(12) United States Patent
Bergstrom et al.

(10) Patent No.: US 10,603,997 B2
(45) Date of Patent: Mar. 31, 2020

(54) ELECTRIC VEHICLE

(71) Applicant: Polaris Industries Inc., Medina, MN (US)

(72) Inventors: Mark P. Bergstrom, Forest Lake, MN (US); Brian T. Hertzberg, Forest Lake, MN (US); Brent D. Raske, New Hope, MN (US); Gary V. Owen, Centuria, WI (US); Benjamin M. Johnson, Zimmerman, MN (US); David D. Helgeson, Roseville, MN (US); Jeffrey G. Jepsen, Estherville, IA (US); Alyssa D. Johnson, North Branch, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 15/001,757

(22) Filed: Jan. 20, 2016

(65) Prior Publication Data

US 2016/0207418 A1  Jul. 21, 2016

Related U.S. Application Data

(60) Provisional application No. 62/106,175, filed on Jan. 21, 2015.

(51) Int. Cl.
*B60K 1/04* (2019.01)
*B62D 63/02* (2006.01)
(Continued)

(52) U.S. Cl.
CPC .................. *B60K 1/04* (2013.01); *B60G 3/06* (2013.01); *B60G 3/08* (2013.01); *B60K 1/00* (2013.01);
(Continued)

(58) Field of Classification Search
CPC ...... B62D 21/12; B62D 23/00; B62D 23/005; B62D 31/00; B62D 31/003; B62D 63/025;
(Continued)

(56) References Cited

U.S. PATENT DOCUMENTS

| | | | | |
|---|---|---|---|---|
| 2,678,231 A | * | 5/1954 | Barenyi | B62D 25/24 296/193.03 |
| 3,616,872 A | * | 11/1971 | Taylor | B60L 11/1805 105/51 |

(Continued)

FOREIGN PATENT DOCUMENTS

| | | |
|---|---|---|
| CN | 102300734 | 12/2011 |
| EP | 1318064 | 6/2003 |

(Continued)

OTHER PUBLICATIONS

International Search Report and Written Opinion issued by the European Patent Office, dated Sep. 21, 2016, for related International Patent Application No. PCT/US2016/014062, 17 pages.

(Continued)

*Primary Examiner* — James A Shriver, II
*Assistant Examiner* — Vaughn Coolman
(74) *Attorney, Agent, or Firm* — Faegre Drinker Biddle & Reath LLP

(57) ABSTRACT

A vehicle is provided including a frame assembly. The frame assembly includes a front frame module, a middle frame module, and a rear frame module. The front frame module is fastened to a front portion of the middle frame module. The rear frame module is fastened to a rear portion of the middle frame module. The middle frame module is interchangeable with at least one other middle frame module to change a length of the vehicle.

17 Claims, 85 Drawing Sheets

(51) Int. Cl.
 B60G 3/06 (2006.01)
 B60K 1/00 (2006.01)
 B60K 16/00 (2020.01)
 B60G 3/08 (2006.01)
 B60L 50/64 (2019.01)
(52) U.S. Cl.
 CPC .............. B60K 16/00 (2013.01); B60L 50/64 (2019.02); B62D 63/025 (2013.01); *B60G 2200/10* (2013.01); *B60G 2200/132* (2013.01); *B60G 2200/142* (2013.01); *B60G 2300/13* (2013.01); *B60G 2300/50* (2013.01); *B60K 2001/001* (2013.01); *B60K 2001/0416* (2013.01); *B60K 2016/003* (2013.01); *B60Y 2200/91* (2013.01); *Y02T 10/90* (2013.01)
(58) Field of Classification Search
 CPC ................ B62D 1/22; B60K 201/0422; B60K 201/0416; B60K 201/0433
 See application file for complete search history.

(56) References Cited

U.S. PATENT DOCUMENTS

| | | | | | |
|---|---|---|---|---|---|
| 4,217,970 | A | * | 8/1980 | Chika | B60G 21/055 180/298 |
| 4,267,895 | A | * | 5/1981 | Eggert, Jr. | B60K 1/04 180/291 |
| 5,401,056 | A | * | 3/1995 | Eastman | B60G 3/20 280/785 |
| 5,934,397 | A | * | 8/1999 | Schaper | B60G 3/01 180/294 |
| 6,360,149 | B1 | | 3/2002 | Kwon | |
| 6,923,282 | B2 | * | 8/2005 | Chernoff | B60G 17/0195 180/312 |
| 7,140,640 | B2 | * | 11/2006 | Tronville | B62D 21/02 280/781 |
| 7,325,866 | B2 | * | 2/2008 | Horton | B62D 21/02 280/785 |
| 7,441,615 | B2 | * | 10/2008 | Borroni-Bird | B60G 3/18 180/402 |
| 7,441,809 | B1 | * | 10/2008 | Coombs | B62D 21/03 280/124.11 |
| 7,905,540 | B2 | * | 3/2011 | Kiley | B62D 63/025 296/193.04 |
| 8,240,748 | B2 | * | 8/2012 | Chapman | A61G 3/00 296/187.07 |
| 8,316,977 | B2 | * | 11/2012 | Tsumiyama | B60N 2/012 180/312 |
| 8,464,817 | B2 | * | 6/2013 | Usami | B60K 1/04 180/68.5 |
| 8,496,268 | B2 | * | 7/2013 | Theodore | B60K 6/40 280/124.109 |
| 8,641,133 | B1 | * | 2/2014 | Scaringe | B62D 23/005 296/193.03 |
| 8,657,058 | B2 | * | 2/2014 | Takagi | B60K 1/04 180/291 |
| D724,997 | S | * | 3/2015 | Brew | D12/14 |
| 9,004,535 | B2 | * | 4/2015 | Wu | B62D 23/005 180/311 |
| 9,045,014 | B1 | * | 6/2015 | Verhoff | B62D 21/152 |
| 9,045,163 | B2 | * | 6/2015 | Theodore | B62D 21/02 |
| 9,287,595 | B2 | * | 3/2016 | Fujii | H01M 2/1077 |
| D786,133 | S | | 5/2017 | Song | |
| 9,649,923 | B2 | * | 5/2017 | Perlo | B60K 1/02 |
| 9,656,640 | B1 | * | 5/2017 | Verhoff | B62D 21/152 |
| 2002/0162224 | A1 | | 11/2002 | Gianfranco | |
| 2003/0040827 | A1 | | 2/2003 | Chernoff | |
| 2005/0056472 | A1 | | 3/2005 | Smith et al. | |
| 2005/0253433 | A1 | | 11/2005 | Brown | |
| 2011/0289896 | A1 | * | 12/2011 | Sasahara | A01D 34/78 56/11.9 |
| 2012/0326410 | A1 | * | 12/2012 | West | B60G 3/20 280/124.109 |
| 2013/0240273 | A1 | * | 9/2013 | Langer | B60K 1/00 180/55 |
| 2016/0046193 | A1 | * | 2/2016 | Park | B60L 11/12 701/22 |
| 2016/0347159 | A1 | * | 12/2016 | Perlo | B60K 1/00 |

FOREIGN PATENT DOCUMENTS

| | | |
|---|---|---|
| WO | WO 2003/070543 | 8/2003 |
| WO | WO 2009/017533 | 2/2009 |

OTHER PUBLICATIONS

International Preliminary Report on Patentability issued by the European Patent Office, dated Jun. 6, 2017, for related International Patent Application No. PCT/US2016/014062; 18 pages.
Article 34 Amendment filed with the European Patent Office, dated Dec. 12, 2016, for related International Patent Application No. PCT/US2016/014062; 6 pages.
Examination Report No. 1 issued by the Australian Government IP Australia, dated Aug. 20, 2018 for Australian Patent Application 2016209449; 4 pages.
1st Office Action issued by the China National Intellectual Property Administration (CNIPA) dated Oct. 25, 2018, for Chinese Patent Application No. 201680006568.1; 10 pages.
Communication Pursuant to Rules 161(1) and 162 EPC dated Sep. 7, 2017, for European Patent Application No. 167072552; 2 pages.
European Search Report issued by the European Patent Office, dated Jun. 4, 2019, for European Patent Application No. 19155252.0; 8 pages.

* cited by examiner

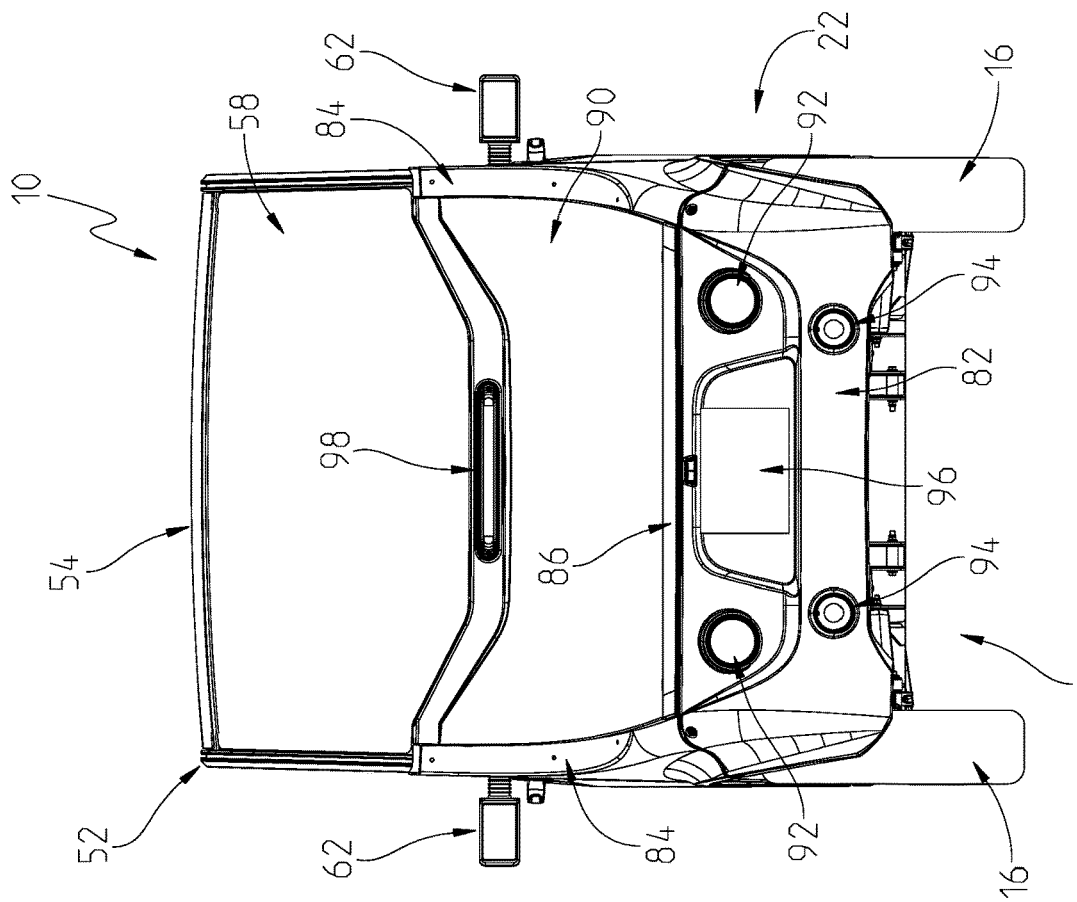
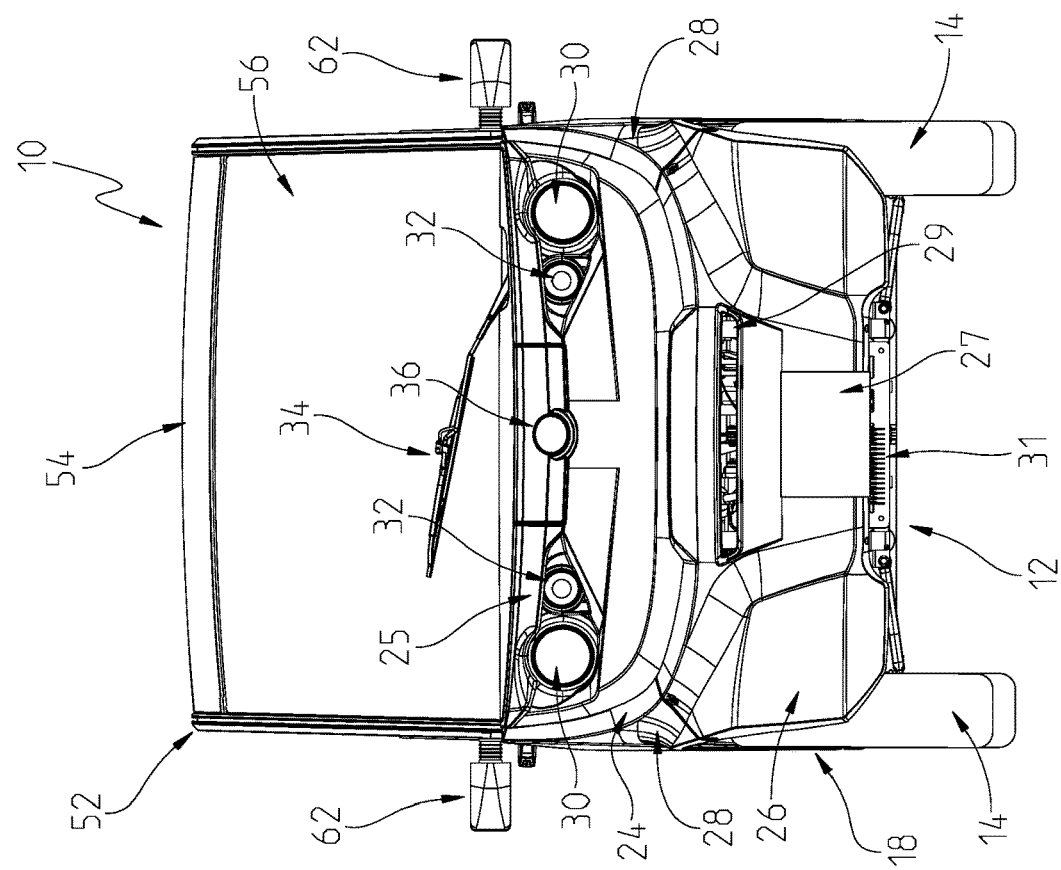

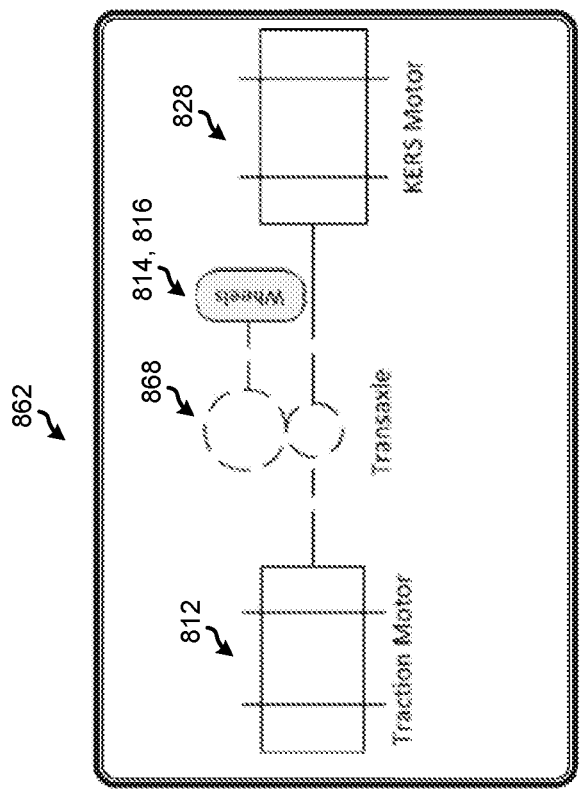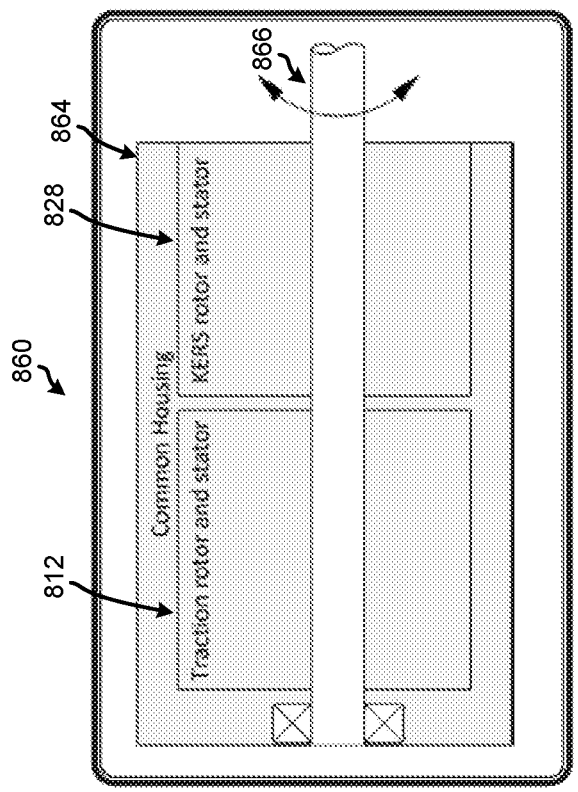
FIG. 67

ELECTRIC VEHICLE

CROSS-REFERENCE TO RELATED APPLICATIONS

The present application claims priority to U.S. Provisional Patent Application Ser. No. 62/106,175, filed on Jan. 21, 2015, and entitled "ELECTRIC VEHICLE", the complete disclosures of which are expressly incorporated by reference herein.

FIELD OF THE DISCLOSURE

The present disclosure relates to a vehicle and more particularly to an electric vehicle including a frame assembly having a plurality of frame modules.

BACKGROUND AND SUMMARY

Vehicles may include various types of powertrains, including engine-based, electric, and hybrid powertrains. In some electric or hybrid vehicles, vehicle braking uses a larger amount of battery energy than any other vehicle function. Some vehicles include regenerative braking systems configured to store kinetic energy produced during vehicle braking. While electric motors are capable of producing braking torque and returning power to vehicle batteries, the batteries often are inefficient at high charge rates and cannot always accept the required power levels when fully charged. Consequently, either the regenerative braking levels are set very low, or a load dump component (e.g., large resistor) and control are added to dissipate the extra power as heat.

Some systems use ultra-capacitors or a high power battery technology in parallel with a conventional battery pack, often resulting in higher vehicle cost. In some systems, such an arrangement locks the state of charge of the two battery packs together, so that both are fully charged at the same time. It has also been proposed to use a DC-DC converter to decouple the ultra-capacitors from the battery, which introduces an additional power conversion between the motor and the energy storage.

Electric vehicles often include on-board battery chargers in the 800 to 3000 watt range or other suitable power ranges. Electric vehicles also often require 12 volt auxiliary power for lighting, fans, controls, and other accessories. In some electric vehicles, this auxiliary power is generated by a DC-DC converter that converts power at the battery pack voltage to power at the auxiliary power level (e.g., 12 VDC). The DC-DC converter is sized to supply the peak power requirements, which may be high for some electrical devices such as headlights, fans, winches, etc. If a DC-DC converter's output is exceeded during vehicle operation, the output voltage may collapse causing relays to drop out and other devices to malfunction. For loads with very high peak requirements, such as winches for example, some vehicles include an additional battery to provide adequate power to the large load. In some vehicles, the auxiliary loads are powered directly from one of the batteries making up the high voltage battery pack, typically the lowest potential or "bottom" battery, i.e., the battery whose negative terminal is connected directly to ground. This often leads to over-discharge and/or undercharge of the lowest potential battery and overcharge of the remainder of the battery pack, potentially reducing battery life.

BRIEF DESCRIPTION OF THE DRAWINGS

FIG. 7 is a front view of the vehicle of FIG. 1;

FIG. 8 is a rear view of the vehicle of FIG. 1;

FIG. 67 is a representative view of first and second configurations for incorporating an energy recovery motor into the powertrain of the vehicle of FIG. 1;

Corresponding reference characters indicate corresponding parts throughout the several views. The exemplification set out herein illustrates embodiments of the invention, and such exemplifications are not to be construed as limiting the scope of the invention in any manner.

DETAILED DESCRIPTION OF THE DRAWINGS

Figure 1:
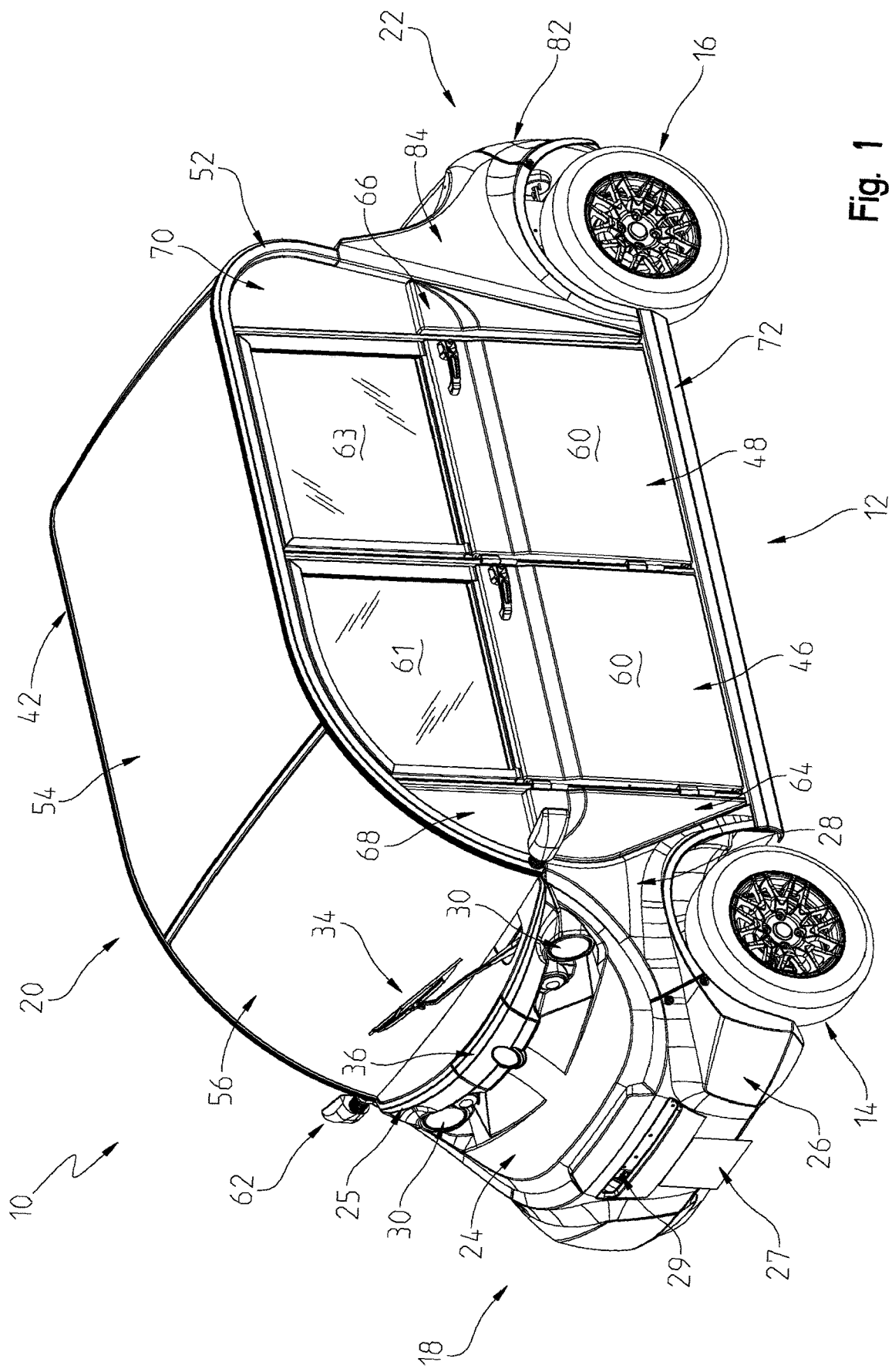
FIG. 1 is a front left perspective view of an exemplary electric vehicle of the present disclosure including four doors.

The embodiments disclosed herein are not intended to be exhaustive or limit the disclosure to the precise forms disclosed in the following detailed description. Rather, the embodiments are chosen and described so that others skilled in the art may utilize their teachings.

With reference to FIGS. 1-8, an electric vehicle 10 is illustrated including a frame assembly 12 supported by a plurality of ground engaging members, for example front wheels 14 and rear wheels 16. Vehicle 10 includes a front portion 18, a rear portion 22, and a middle portion 20 extending between front and rear portions 18, 22. Vehicle 10 is illustratively a four-door vehicle, although vehicle 10 may alternatively include two doors (FIG. 9), six doors (FIG. 11), or another suitable number of doors. In another embodiment, vehicle 10 does not include doors and has an open cab. In another embodiment, vehicle 10 includes half lower doors, quarter lower doors, or soft canvas doors.

Front portion 18 includes a plurality of body panels including a hood 24, a hood valence 25 coupled to hood 24, a front body panel 26 positioned in front of and below hood 24, and side body panels 28 positioned on each side adjacent hood 24 (see also FIG. 46). Front body panel 26 includes a mount 27 for mounting a bracket and license plate. Front portion 18 also includes a pair of headlights 30 positioned in openings formed in hood 24. Turn signal lights 32 are also positioned in openings formed in hood 24 (FIG. 7). A windshield wiper 34 is driven by a wiper motor 38 (FIG. 5) located behind hood 24. In the illustrated embodiment, hood 24 is removable from frame assembly 12 to provide access to electronic components located beneath hood 24.

A charge port 76 (FIG. 36) is accessible behind a hinged access panel 36 of hood valence 25. Charge port 76 is electrically coupled to batteries 252 (FIG. 36) via one or more chargers 422 (FIG. 36) for charging the vehicle batteries 252 via a remote power source (e.g., electrical outlet, generator, etc.). Charge port 76 is positioned in the front of vehicle 10 below windshield 56 to increase the likelihood of a battery charging operation being visible to the operator when the operator is seated in vehicle 10. In another embodiment, vehicle 10 includes an alternative charge port 77 illustrated in FIG. 36 instead of charge port 76. In one embodiment, charge port 76 is configured for normal charge operations (e.g., 120 V), and charge port 77 is configured for fast charge operations (e.g., 240 V). In another embodiment, both charge ports 76, 77 are provided in vehicle 10.

Middle portion 20 of vehicle 10 of FIGS. 1-8 illustratively includes a cab frame 52 and a plurality of doors, illustratively a pair of front doors 46 and a pair of rear doors 48. Front doors 46 each include a lower door portion 60 and a window 61, and rear doors 48 each include a lower door portion 60 and a window 63. In the illustrated embodiment, windows 61 each have a curved top edge to match the curved contour of cab frame 52, and windows 63 each have a rectangular shape. In the illustrated embodiment, lower door portions 60 of each door 46, 48 are identical, i.e., the same size and shape, and are thus interchangeable.

Figure 46:
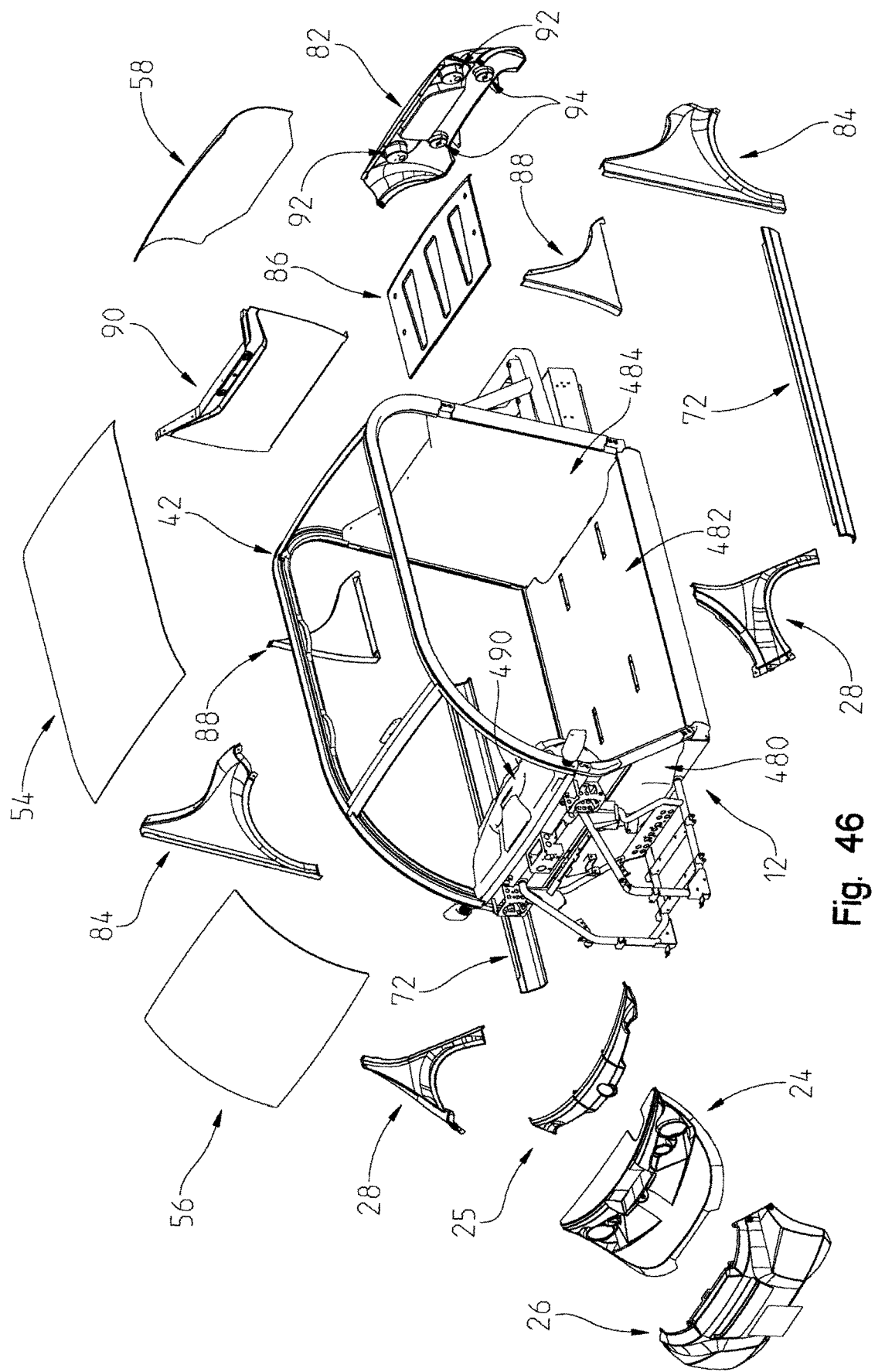
FIG. 46 is a partially exploded front left perspective view of the vehicle of FIG. 1 including a frame assembly and a plurality of body panels configured to couple to the frame assembly.

Middle portion 20 includes a roof panel 54, a front windshield 56, and a rear windshield 58 coupled to cab frame 52 (see also FIG. 46). In one embodiment, vehicle 10 does not include rear windshield 58. Middle portion 20 further includes side body panels 64 positioned between front doors 46 and front portion 18 and side body panels 66 positioned between rear doors 48 and rear portion 22. Lower trim panels 72 are coupled to frame assembly 12 below doors 48. Front side windows 68 and rear side windows 70 are coupled between respective doors 46, 48 and cab frame 52. Windshields 56, 58 and windows 61, 63, 68, 70 may be made of glass or plastic, for example. Side mirrors 62 are coupled to cab frame 52. In one embodiment, vehicle 10 includes an option where doors 46, 48, side windows 68, 70, and side body panels 64, 66 are all removed from middle portion 20 to provide an open-air cab for the operator and passengers. In one embodiment, windows 56, 58 and roof panel 54 are also removed from cab frame 52. In one embodiment, doors 46, 48 are removable by an operator.

Figure 2:
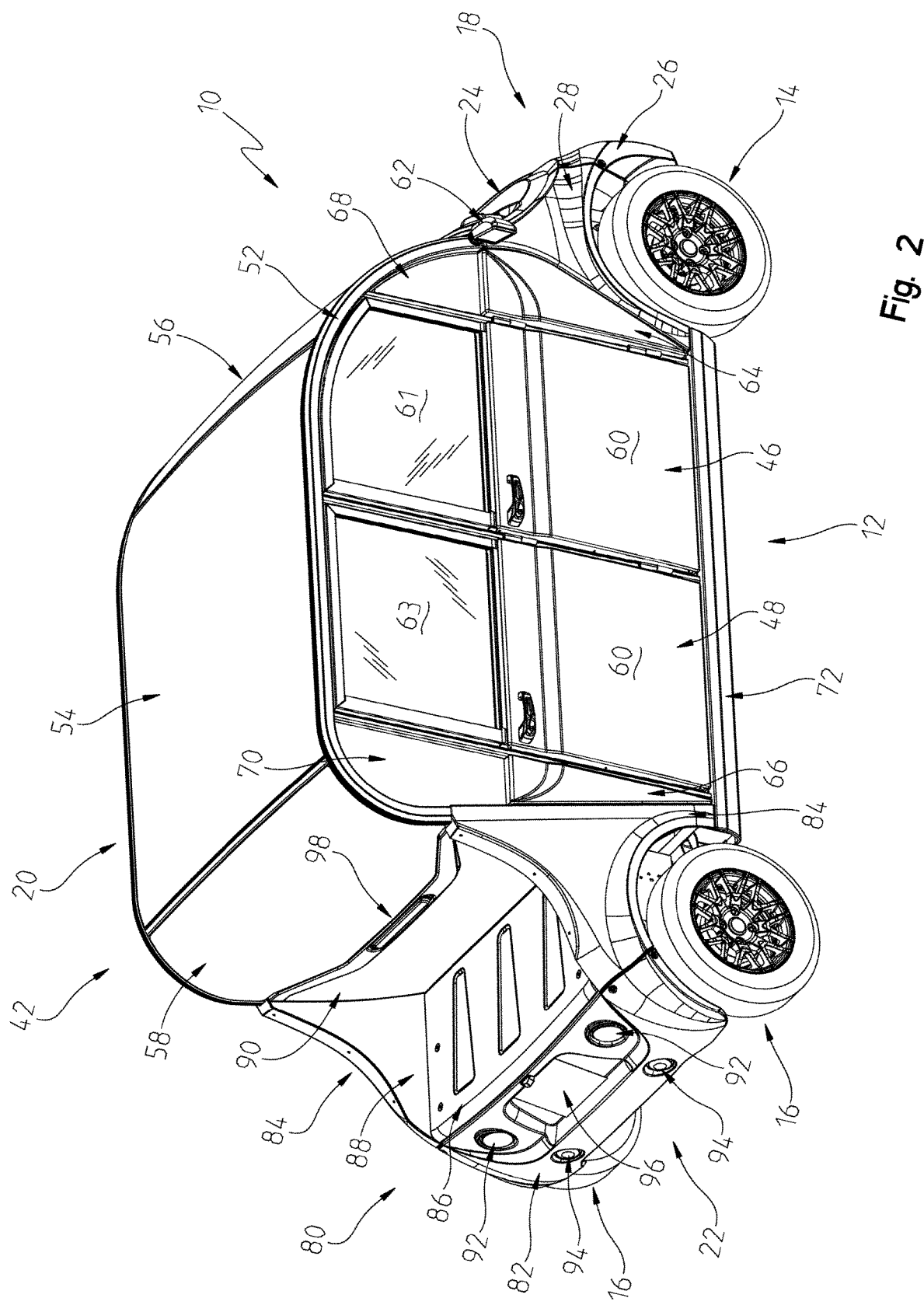
FIG. 2 is a rear right perspective view of the vehicle of FIG. 1.
Figure 3:
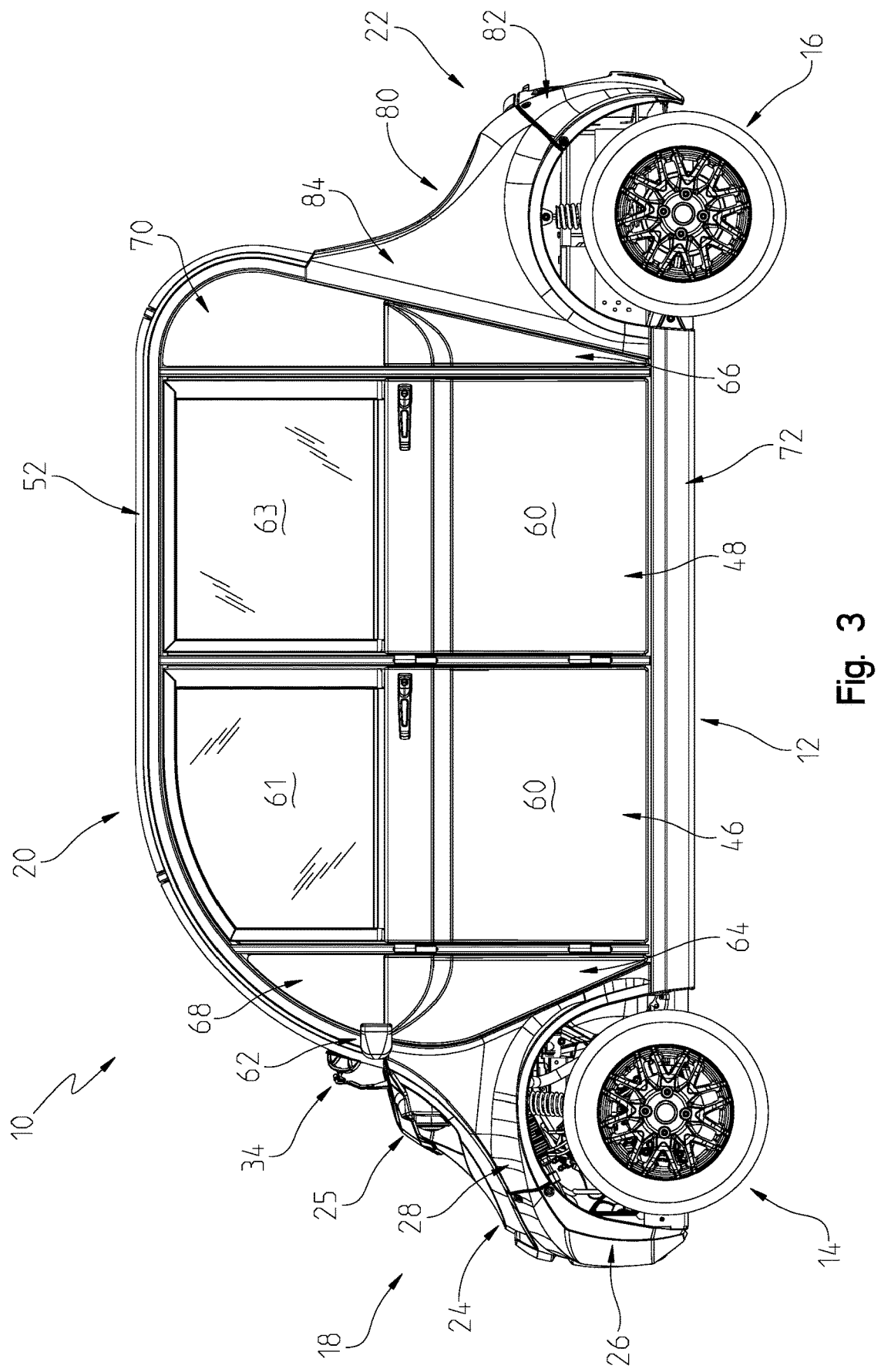
FIG. 3 is a left side view of the vehicle of FIG. 1.
Figure 4:
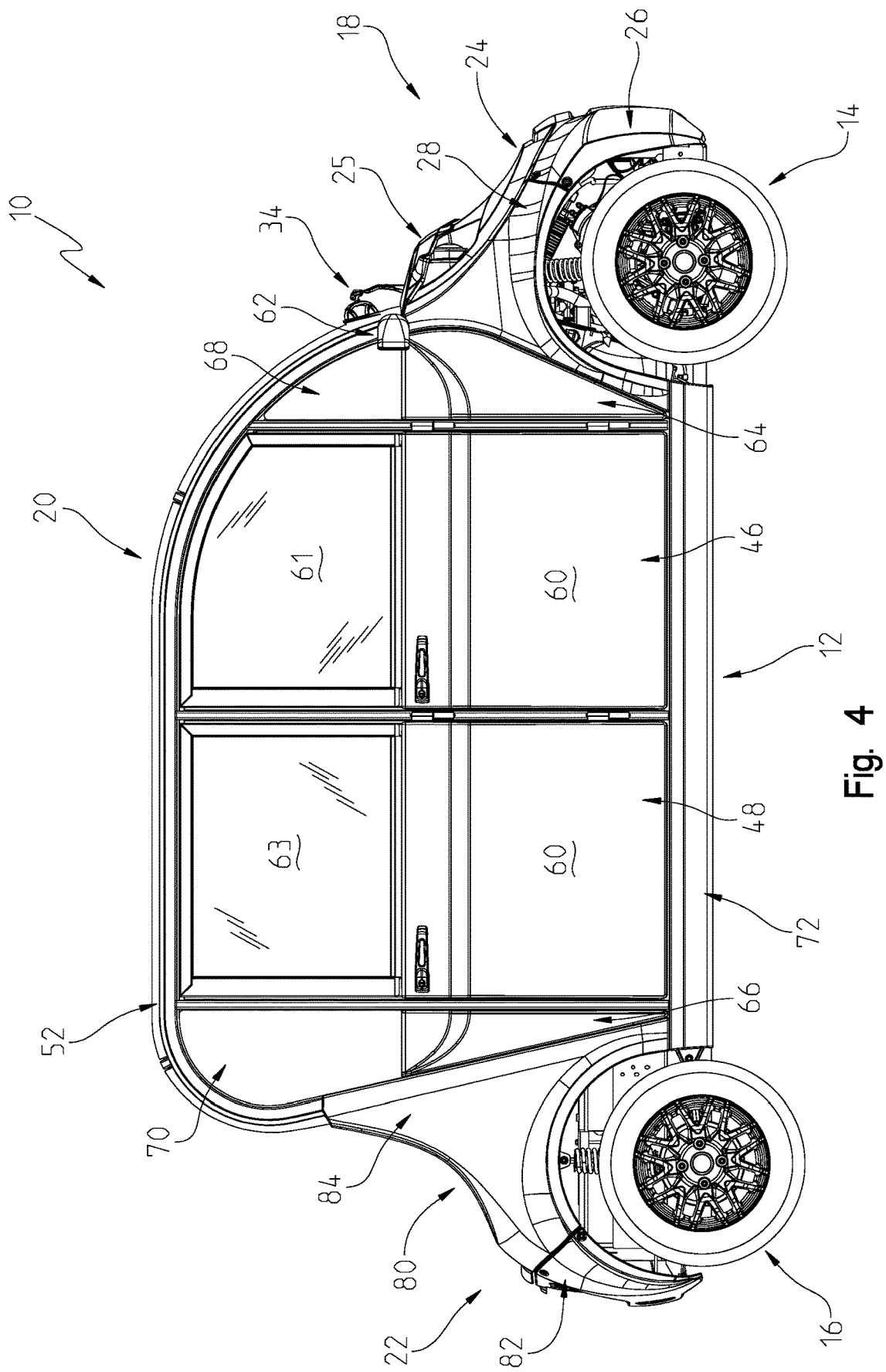
FIG. 4 is a right side view of the vehicle of FIG. 1.
Figure 5:
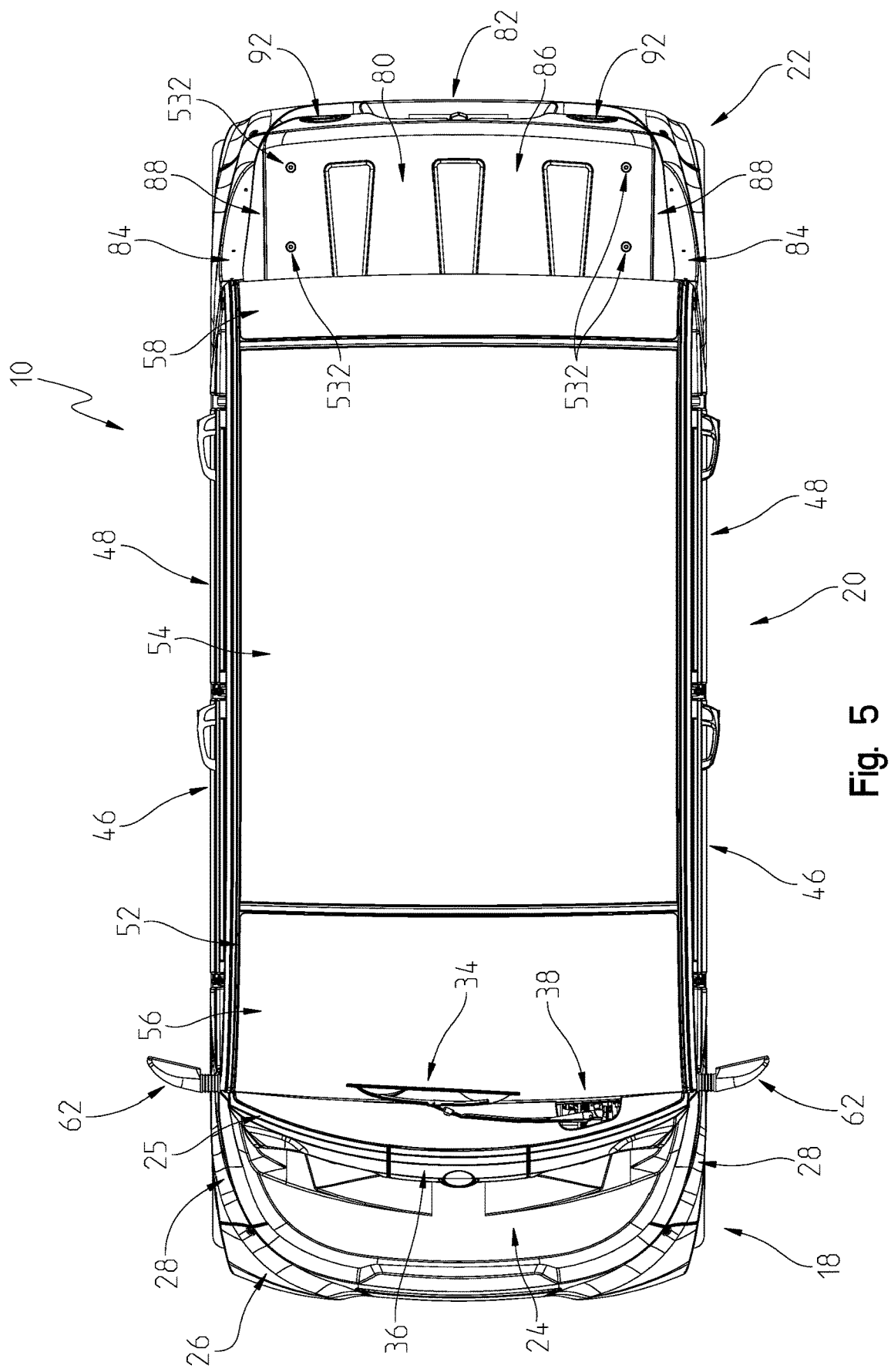
FIG. 5 is a top view of the vehicle of FIG. 1.

As illustrated in FIG. 2, rear portion 22 includes a storage area 80, rear side panels 84, and a rear body panel 82 (see also FIG. 46). Storage area 80 includes a platform 86, side panels 88, and a back panel 90 cooperating to form a storage space for light cargo or for mounting accessories. Platform 86 is removable from the frame to gain access to batteries 252. In one embodiment, platform 86 is coupled via hook and loop fastener to the rear frame. Brake lights 92 and reverse lights 94 are positioned in openings formed in rear body panel 82. An additional brake light 98 is positioned in an opening formed in back panel 90. Rear body panel 82 further includes a mount 96 for mounting a license plate.

Figure 6:
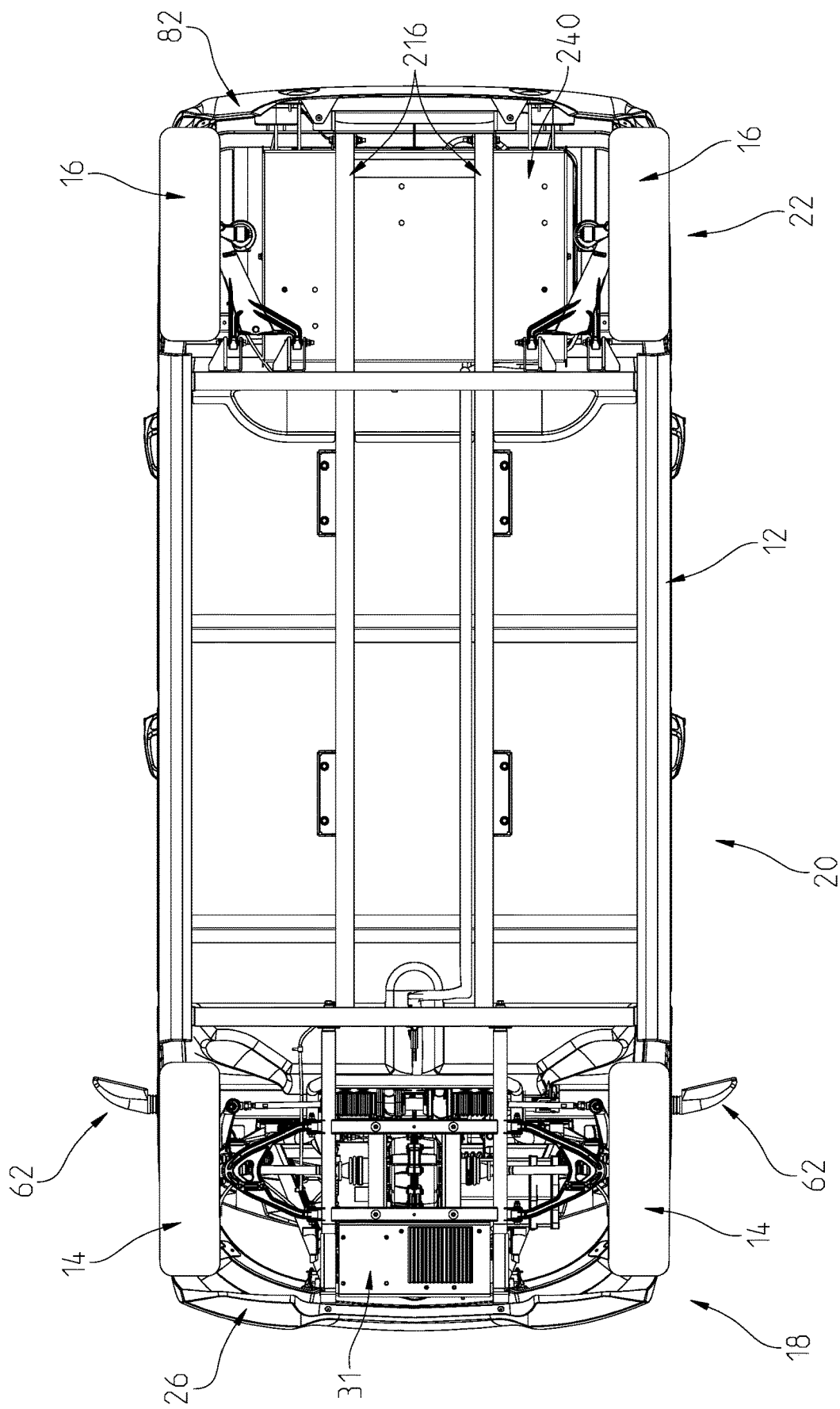
FIG. 6 is a bottom view of the vehicle of FIG. 1.

As illustrated in FIGS. 6 and 7, a voltage regulator 31 is mounted to frame assembly 12 in the lower front portion of vehicle and includes cooling fins that encounter air flowing beneath vehicle 10. As illustrated in FIGS. 1 and 7, front body panel 26 includes a slotted opening 29 to provide air cooling to electrical components of vehicle 10. In one embodiment, the body panels of vehicle 10, including hood 24, front body panel 26, side body panels 28, 64, 66, panel 72, rear side panels 84, rear body panel 82, roof panel 54, side panels 88, and back panel 90 are made of plastic.

Figure 9:
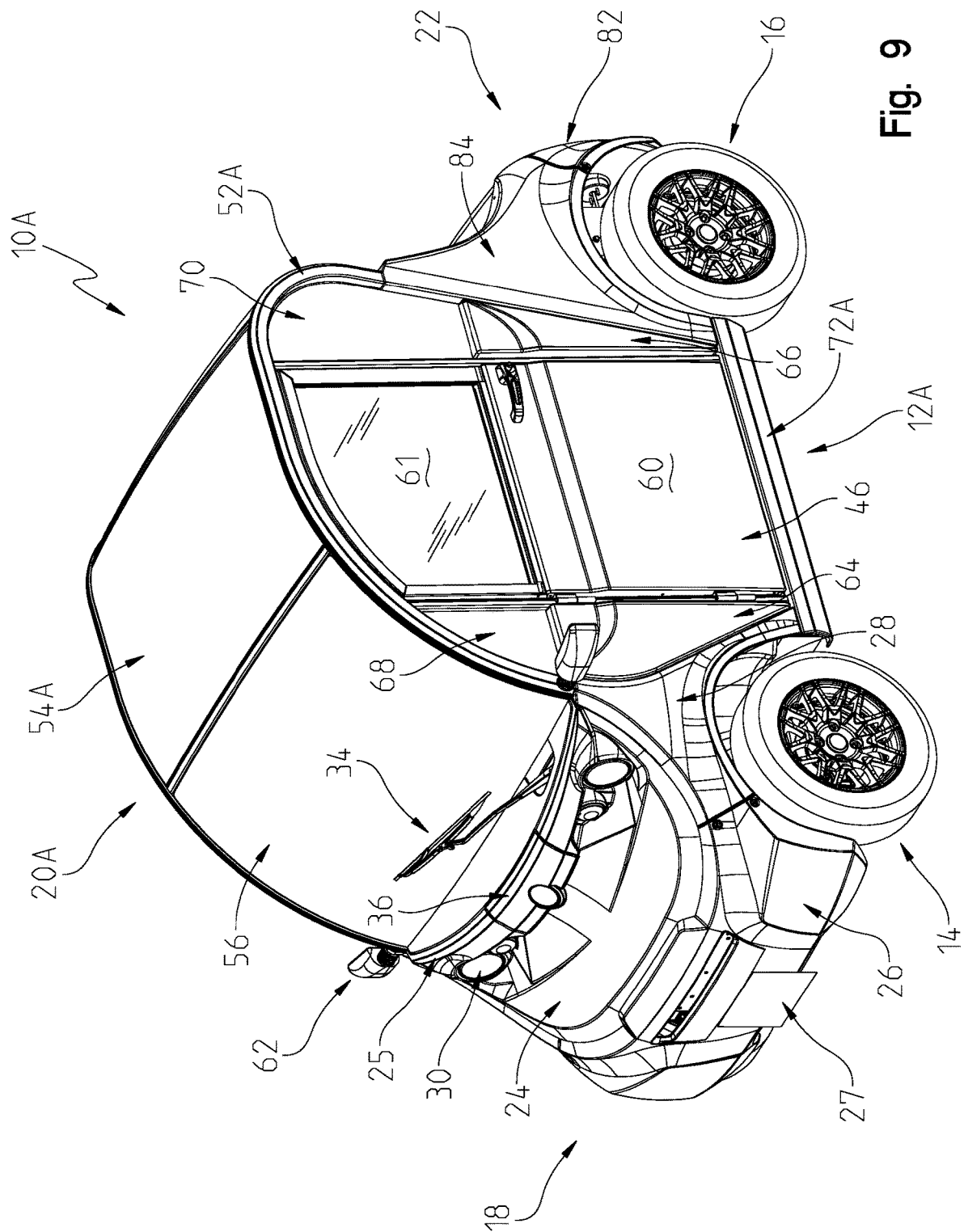
FIG. 9 is a front left perspective view of another exemplary electric vehicle of the present disclosure including two doors.
Figure 10:
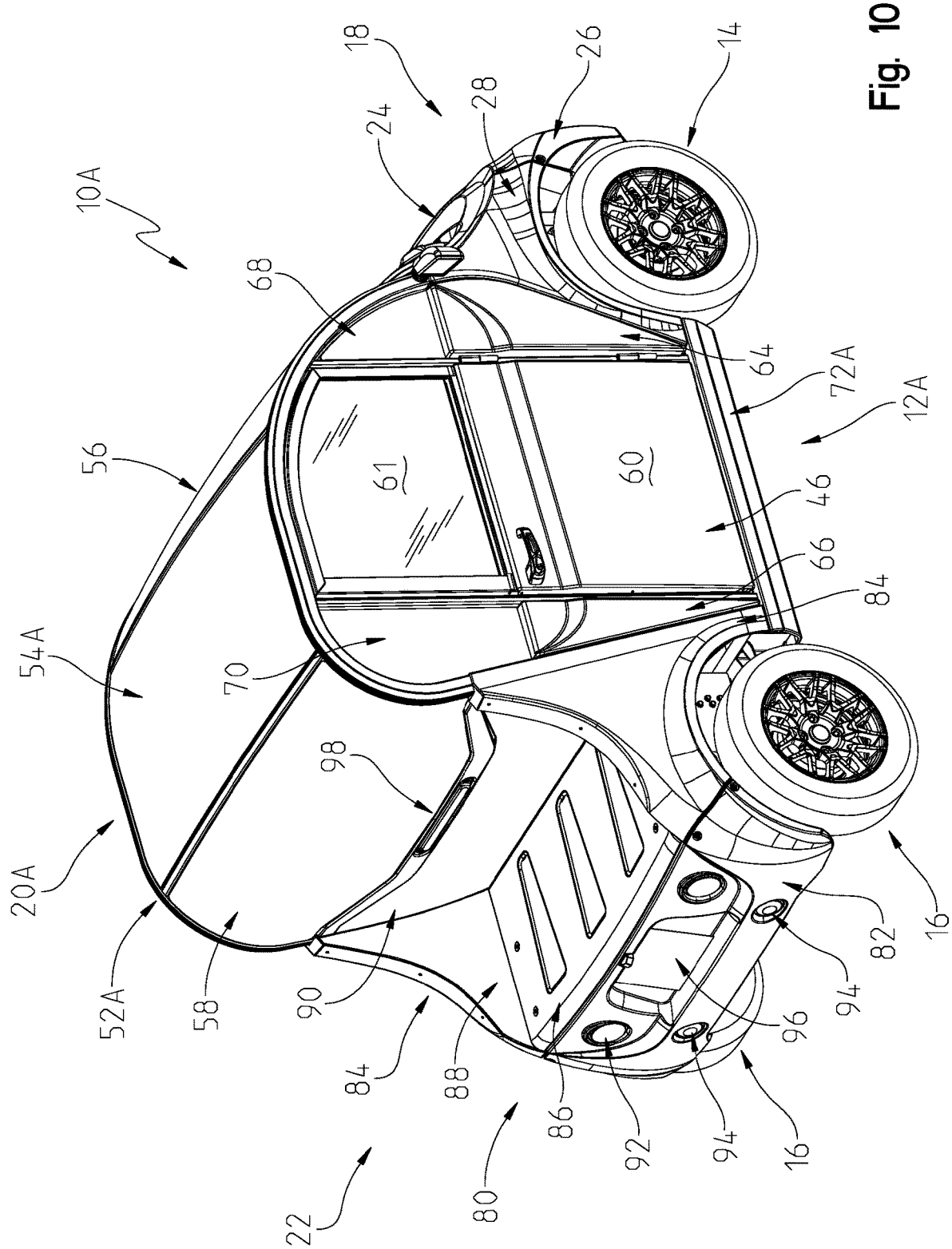
FIG. 10 is a rear right perspective view of the vehicle of FIG. 9.

Referring to FIGS. 9 and 10, an electric vehicle 10A is illustrated. Vehicle 10A is a two-door version of vehicle 10 of FIGS. 1-8. Like components of vehicle 10A and vehicle 10 are provided with like reference numbers. In the illustrated embodiment, front portion 18 and rear portion 22 of vehicle 10A are identical to the front and rear portions 18, 22 of vehicle 10. Middle portion 20A of vehicle 10A is shorter in length than middle portion 20 of vehicle 10, resulting in vehicle 10A being shorter in length than vehicle 10 and being configured to carry fewer passengers. Middle portion 20A includes a frame assembly 12A, a roof panel 54A, and a lower trim panel 72A that are all shorter in length than corresponding frame assembly 12, roof panel 54, and lower trim panel 72 of vehicle 10. Middle portion 20A further includes two doors 46, each including a window 61 and a lower door portion 60.

Figure 11:
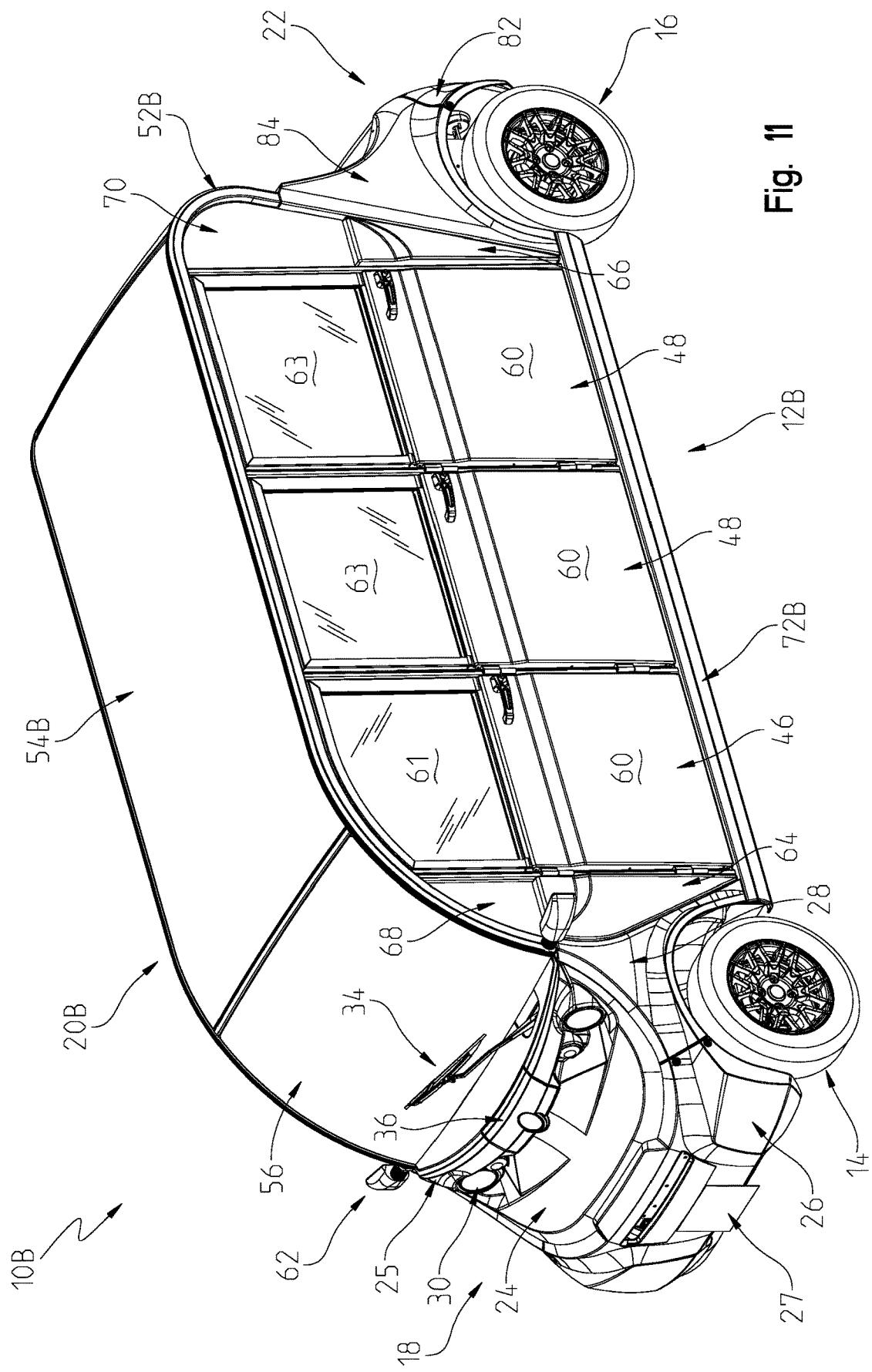
FIG. 11 is a front left perspective view of another exemplary electric vehicle of the present disclosure including six doors.
Figure 12:
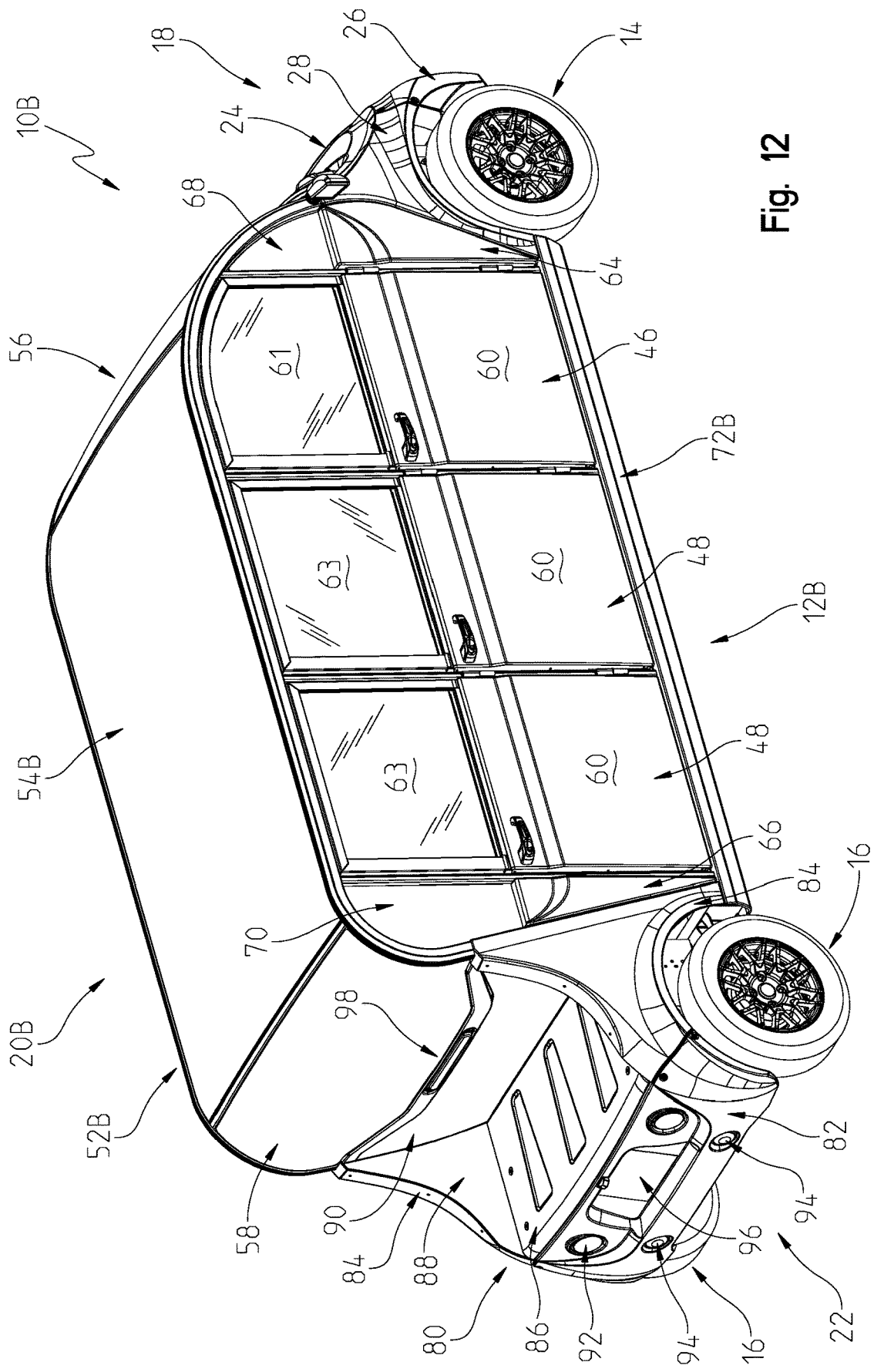
FIG. 12 is a rear right perspective view of the vehicle of FIG. 11.

Referring to FIGS. 11 and 12, an electric vehicle 10B is illustrated. Vehicle 10B is a six-door version of vehicle 10 of FIGS. 1-8. Like components of vehicle 10B and vehicle 10 are provided with like reference numbers. In the illustrated embodiment, front portion 18 and rear portion 22 of vehicle 10B are identical to the front and rear portions 18, 22 of vehicle 10. Middle portion 20B of vehicle 10A is longer in length than middle portion 20 of vehicle 10, resulting in vehicle 10B being longer in length than vehicle 10 and being configured to carry additional passengers, illustratively six passengers. Middle portion 20B includes a frame assembly 12B, a roof panel 54B, and a lower trim panel 72B that are all longer in length than corresponding frame assembly 12, roof panel 54, and lower trim panel 72 of vehicle 10. Middle portion 20B further includes six doors, including two front doors 46 and four doors 48. Front doors 46 each include a window 61 and a lower door portion 60, and doors 48 each include a window 63 and a lower door portion 60.

Accordingly, vehicles 10, 10A, and 10B differ only in their length and available cab space/seating which is based on the length of the middle portion 20, 20A, 20B. As such, the description herein referencing vehicle 10 also applies to each of vehicles 10A and 10B unless otherwise stated. Vehicles having additional lengths based on different length middle portions may also be provided.

Referring to FIGS. 13A and 14-16, frame assembly 12 includes a front frame module 40, a middle frame module 42, and a rear frame module 44. Front and rear frame modules 40, 44 are each fastened to middle frame module 42 with fasteners, such as bolts for example, as described herein. In one embodiment, middle frame module 42 and rear frame module 44 are both made of aluminum, and front frame module 40 is made of steel. Other suitable materials may be provided.

Middle frame module 42 includes cab frame 52, a lower or floor frame 50, a forward frame 100 coupled to cab frame 52 and floor frame 50, a steering assembly frame 102 coupled to forward frame 100, and a pair of seat frames 104 coupled to floor frame 50. In the illustrated embodiment, cab frame 52 includes frame members 106, 108 extending longitudinally from rear frame module 44 to forward frame 100. Cab frame 52 further includes cross frame members 110, 112 extending between frame members 106, 108. Frame members 106, 108 each include a respective front curved portion 133, 137 that couples to forward frame 100 and a respective rear curved portion 135, 139 that couples to rear frame module 44.

Frame members 106, 108 and cross frame members 110, 112 of cab frame 52 cooperate to form a seat for roof panel 54 (FIG. 1). Similarly, frame members 106, 108 and cross frame member 110 cooperate to form a seat for front windshield 56 (FIG. 1), and frame members 106, 108 and cross frame member 112 cooperate to form a seat for rear windshield 58 (FIG. 2). See, for example, ledges 114 of frame members 106, 108 and ledges 116 of cross frame members 110, 112 (FIG. 26) that form seats for windshields 56, 58 and/or roof panel 54. Forward frame 100 also includes a ledge 118 (FIG. 18) serving as a seat for front windshield 56. In one embodiment, windshields 56, 58 and roof panel 54 are coupled to frame members 106, 108 and cross frame members 110, 112 with an adhesive or with a high bond double sided tape, although other suitable couplers may be used.

In one embodiment, frame members 106, 108 and cross frame members 110, 112 of cab frame 52 are made of extruded aluminum, although another suitable material may be used. In the illustrated embodiment, each frame member 106, 108 is a single extrusion, although each frame member 106, 108 may alternatively include multiple frame sections coupled together.

Figure 26:
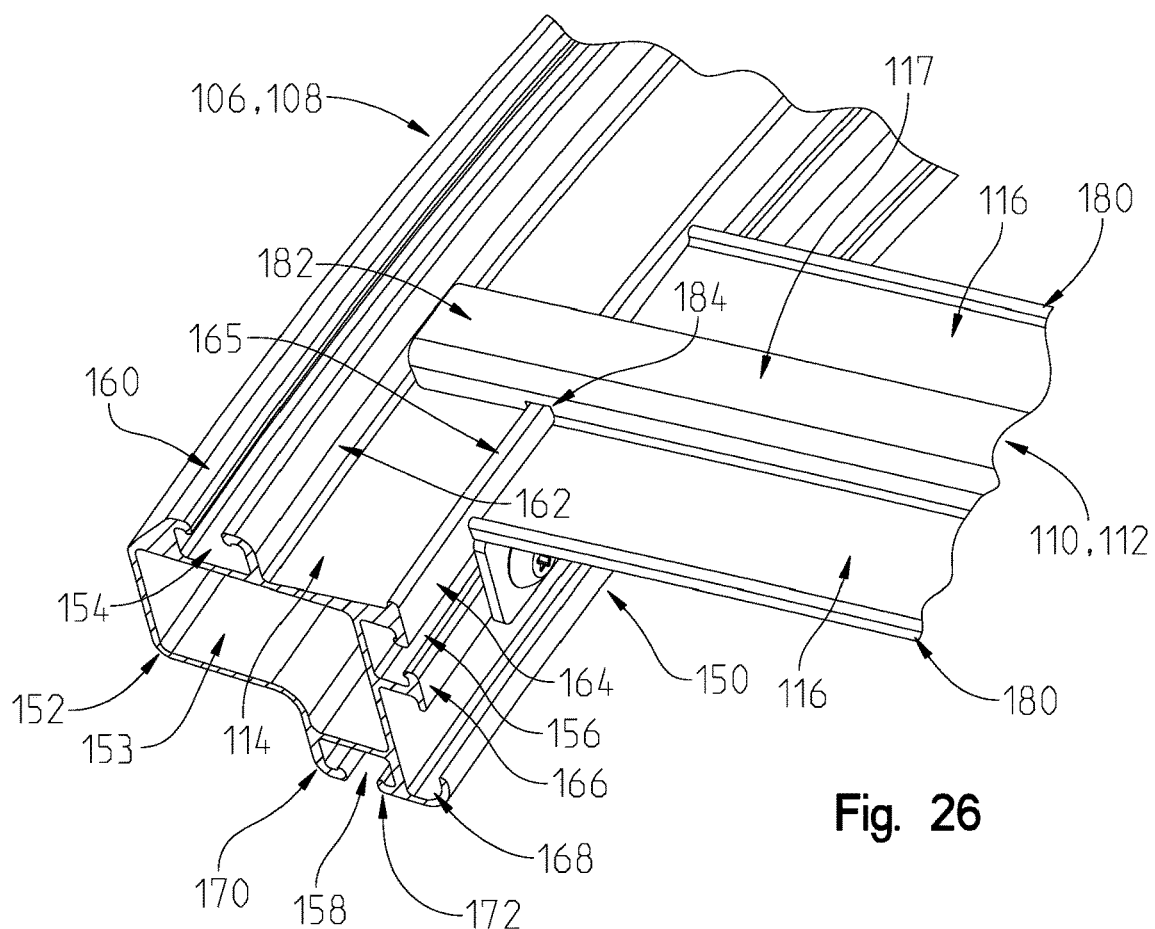
FIG. 26 is a top perspective view of an exemplary joint between the frame members and cross frame members of a cab frame of FIG. 13A.
Figure 27:
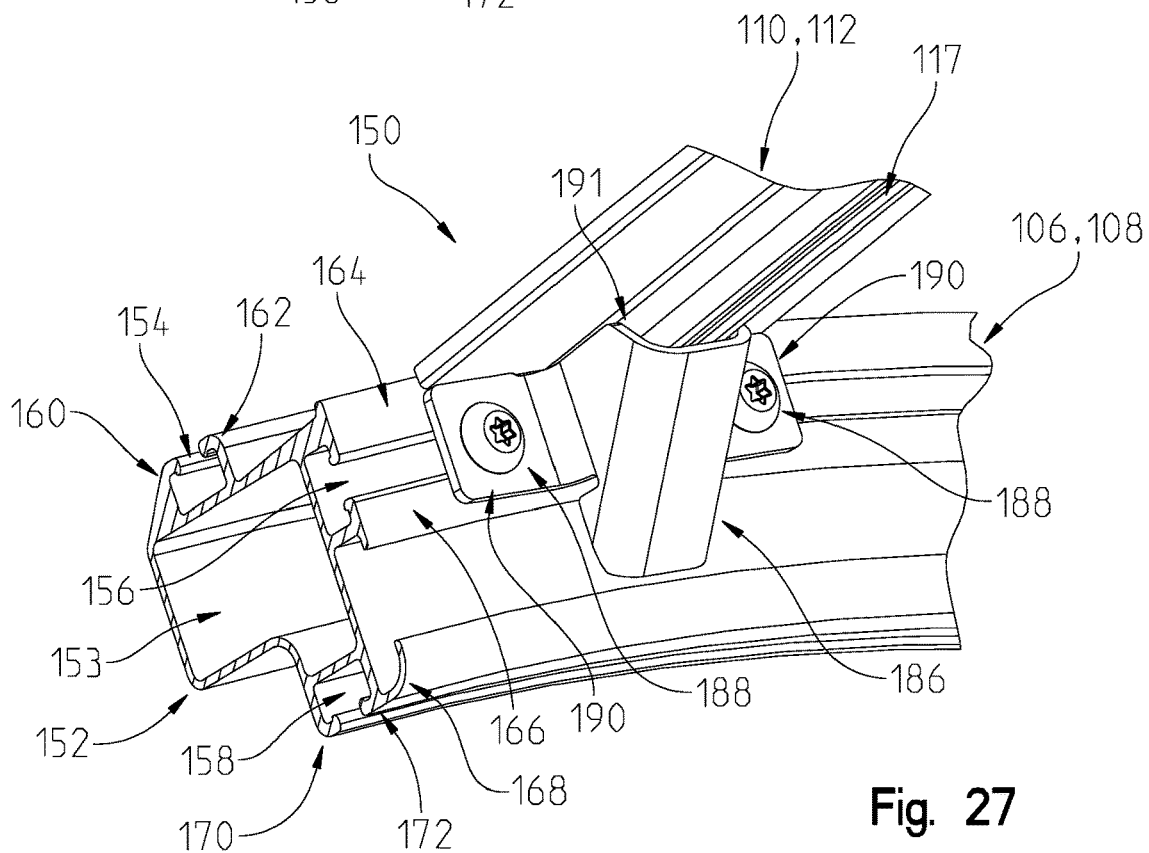
FIG. 27 is a bottom perspective view of the exemplary joint of FIG. 26.

Referring to FIGS. 26 and 27, an exemplary joint 150 is illustrated between a frame member 106, 108 and a cross frame member 110, 112 of cab frame 52. Frame member 106, 108 includes an outer wall 152 forming an internal opening 153 that extends the length of frame member 106, 108. Opening 153 is illustratively L-shaped. A plurality of channels 154, 156, 158, 168 are spaced apart around outer wall 152 and extend the length of frame member 106, 108. One or more channels 154, 156, 158, 168 may be used to route electrical wiring between the front and rear of vehicle 10. Flange portions 160, 162 extending from outer wall 152 cooperate to form channel 154, flange portions 164, 166 extending from outer wall 152 cooperate to form channel 156, and flange portions 170, 172 extending from outer wall 152 cooperate to form channel 158. Outer wall 152 includes a flat portion or ledge 114 extending between flange portion 162 and a lip 165 of flange portion 164. A track 168 is formed along the bottom of outer wall 152 and extends the length of frame member 106, 108.

Cross frame member 110, 112 includes a pair of flat portions or ledges 116 separated by a ridge portion 117 extending the length of cross frame member 110, 112. In one embodiment, ridge portion 117 is hollow. A lip 180 extends along the outer edge of each ledge 116. In one embodiment, ledges 116 and ledges 114 are configured to hold an adhesive or a high bond double sided tape for coupling windshields 56, 58 and roof panel 54 to frame members 106, 108 and cross frame members 110, 112. An end 182 of ridge portion 117 extends past the ends of ledges 116 to couple to ledge 114 of frame member 106, 108, and a notch 184 mates with lip 165 of flange portion 164. A T-shaped bracket 186 is fastened to frame member 106, 108 with fasteners 188. Bracket 186 includes a U-shaped portion 191 supporting ridge portion 117 of cross frame member 110, 112. In the illustrated embodiment, fasteners 188 include screws or bolts positioned through corresponding flanges 190 of bracket 186 and coupled to corresponding nuts positioned in channel 156 to clamp bracket 186 to frame member 106, 108.

Figure 15:
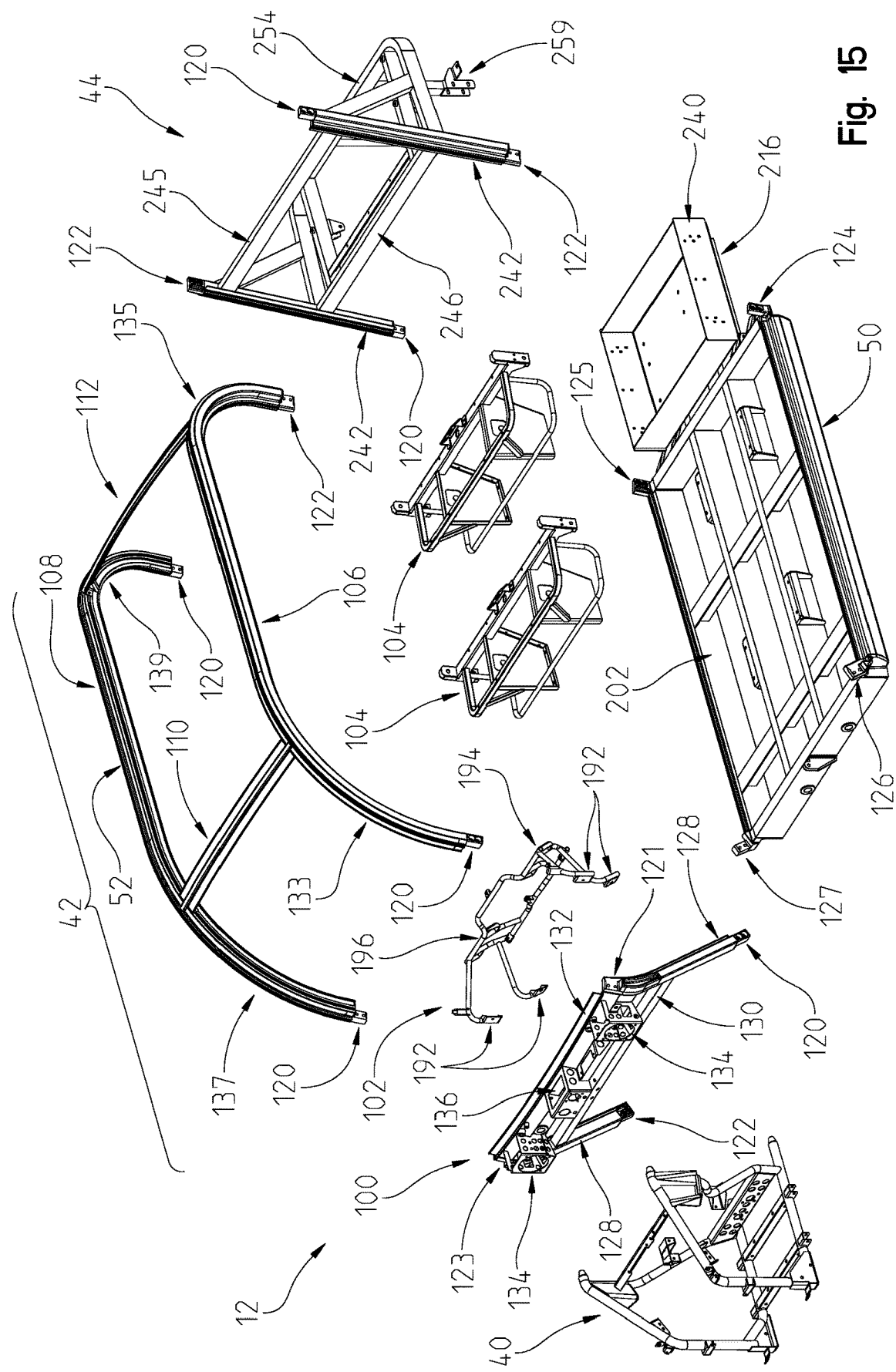
FIG. 15 is an exploded front left perspective view of the frame assembly of FIG. 13A.
Figure 16:
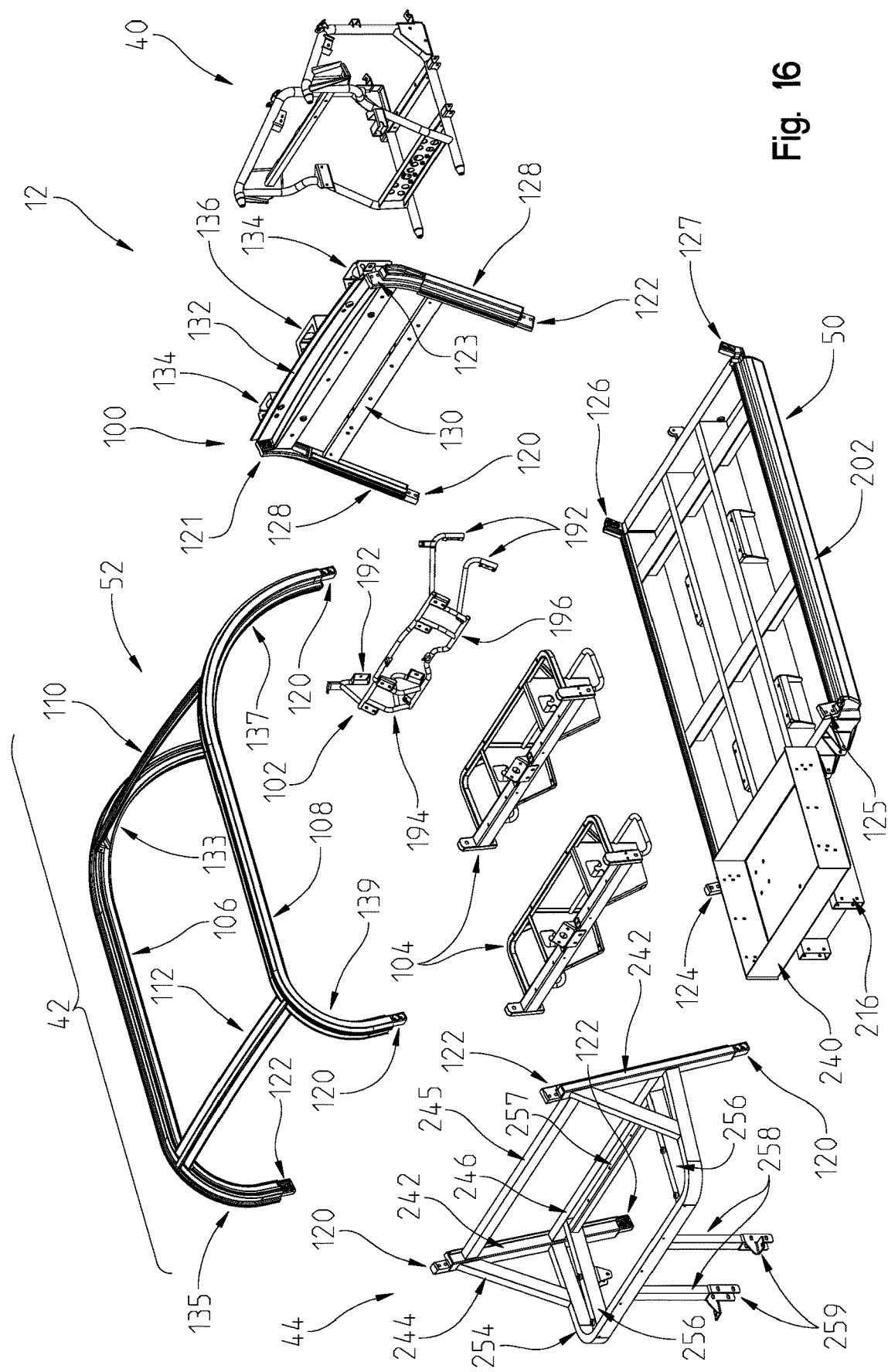
FIG. 16 is an exploded rear right perspective view of the frame assembly of FIG. 13A.

Referring to FIGS. 15 and 16, forward frame 100 includes a pair of upright frame members 128, a lower cross member 130 extending between upright frame members 128, and an upper cross member 132 extending between upright frame members 128. Brackets 134 for mounting headlights 30 (FIG. 1) and a bracket 136 for mounting charge port 76 (FIG. 36) are coupled to upper cross member 132.

Figure 17:
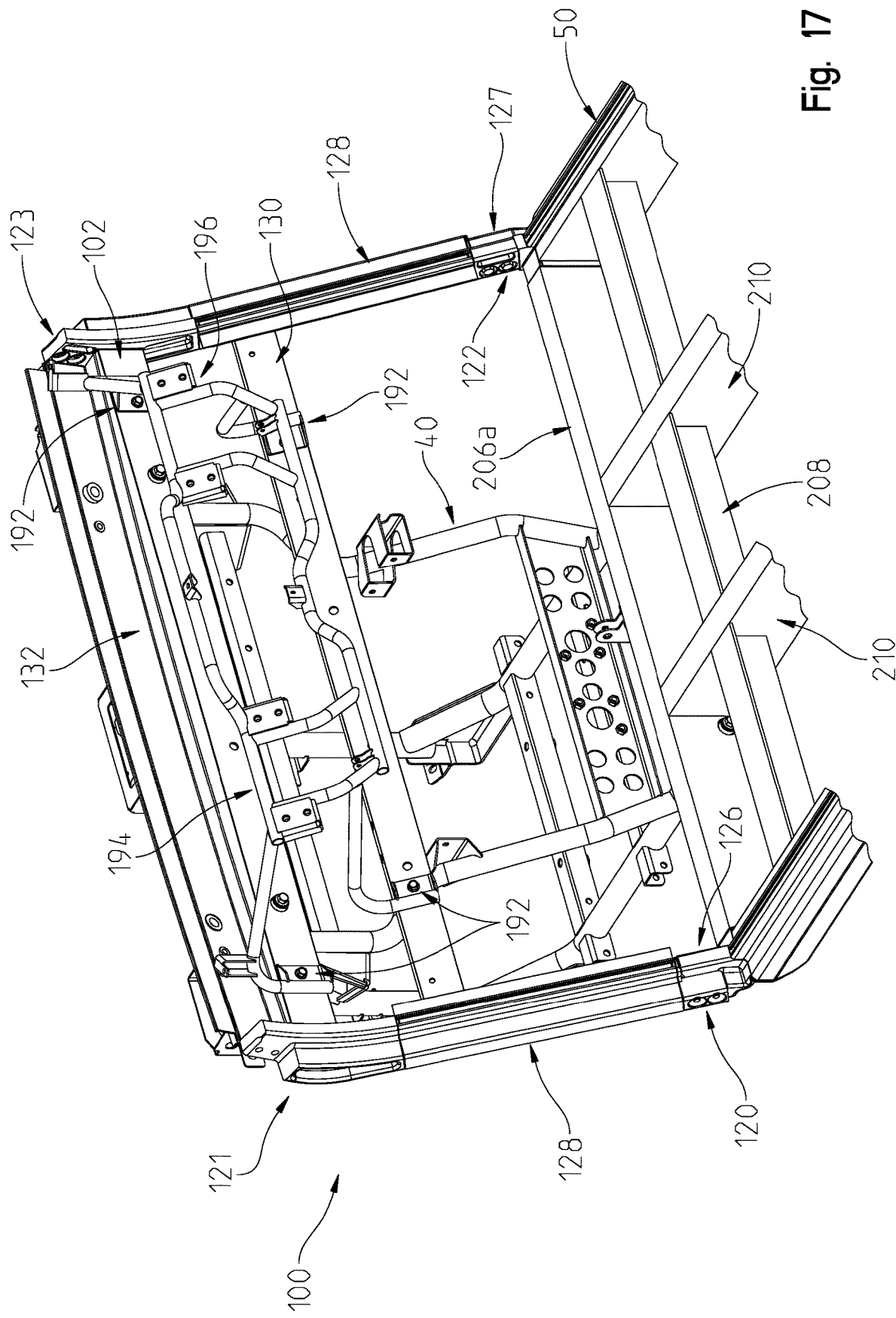
FIG. 17 is a rear left perspective view of a steering assembly frame and a forward frame of the frame assembly of FIG. 13A.
Figure 28:
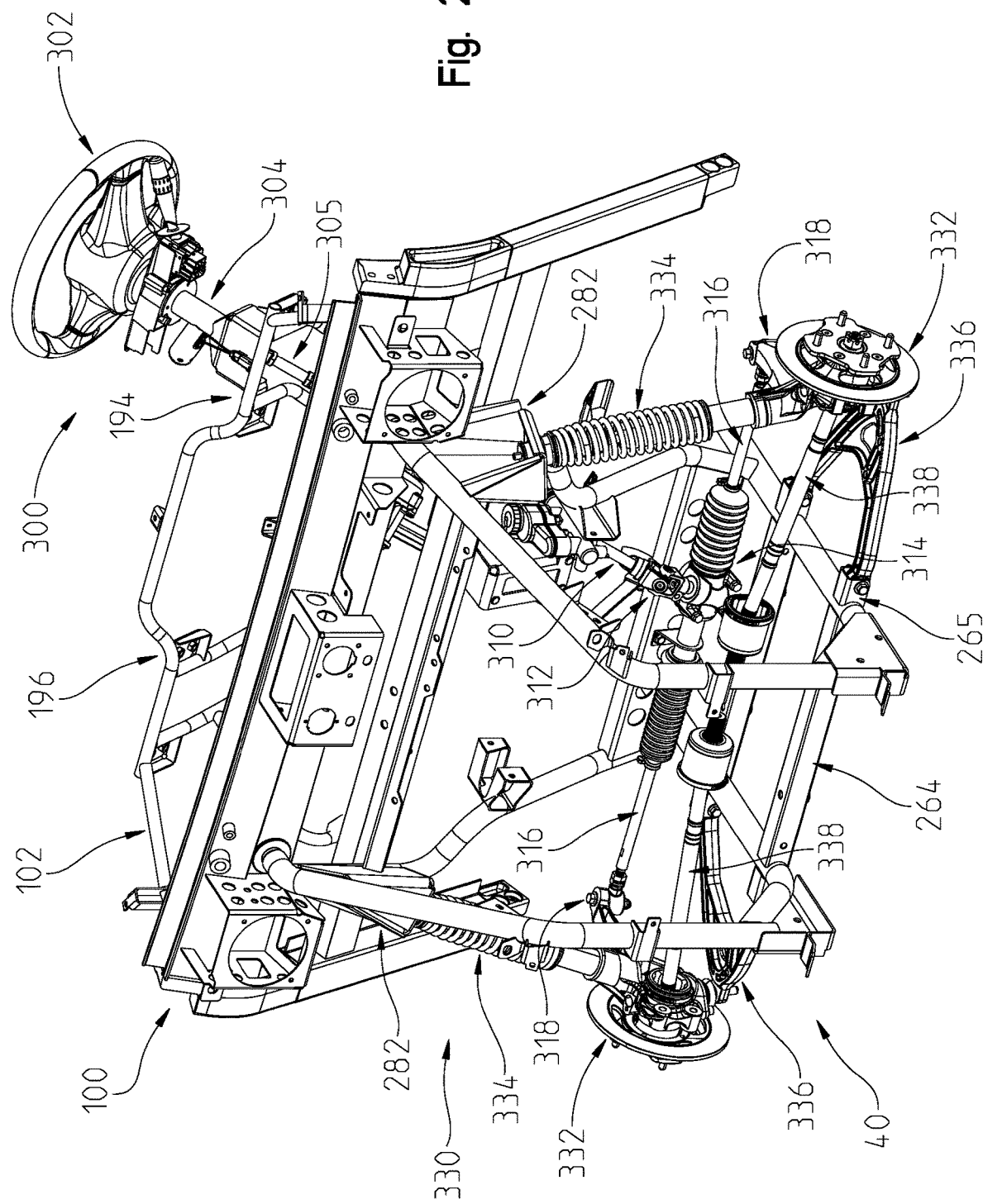
FIG. 28 is a front left perspective view of a steering assembly and a front suspension assembly of the vehicle of FIG. 1.

Steering assembly frame 102 is coupled to lower and upper cross members 130, 132 of forward frame 100. Referring to FIGS. 15-17, steering assembly frame 102 includes a plurality of mounting brackets 192 that are fastened to corresponding mounting holes of lower and upper cross members 130, 132. As best illustrated in FIG. 17, steering assembly frame 102 includes a left steering assembly mount 194 and a right steering assembly mount 196. Each mount 194, 196 includes brackets for mounting a steering wheel 302 and steering column 304 of a steering assembly 300 (FIG. 28). Steering column 304 (FIG. 28) may be mounted to either mount 194, 196 according to vehicle preferences or standards in different countries.

Figure 24:
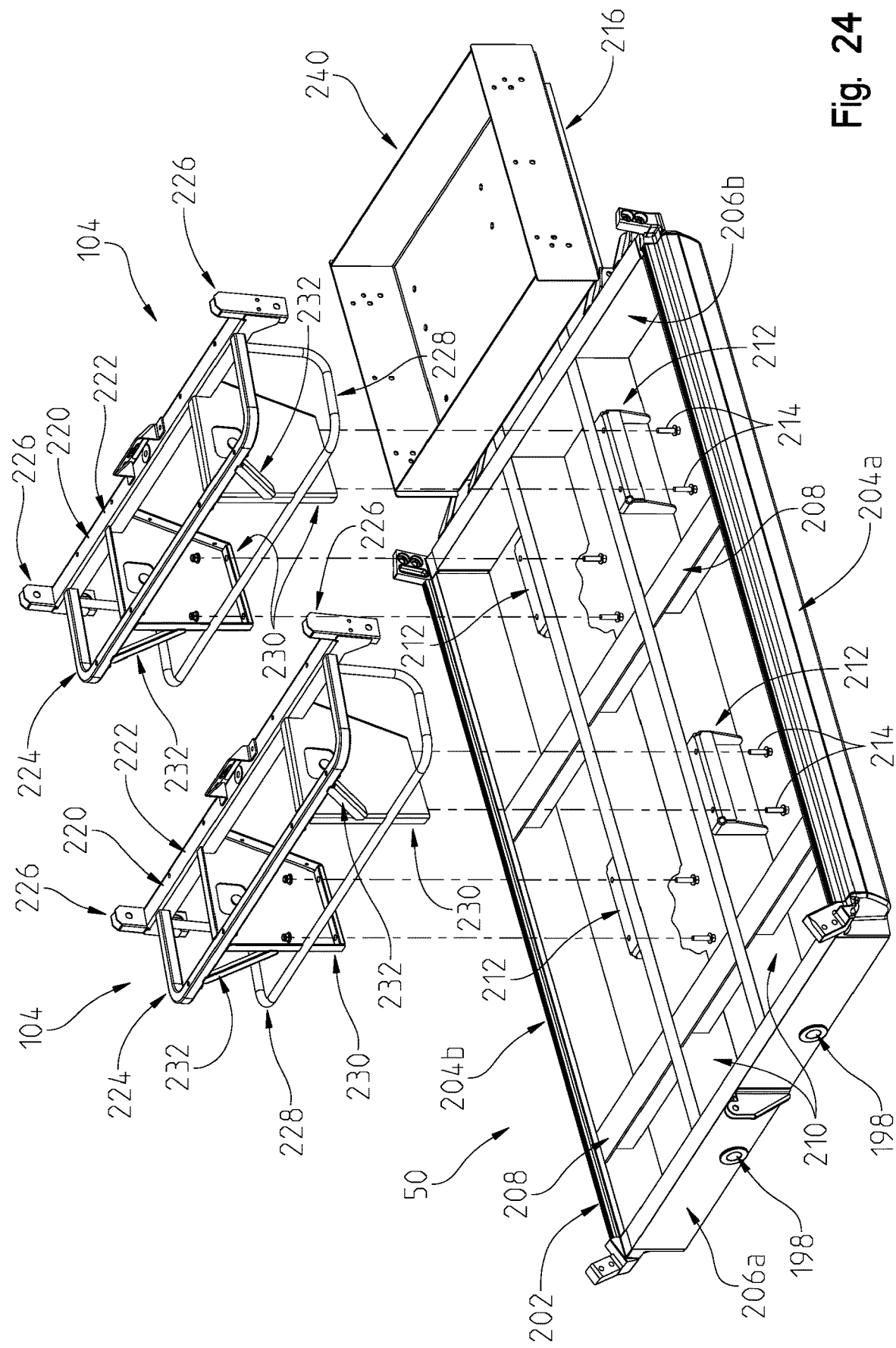
FIG. 24 is a front left perspective view of a floor frame and seat frames of the frame assembly of FIG. 13A.

Referring to FIG. 24, floor frame 50 includes a plurality of frame members including cross beams 208, 210 coupled to an outer frame 202. Outer frame 202 forms a perimeter around cross beams 208, 210. Cross beams 210 extend in the longitudinal direction of vehicle 10, and cross beams 208 extend perpendicular to cross beams 210 in the latitudinal direction of vehicle 10. Outer frame 202 includes side beams 204a, 204b extending parallel to cross beams 210 and front and rear beams 206a, 206b extending parallel to cross beams 208. A pair of apertures 198 are provided in front beam 206a for receiving conical bosses 272 (FIGS. 18-20) of front frame module 40. Floor frame 50 further includes a pair of rear frame members 216 coupled to and extending longitudinally from rear beam 206b. A cross beam 218 (FIG. 25) extends between the ends of frame members 216. Frame members 216 and cross beam 218 cooperate to support a battery tray 240.

In one embodiment, the high profile of floor frame 50 serves to provide an area for storage between cross beams 208, 210. For example, vehicle batteries, wiring, controllers, and/or other components and devices may be mounted to floor frame 50 beneath floor panel 482 (FIG. 46).

As illustrated in FIGS. 14-16 and 25, rear frame module 44 includes a pair of upright frame members 242 extending from the rear corners of floor frame 50 to the ends of frame members 106, 108 of cab frame 52. Upper and lower cross members 245, 246 are coupled between upright frame members 242, and a U-shaped frame member 254 is coupled to upright frame members 242 and extends to the rear of vehicle 10. Angled support members 244 are coupled to upright frame members 242 and U-shaped frame member 254. A pair of frame members 256 are coupled between U-shaped frame member 254 and cross member 246, and a cross member 257 is coupled between frame members 256. A pair of vertically-extending frame members 258 are coupled to U-shaped frame member 254. A bracket 259 is coupled to the end of each frame member 258 for mounting to the ends of corresponding frame member 216 of floor frame 50. Bracket 259 is fastened to frame members 216 via fasteners, illustratively bolts and nuts along with spacers positioned in the hollow ends of members 216. In the illustrated embodiment, at least frame members 216, 218 of floor frame 50 and at least frame members 242, 244, 246, 254, 256, 257, 258 of rear frame module 44 cooperate to support a bed and/or accessories of vehicle 10.

Figure 25:
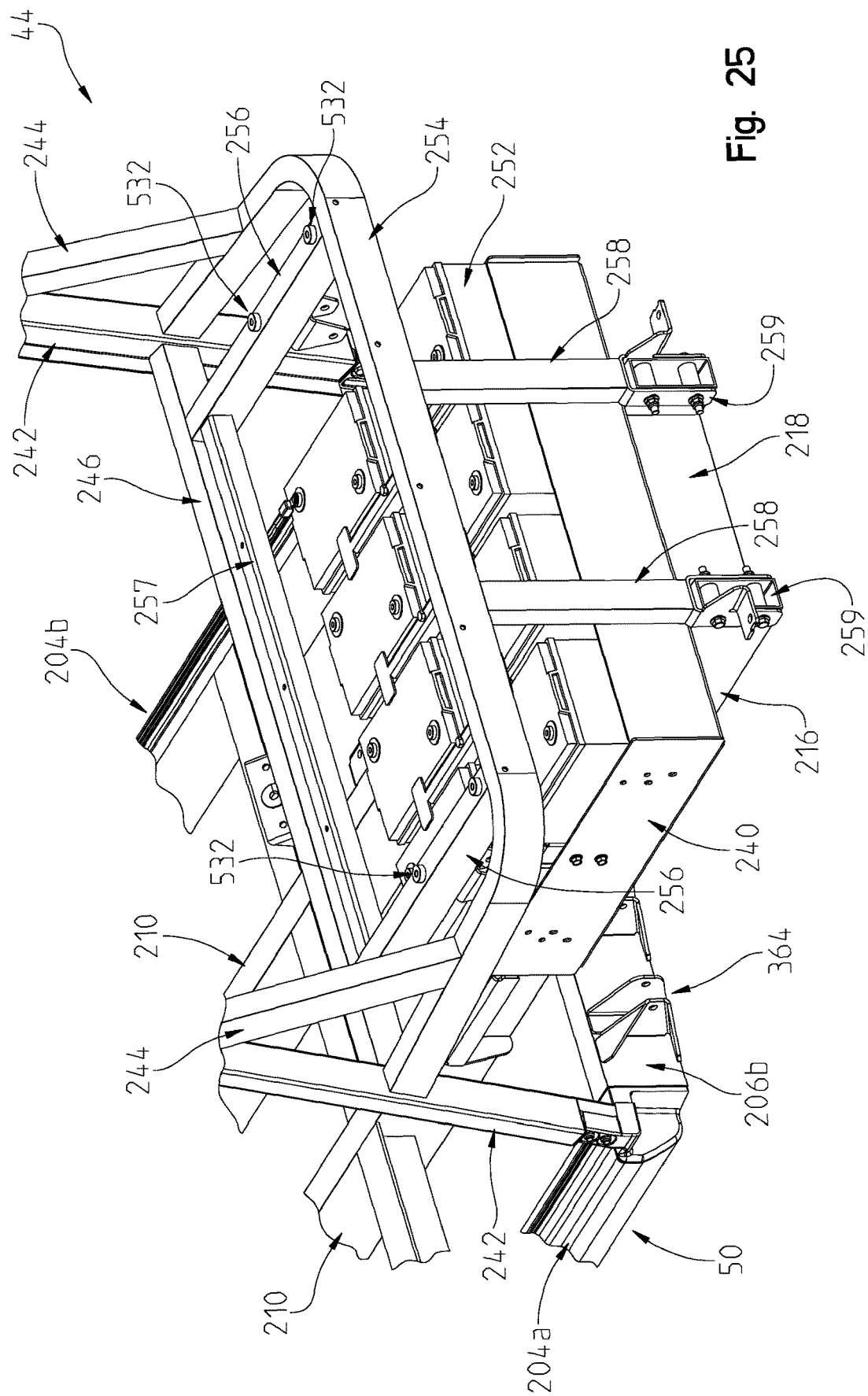
FIG. 25 is a rear left perspective view of the rear frame module of the frame assembly of FIG. 13A including batteries positioned in a battery tray.

As illustrated in FIG. 25, batteries 252 are positioned in battery tray 240. Batteries 252 are accessible from above rear frame module 44. In particular, batteries 252 may be individually removed and replaced through the opening formed in U-shaped frame member 254. Accordingly, when a battery 252 requires replacing or maintenance, the removal of rear panel (platform) 86 provides access to the battery compartment. Tray 240 is configured to support multiple different battery configurations, including various numbers, types, and sizes of batteries. In one embodiment, rear panel 86 is coupled to rear frame module 44 via a snap fit. In another embodiment, battery tray 240 is bolted to module 44 and may be removed entirely through the opening in U-shaped frame member 254 and replaced with a different tray 240 of batteries 252. In another embodiment, battery tray 240 is slidingly coupled to rear frame module 44 such that tray 240 may be slid out the back of rear frame module 44 (with frame members 258 of FIG. 25 removeably coupled to module 44). In another embodiment, battery tray 240 is welded to rear frame module 44.

Referring again to FIG. 24, seat frame mounts 212 are coupled to cross beams 210 of floor frame 50 for coupling seat frames 104 to floor frame 50. A first pair of seat frame mounts 212 are coupled to cross beams 210 between front and rear cross beams 208, and a second pair of seat frame mounts 212 are coupled to cross beams 210 between rear cross beam 208 and rear beam 206b. Seat frame mounts 212 include apertures for receiving fasteners 214, illustratively nut and bolt fasteners, for coupling seat frames 104 to mounts 212.

In the illustrated embodiment, seat frames 104 are identical and interchangeable with each other. Each seat frame 104 includes an upper frame portion 220 and a front frame member 228 positioned below the upper frame portion 220 and extending across a front of the seat frame 104. Upper frame portion 220 includes a rear frame member 222 coupled to a front frame member 224. Rear and front frame members 222, 224 cooperate to form a rectangular-shaped upper frame portion 220 that supports a pair of seats 250 (FIG. 34) positioned in a side-by-side arrangement. A seat belt mount 226 is coupled to each end of rear frame member 222 for receiving a seat belt assembly. Each seat frame 104 further includes a pair of support walls 230 coupled to upper frame portion 220 and front frame member 228. A lower end of each support wall 230 includes apertures for receiving fasteners 214 for coupling seat frame 104 to mount 212. Angled brackets 232 extending from front frame member 224 to each support wall 230 further provides structural support and rigidity for seat frame 104. Additional angled support brackets 238 (FIG. 34) are coupled to upper frame portion 220 and to corresponding side beams 204a, 204b of floor frame 50.

Figure 34:
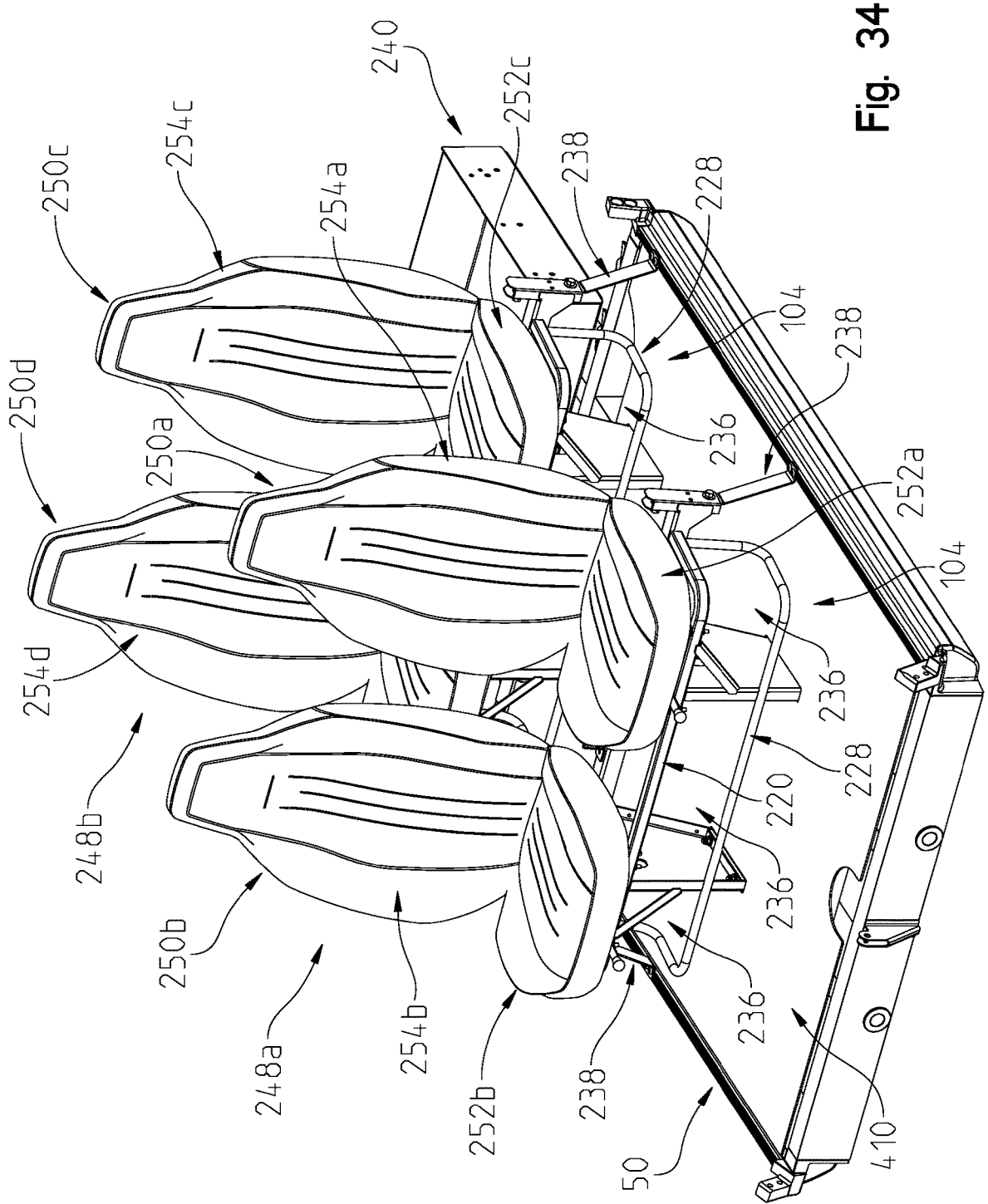
FIG. 34 is a front left perspective view of seating assemblies of the vehicle of FIG. 1.

As illustrated in FIG. 34, a front seat assembly 248a and a rear seat assembly 248b are coupled to floor frame 50. Front seat assembly 248a includes a pair of seats 250a, 250b coupled to a front seat frame 104, and rear seat assembly 248b includes a pair of seats 250c, 250d coupled to a rear seat frame 104. Each seat 250a-d includes a seat bottom 252a-d and a seat back 254a-d. In the illustrated embodiment, each seat frame 104 forms a cargo area 236 beneath seats 250 for storing items or for additional space for rear passengers (e.g., for a rear passenger's feet). Cargo area 236 is accessed via the rear opening in seat frame 104 formed with rear frame member 222 (FIG. 24) of upper frame portion 220. In the illustrated embodiment, upper frame portion 220 of each seat frame 104 is positioned at a first height above the floor panel 410, and front frame member 228 is positioned at a second, lower height above the floor panel 410. The height of front frame member 228 is illustratively less than or equal to half the height of upper frame portion 220 above floor panel 410. As such, front frame member 228 and angled brackets 232 (FIG. 24) serve to block cargo stored underneath seats 250 from sliding forward past the associated seat assembly 248a, 248b. Walls 230 (FIG. 24) each include a retention hook for further retaining cargo stored underneath seats 250. For example, a strap may be wrapped around the retention hook to reduce the likelihood of cargo sliding around during transport.

Figure 35:
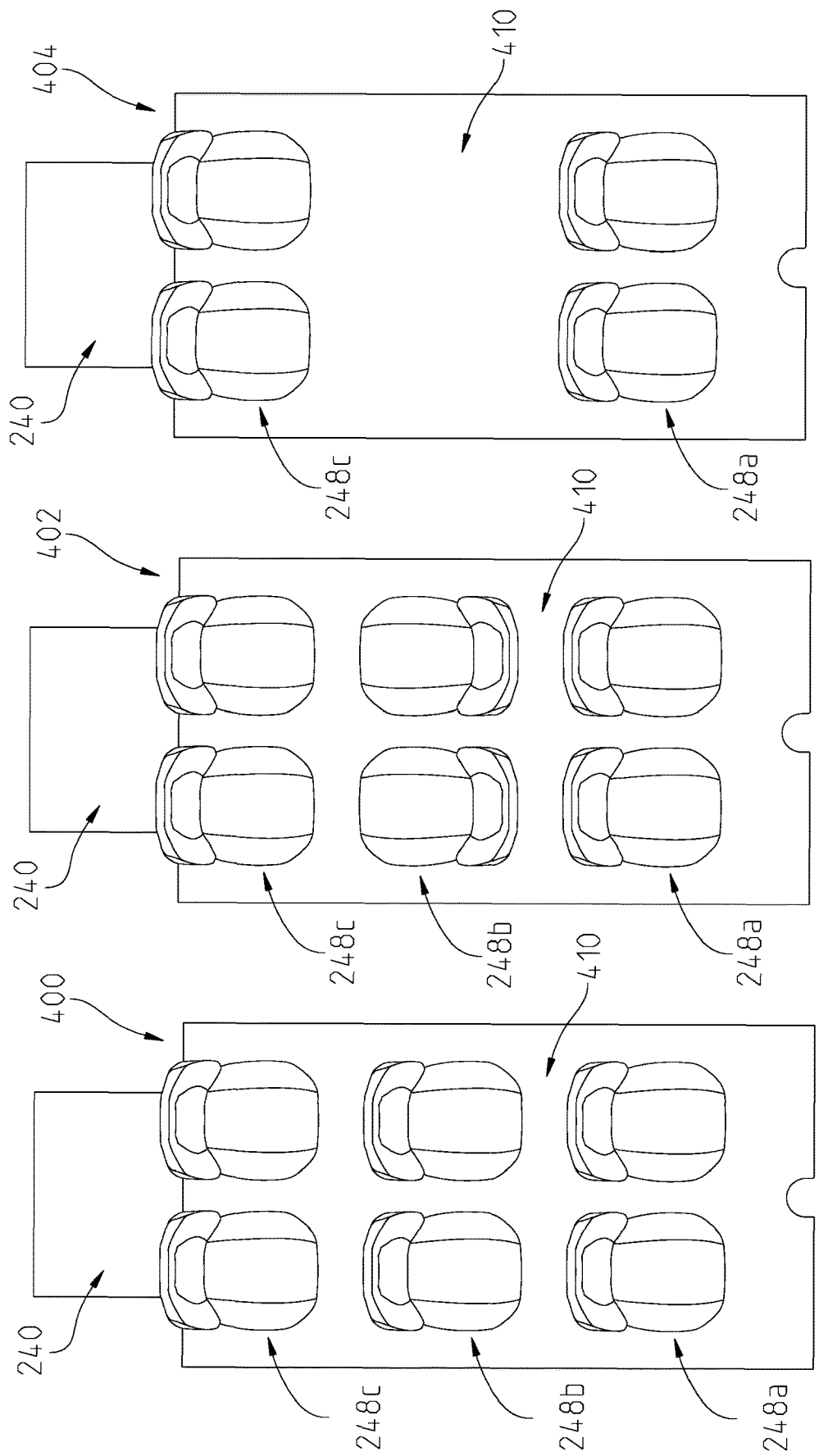
FIGS. 35A-35C are top perspective views of seating arrangements of the vehicle of FIGS. 11 and 12.

In the illustrated embodiment, the seat assemblies (e.g., seat assemblies 248a, 248b of FIG. 34) of vehicle 10 are reversible and interchangeable. For example, rear seat assembly 248b is configured to couple to floor frame 50 in a reversed orientation such that seats 250c, 250d are facing rearward towards the back of the vehicle. Referring to FIG. 35A-35C, exemplary seating arrangements are illustrated for a six-door vehicle (FIG. 11). FIG. 35A illustrates a first seating arrangement 400 wherein a front seat assembly 248a, a middle seat assembly 248b, and a rear seat assembly 248c are all mounted to frame 50 (FIG. 24) in a forward facing orientation. In a second seating arrangement 402 of FIG. 35b, middle seat assembly 248b is mounted in a reverse orientation facing the back of the vehicle, while seat assemblies 248a and 248c are mounted in the forward facing orientation. In a third seating arrangement 404 of FIG. 35c, middle seat assembly 248b is removed, and seat assemblies 248a and 248c are mounted in the forward facing orientation. Other suitable seating arrangements may be provided, as each seat assembly 248a-248c is reversible, removable, and interchangeable. For example, any of one to six seats may be provided, including configurable storage and transit options. In one embodiment, several seats are removed from vehicle 10B of FIG. 11 to provide space for a medical stretcher.

Figure 18:
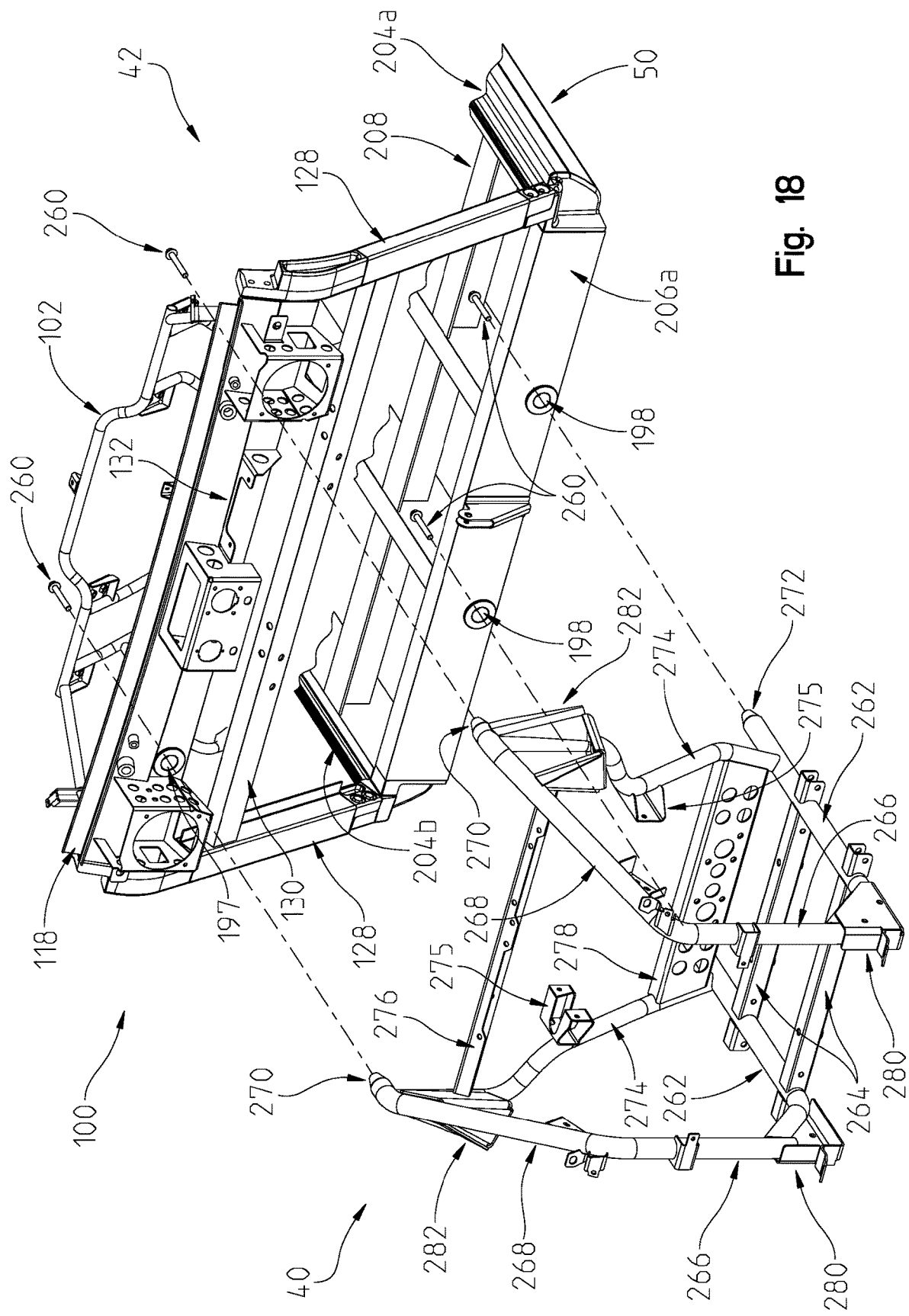
FIG. 18 is a front left perspective view of a front frame module of the frame assembly of FIG. 13A, wherein the front frame module is removed from the forward frame.
Figure 19:
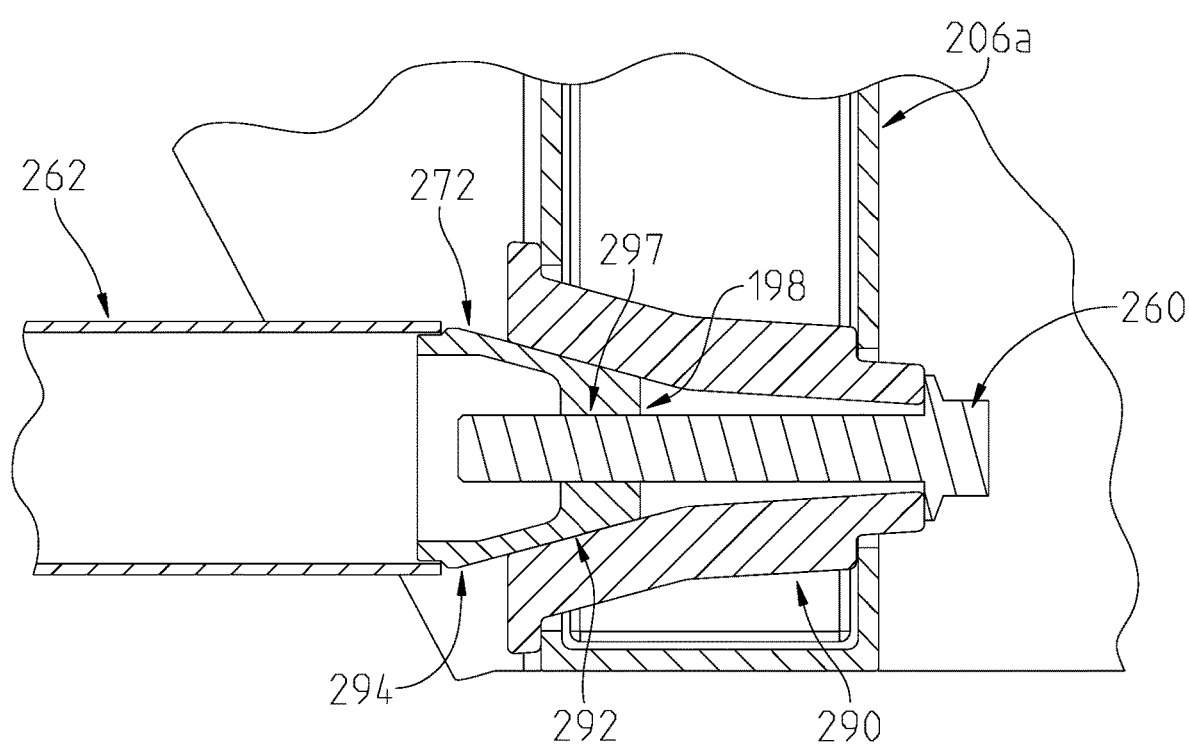
FIG. 19 is a cross-sectional view of a conical boss of the front frame module.

Referring to FIG. 18, front frame module 40 includes a plurality of frame members including a pair of lower tubular members 262, a pair of cross beams 264 coupled to tubular members 262, a pair of front upright tubular members 266, a pair of rear upright tubular members 274, an upper bracket 276, and a lower bracket 278. Lower tubular members 262 are coupled to front upright tubular members 266 via front brackets 280. Front upright tubular members 266 are coupled to rear upright tubular members 274 via brackets 282. In one embodiment, the master hydraulic cylinder of a hydraulic braking system mounts to brackets 275 on tubular members 274. In one embodiment, additional support tubes (not shown) triangulate between members 274 and 252.

Front upright tubular members 266 each include an angled portion 268 that includes a conical boss 270 at the rear end for coupling in corresponding apertures 197 of forward frame 100 of middle frame module 42. Similarly, ends of lower tubular members 262 include conical bosses 272 for coupling in corresponding apertures 198 of lower frame 50 of middle frame module 42. A plurality of fasteners 260, illustratively threaded bolts, extend through apertures 197, 198 and fasten to respective conical bosses 270, 272 for coupling front frame module 40 to middle frame module 42. For example, referring to FIG. 19, a coupler 290 is coupled to front beam 206a of lower frame 50 for receiving conical boss 272 of a lower tubular member 262. Coupler 290 includes an angled or conical inner surface 292 forming aperture 198. Conical boss 272 includes an angled or conical outer surface 294 that engages inner surface 292 of coupler 290. Fastener 260 is inserted through the back end of coupler 290 and engages conical boss 272 at a threaded interface 297. As fastener 260 is tightened, conical boss 272 is pulled into aperture 198 until outer surface 294 is tight against inner surface 292. Conical bosses 270 and apertures 197 of FIG. 18 are also configured according to the embodiment illustrated in FIG. 19.

Figure 20:
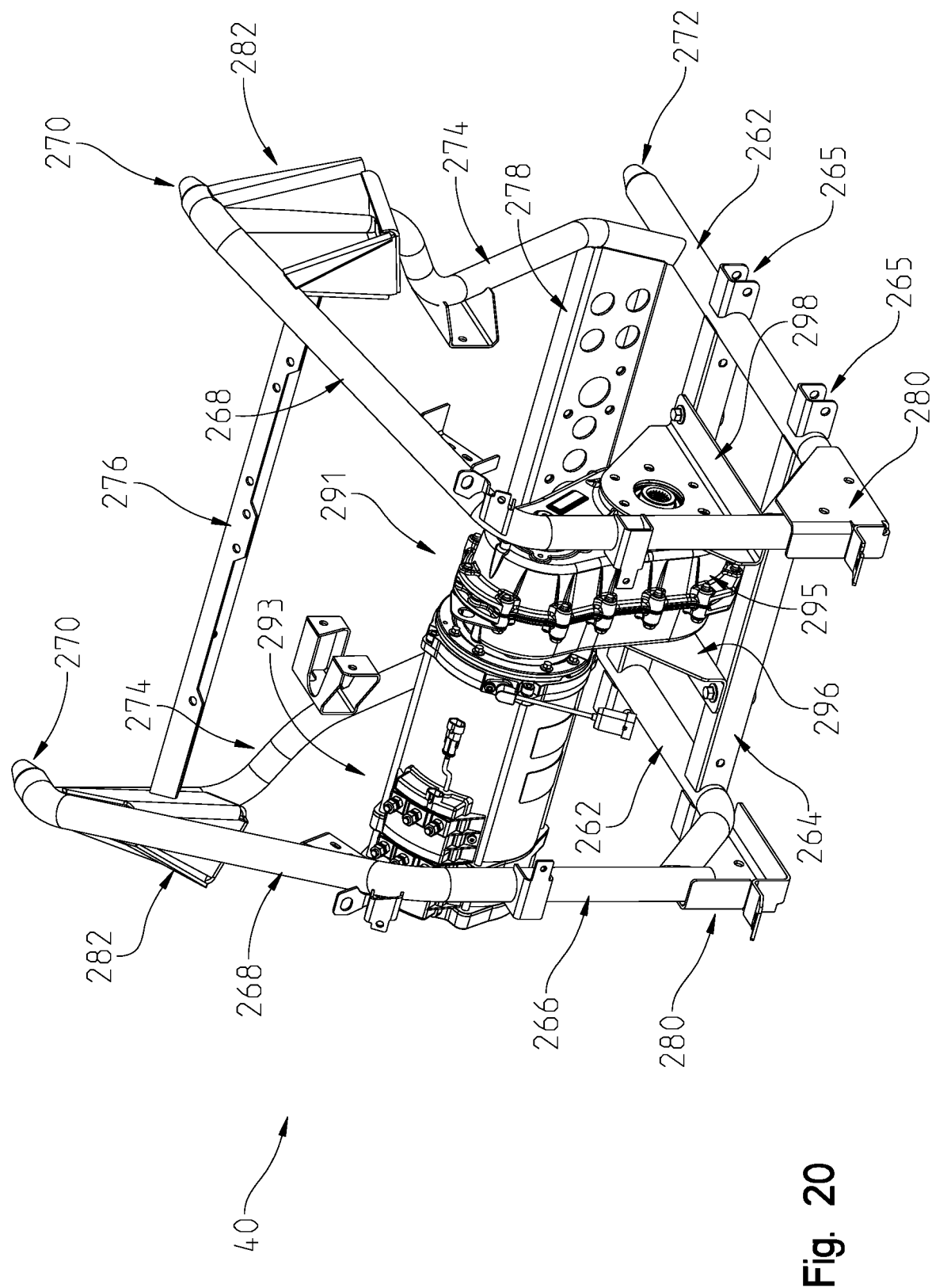
FIG. 20 is a front left perspective view of an electric motor and transmission assembly mounted in the front frame module of FIG. 18.

As illustrated in FIG. 20, cross beams 264 of front frame module 40 support a motor and transmission assembly 291. Motor and transmission assembly 291 includes an electric motor 293 and a transmission 295 drivingly coupled to an output of motor 293. In the illustrated embodiment, motor 293 and transmission 295 are positioned above front axles 338, transmission 295 is tilted, and motor 293 is also forward of front axles 338. In one embodiment, transmission 295 is a continuously variable transmission. In one embodiment, a plurality of operating gears, including high, low, and reverse, are all controlled through motor 293, and transmission 295 serves only as a gear reduction and differential for the front axles 338. Other suitable transmission types may be provided. Transmission 295 is coupled to front frame module 40 via brackets 296, 298 bolted to cross beams 264. In one embodiment, frame members of front frame module 40 are configured to support a plurality of different electric motors 293 and transmissions 295 each having a different size and/or type. Front frame module 40 is configured to support components of other types of powertrains, including a hybrid, gas, or diesel engine, for example. In one embodiment, the powertrain of vehicle 10 is changed by removing and replacing front frame module 40 having one type of powertrain with a different front frame module 40 having a different type of powertrain mounted thereto.

In the illustrated embodiment, cab frame 52, rear frame module 44, floor frame 50, and forward frame 100 are coupled together with joint pieces and fasteners. Referring to FIG. 15, a joint piece 120 or 122 is coupled to each end of each frame member 106, 108 of cab frame 52. Similarly, a joint piece 120 or 122 is coupled to each end of each upright frame member 242 of rear frame module 44. Forward frame 100 also includes joint pieces 121, 123 coupled to the top ends of upright frame members 128 and joint pieces 120, 122 coupled to the bottom ends of upright frame members 128. Floor frame 50 includes joint pieces 124, 125, 126, 127 coupled to the corners of outer frame 202.

In one embodiment, joint pieces 120-123 are bonded, either welded or with an adhesive, to an interior wall (e.g., see interior opening 153 of FIG. 26 and interior opening 129 of FIG. 21) of corresponding frame members 106, 108, 128, 242. A portion of joint pieces 120, 122 protrude from the ends of frame members 106, 108, 128, 242. Similarly, joint pieces 124-127 are bonded to an interior wall of the corners of outer frame 202 of floor frame 50. In one embodiment, joint pieces 120-127 are cast metal, although other suitable materials may be used. In the illustrated embodiment, joint pieces 120 are all similarly shaped and are configured to receive the head of the corresponding fastener 144, and joint pieces 122 of vehicle 10 are all similarly shaped (differently from joint pieces 120) and are configured to receive the nut of the corresponding fastener 144.

Figure 21:
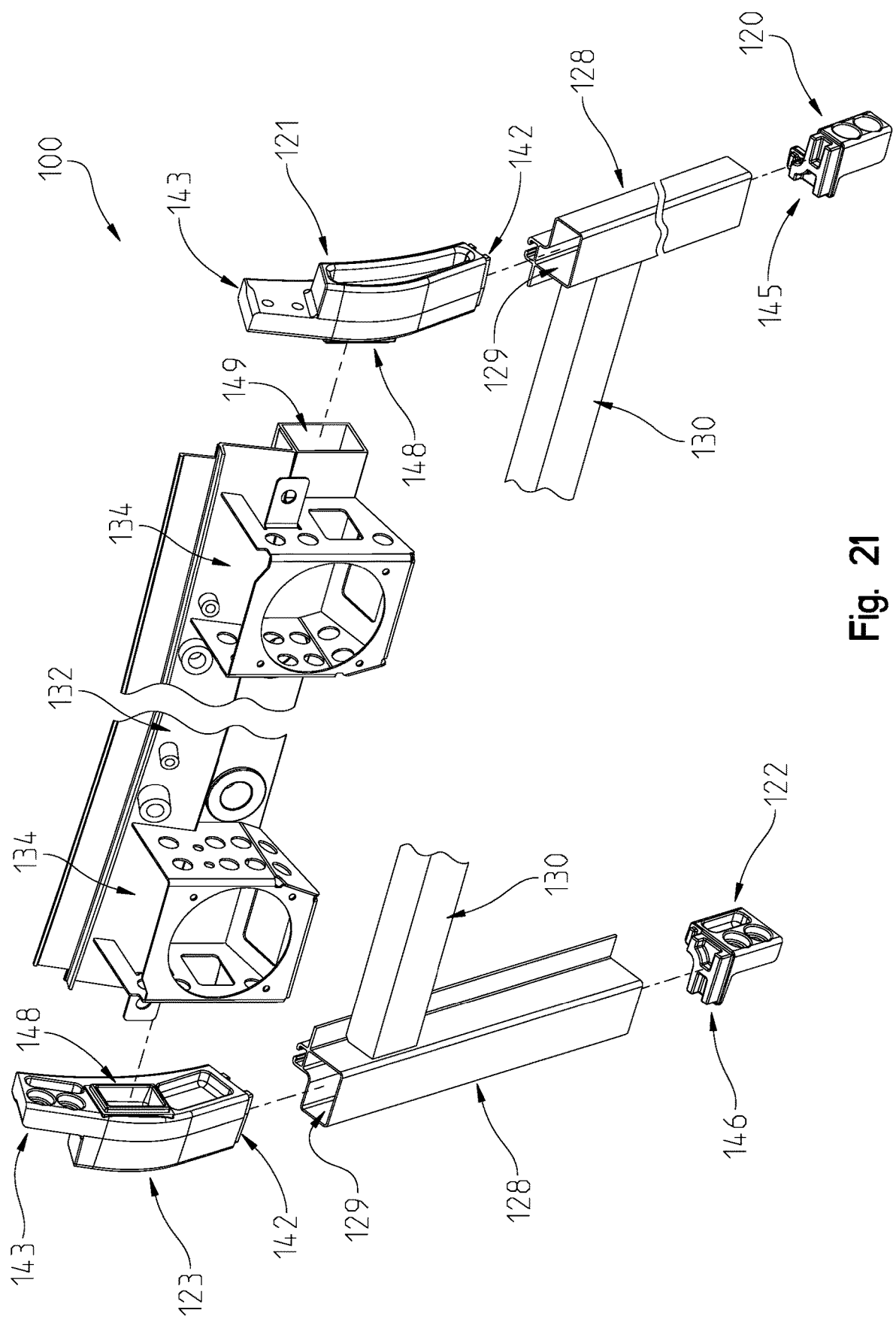
FIG. 21 is an exploded front left perspective view of the forward frame of FIG. 17 illustrating a plurality of joint pieces.
Figure 22:
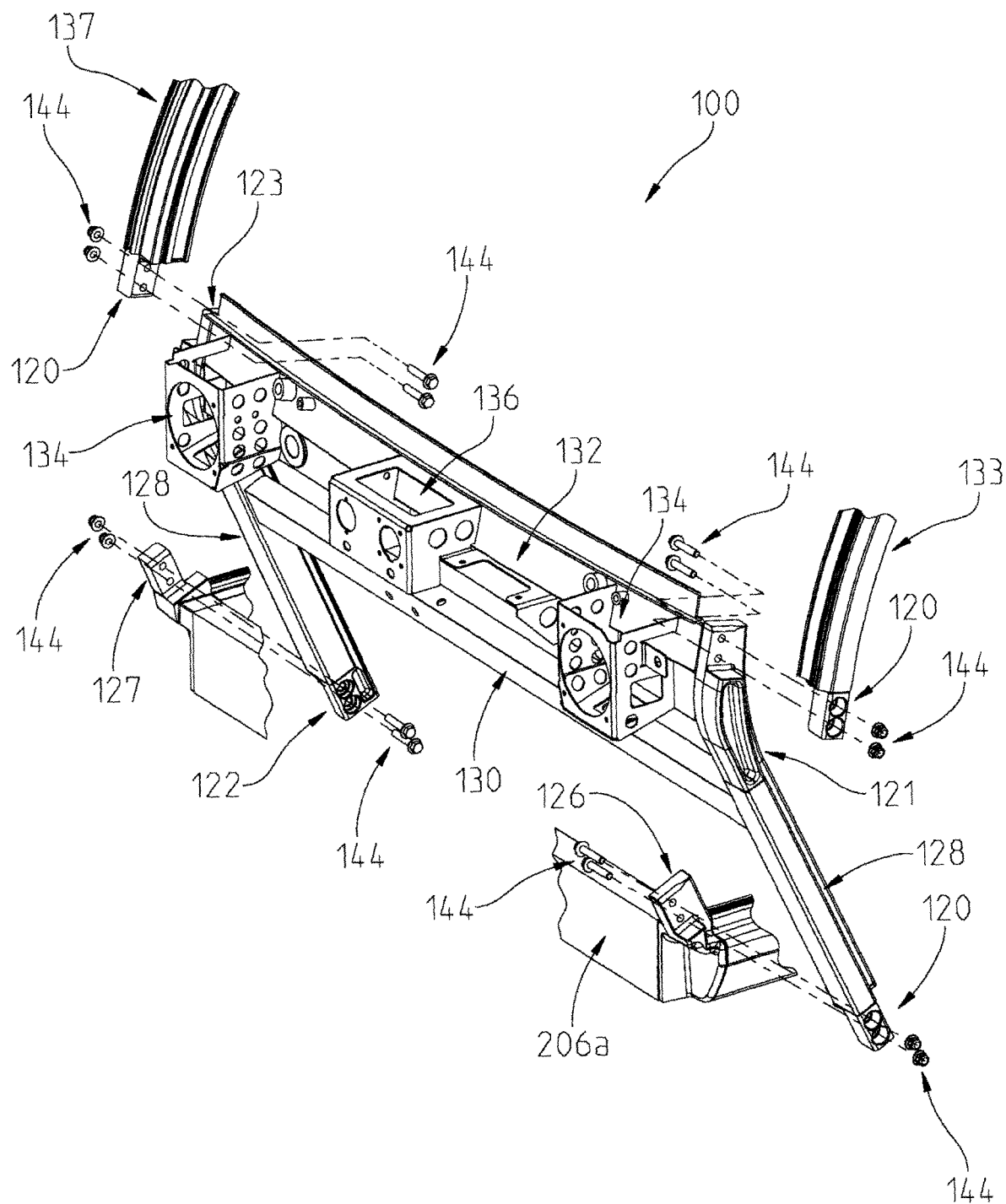
FIG. 22 a partially exploded front left perspective view of the forward frame of FIG. 17 with the forward frame removed from the middle frame module.
Figure 23:
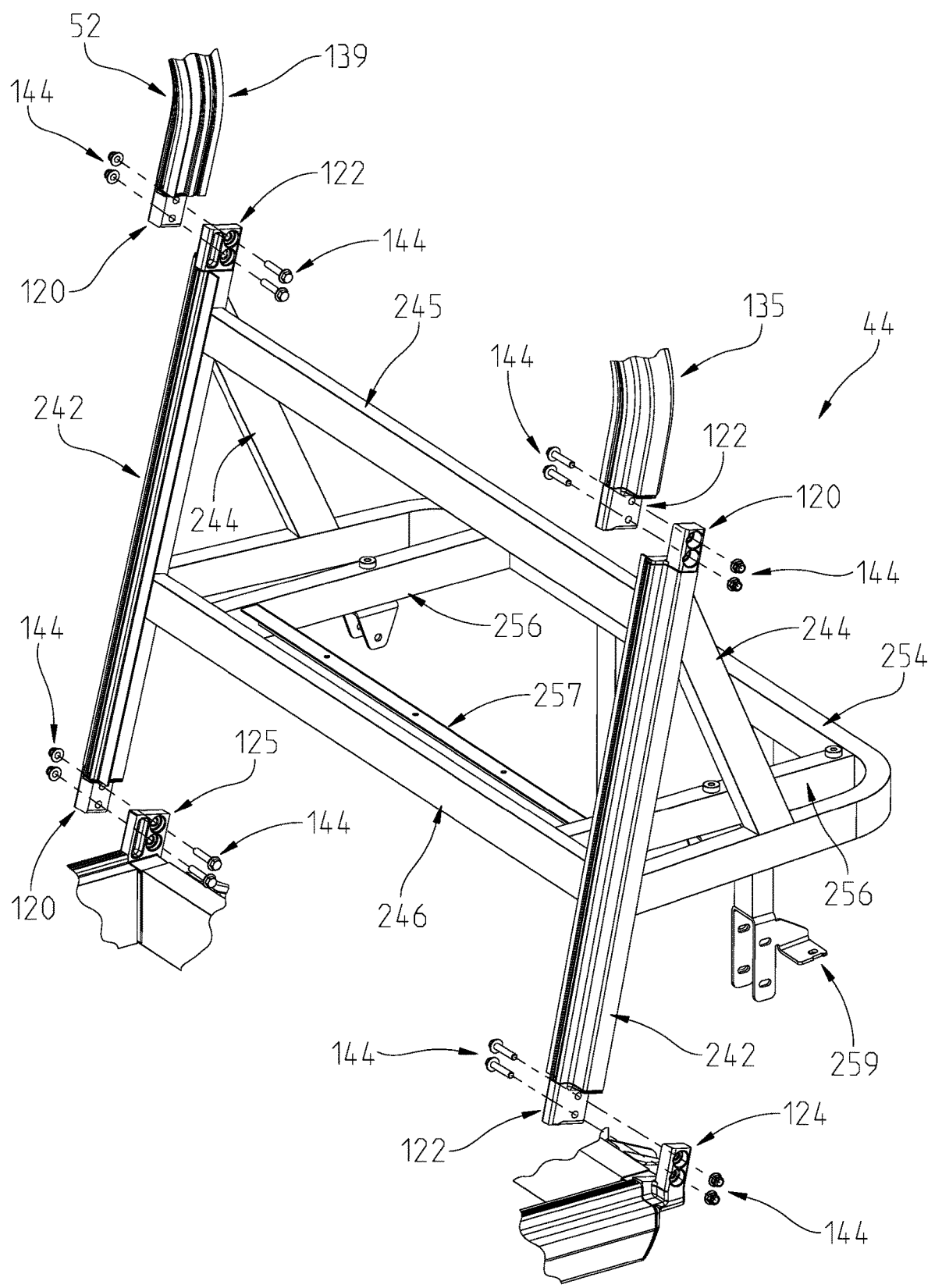
FIG. 23 is a front left perspective view of a rear frame module of the frame assembly of FIG. 13A, wherein the rear frame module is removed from the middle frame module.

For example, referring to FIG. 21, joint pieces 121, 123 each include a male portion 142 that is bonded to the interior wall 129 of corresponding frame member 128. A flange portion 143 on the opposite end of joint piece 121, 123 couples to corresponding joint piece 120 of cab frame 52 via fasteners 144, illustratively threaded bolts and nuts (FIG. 22). Similarly, a male portion 145, 146 of respective joint pieces 122 are bonded to the interior wall 129 of corresponding frame member 128, as illustrated in FIG. 21. Joint pieces 120, 122 of FIG. 21 are coupled to corresponding joint pieces 124-127 of floor frame 50 via fasteners 147, illustratively threaded bolts and nuts (FIG. 22). Joint pieces 121, 123 further include rectangular openings 148 for receiving ends 149 of upper cross member 132 of forward frame 100, as illustrated in FIG. 21. Referring to FIG. 23, upper joint pieces 120, 122 of rear frame module 44 are coupled to respective joint pieces 122, 120 of cab frame 52 via fasteners 144, and lower joint pieces 120, 122 of rear frame module 44 are coupled to respective joint pieces 125, 124 of floor frame 50 via fasteners 144.

Figure 13A:
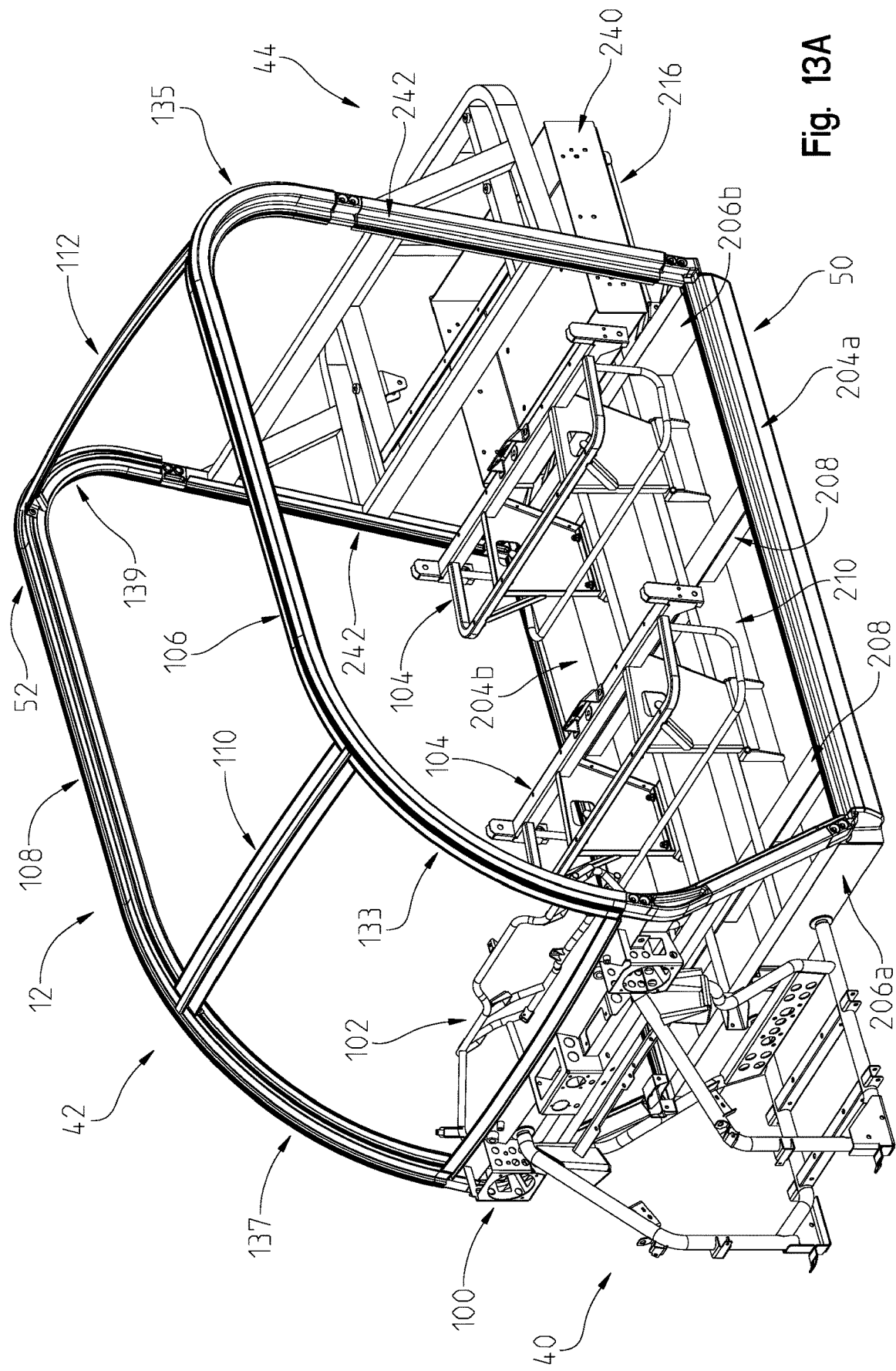
FIG. 13A is a front left perspective view of a frame assembly of the vehicle of FIG. 1.
Figure 13B:
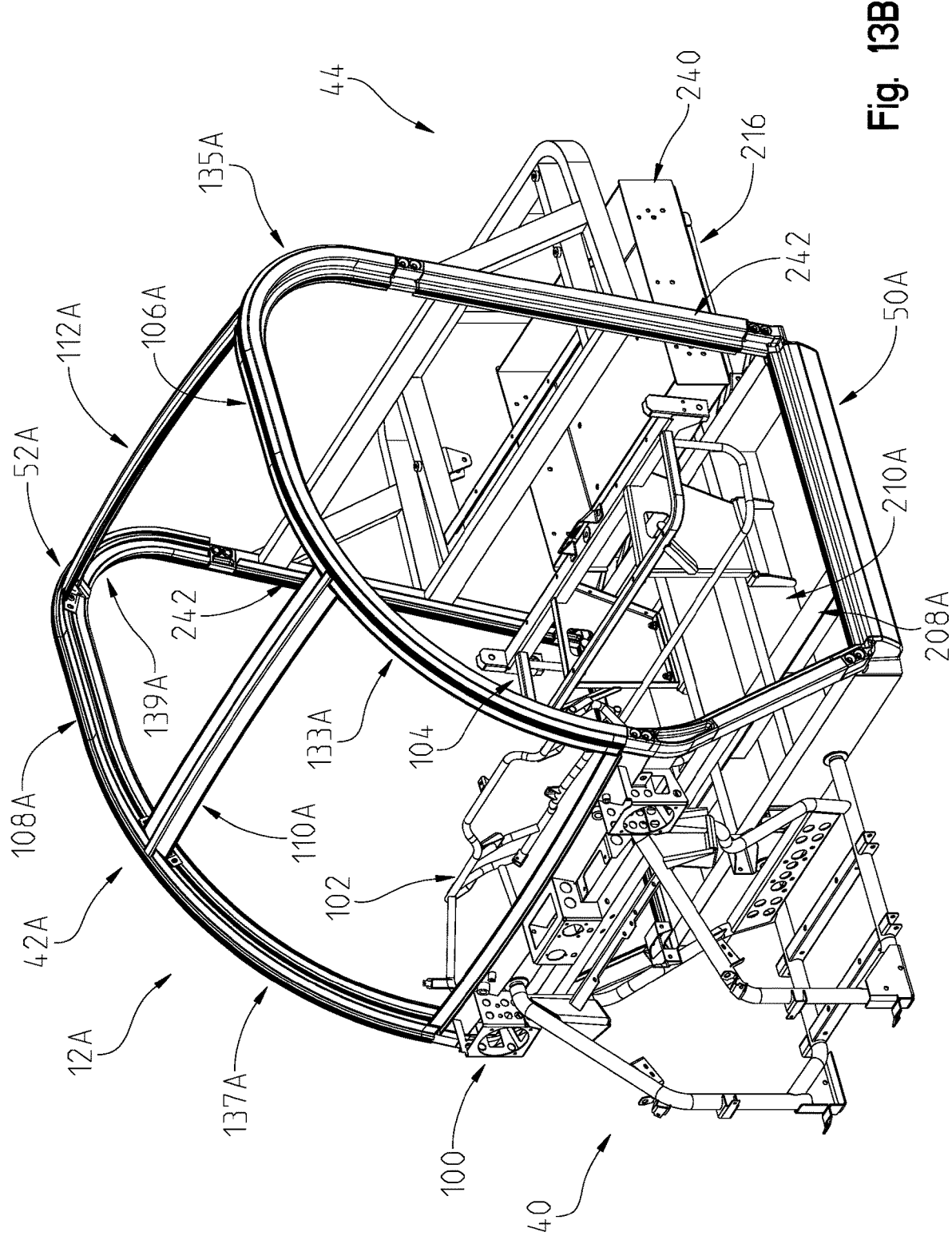
FIG. 13B is a front left perspective view of a frame assembly of the vehicle of FIG. 9.
Figure 13C:
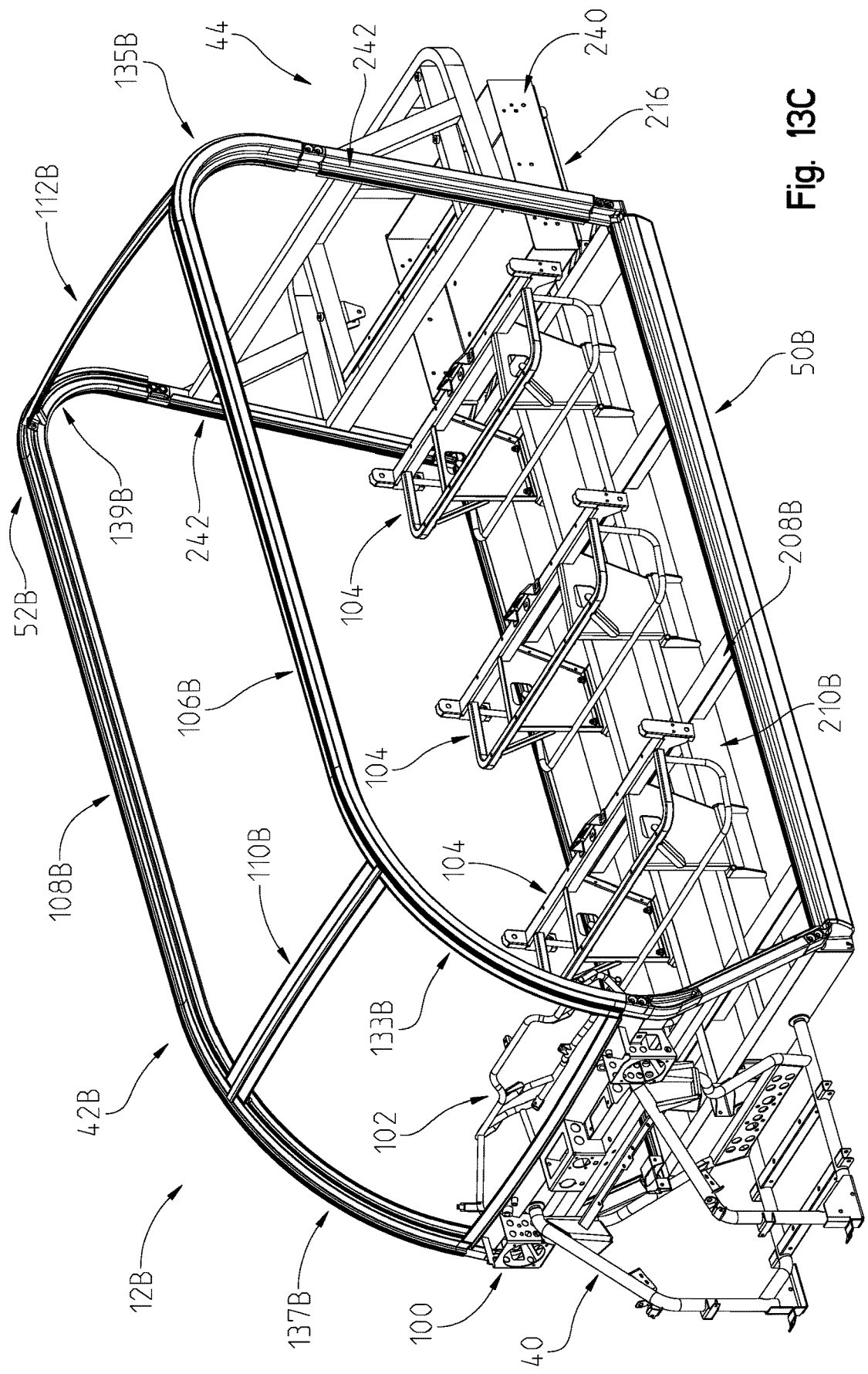
FIG. 13C is a front left perspective view of a frame assembly of the vehicle of FIG. 11.
Figure 14:
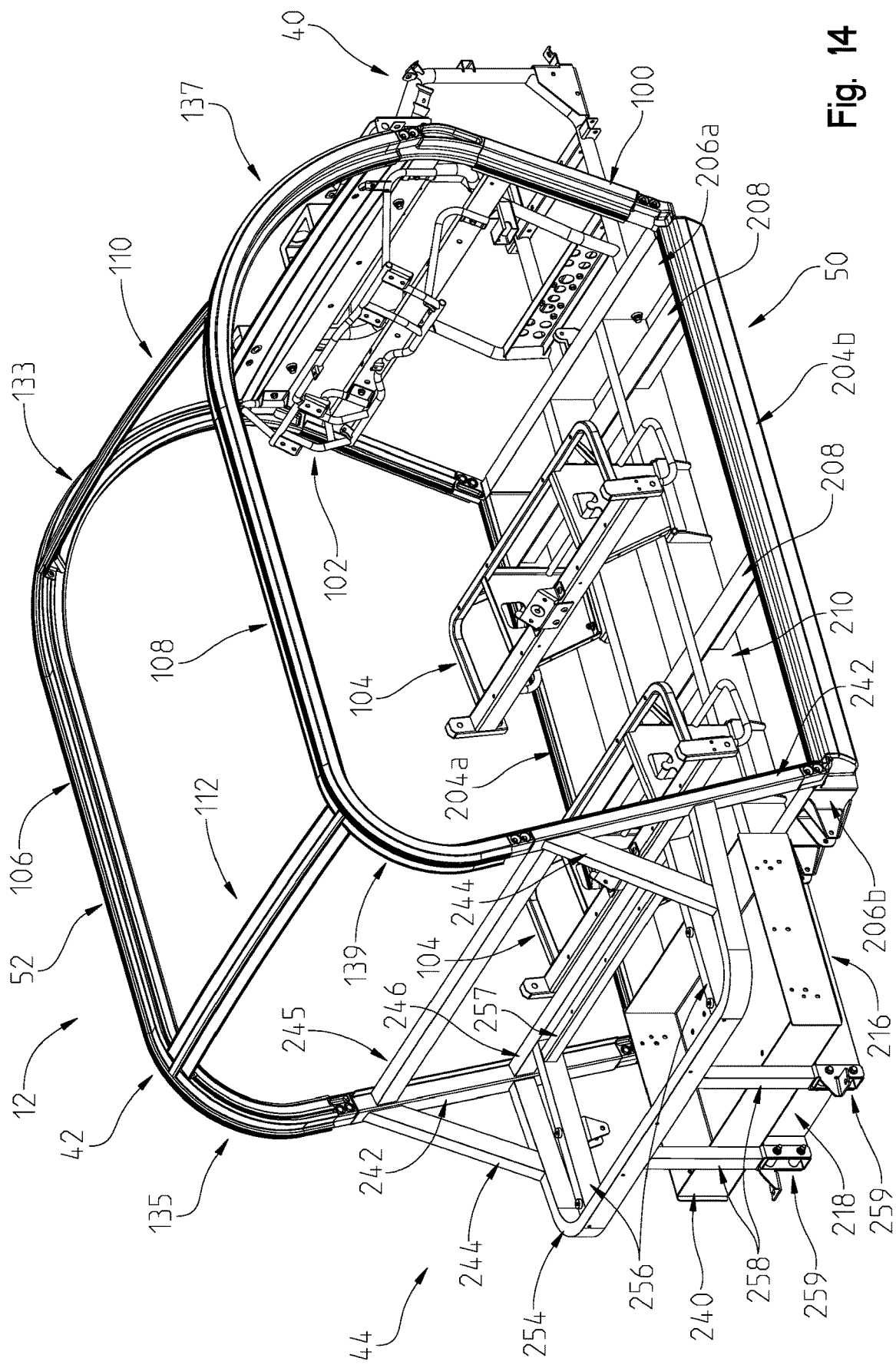
FIG. 14 is a rear right perspective view of the frame assembly FIG. 13A.

FIG. 13B illustrates frame assembly 12A of two-door vehicle 10A of FIGS. 9 and 10, and FIG. 13C illustrates frame assembly 12B of six-door vehicle 10B of FIGS. 11 and 12. Frame assemblies 12A and 12B include a same front frame module 40 and rear frame module 44 as frame assembly 12 of vehicle 10 of FIG. 1. Frame assembly 12A differs from frame assembly 12 (FIG. 13A) in that middle frame module 42A is shorter in length than middle frame module 42 of frame assembly 12. Similarly, frame assembly 12B differs from frame assembly 12 (FIG. 13A) in that middle frame module 42B is longer in length than middle frame module 42 of frame assembly 12. In particular, floor frame 50 and cab frame 52 of frame assembly 12 (FIG. 13A) are longer in length than floor frame 50A and cab frame 52A (FIG. 13B) and are shorter in length than corresponding floor frame 50B and cab frame 52B (FIG. 13C). Frame members 106A, 108A of cab frame 52A are shorter in length than corresponding frame members 106, 108 of frame assembly 12 to allow for only one row of seats, and frame members 106B, 108B of cab frame 52B are longer in length than corresponding frame members 106, 108 of frame assembly 12 to allow for three rows of seats. As such, middle frame modules 42, 42A, and 42B are interchangeable with each other to provide the different length vehicles 10, 10A, and 10B described herein.

In the illustrated embodiment, curved portions 133A, 135A, 137A, 139A of frame assembly 12A (FIG. 13B) and curved portions 133B, 135B, 137B, 139B of frame assembly 12B (FIG. 13C) are identical to respective curved portions 133, 135, 137, 139 of frame assembly 12 (FIG. 13A). Similarly, cross frame members 110A, 112A of frame assembly 12A (FIG. 13B) and cross frame members 110B, 112B of frame assembly 12B (FIG. 13C) are identical to respective cross frame members 110, 112 of frame assembly 12 (FIG. 13A). As such, the same front and rear windows 56, 58, seat frames 104, and forward frames 100 may be used with each frame assembly 12, 12A, 12B. Further, frame assemblies 12, 12A, and 12B are all the same width.

Figure 29:
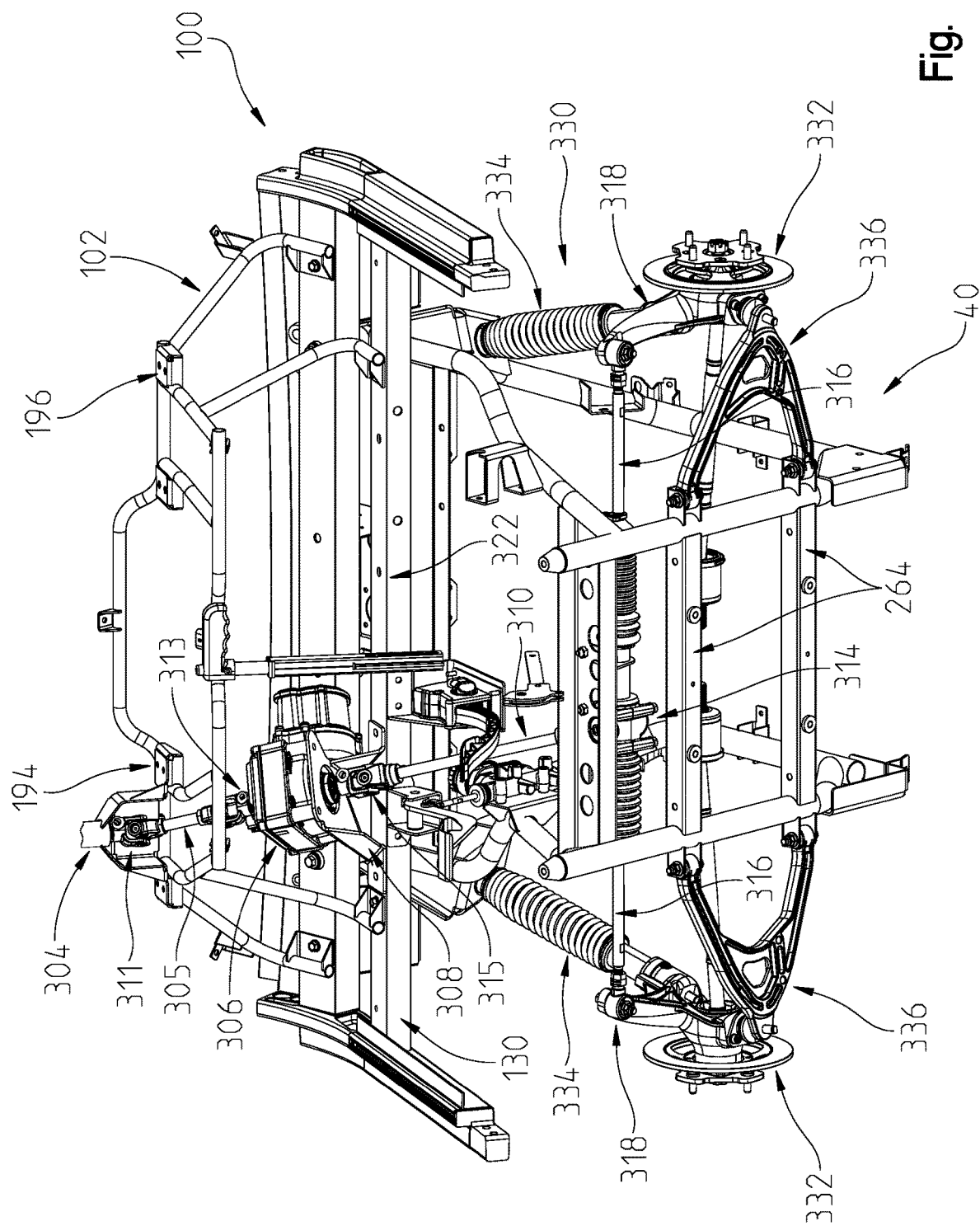
FIG. 29 is a bottom rear perspective view of the steering assembly and front suspension assembly of FIG. 28.

Referring to FIGS. 28 and 29, steering assembly 300 is illustrated including a steering input device, illustratively a steering wheel 302, coupled to a steering column 304. Steering column 304 is coupled to a first shaft 305 via universal joint 311, and first shaft 305 is coupled to a power steering device 306 via a universal joint 313. Power steering device 306 includes a motor, such as a hydraulic or electric motor, and is operative to provide steering torque assist to steering assembly 300. Power steering device 306 is attached to lower cross member 130 of forward frame 100 by way of a bracket 308. An output of power steering device 306 is fixed to a steering gear 314 by way of a shaft 310 through universal joints 312, 315. Steering gear 314 includes steering arms 316 attached to arms 318 on the front wheel spindle assemblies 332 for steering as is known in the art.

Steering column 304 is illustratively mounted to left steering assembly mount 194 of steering assembly frame 102. In the illustrated embodiment, universal joints 311, 313, 312, 315 allow steering assembly 300 to be mounted to either left steering assembly mount 194 or right steering assembly mount 196 of steering assembly frame 102. Bracket 308 of steering assembly 300, while illustratively coupled to a left portion of lower cross member 130 of forward frame 100, may alternatively be coupled to a right portion 322 (FIG. 29) of lower cross member 130 when steering column 304 is mounted to right steering assembly mount 196. Power steering device 306 and corresponding mounting brackets are also moveable over to the right hand drive position.

In another embodiment, the steering assembly is not power steering and steering column 304 is connected to a single steering shaft that couples to steering gear 314 via universal joints. In one embodiment, steering wheel 302 has a tilt feature. In one embodiment, steering column 304 includes an integrated steering lock feature. In this embodiment, column 304 has a set of keyway features that engage a key feature on the ignition barrel when the ignition key is removed, thereby reducing the likelihood of vehicle theft and of wheel 302 turning when the ignition key is removed.

Figure 30:
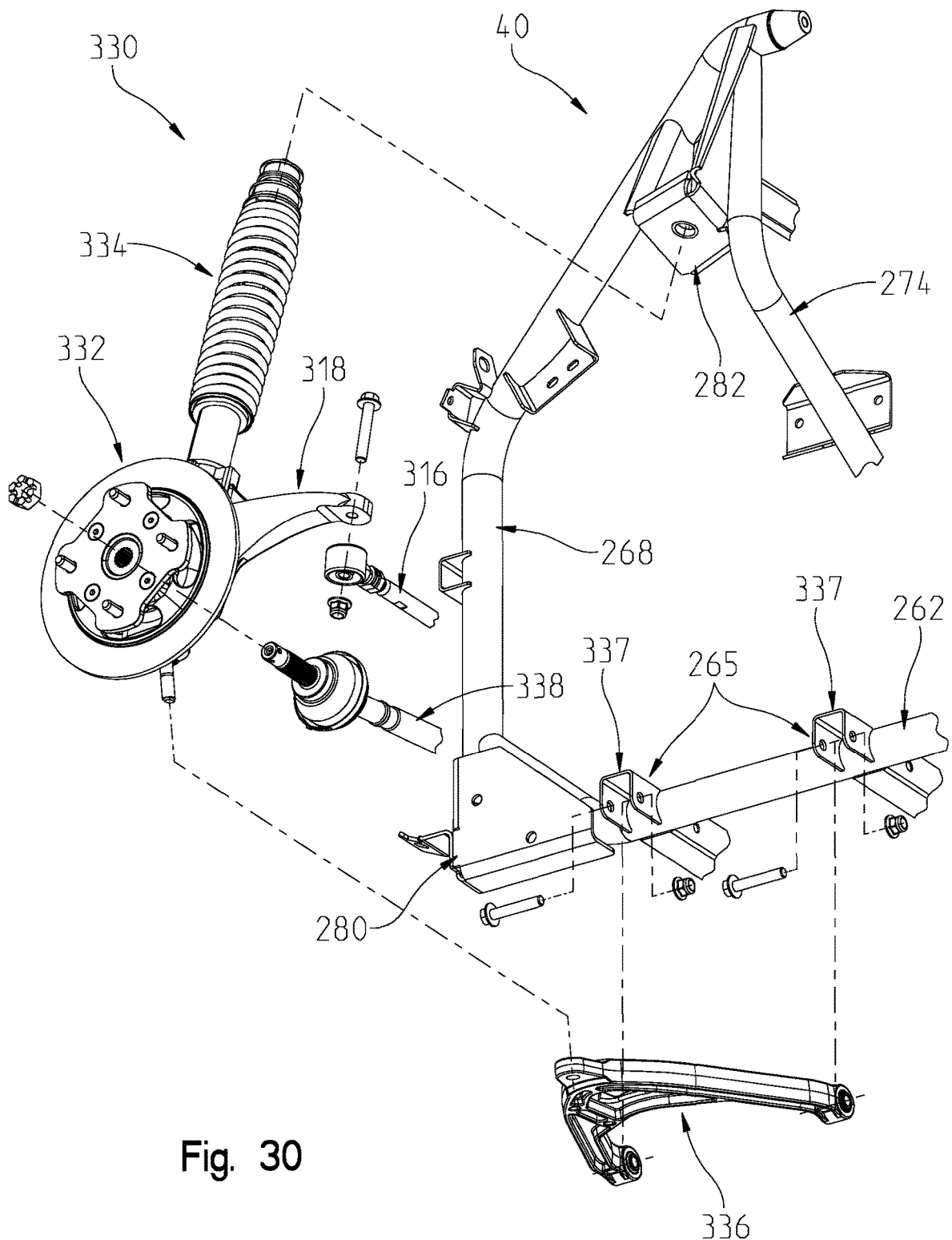
FIG. 30 is a partially exploded perspective view of a front left suspension assembly of the vehicle of FIG. 1.

Referring to FIGS. 28-30, a front suspension assembly 330 is illustrated including right and left shock absorbers 334 coupled to brackets 282 of front frame module 40 and to corresponding front wheel spindle assemblies 332. Left and right lower A-arms 336 are coupled to front wheel spindle assemblies 332 and to mounting locations 337 (FIG. 30) of beams 265 of front frame module 40. Axles 338 extend from front wheel spindles to the output of transmission 295 (FIG. 20).

Figure 31:
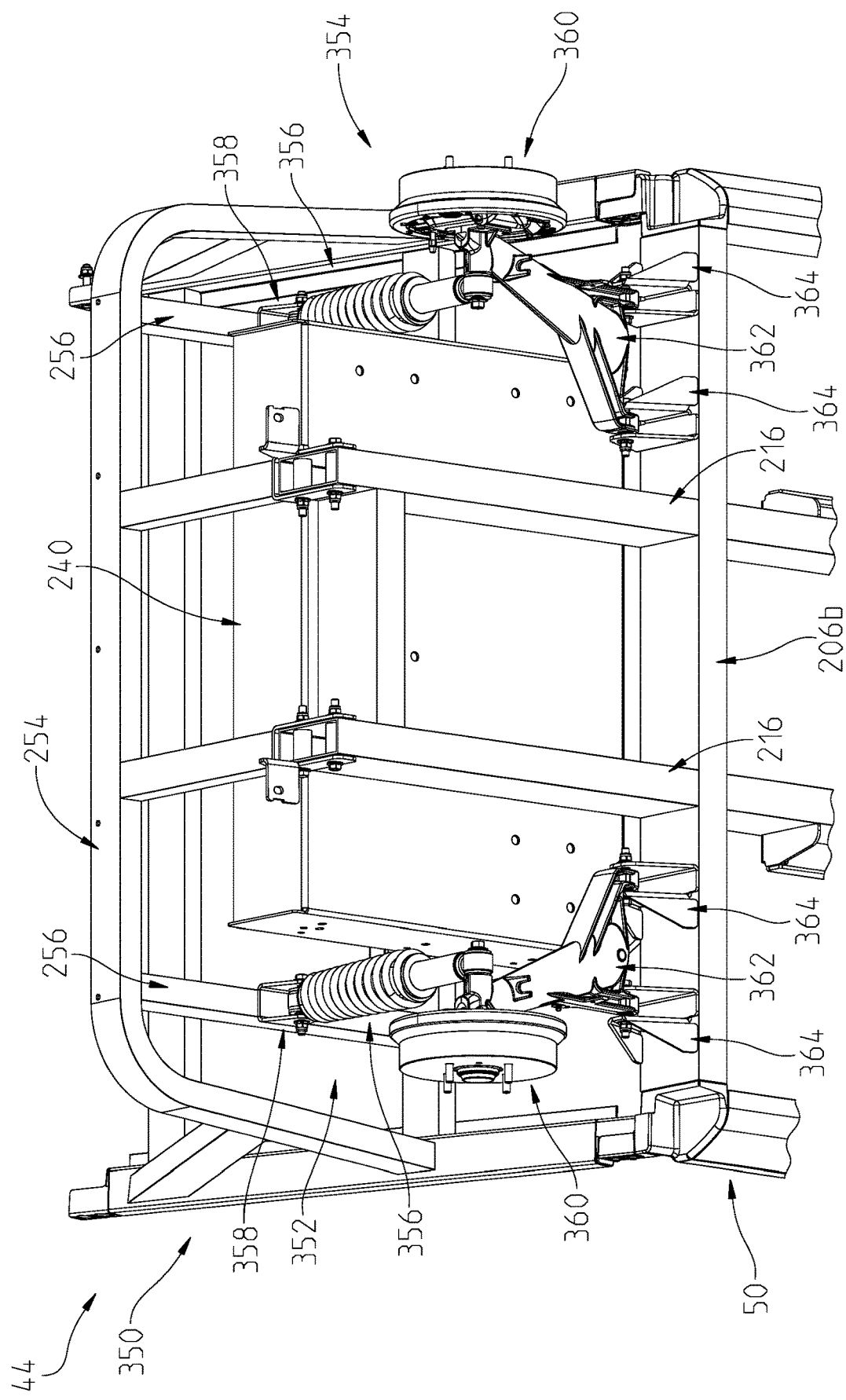
FIG. 31 is a bottom rear perspective view of the rear suspension assembly of the vehicle of FIG. 1.
Figure 32:
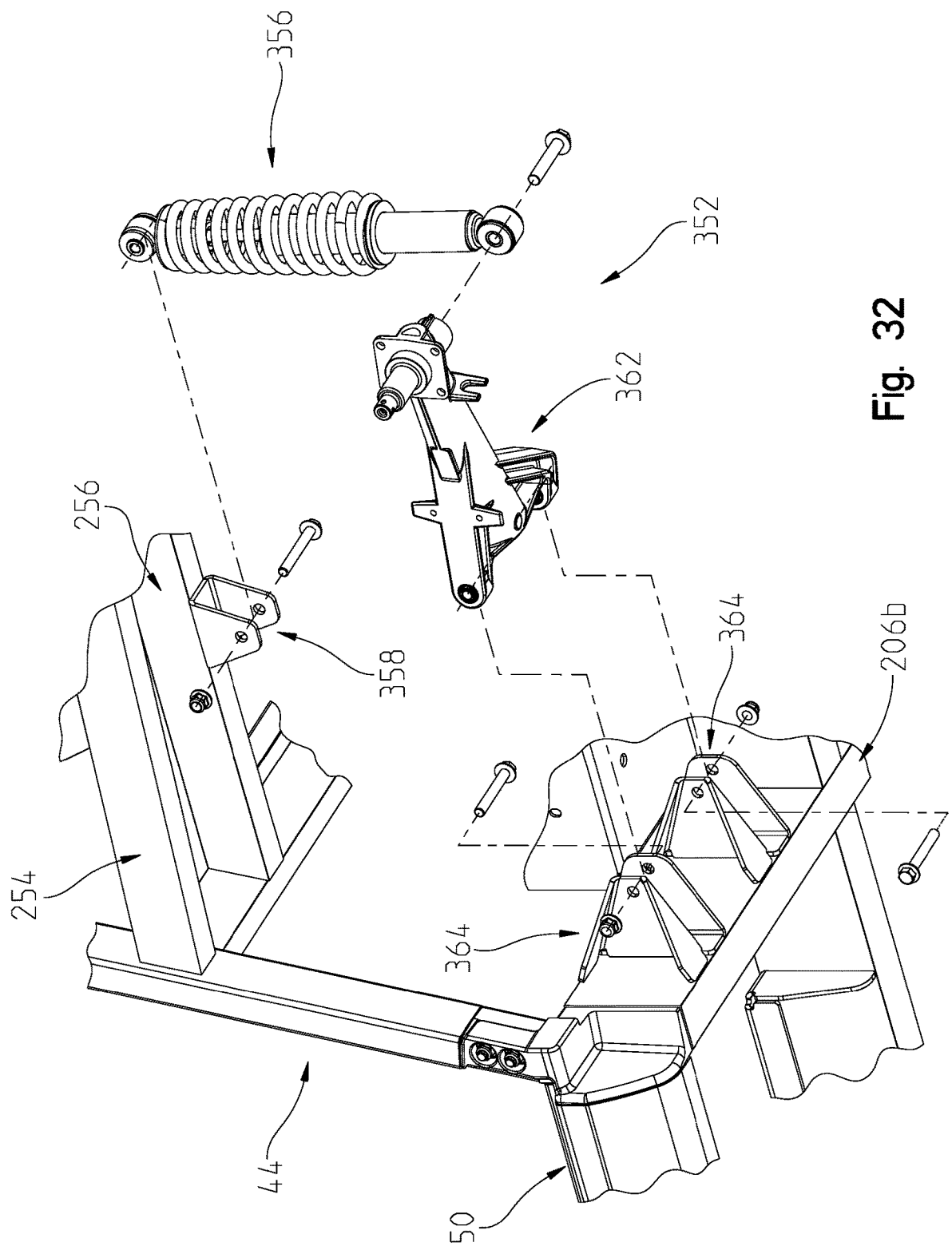
FIG. 32 is a partially exploded perspective view of a rear left suspension assembly of the vehicle of FIG. 1.

Referring to FIGS. 31 and 32, a rear suspension assembly 350 is illustrated including a left rear suspension assembly 352 and a right rear suspension assembly 354. Left and right rear suspension assemblies 352, 354 each include a shock absorber 356 coupled via fasteners at one end to a bracket 358 mounted to a corresponding frame member 256 of rear frame module 44. The other end of each shock absorber 356 is coupled via fasteners to a corresponding rear wheel spindle assembly 360. Each rear suspension assembly 352, 354 further includes a trailing arm 362 coupled via fasteners to rear wheel spindle assembly 360 and to the rear beam 206b of floor frame 50 via a pair of brackets 364. Exemplary fasteners include bolts and nuts.

As illustrated in FIG. 31, battery tray 340 and batteries 252 (FIG. 25) are positioned between left rear suspension assembly 352 and right rear suspension assembly 354, and left and right rear suspension assembly 352, 354 and batteries 252 are all positioned below the bed 80 of the vehicle. Further, each left and right rear suspension assembly 352, 254 is coupled to floor frame 50 of middle frame module 42 via trailing arm 362 and to rear frame module 44 via shock absorber 356.

In one embodiment, independent front and rear suspension assemblies 330, 350 are adjustable to accommodate varying loads of vehicle 10, 10A, 10B. For example, the shock preload and/or spring stiffness of each shock absorber 334, 356 may be adjusted to accommodate the different sizes and weights of vehicles 10, 10A, 10B described herein.

Figure 33:
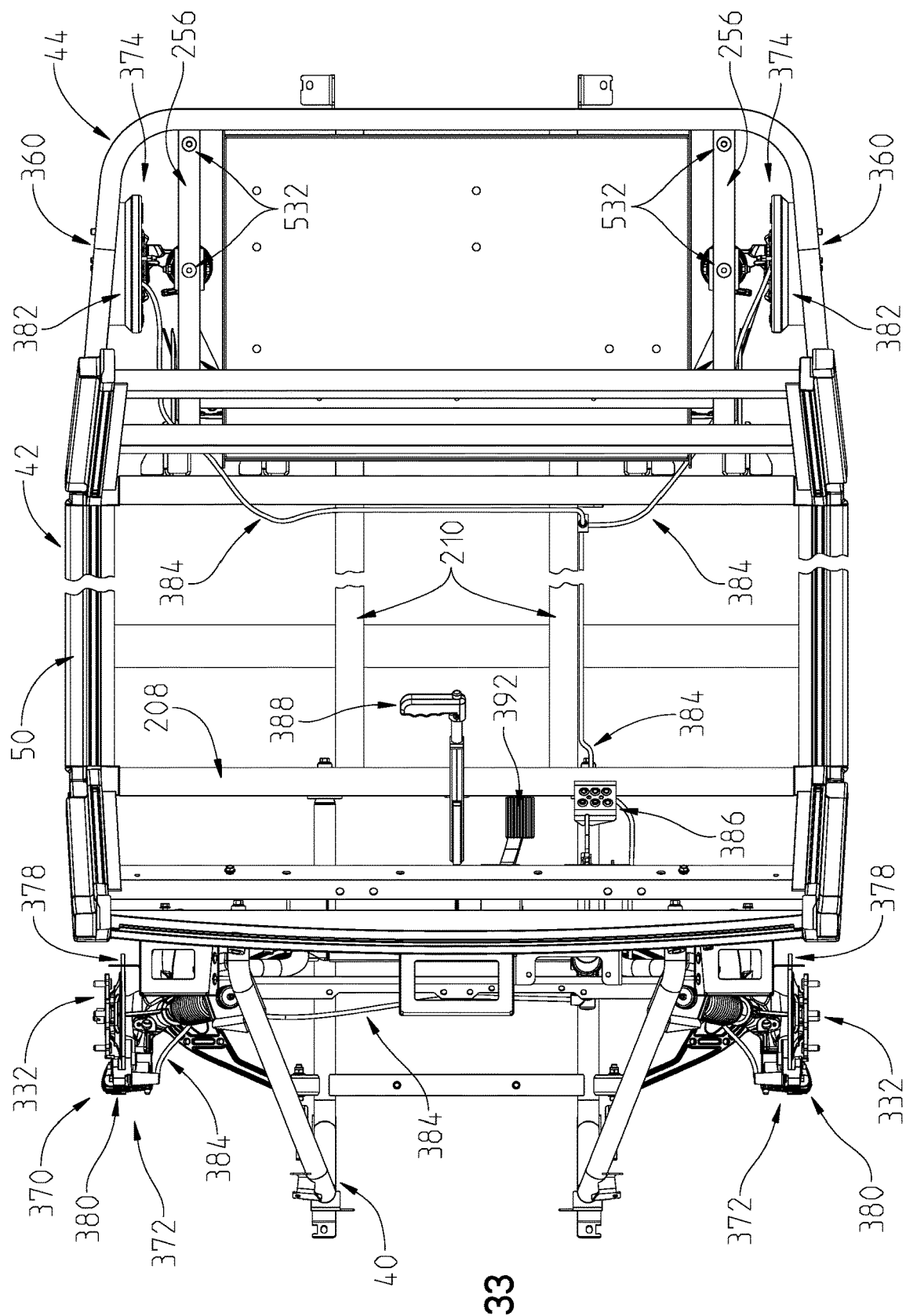
FIG. 33 is a top perspective view of a brake system of the vehicle of FIG. 1.

Referring to FIG. 33, a brake system 370 is illustrated including front brakes 372 coupled to front wheel spindle assemblies 332 and rear brakes 374 coupled to rear wheel spindle assemblies 360. Front brakes 372 are illustratively hydraulic disc brakes including brake discs 378 and brake calipers 380, and rear brakes 374 are illustratively hydraulic drum brakes 382. Hydraulic brake lines 384 are routed from rear brakes 374 along a cross beam 210 to a hydraulic cylinder assembly (not shown). Similarly, hydraulic brake lines 384 are routed from front brakes 372 to the hydraulic cylinder assembly. A brake pedal 386 is actuated by an operator to control brakes 372, 374. An accelerator pedal 392 and a mechanical emergency brake 388 are also illustrated in FIG. 33. When steering wheel 302 is coupled to right steering assembly mount 196 of FIG. 16, pedals 386, 392 are coupled to a mounting location in front of the passenger front seat, as illustrated in phantom in FIG. 48 at 496, 498. In another embodiment, vehicle 10 includes a blended braking system as described herein with respect to FIGS. 69-71.

Figure 36:
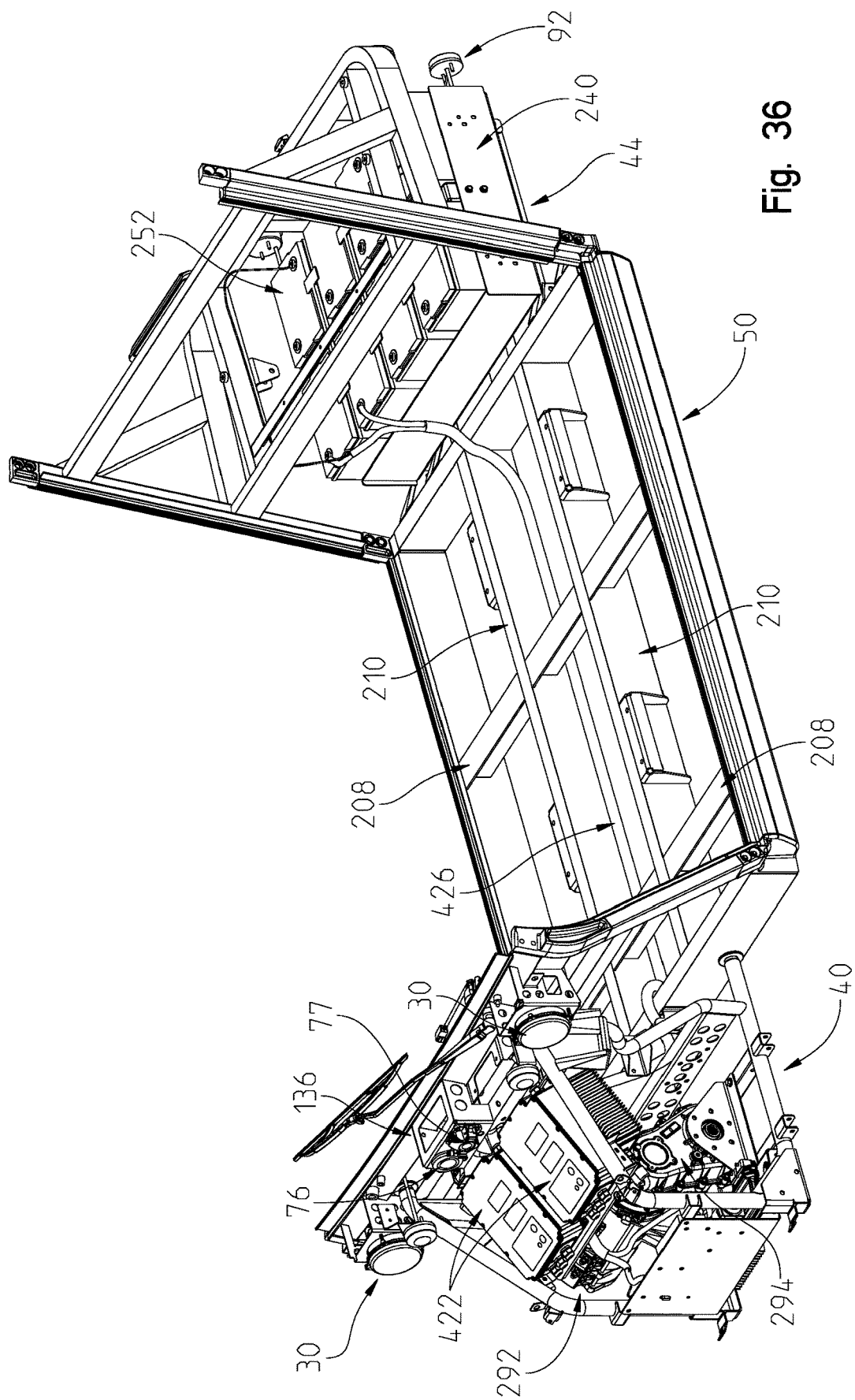
FIG. 36 is a front left perspective view of an electrical system of the vehicle of FIG. 1.

Referring to FIG. 36, an electrical system of vehicle 10 includes batteries 252 supported by rear frame module 44 and a pair of battery chargers 422 and an electric motor 293 supported by front frame module 40. Battery chargers 422 are electrically coupled to one of ports 76, 77 and to batteries 252. In one embodiment, a single charger 422 is provided for lower charging requirements and both chargers 422 are provided for higher charging level requirements, such as fast charging with port 77. A power line bundle/harness 426 is routed from chargers 422 in the front of vehicle 10 to batteries 252 in the rear of vehicle 10 along a cross frame member 210 of floor frame 50. In one embodiment, batteries 252 include at least one lithium ion battery. In one embodiment, multiple different configurations of batteries 252 are available. For example, batteries 252 may include a single battery or battery pack, multiple batteries, and various types of batteries.

Figure 37:
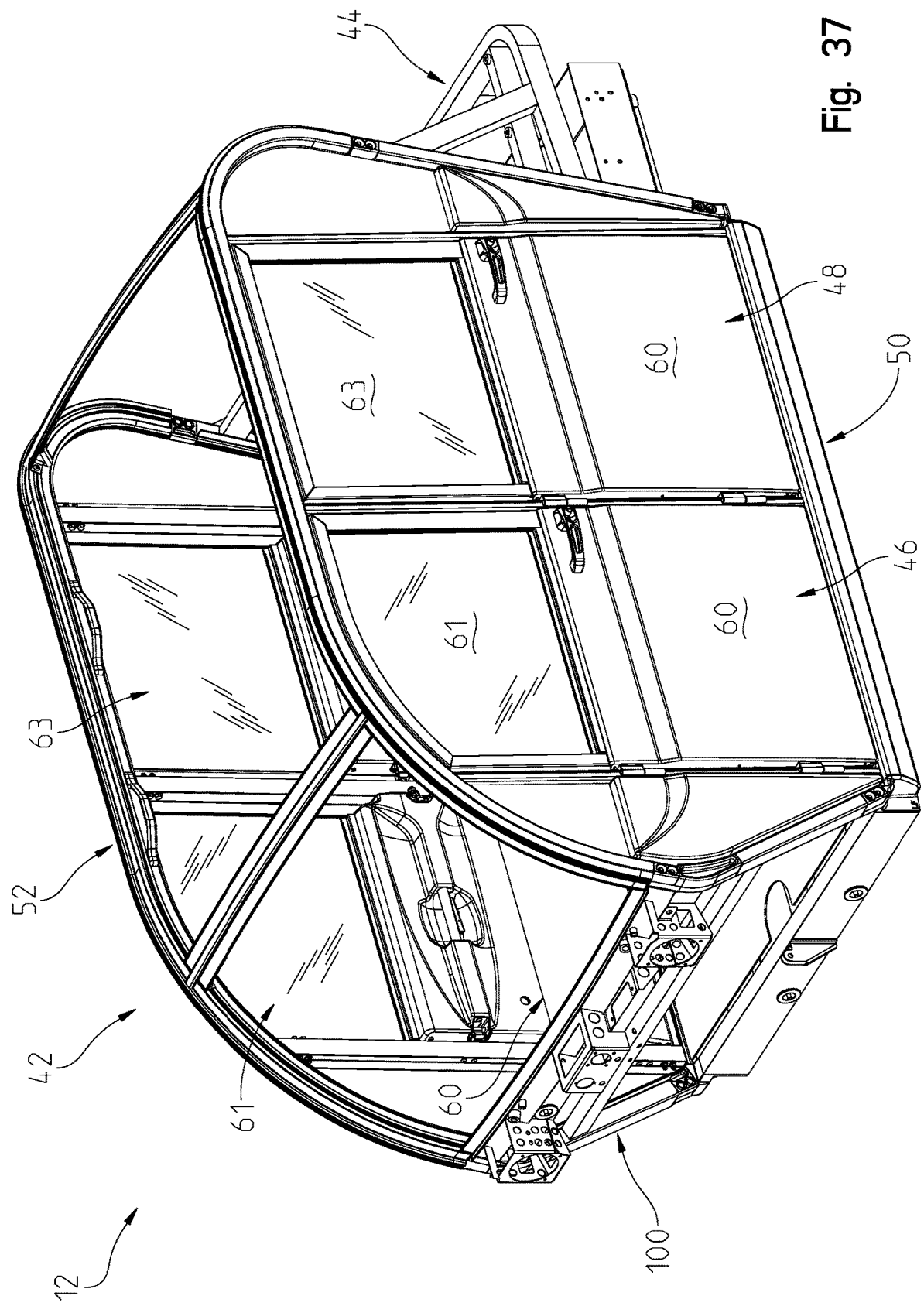
FIG. 37 is a front left perspective view of the middle and rear frame modules of the vehicle of FIG. 1 including four doors.
Figure 38:
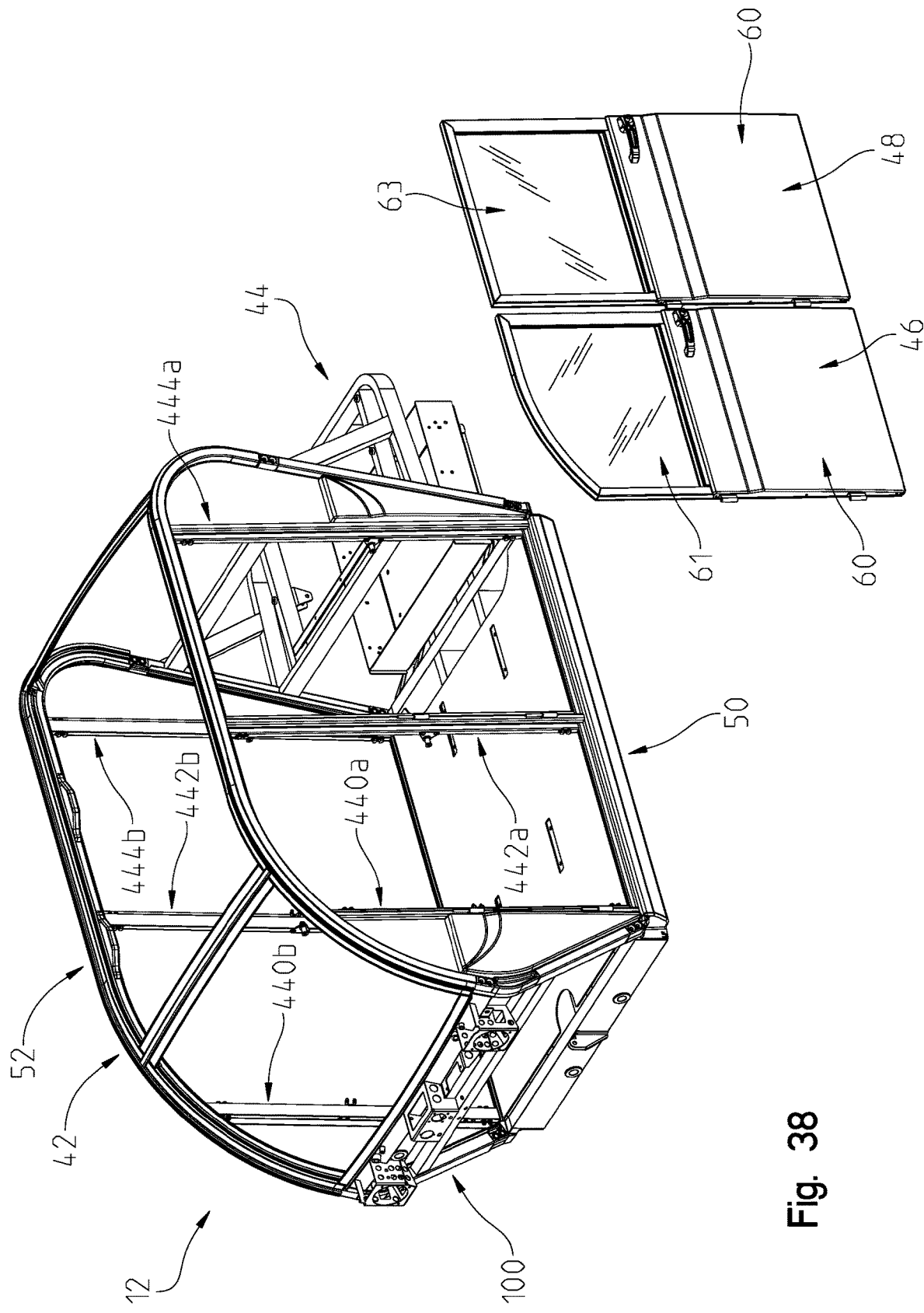
FIG. 38 is a front left perspective view of the middle and rear frame modules of FIG. 37 with the doors removed.
Figure 39:
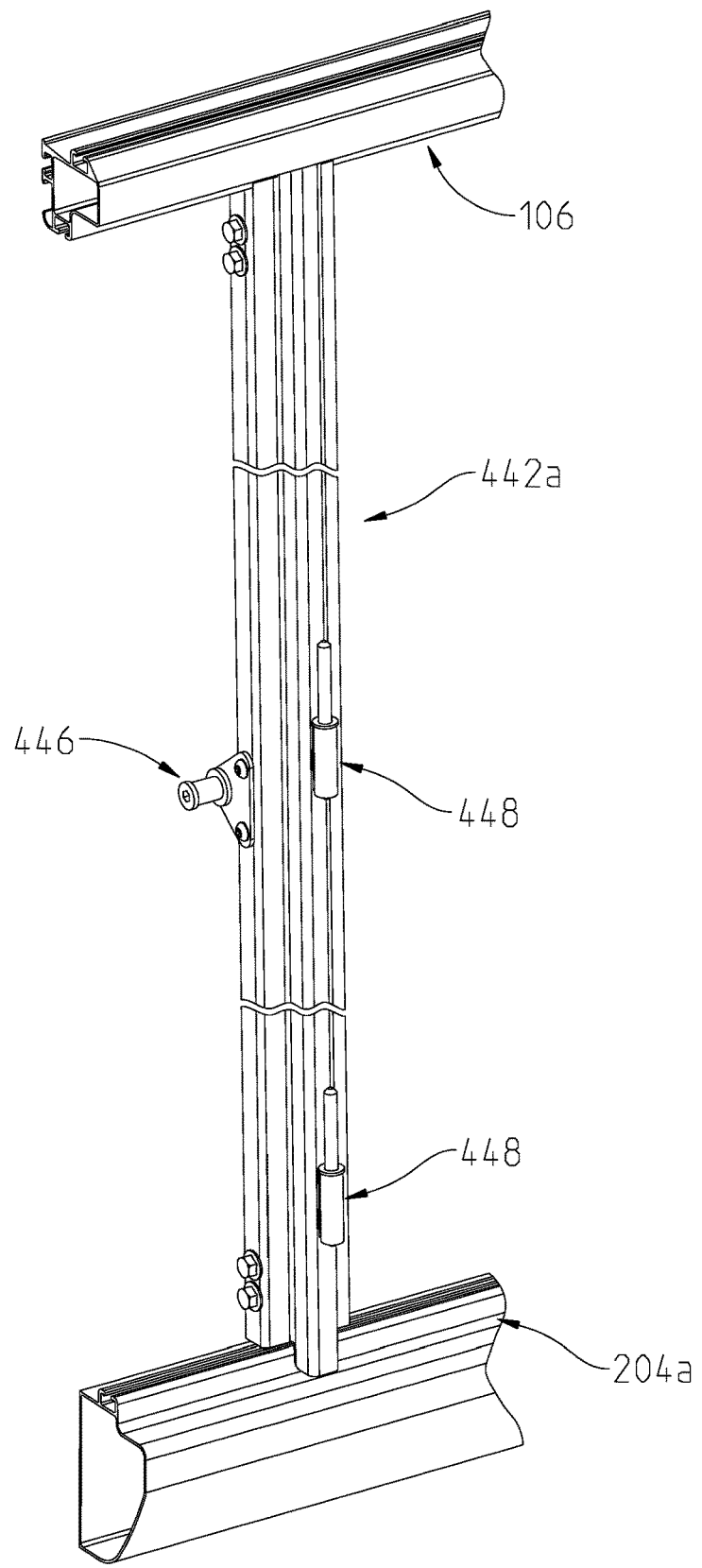
FIG. 39 is a front left perspective view of a middle door frame member coupled to a cab frame and a floor frame of the middle frame module of FIG. 37.

Referring to FIGS. 37 and 38, front doors 46 and rear doors 48 are shown coupled to middle frame module 42 of vehicle 10. As illustrated in FIG. 38, middle frame module 42 includes front door frame members 440a, 440b, middle door frame members 442a, 442b, and rear door frame members 444a, 444b for hingedly mounting front and rear doors 46, 48 on the left and right sides of frame assembly 12. Referring to FIGS. 39-42, middle door frame member or pillar 442a is illustrated including a door latch 446 for latching front door 46 (FIG. 37) to frame member 442a and a pair of hinge mounts 448 for mounting rear door 48 (FIG. 38) to frame member 442a. A trim piece 464 is coupled to a back of frame member 442a. In one embodiment, each hinge mount 448 is a single weldment.

Figure 40:
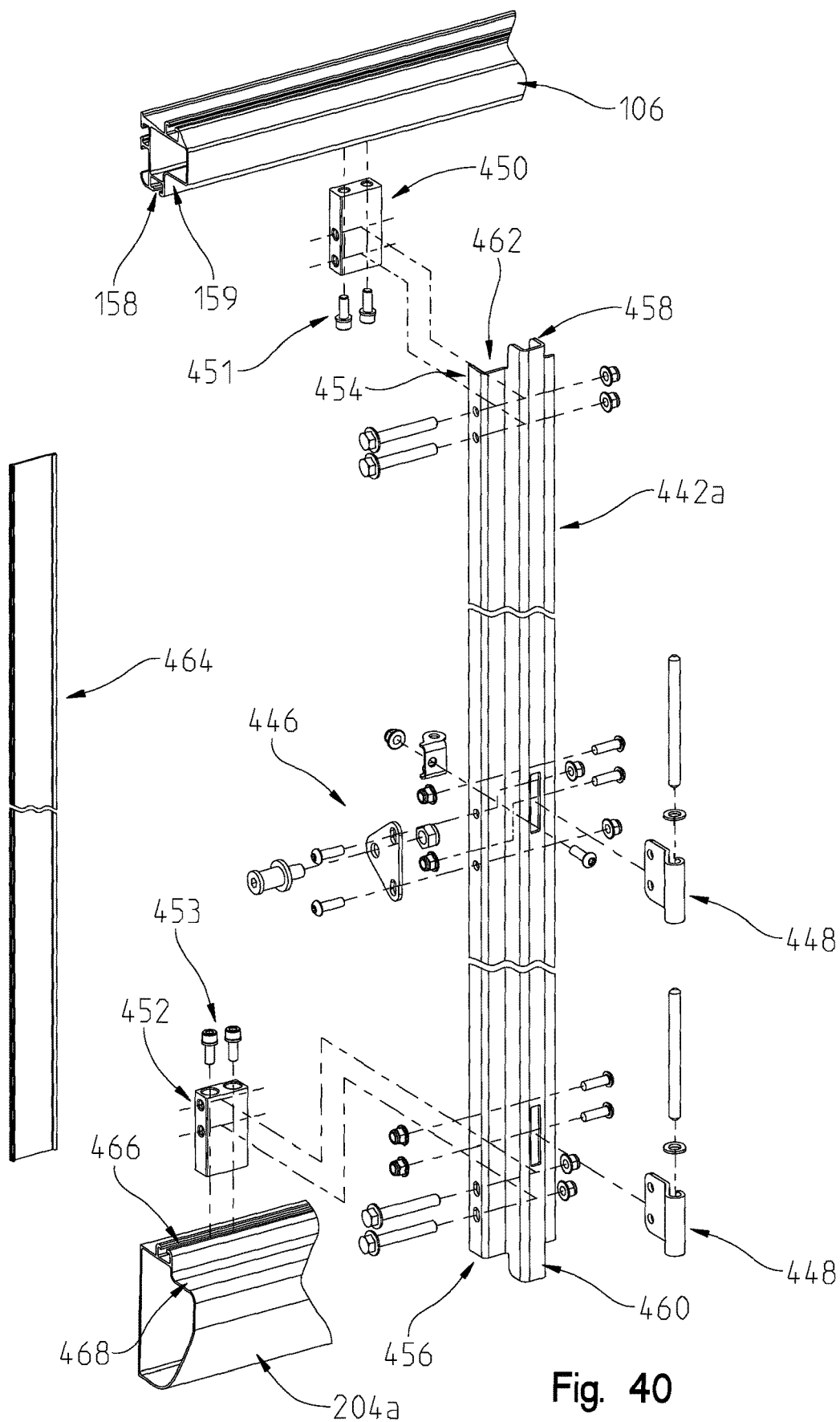
FIG. 40 is an exploded front left perspective view of the middle door frame member of FIG. 39.
Figure 41:
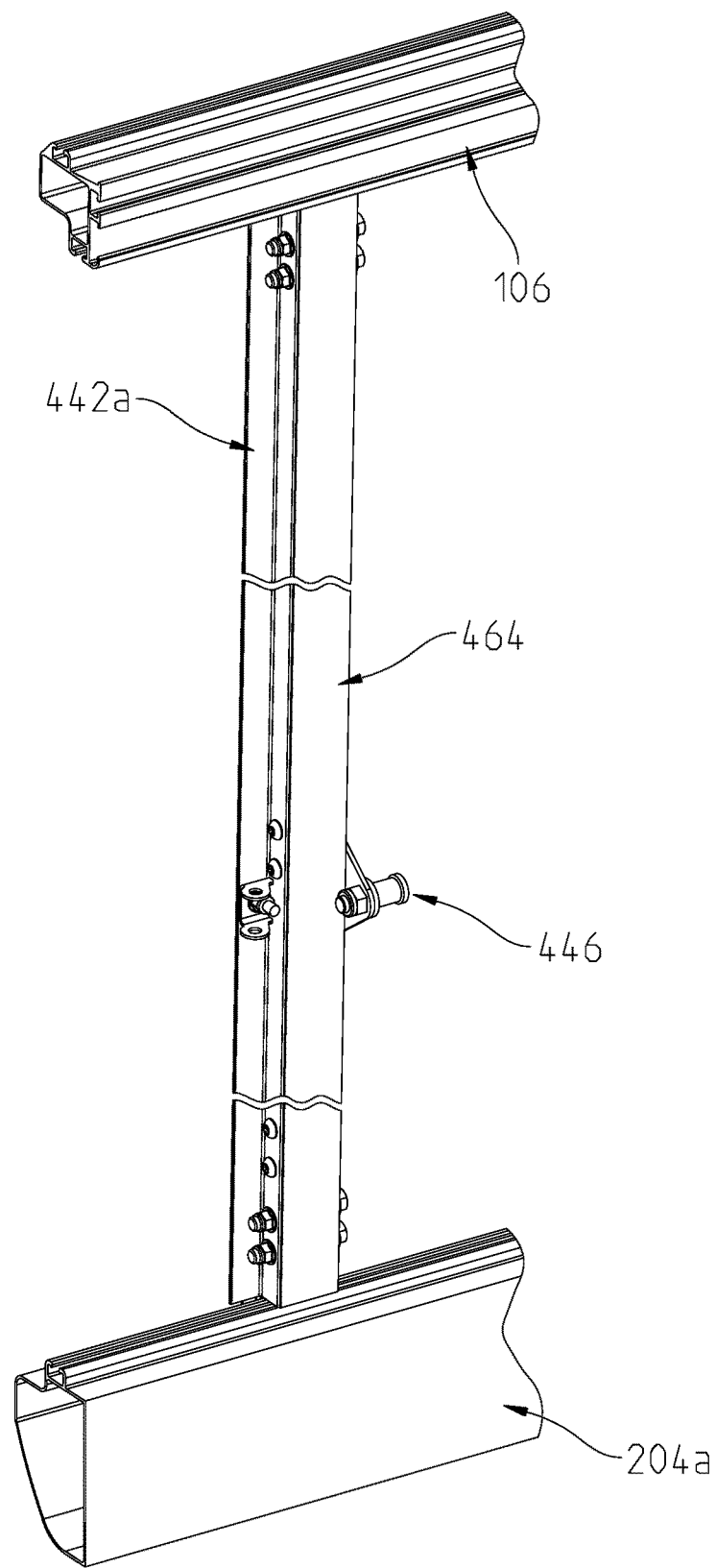
FIG. 41 is a rear right perspective view of the middle door frame member of FIG. 39.
Figure 42:
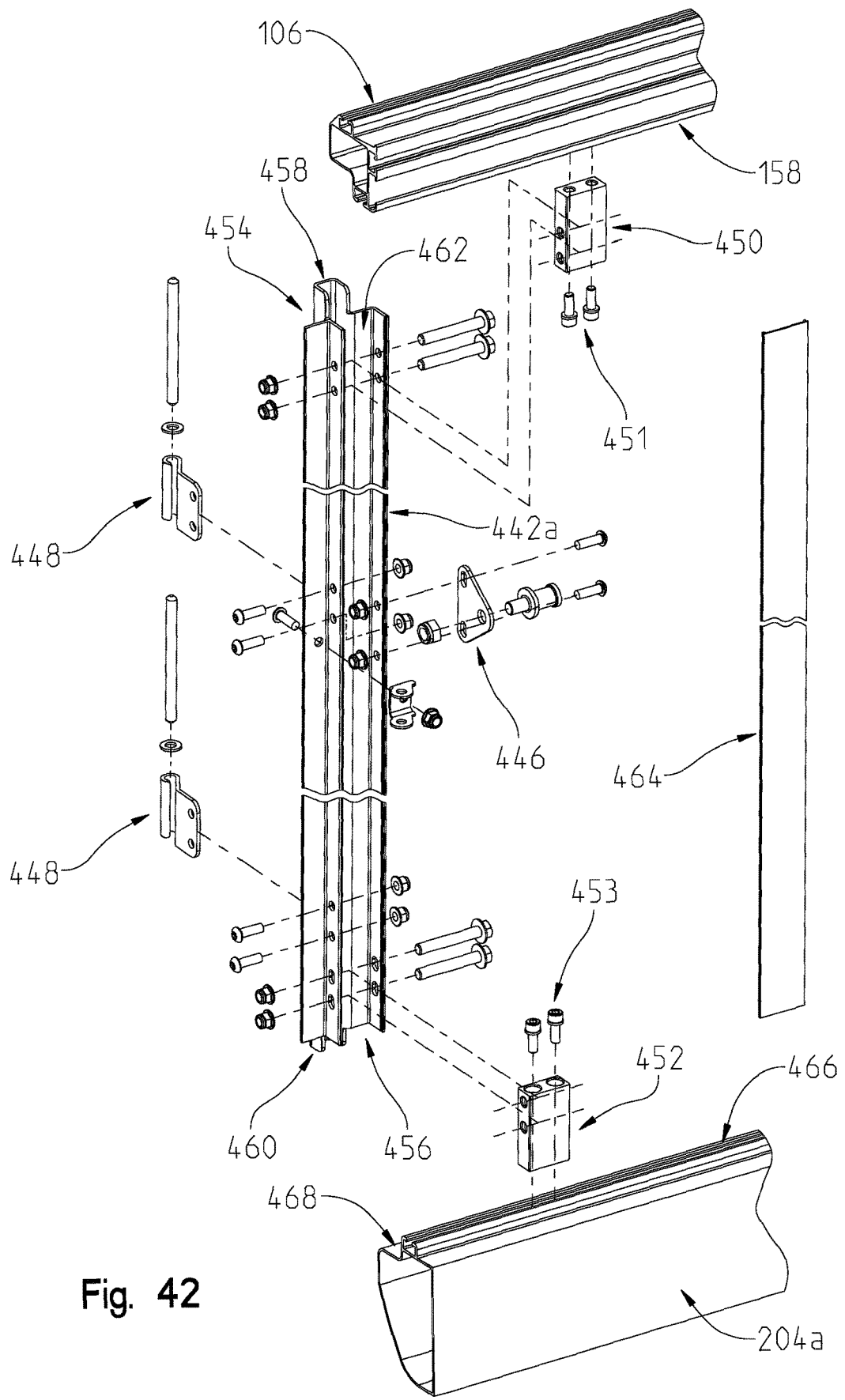
FIG. 42 is an exploded rear right perspective view of the middle door frame member of FIG. 39.

As illustrated in FIGS. 40 and 42, a mounting block 450 is coupled to T-slot channel 158 of frame member 106 via fasteners, such as bolts 451 and nuts positioned in channel 158. Mounting block 450 couples to a top end 454 of frame member 442a in a back channel 462 of frame member 442a via fasteners. A flange 458 of top end 454 is positioned adjacent a shoulder 159 of frame member 106. Similarly, a mounting block 452 is coupled to a T-slot channel 466 of frame member 204a via fasteners, such as bolts 453 and nuts positioned in channel 466. Mounting block 452 couples to a bottom end 456 of frame member 442a in back channel 462 of frame member 442a via fasteners. A flange 460 of bottom end 456 is positioned adjacent a shoulder 468 of frame member 204a. Door frame members 440a, 440b, 442b, 444a, 444b are also coupled to cab frame 52 and floor frame 50 as described with respect to door frame member 442a in FIGS. 39-42.

Figure 43:
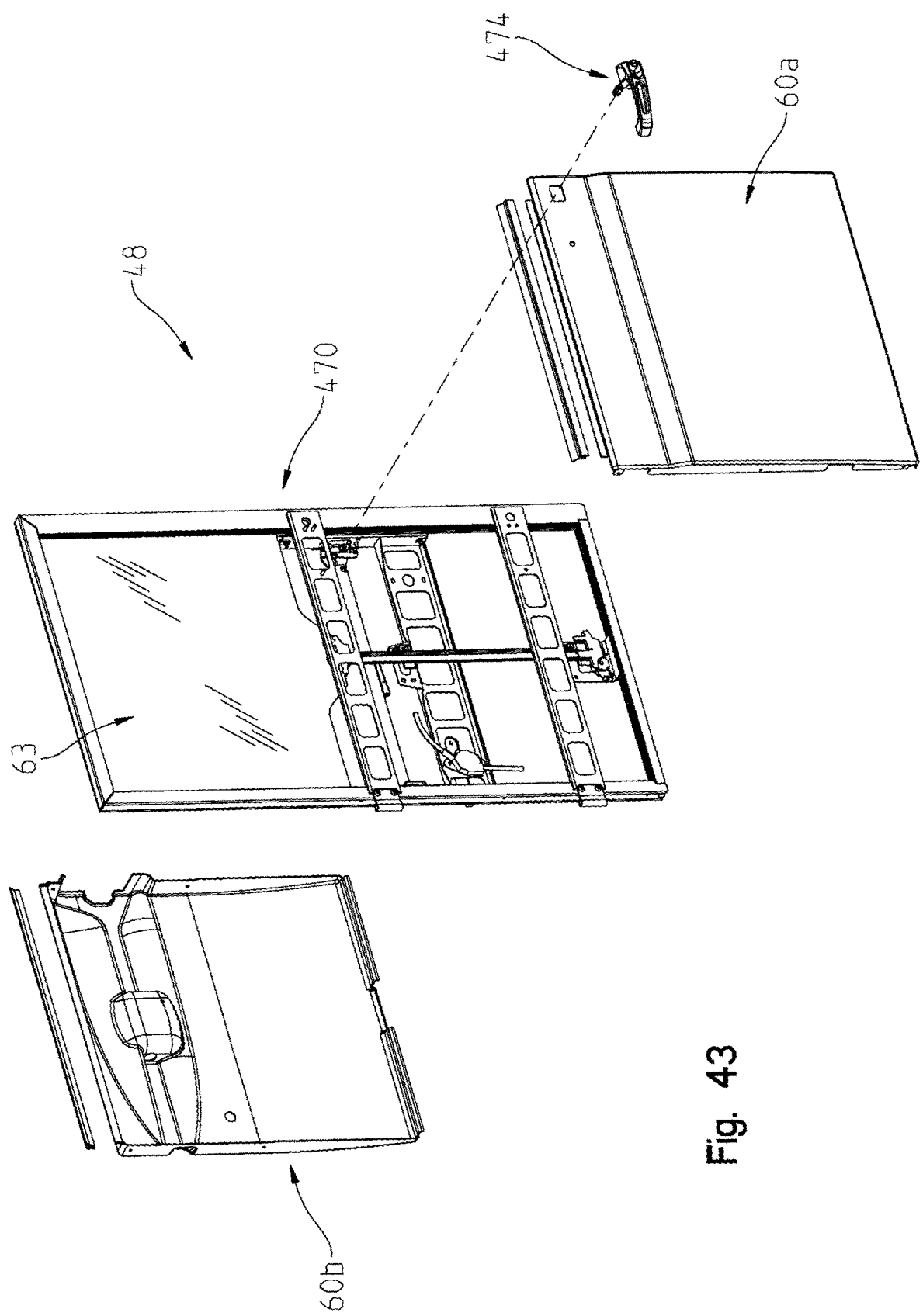
FIG. 43 is a partially exploded front left perspective view of a rear door of the vehicle of FIG. 1.
Figure 44:
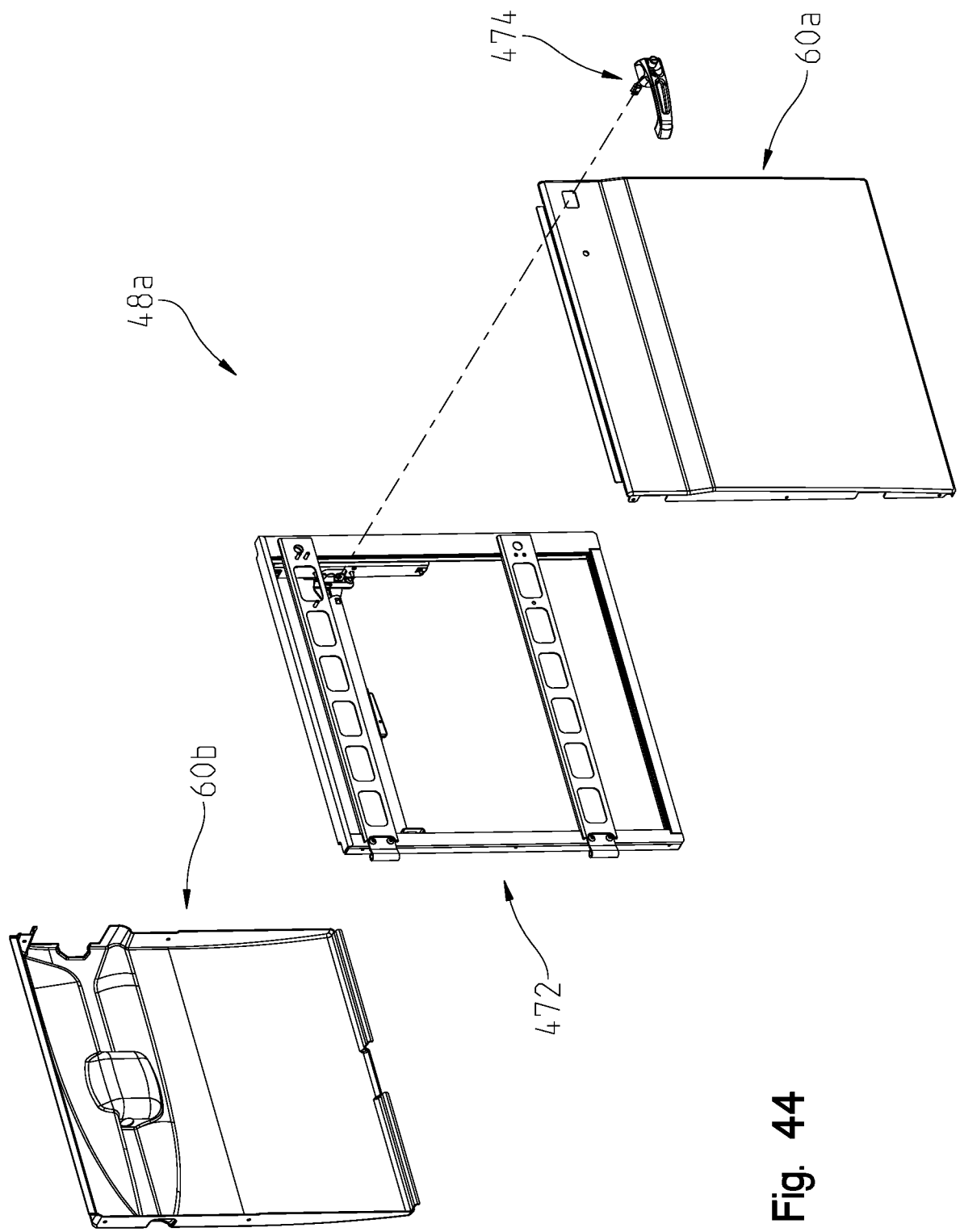
FIG. 44 is a partially exploded front left perspective view of a door of the vehicle of FIG. 1.

Referring to FIG. 43, a full rear door 48 of FIG. 1 is illustrated according to some embodiments. In the illustrated embodiment of FIG. 43, lower door portion 60 of FIG. 1 includes a front panel 60a and a rear panel 60b that each couple to a full door structure 470. A door handle 474 mounts to front panel 60a. Referring to FIG. 44, an alternative half rear door 48a is illustrated without a window 63. Rear door 48a of FIG. 44 includes front and rear panels 60a, 60b coupled to a half door structure 472.

Figure 45:
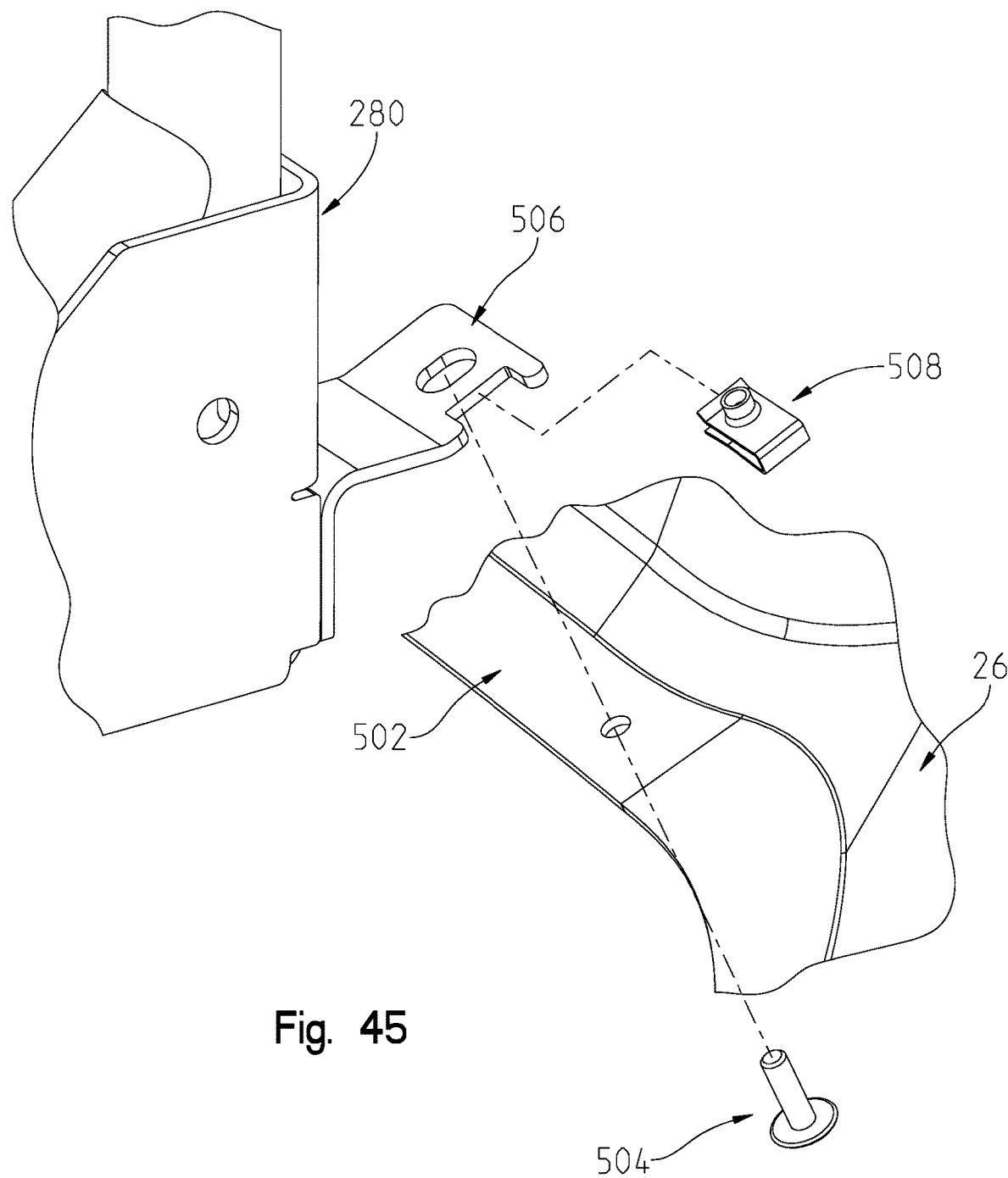
FIG. 45 is a perspective view of an exemplary U-clip configuration for fastening a body panel to a frame member of the vehicle of FIG. 1.

As described herein, the body of vehicle 10 includes a plurality of panels (see FIG. 46) that are coupled to frame assembly 12. One or more body panels are coupled to frame assembly 12 via U-clips. For example, FIG. 45 illustrates an exemplary U-clip configuration for coupling a body panel to frame assembly 12. Referring to FIG. 45, front bracket 280 of front frame module 40 (FIG. 18) includes a flanged bracket 506. A U-clip 508 clamps onto bracket 506 and receives a fastener 504 which extends through an edge portion 502 of front body panel 26 to fasten front body panel 26 to bracket 506. Other body panels of vehicle 10 are coupled to frame assembly 12 via glue joints and/or nylon push pins.

Referring to FIG. 46, the interior of vehicle 10 includes a front lower floor liner panel 480, a floor panel 482, and a rear panel 484 coupled to middle frame module 42. For each different length vehicle 10, 10A, 10B described herein (FIGS. 1-12), floor liner panel 480 and rear panel 484 are identical but floor panel 482 varies in length to accommodate the different length middle frame modules 42. See, for example, the extended floor panel 482 (shown as floor panel 410) in FIGS. 35A-35C for a six-door vehicle 10B (FIGS. 11 and 12). In one embodiment, panels 480, 482, and 484 are coupled to middle frame module 42 with an adhesive, although other suitable fasteners or couplers may be used. Panels 480, 482, 484 are configured to allow the routing of electrical wires and cables along middle frame module 42 between the front and rear of vehicle 10.

Figure 47:
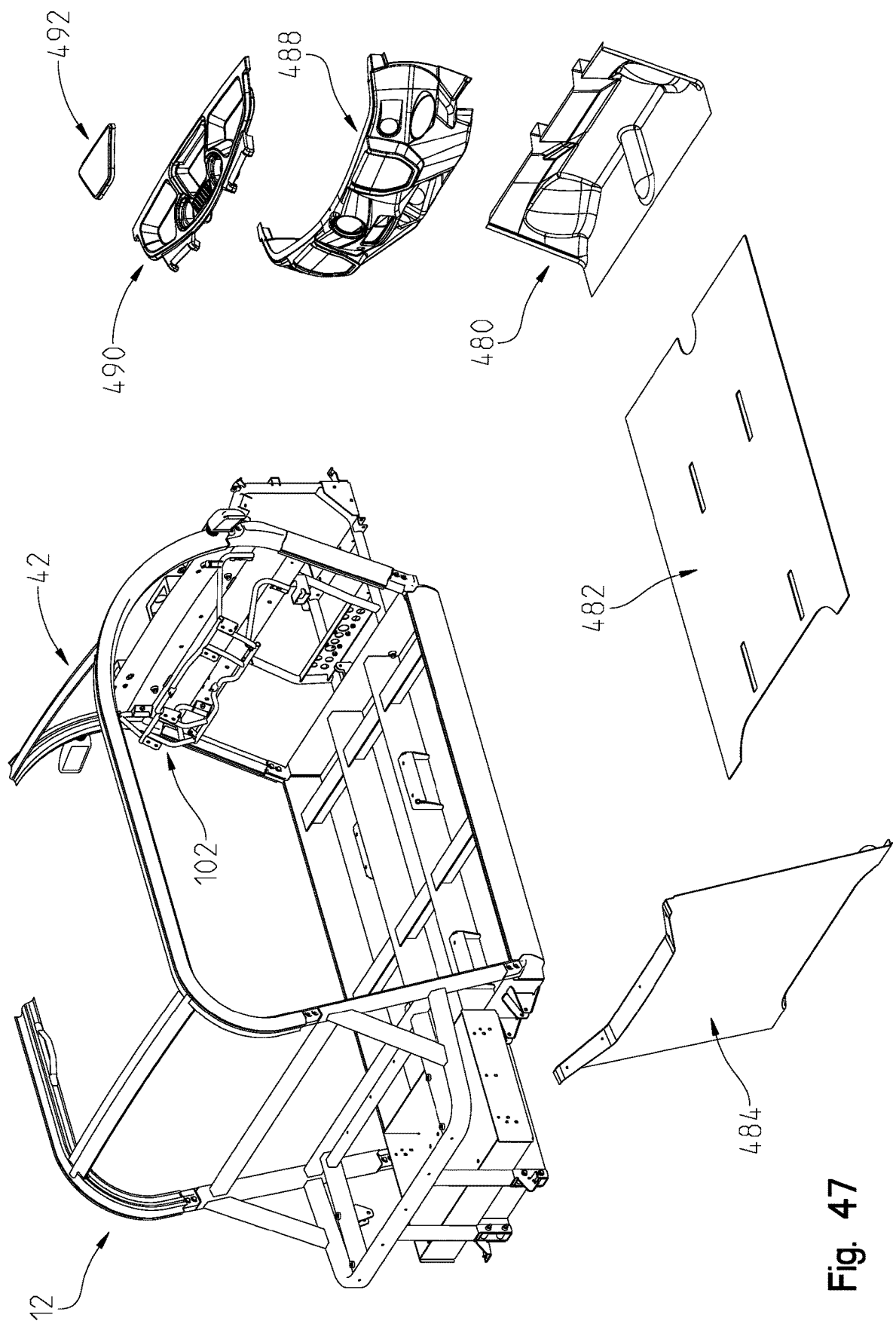
FIG. 47 is a partially exploded rear right perspective view of the vehicle of FIG. 1 including the frame assembly and a plurality of interior panels configured to couple to the frame assembly.
Figure 48:
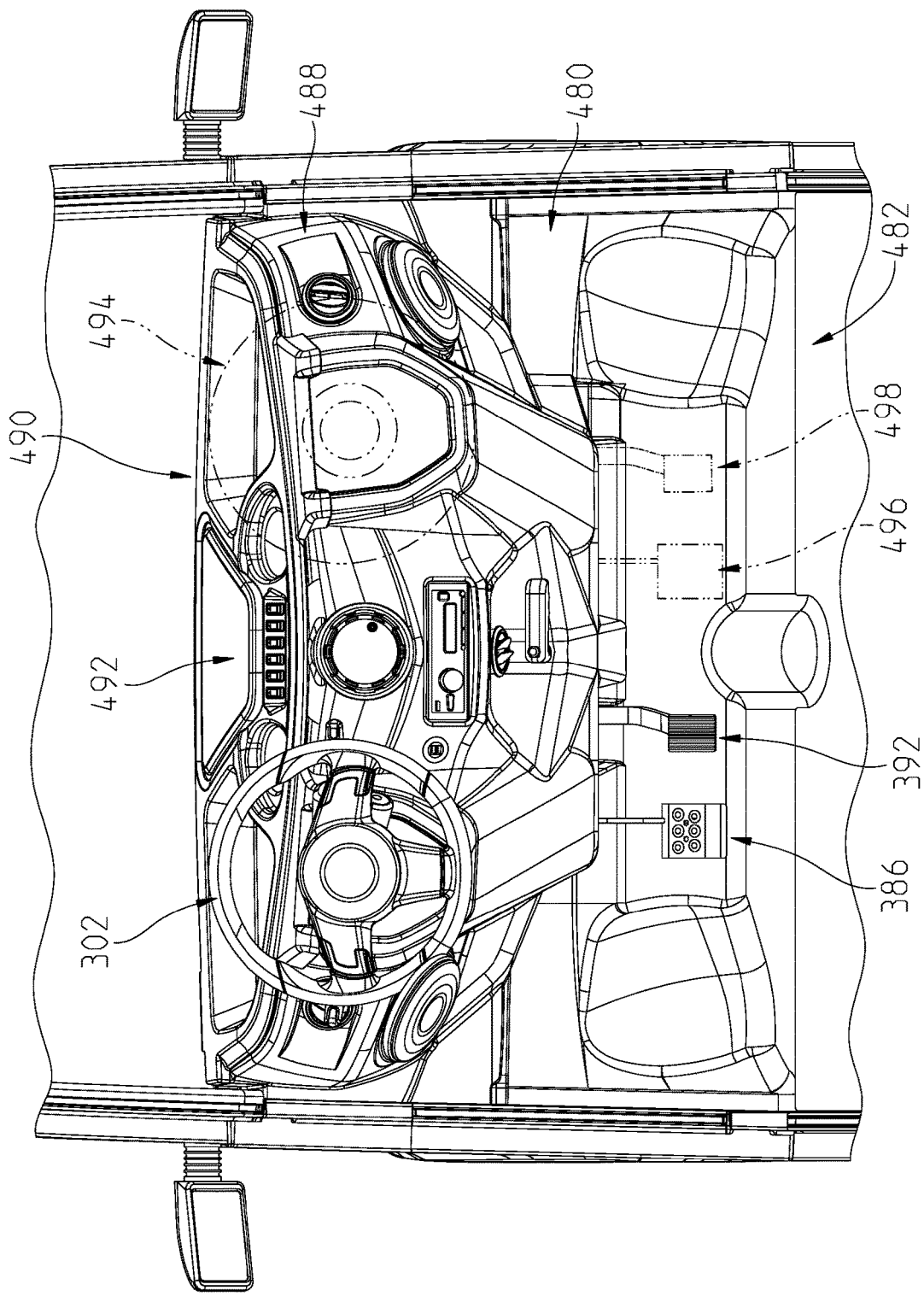
FIG. 48 is a rear perspective view of an interior dash of the vehicle of FIG. 1 including a steering wheel, an accelerator pedal, and a brake pedal mounted in a left hand drive configuration.
Figure 49:
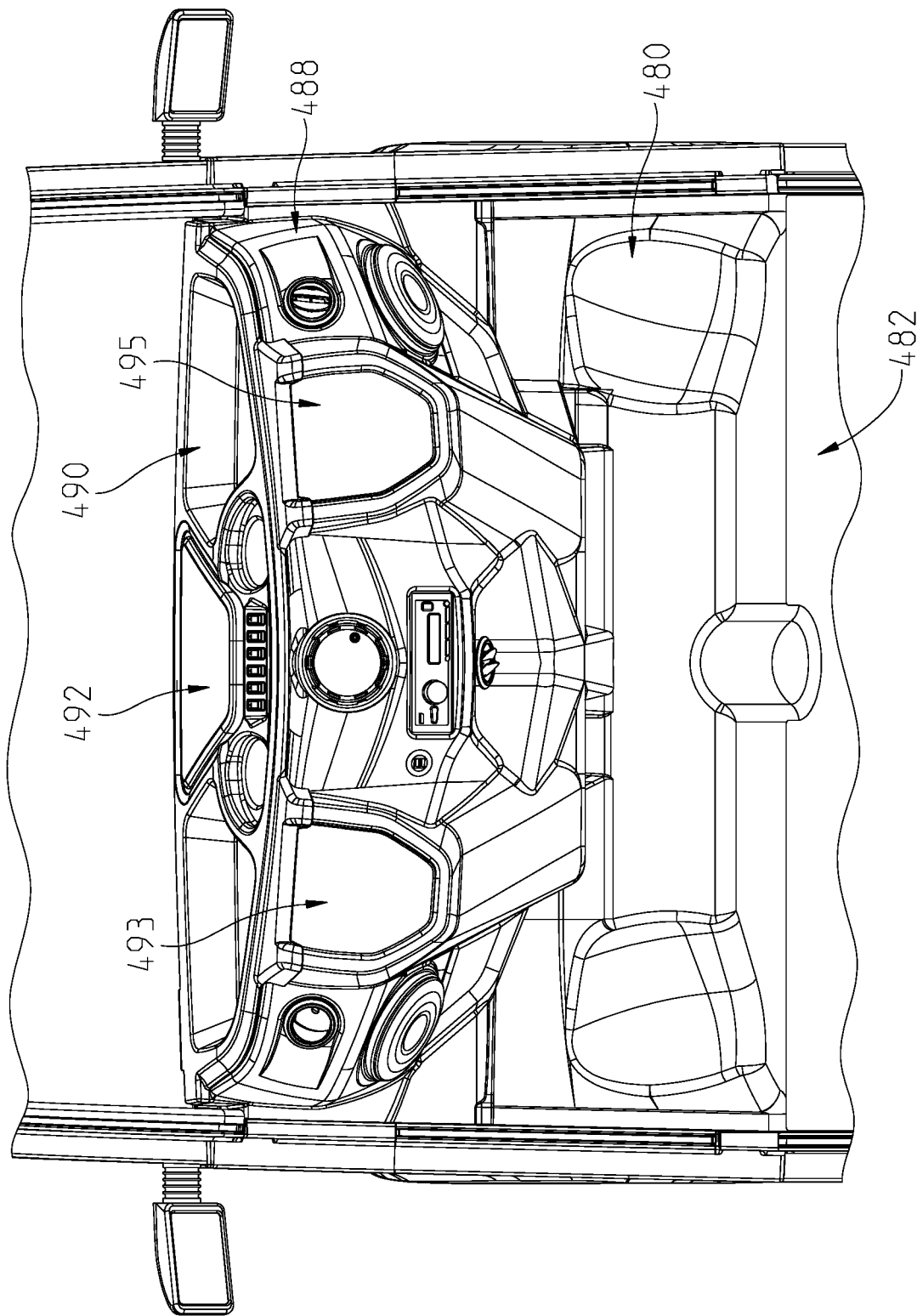
FIG. 49 is a rear perspective view of the interior dash of FIG. 48 illustrating steering mount panels positioned in both the left and right steering mount locations.

As illustrated in FIGS. 47 and 48, first and second dash panels 488, 490 couple to steering assembly frame 102 to form the dash of vehicle 10, and a hinged access panel 492 provides access to a storage compartment in dash panel 490. In one embodiment, an upper front liner panel (not shown) is positioned between first dash panel 488 and lower floor liner panel 480. FIG. 48 further illustrates second mounting location 494 for steering wheel 302. Dash panel 488 may be removed and replaced with a different dash panel having an opening at second mount location 494 for installing steering wheel 302. FIG. 49 illustrates an alternative embodiment with left and right removable panels 493, 495 installed in dash panel 488 which are selectively removed based on the mounting location of steering wheel 302.

Figure 50:
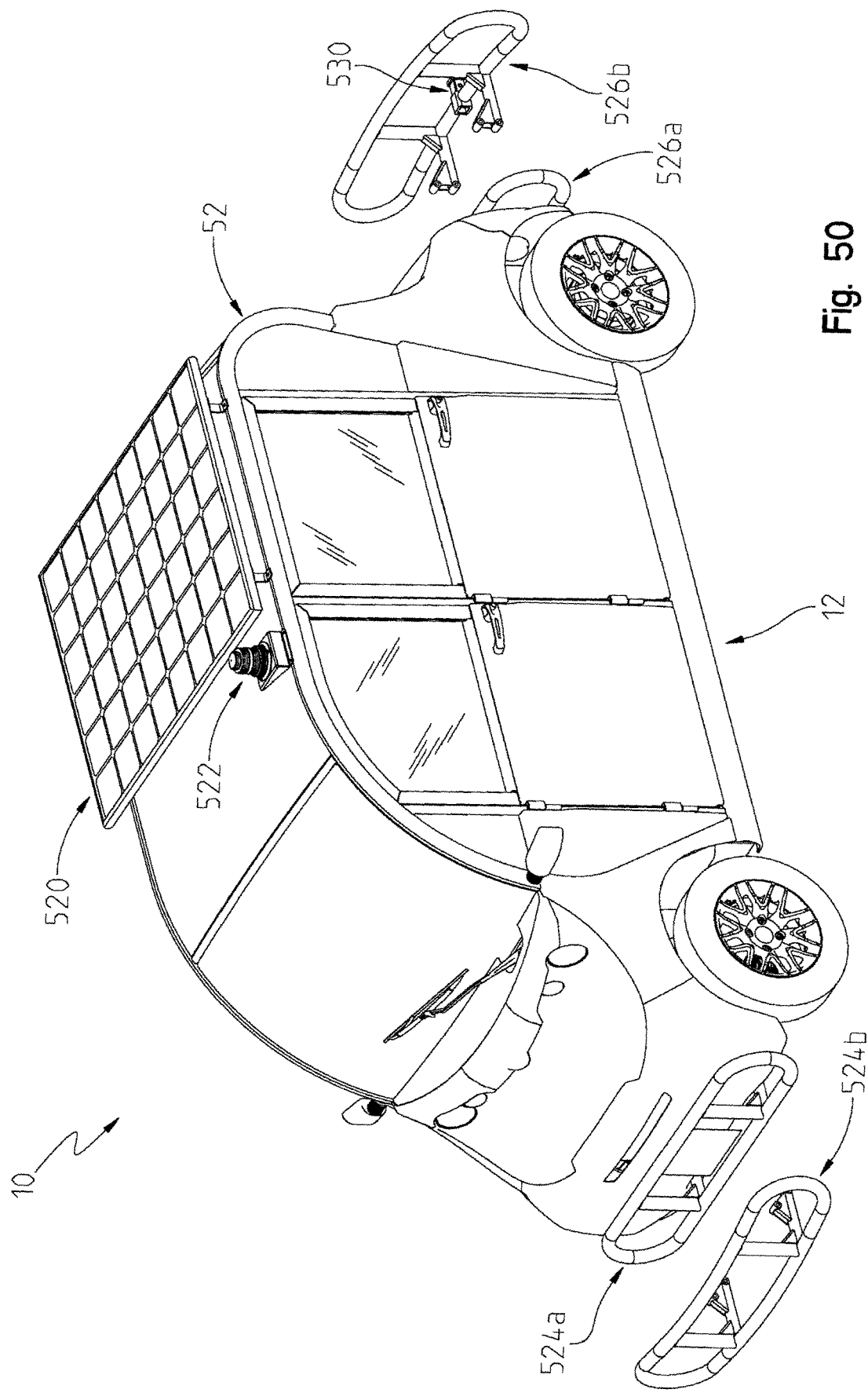
FIG. 50 is a front left perspective view of the vehicle of FIG. 1 including a plurality of accessories, including a plurality of bumpers, solar panel, and lighting device.

Referring to FIG. 50, several accessories for vehicle 10 are illustrated. For example, a solar panel assembly 520 is mounted to cab frame 52 of vehicle 10 for providing additional electrical power to vehicle 10, i.e., for charging batteries. A flashing light assembly 522 is also coupled to roof panel 54. Multiple different configurations of front and rear bumpers, such as straight and curved front bumpers 524a, 524b and straight and curved rear bumpers 526a, 526b, may be coupled to frame assembly 12 of vehicle 10. Rear bumper 526b illustratively includes a hitch receiver 530.

Figure 51:
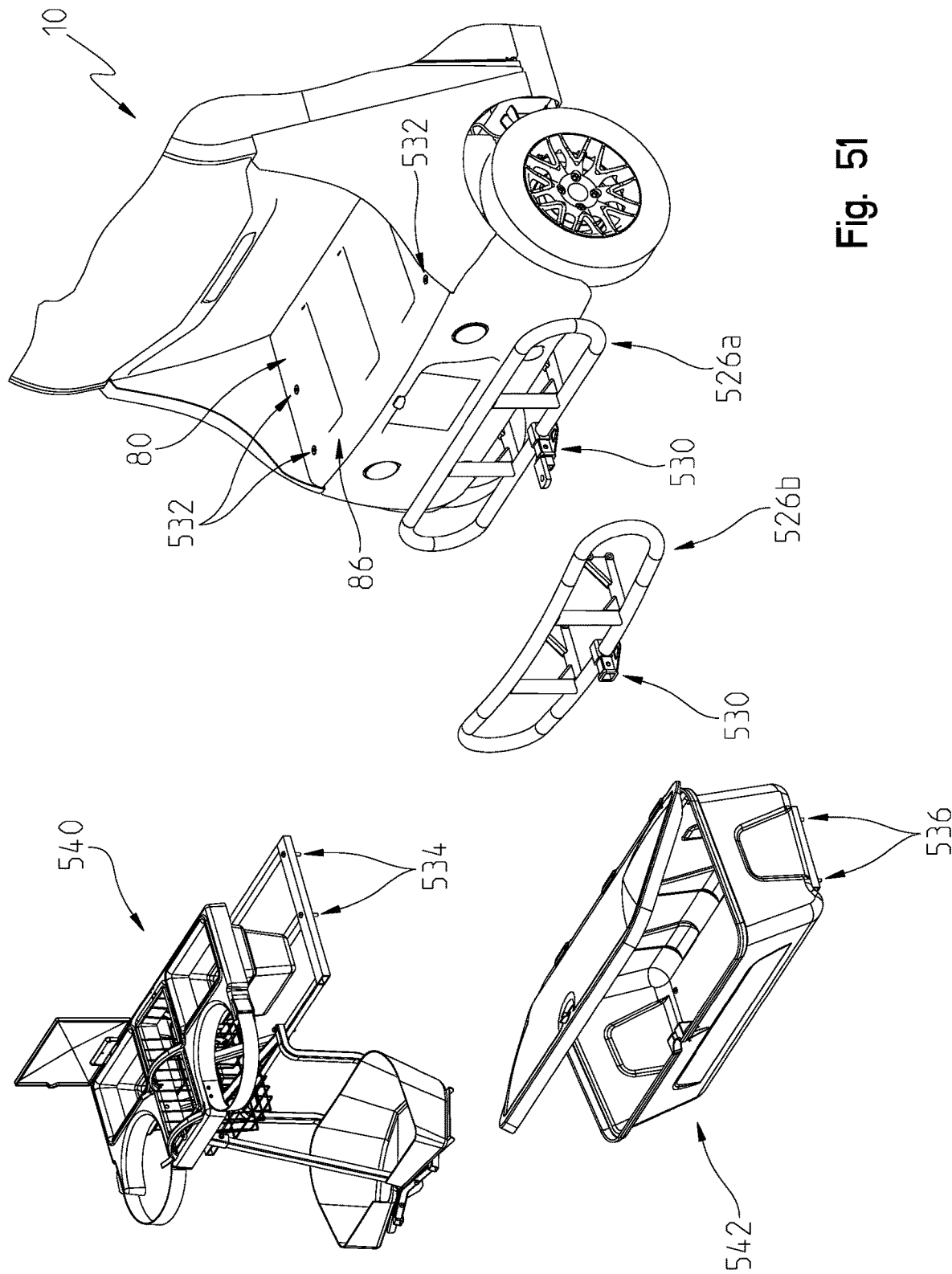
FIG. 51 is rear right perspective view of the rear end of the vehicle of FIG. 1 including a plurality of accessories, including a golf bag carrier, a storage container, and a plurality of bumpers.
Figure 52:
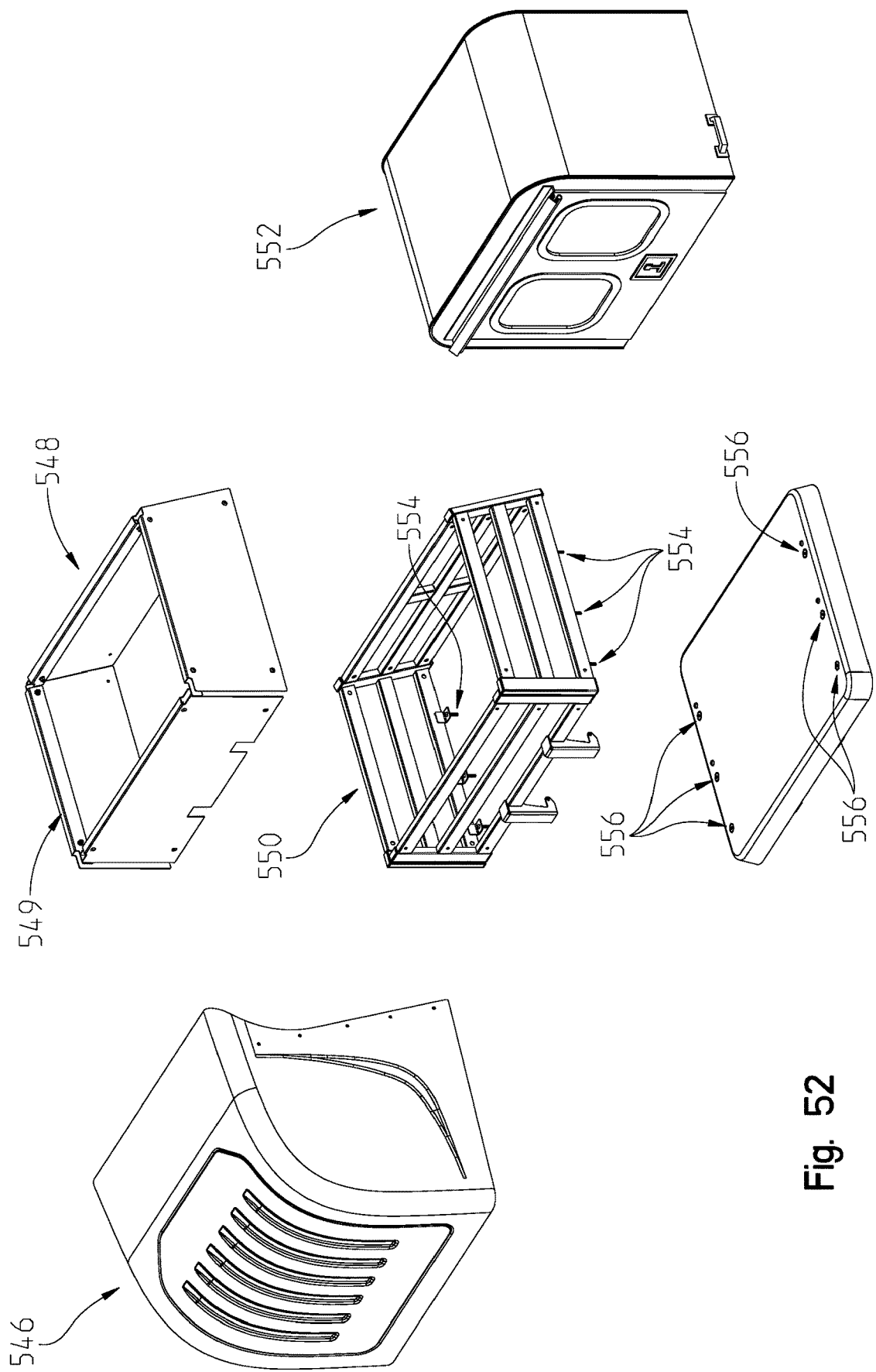
FIG. 52 is rear right perspective view of a plurality of accessories for the vehicle of FIG. 1, including a plurality of different storage containers.

Referring to FIG. 51, multiple accessories for mounting to bed 80 of vehicle 10 are illustrated, including a golf bag carrier 540 and a storage container 542. Accessories 540, 542 include respective bosses or fasteners 534, 536 configured to couple to corresponding fasteners 532 (see also FIG. 5) of bed 80. Fasteners 534, 536 have the same size, shape, and spacing. In the illustrated embodiment, fasteners 532 of bed 80 are mounted to frame members 256 of rear frame module 44 (see FIG. 33) and protrude through openings in platform 86. Referring to FIG. 52, additional accessories are illustrated for mounting to bed 80 including a storage container 546, an open storage container 548, and another storage container 552. Open storage container 548 includes a perimeter wall panel 549 that mounts over a frame 550. Platform 551 may be coupled to platform 86 (FIG. 51) of bed 80 via fasteners 532 (FIG. 51). Platform 551 includes fasteners 556 configured to receive fasteners 554 of frame 550 and fasteners (not shown) of container 546 for mounting the accessories to platform 551.

Figure 53:
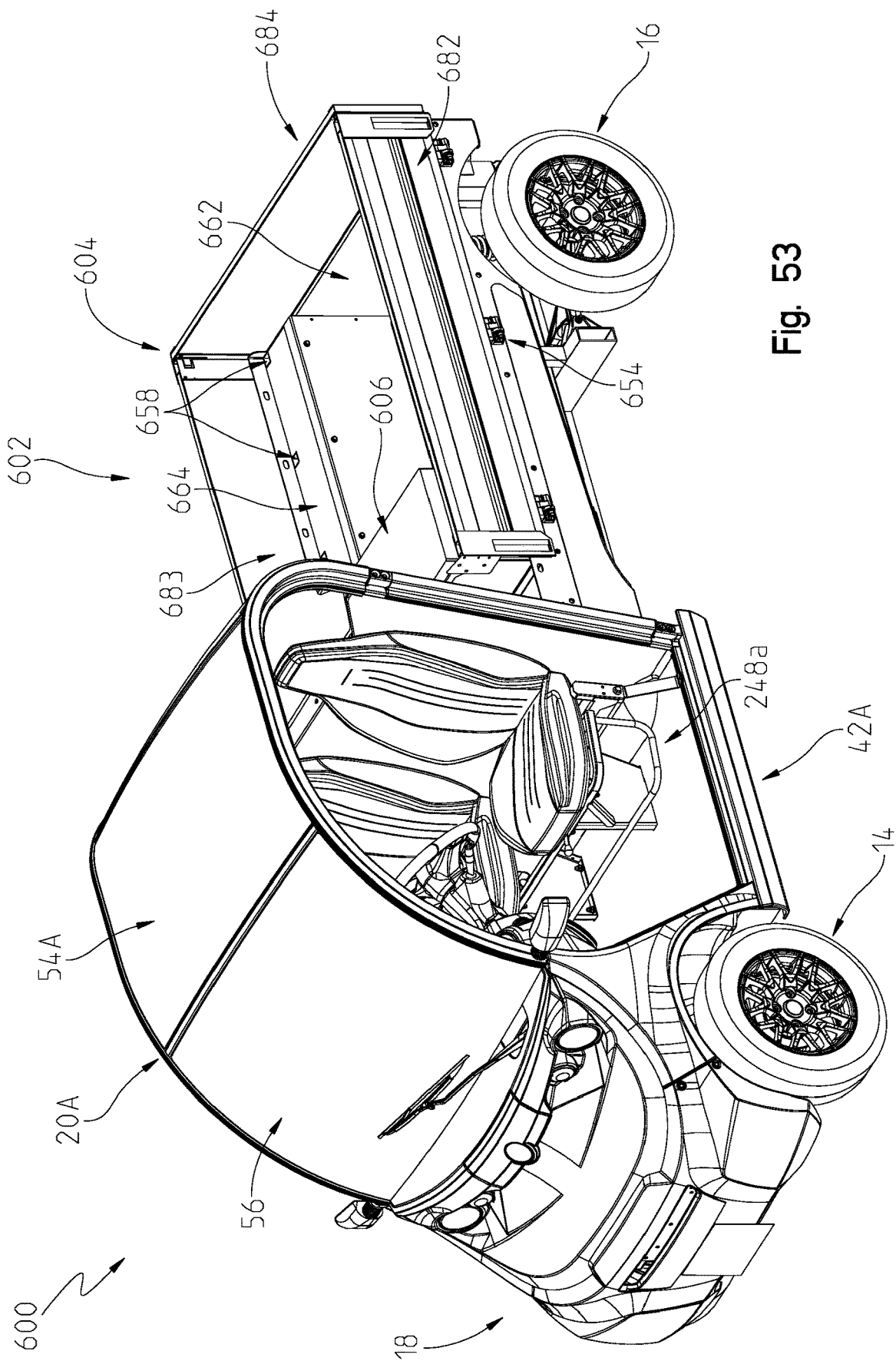
FIG. 53 is a front left perspective view of another exemplary vehicle according to one illustrative embodiment having an extended bed.
Figure 54:
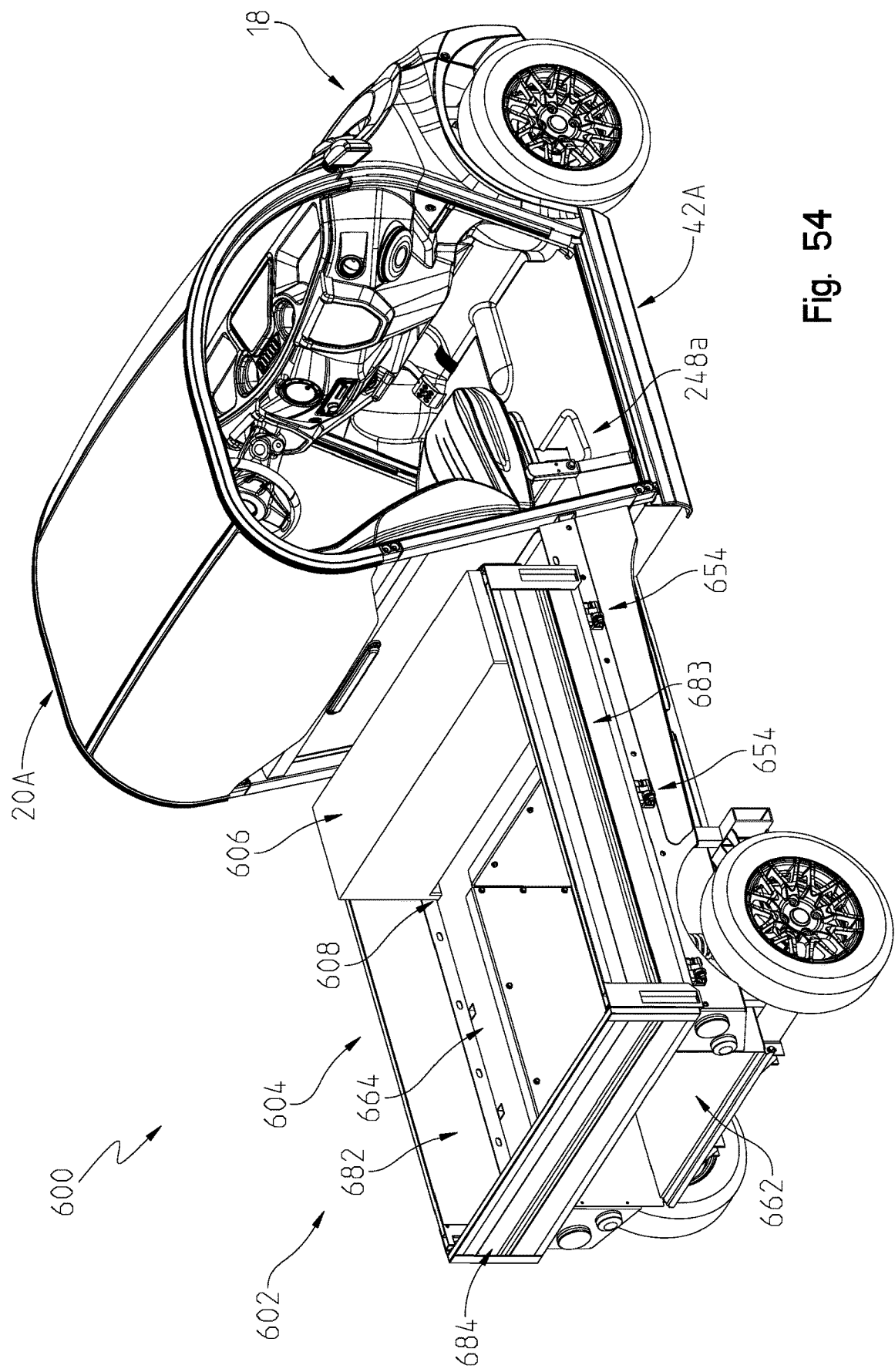
FIG. 54 is a rear right perspective view of the vehicle of FIG. 53.

Referring to FIGS. 53 and 54, another exemplary vehicle 600 is illustrated according to an embodiment. Vehicle 600 includes a common front portion 18 and a common middle portion 20A as vehicle 10A of FIGS. 9 and 10, but rear portion 602 is different from rear portion 22 of vehicle 10A and includes an extended bed 604. Bed 604 includes a U-shaped panel 664 and a recessed portion 662. An optional toolbox 606 is illustratively coupled to U-shaped panel 664 of bed 604 immediately behind the vehicle cab. Toolbox 606 includes legs or stilts 608 on either end to form a gap between U-shaped panel 664 and toolbox 606 for sliding thin objects underneath toolbox 606, such as plywood, drywall, panels, or other thin objects. Additional toolboxes may be coupled to bed 604 along side walls 682, 683 and/or behind toolbox 606. In one embodiment, additional bed extender platforms are provided and each may be coupled to bed 604 to extend or change the configuration of bed 604. Additional rear carriers that may be coupled to bed 604 include a ladder rack, cargo box, and L-box, for example.

Figure 55:
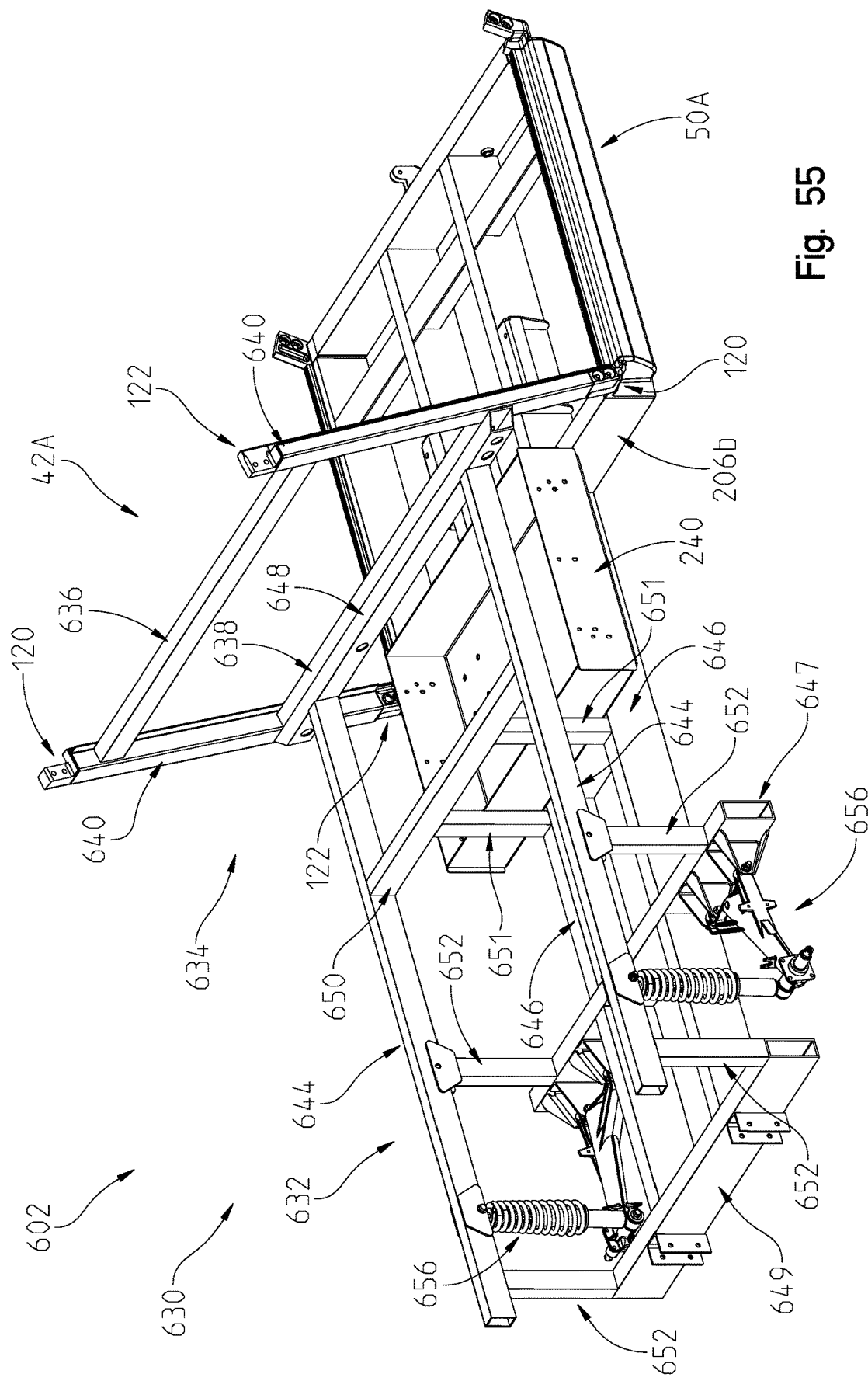
FIG. 55 is a rear right perspective view of a rear frame module of the vehicle of FIG. 53.

Referring to FIG. 55, rear portion 602 includes a rear frame module 630 that couples to middle frame module 42A via joint pieces 120, 122. Rear frame module 630 includes a bed frame 632 coupled to a rear frame 634 and configured to support bed 604 of FIG. 53. Rear frame 634 includes an upper cross member 636 and a lower cross member 638 spaced apart and coupled between a pair of upright frame members 640. Upright frame members 640 are coupled to floor frame 50A and cab frame 52A (FIG. 9) via joint pieces 120, 122. Bed frame 632 includes a pair of longitudinal frame members 644 extending parallel to each other and coupled to a cross member 648. Cross member 648 is coupled to lower cross member 638 of rear frame 634 via a plurality of fasteners, such as bolts. Alternatively, cross member 648 is removed and frame members 644 are coupled directly to lower cross member 638 with brackets and bolts. A second cross member 650 is coupled between frame members 644 immediately behind battery tray 240.

Two lower frame members 646 extend rearwardly from rear beam 206b of floor frame 50A, and two lower frame members 647, 649 are coupled perpendicularly to frame members 646. A plurality of upright support members 652 are coupled between lower frame members 647, 649 and upper frame members 644 of bed frame 632. Similarly, upright support members 651 are coupled between second cross member 650 and lower frame members 646 immediately behind battery tray 240. Right and left independent rear suspension assemblies 656, having a same design as suspension assemblies 352, 354 of FIGS. 31 and 32, are coupled to lower frame member 647 and include shock absorbers coupled to frame members 644.

Figure 56:
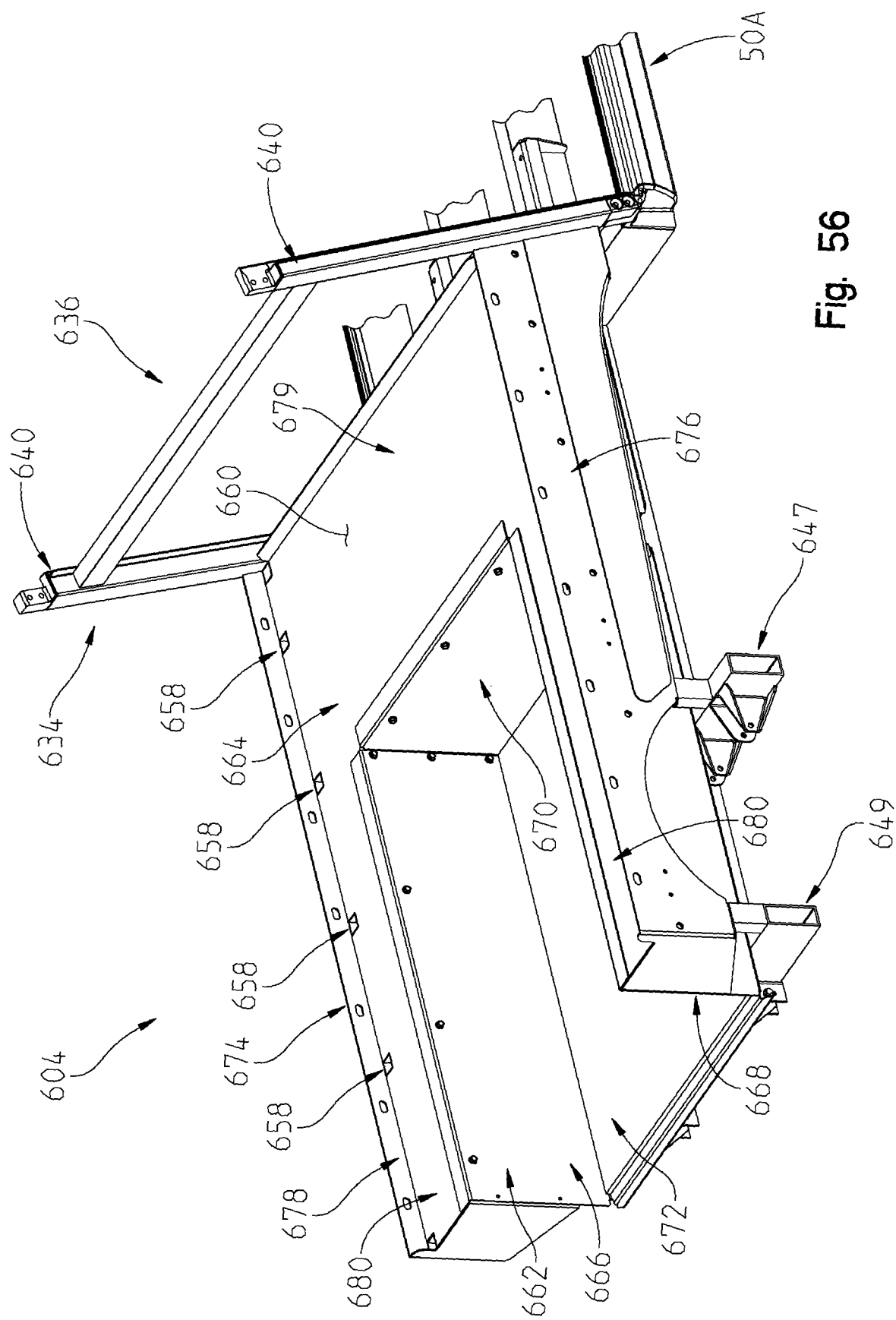
FIG. 56 is a rear right perspective view of a bed of the vehicle of FIG. 53 including a recessed portion and an upper bed portion.

Referring to FIG. 56, a U-shaped panel 664 is coupled to upper frame members 644 and cross members 648, 650 of bed frame 632 (FIG. 55). U-shaped panel 664 includes a main portion 679 adjacent rear frame 634 and side portions 680 extending along each side of a recessed portion 662. A lower panel 672 is coupled to lower frame members 646, 647, 649 inside uprights 652 (FIG. 55) and cooperates with side panels 666, 668, 670 to form recessed portion 662 that is open at the rear of vehicle 600. Accordingly, U-shaped panel 664 provides an upper surface 660 that surrounds recessed portion 662 on three sides. In one embodiment, panel 664 has a height of about 30 inches, and panel 672 has a height of about 16 inches, although other suitable heights may be provided. In one embodiment, cargo that spans the entire width of recessed portion 662 may be supported by side portions 680 of panel 664. In one embodiment, panels 664, 666, 668, 670, 672 are made of aluminum, although other suitable materials may be used.

Vertical side panels 674, 676 are coupled on each side of bed 604 and form a lip 678 extending above the surface 660 of panel 664. Lip 678 illustratively includes apertures which may be used for tie-down straps, for example. In one embodiment, the open recessed portion 662 provides a lower load height portion of bed 604 that may be stepped or leaned into by an operator for reaching towards the front of bed 604 above main portion 679 of panel 664. In one embodiment, the lower load height of recessed portion 662 allows heavy cargo items to be more easily loaded or carted up a ramp into bed 604. In one embodiment, recessed portion 662 extends from the rear of vehicle 600 into bed 604 about two-thirds of the distance to rear frame 634, as illustrated in FIG. 56. In one embodiment, recessed portion 662 is about 46 inches long, 33 inches wide, and 13 inches deep, although other suitable dimensions may be provided.

Bed 604 includes a plurality of apertures 658 for receiving corresponding couplers of accessories or other components. Apertures 658 are illustratively rectangular-shaped and are formed along the outer perimeter of panel 664. In one embodiment, apertures 658 are formed with a raised perimeter wall that is raised above the surface 660 of bed 604. As such, a bed liner or platform inserted into bed 604 fits around apertures 658 and lays flush with the raised aperture walls.

Figure 57:
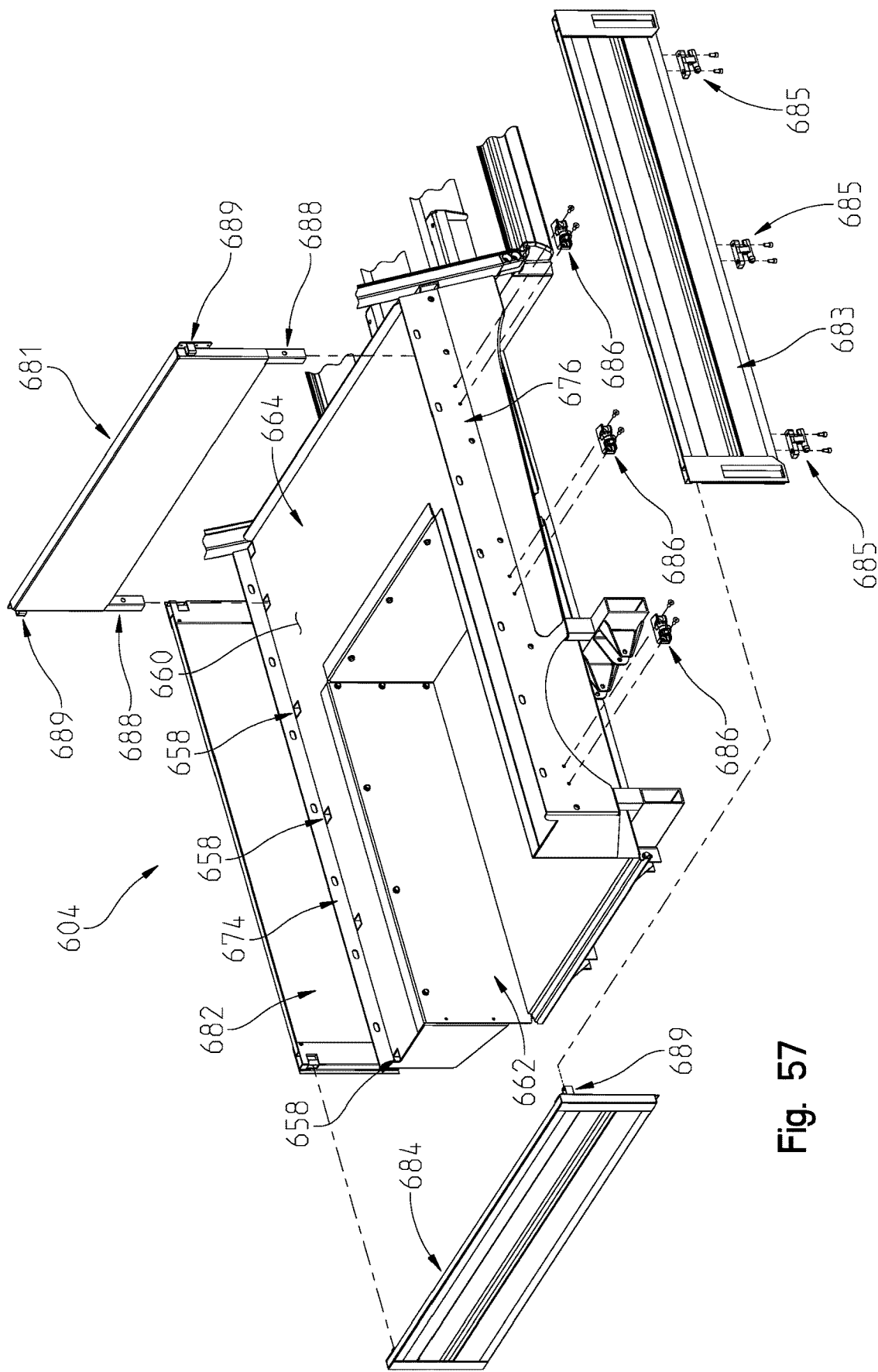
FIG. 57 is rear right perspective view of the bed of FIG. 56 further including side walls.

Referring to FIGS. 53, 54, and 57, bed 604 further includes a plurality of detachable side walls that are hingedly coupled along the outside perimeter of bed 604. Bed 604 illustratively includes a front side wall 681, a left side wall 682, a right side wall 683, and a rear side wall 684. Left and right side walls 682, 683 are coupled to respective vertical side panels 674, 676 via hinge portions 685, 686. Front and rear side walls 681, 683 are coupled to left and right side walls 682, 683 via couplers 689 and to apertures 658 via couplers 688. In the illustrated embodiment, couplers 688 lock in place when inserted into corresponding apertures 658 and include a release mechanism engageable by an operator to release the couplers 688 from apertures 658.

Figure 59:
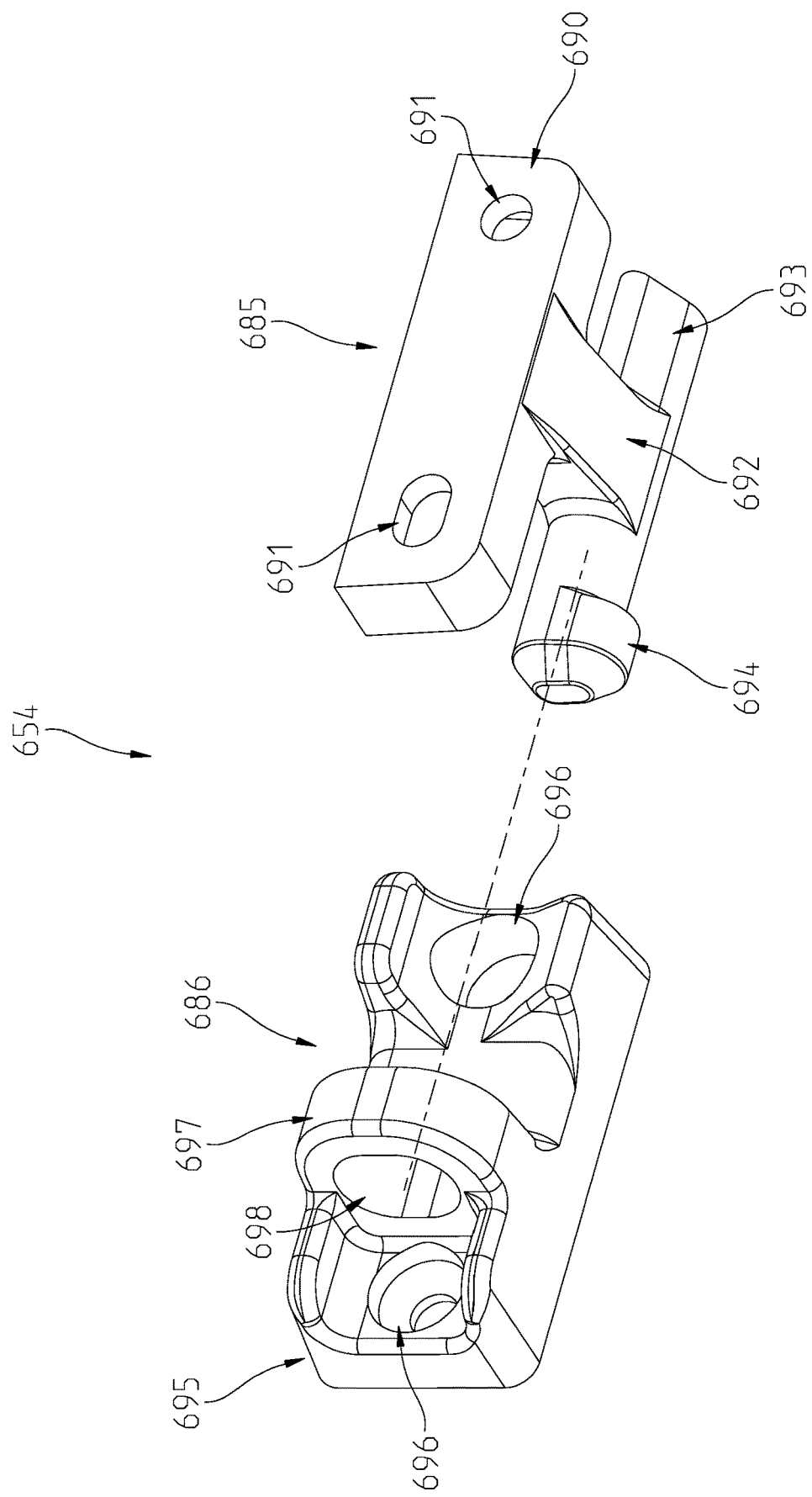
FIG. 59 is a bottom perspective view of the hinge of FIG. 58 disassembled.
Figure 60:
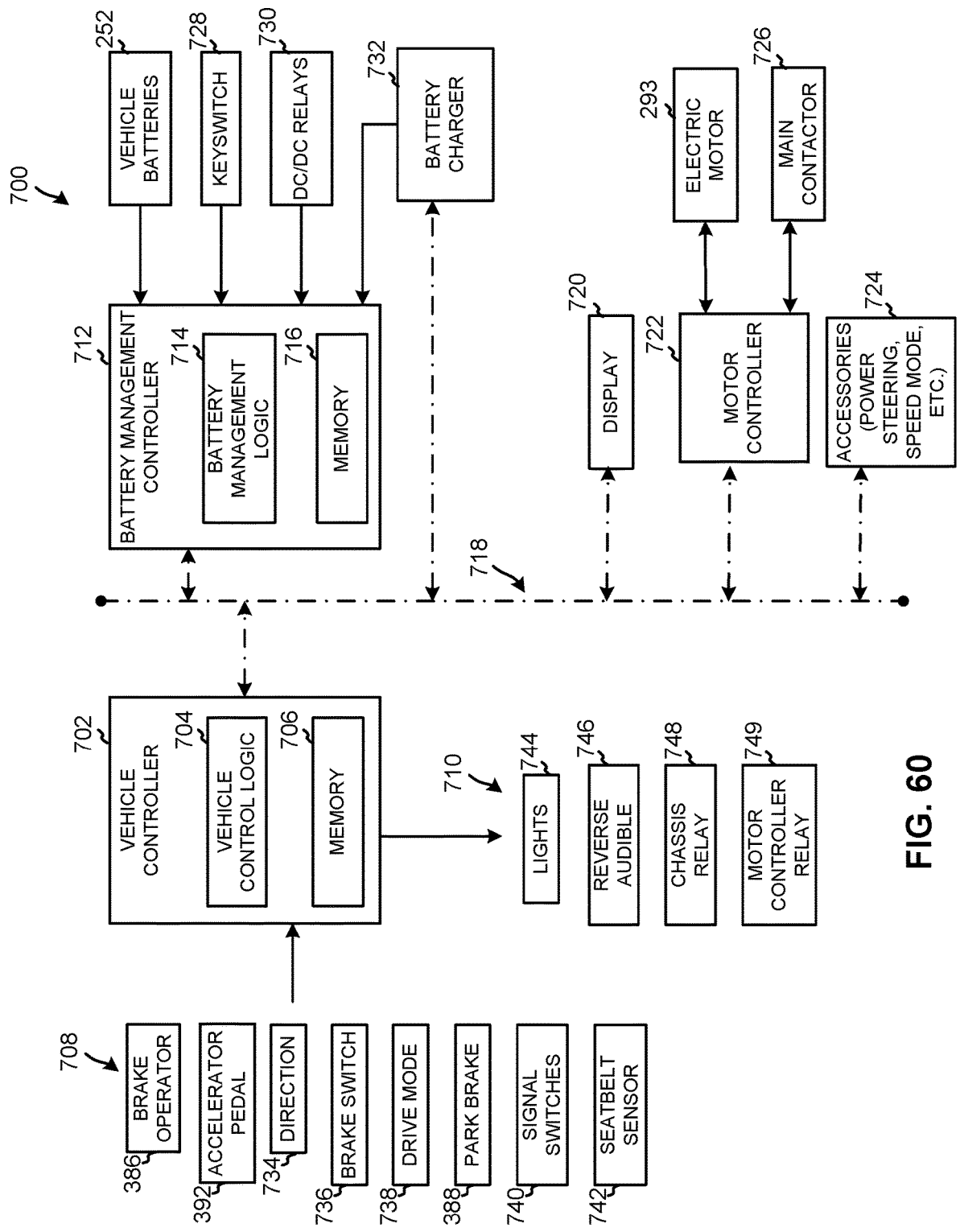
FIG. 60 is a representative view of an exemplary electrical system of the vehicle of FIG. 1 including a vehicle controller.

Referring to FIGS. 59 and 60, an exemplary hinge 654 of FIG. 57 is illustrated including a first hinge portion 685 and a second hinge portion 686. First hinge portion 685 is illustratively coupled to a bottom surface of side walls 682, 683 (FIG. 57), and second hinge portion 686 is illustratively coupled to side panels 674, 676 (FIG. 57). First hinge portion 685 includes a base portion 690 having apertures 691 for receiving fasteners 687. Base portion 690 is coupled to a stem portion 692 coupled to a male portion 693, and male portion 693 is spaced apart and substantially parallel to base portion 690. Male portion 693 includes an oblong shaped head 694. Second hinge portion 686 includes a base 695 having apertures 696 for receiving fasteners 699. A protrusion 697 extends from base 695 and forms an opening 698 having an oblong shape matching the shape of head 694.

Figure 58:
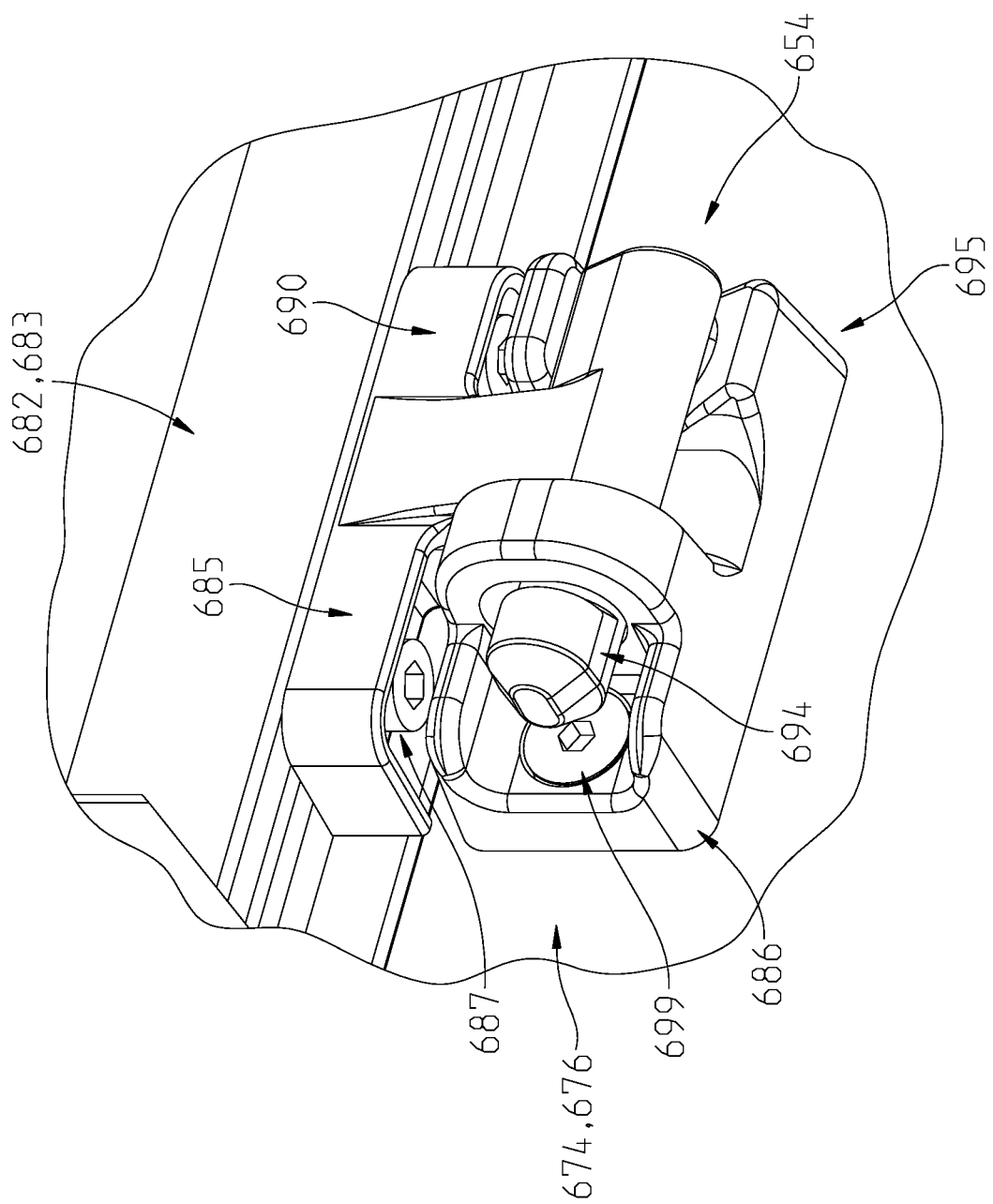
FIG. 58 is a bottom perspective view of an exemplary hinge for coupling a side wall of FIG. 57 to the bed of FIG. 57.

When first hinge portion 685 is in the first orientation relative to second hinge portion 686 illustrated in FIG. 58 (i.e., when side wall 682, 683 is folded up and perpendicular to panel 664 (FIG. 57) of bed 604), oblong head 694 locks first hinge portion 685 to second hinge portion 686 in the longitudinal direction due to the engagement of head 694 with protrusion 697. When first hinge portion 685 is rotated to the second orientation relative to second hinge portion 686 illustrated in FIG. 59 (i.e., when side wall 682, 683 is folded down and parallel to panel 664 (FIG. 57) of bed 604), oblong head 694 becomes aligned with oblong opening 698 allowing male portion 693 to be backed out of opening 698. Accordingly, side walls 682, 683 are removable from bed 604 when oriented approximately 180 degrees relative to panel 664 and are locked to bed 604 when orientated at angles other than 180 degrees (e.g., 90 degrees, 135 degrees, etc.). In one embodiment, opening 698 and male portion 693 are sized to allow decoupling of hinge portions 685, 686 when side walls 682, 683 are oriented a few degrees (e.g., one to five degrees) in either direction from 180 degrees.

While FIGS. 53-59 are described herein with respect to a vehicle 600 having a two-door middle portion 20A, a vehicle 600 having a four-door or six-door middle portion 20, 20B may also be provided.

FIGS. 60-81 relate to the electrical system and controls of an electric vehicle. Although FIGS. 60-81 are described herein with reference to electric vehicle 10 of FIG. 1, the systems and control schemes of FIGS. 60-81 may be incorporated in any electric vehicle, including vehicle 10A (FIG. 9), vehicle 10B (FIG. 11), and vehicle 600 (FIG. 53) described herein and other suitable vehicles.

Referring to FIG. 60, an exemplary control system 700 of vehicle 10 is illustrated. Control system 700 includes a vehicle controller 702, such as a vehicle control module (VCM), having vehicle control logic 704 that controls various subsystems and electrical components of vehicle 10. Controller 702 includes one or more processors that execute software and/or firmware code stored in an internal or external memory 706 of controller 702. The software/firmware code contains instructions that, when executed by the one or more processors of controller 702, causes controller 702 to perform the functions described herein. Controller 702 may alternatively include one or more application-specific integrated circuits (ASICs), field-programmable gate arrays (FPGAs), digital signal processors (DSPs), hardwired logic, or combinations thereof. Controller 702 may include one or more physical control modules. In one embodiment, control system 700 is a 48 volt system and includes a 12 volt auxiliary source for accessories, although other suitable systems may be provided.

Controller 702 receives a plurality of vehicle inputs 708 and controls a plurality of vehicle output devices 710. Position sensors of brake operator 386 and accelerator pedal 392 (FIG. 33) provide signals representing pedal position or demand to controller 702. A direction sensor 734 provides a signal to controller 702 indicative of a direction of movement of vehicle 10 and may include any suitable sensor (e.g., speed sensor, direction sensor on motor, etc.). A brake switch 736 provides a signal to controller 702 indicative of an operator depressing brake pedal 386, and controller 702 controls brake lights based on the brake switch signal. In one embodiment, controller 702 limits accelerating torque of motor 293 when switch 736 is closed to reduce the likelihood of damage to the powertrain when an operator simultaneously depresses both brake pedal 386 and accelerator pedal 392. In one embodiment, motor 293 is controlled to provide decelerating torque in response to brake switch 736 being closed, as described herein. A drive mode input 738 provides a signal based on selection by an operator via a user input device of a drive mode of vehicle 10, such as a forward high operating mode, a forward low operating mode, and a reverse operating mode, for example. In one embodiment, each of the drive modes are provided through control of electric motor 293, although transmission 295 (FIG. 20) may also be configured to provide different gear configurations for the different modes. In one embodiment, each drive mode has at least one corresponding pedal map stored in controller 702, as described herein with respect to FIG. 61. Park brake 388 includes a position sensor providing a signal to controller 702 indicative of whether the park or emergency brake 388 is engaged. Signal switches 740 provide signals indicative of user requests for left/right turn signals and hazard signals. A seat belt sensor 742, such as a Hall effect sensor, for example, provides a signal to controller 702 indicative of whether the operator's seat belt is engaged. In one embodiment, vehicle controller 702 limits an operation of vehicle 10 (e.g., limits maximum speed, maximum torque, etc.) when vehicle 10 is moving but the seat belt is disengaged.

Vehicle controller 702 controls outputs 710 including vehicle lights 744 (headlights, brake lights, hazard lights, signal lights, etc.), an audible alarm 746 for when vehicle 10 is moving in reverse, a chassis relay 748, and a motor controller relay 749. Chassis relay 748 provides power to various electrical systems of vehicle 10. Motor controller relay 749 is controlled by vehicle controller 702 to selectively enable logic power to motor controller 722, such as power for the control functions of motor controller 722.

A battery management controller (BMC) 712 including battery management logic 714 is in communication with vehicle controller 702 to manage the charging of batteries 252. BMC 712 includes one or more processors that execute software and/or firmware code stored in an internal or external memory 716 of BMC 712. The software/firmware code contains instructions that, when executed by the one or more processors of BMC 712, causes BMC 712 to perform the functions described herein. In one embodiment, BMC 712 is operative to selectively connect and disconnect a battery charger 732 (e.g., battery charger 422 of FIG. 36) from batteries 252 to control the charging of batteries 252. BMC 712 monitors the state of charge of batteries 252 and monitors and controls battery charger 732 based on the battery charge level and on vehicle information and commands from vehicle controller 702. In the illustrated embodiment, battery charger 732 is onboard vehicle 10 and is configured to plug into a wall outlet.

Memory 706, 716 is any suitable computer readable medium that is accessible by the processor(s) of respective controller 702, 712. Memory 706, 716 may be a single storage device or multiple storage devices, may be located internally or externally to respective controller 702, 712, and may include both volatile and non-volatile media. Exemplary memory 706, 716 includes random-access memory (RAM), read-only memory (ROM), electrically erasable programmable ROM (EEPROM), flash memory, CD-ROM, Digital Versatile Disk (DVD) or other optical disk storage, a magnetic storage device, or any other suitable medium which is configured to store data and which is accessible by respective controller 702, 712.

In one embodiment, BMC 712 is operative to detect faults of battery charger 732 via a blink code. In this embodiment, battery charger 732 displays status, faults, and warnings by outputting a blink pattern via a light emitting diode (LED), and BMC 712 reads the blink code and controls charger 732 based on the code. In another embodiment, battery charger 732 is in direct electrical communication with BMC 712 to provide status, faults, and warning information to BMC 712.

In the illustrated embodiment, vehicle controller 702 communicates with BMC 712, battery charger 732, display 720, motor controller 722, and accessories 724 over a controller area network (CAN) bus communication protocol 718. Accessories 724 include, for example, an electronic power steering module and a speed mode device. The speed mode device is operative to limit vehicle speed or motor speed to below a threshold speed based on a user input (e.g., key device having readable identification code, operator entered code, etc.). In one embodiment, an accelerometer is provided on CAN bus 718 for providing acceleration detection signals to controller 702. Vehicle controller 702 communicates torque commands to motor controller 722 over CAN bus 718 based on operator pedal demand and pedal maps stored in memory 706. In one embodiment, the torque commands include at least a desired motor torque, a motor speed limit, and a motor current limit. Vehicle controller 702 receives CAN messages from BMC 712 providing battery state of charge information including battery charge levels and battery range to empty calculations. BMC 712 may also provide status information to controller 702 for battery charger 732 and DC/DC relays 730. When battery charger 732 is plugged in, BMC 712 notifies controller 702 which then prevents vehicle acceleration regardless of acceleration demands by an operator via pedal 392. Motor controller 722 also provides information to vehicle controller 702 over CAN 718 including the motor speed, operating temperature of controller 722 and/or motor 293, power data, and other motor performance data.

When vehicle 10 is powered on, control system 700 is operative to enter a sleep mode when vehicle 10 sits for a threshold duration with no detection of operator inputs. An exemplary threshold duration of operator inactivity is five or ten minutes, although any suitable duration may be provided. Vehicle controller 702 monitors operator inactivity based on lack of operator inputs (pedals, mode selection, park brake, etc.) for the threshold duration. For example, an internal counter may be reset each time an operator input is detected, and when the counter expires control system 700 enters sleep mode. In the sleep mode, vehicle controller 702 sends commands to power off all electrical components of vehicle 10 except for BMC 712, which receives a control message from controller 702 to enter a low power state in sleep mode. The sleep mode thereby serves to extend battery life during periods of no operator use. In one embodiment, when battery charger 732 is plugged into an electrical outlet and the vehicle 10 sits with no operator inputs for the threshold duration, control system 700 enters sleep mode after expiration of the threshold duration only after batteries 252 have finished charging.

In one embodiment, when battery charger 732 is plugged into an electrical outlet and the vehicle is in the sleep mode, BMC 712 is programmed with predetermined scheduled intervals in memory 716 for periodically checking the state of charge of batteries 252. An exemplary interval is monthly, weekly, or another suitable interval. When the state of charge is detected as being below a low threshold during the periodic check, BMC 712 automatically wakes up (powers on) battery charger 732 during the sleep mode to do maintenance charging of batteries 252 to maintain batteries 252 at a desired charge state. In another embodiment, BMC 712 continually monitors the battery gauge during sleep mode and initializes the maintenance charging when a detected charge state is below a threshold charge state. In one embodiment, one or more loads are connected to the lower battery of batteries 252 and BMC 712 periodically switches on DC-DC converters during sleep mode to rebalance the charge state of lower batteries. Display 720 powers on during the maintenance charging to display an indication that batteries 252 are charging. In one embodiment, sleep mode serves to prolong battery storage time between uses and to protect batteries 252 from over-discharge, for example, thereby prolonging battery life.

In the illustrated embodiment, keyswitch 728 or another suitable operator input is actuated by an operator to turn control system 700 on and off and/or to exit the sleep mode and return to full power mode. In one embodiment, when vehicle 10 is plugged in to an electrical outlet, vehicle 10 automatically enters sleep mode when keyswitch 728 is turned off, but BMC 712 remains on to continue charging batteries 252 until batteries 252 are fully charged and then BMC 712 enters the low power mode. In the illustrated embodiment, keyswitch 728 is electrically routed to BMC 712, and BMC 712 routes a vehicle ON signal to vehicle controller 702 in response to keyswitch 728 being turned to an ON position. As such, when vehicle 10 is in the sleep mode, the ON/OFF signal from keyswitch 728 is detectable by BMC 712 which is operating in low power mode, and BMC 712 is operative to provide a control signal to controller 702 to wake up controller 702 from the sleep mode.

In one embodiment, BMC 712 is calibrated by a manufacturer or dealer based on the battery configuration of the vehicle. BMC 712 is operative to manage batteries 252 and charger 732 differently based on the types/number of batteries 252 installed on the vehicle. The calibration of BMC 712 species the size/number of batteries 252, impedance characteristics, temperature dependencies, and charging strategies. In another embodiment, BMC 712 is calibrated further based on the vehicle size and configuration (e.g., two-, four-, or six-passenger vehicle) such that BMC 712 manages batteries 252 differently based on the vehicle size. Exemplary vehicle size characteristics further include the vehicle weight, vehicle load, battery discharge rates, etc.

Motor controller 722 includes logic operative to control motor 293 based on torque commands provided by vehicle controller 702 over CAN bus 718. In one embodiment, motor controller 722 includes a 48 volt drive, although other suitable drives may be provided. In one embodiment, electric motor 293 is a 5 kilowatt motor. In another embodiment, motor 293 is a 6.5 kilowatt motor. Other suitable motors 293 may be provided. Motor controller 722 engages a main contactor 726 in response to commands from vehicle controller 702 to provide a high current connection to controller 702 for routing power to motor 293. In one embodiment, multiple motor controllers control multiple electric motors of the vehicle and receive torque commands from vehicle controller 702 over CAN bus 718.

In one embodiment, if the available battery power reduces to below a threshold, one or more electrically powered accessories are disabled by controller 702. For example, as the battery state of charge reduces to a first threshold, a first accessory is disabled, and as the battery state of charge reduces to a second threshold, a second accessory is disabled. Exemplary accessories that may disabled include an air conditioning system, heating system, or other suitable accessory systems of vehicle 10. In one embodiment, a maximum vehicle speed or motor speed is limited by controller 702 when the battery state of charge reduces to a low threshold.

Vehicle controller 702 of FIG. 60 executes a drive mode algorithm that receives as inputs the drive mode selection via input 738, a forward/reverse direction via input 734, and a pedal position from accelerator 392 and outputs a torque message to motor controller 722. In one embodiment, vehicle controller 702 further adjusts the drive mode based on the battery state of charge reported by BMC 712. In the illustrated embodiment, each drive mode is based on preconfigured pedal maps and torque rate limiter maps stored in memory 706. The pedal maps each correlate operator pedal demand from accelerator pedal 392 to a motor torque request. A pedal map may serve to limit motor acceleration or speed to preserve battery life, for example. In one embodiment, each drive mode includes a corresponding pedal map and torque rate limit map.

Figure 61:
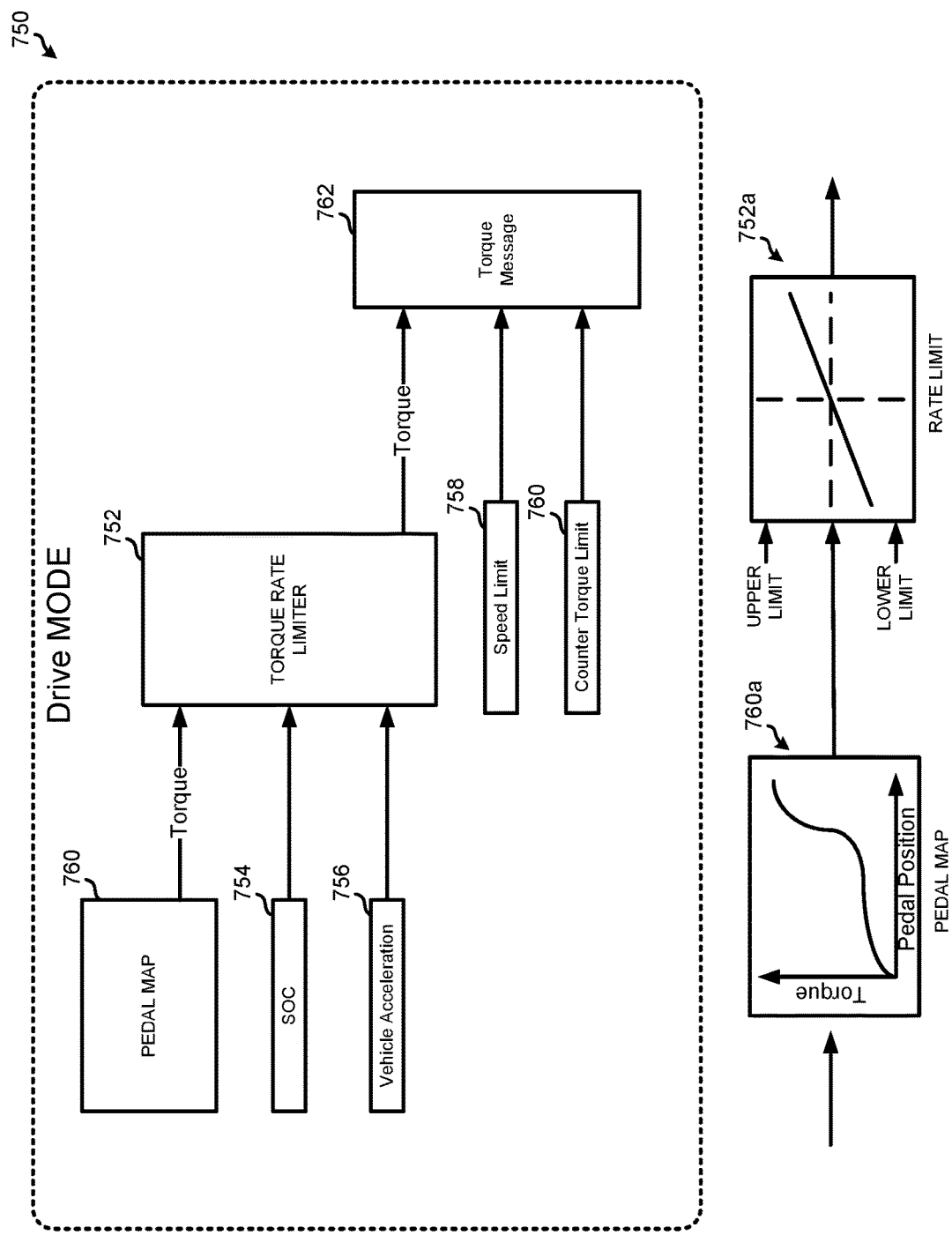
FIG. 61 is a representative view of an exemplary drive mode implementation by the vehicle controller of FIG. 60.

Referring to FIG. 61, a block diagram of an exemplary drive mode algorithm 750 is illustrated. Based on a drive mode selected via mode selection input 738 of FIG. 60, a corresponding pedal map 760 is selected that provides a torque demand based on the operator demand (e.g., position) of accelerator pedal 392. The torque demand from pedal map 760 as well as the battery state of charge 754 and vehicle acceleration 756 are provided as inputs to a torque rate limiter function 752, and the torque rate limiter function 752 limits the amount of torque provided to motor controller 722 (FIG. 60) based on the inputs. An exemplary linear torque rate limit map 752a of torque rate limiter 752 is illustrated that limits a torque demand determined from an exemplary pedal map 760a. Torque rate limit map 752a illustratively has an upper torque limit and a lower torque limit.

In one embodiment, the torque demand from torque rate limiter 752 is routed to motor controller 722 (FIG. 60) as torque request message 762. In another embodiment, torque message 762 is determined by vehicle controller 702 (FIG. 60) based on the torque demand from torque rate limiter 752 as well as a speed limit 758 and counter torque limit 760 identified in the selected drive mode. For example, low and high modes may each identify different maximum vehicle speeds. In the illustrated embodiment, torque message 762 is communicated to motor controller 722 over CAN bus 718 (FIG. 60).

Exemplary drive modes selectable via mode selector 738 includes a low mode, a high mode, an economy/max range mode, a golf mode, and a turf mode. Low mode is a speed-based mode that implements a maximum vehicle speed limit (e.g., 10 mph, etc.). High mode is a speed-based mode that implements a maximum vehicle speed limit that is higher than the low mode maximum speed (e.g., 35 mph, etc.). In one embodiment, the torque demand is in linear relationship with the pedal demand in the low and high modes, although non-linear torque curves may also be implemented.

The economy/max range mode is a speed and torque based mode. For example, upper limits are placed on the torque and vehicle speed to achieve a maximum or improved battery range. Limiting the motor torque serves to reduce the propulsion power to increase the battery range. Further, in one embodiment one or more electrically powered accessories, such as an air conditioning system, heating system, implements, or other suitable accessories are limited or disabled to further maintain low energy usage during operation. The pedal map includes a torque curve that limits the acceleration based on operator pedal demand. The golf mode is also a speed and torque based mode having a upper limits placed on torque and vehicle speed that are different than the economy mode. For example, the golf mode may have a maximum speed limit similar to the low mode but includes a pedal map that decreases the acceleration rate compared to the low mode. The turf mode comprises the golf mode plus additional operations such as one wheel drive and/or open differential mode to reduce the likelihood of damaging the grounds traversed by the vehicle.

Another exemplary drive mode is a limp home mode that reduces the maximum motor speed and vehicle speed regardless of operator demand for higher speeds. Limp home mode is implemented by controller 702 in response to detecting a vehicle fault or failure, such as a sensor failure or a detected parameter being outside of predetermined operating limits, or in response to a battery charge state dropping below a threshold level. In one embodiment, limp home mode has similar limits as the golf mode.

In some embodiments, the various drive modes are implemented while maintaining the feel of a traditional gas pedal system. In some embodiments, vehicle controller 702 limits performance only when required to maintain the drive mode limits, such as limiting the torque only when the torque limit specified by the drive mode is exceeded. In the illustrated embodiment, using vehicle controller 702 to dictate torque commands to motor controller 722 allows the torque requested to be modified further based on user input, vehicle data, pedal maps, and torque rate limiting maps.

In one embodiment, vehicle 10 is controlled via an autonomous control system. For additional disclosure on the autonomous controls and functionality of vehicle 10, see U.S. Patent Application No. 62/091,946, filed Dec. 15, 2014, entitled AUTONOMOUS READY VEHICLE, the entire disclosure of which is incorporated herein by reference. In one embodiment, vehicle 10 further includes a telematics system as described in U.S. patent application Ser. No. 14/190,369, filed Feb. 26, 2014, entitled RECREATIONAL VEHICLE INTERACTIVE TELEMETRY, MAPPING, AND TRIP PLANNING SYSTEM, and in PCT Application No. PCT/US2014/018638, filed Feb. 26, 2014, entitled RECREATIONAL VEHICLE INTERACTIVE TELEMETRY, MAPPING, AND TRIP PLANNING SYSTEM, the entire disclosures of which are incorporated herein by reference.

Figure 62:
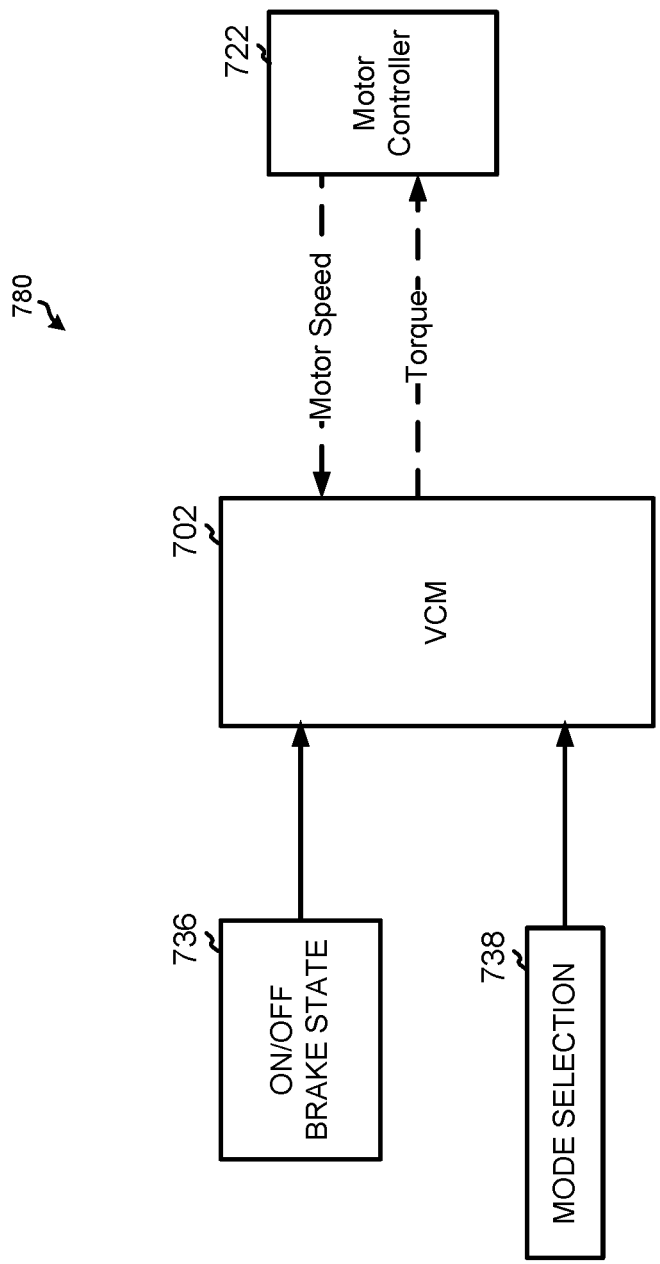
FIG. 62 is a representative view of an exemplary fixed regenerative braking system of the vehicle of FIG. 1.
Figure 68:
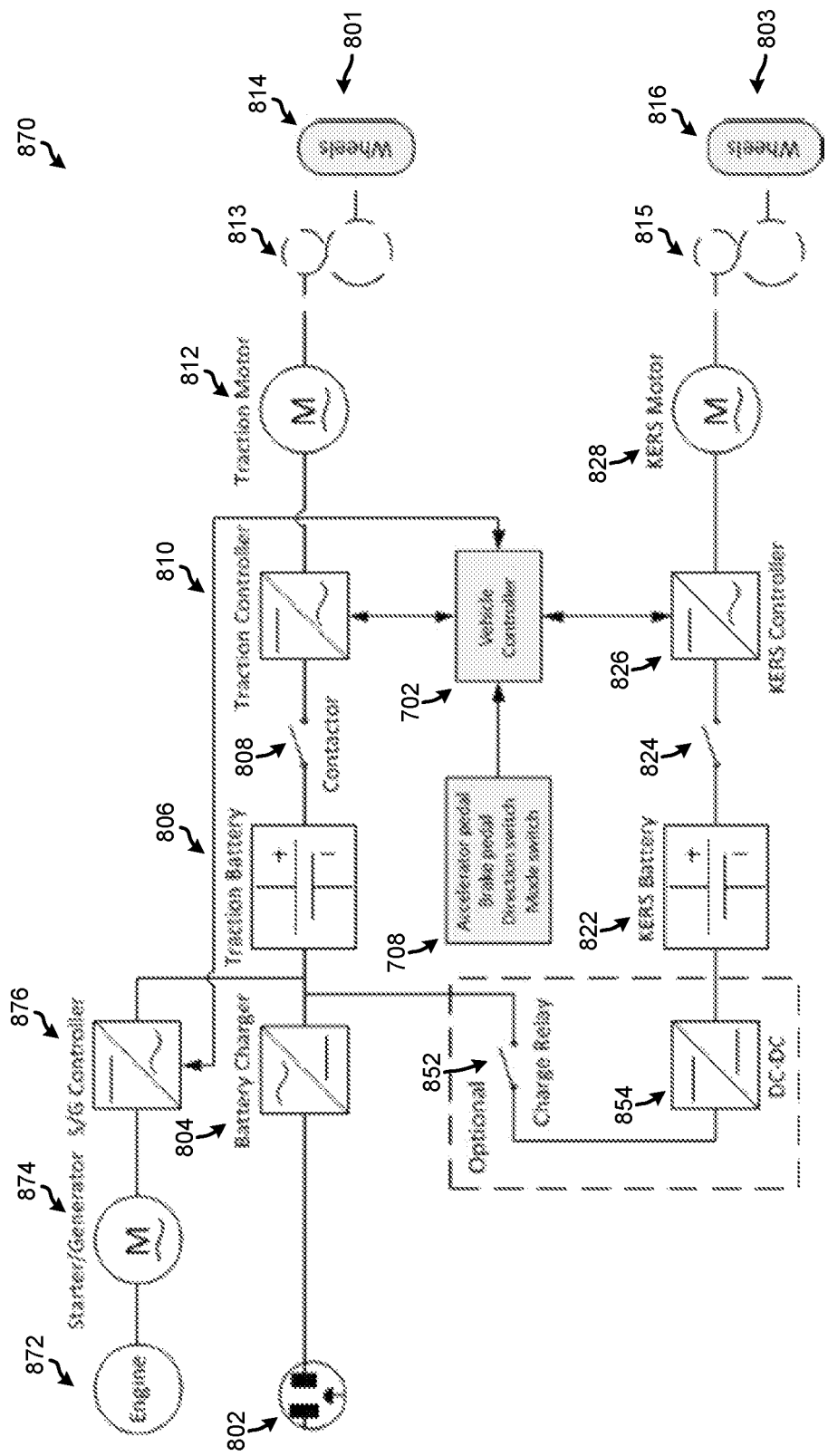
FIG. 68 is a representative view of the electric powertrain system architecture of FIG. 65 further including a range extender assembly.
Figure 69:
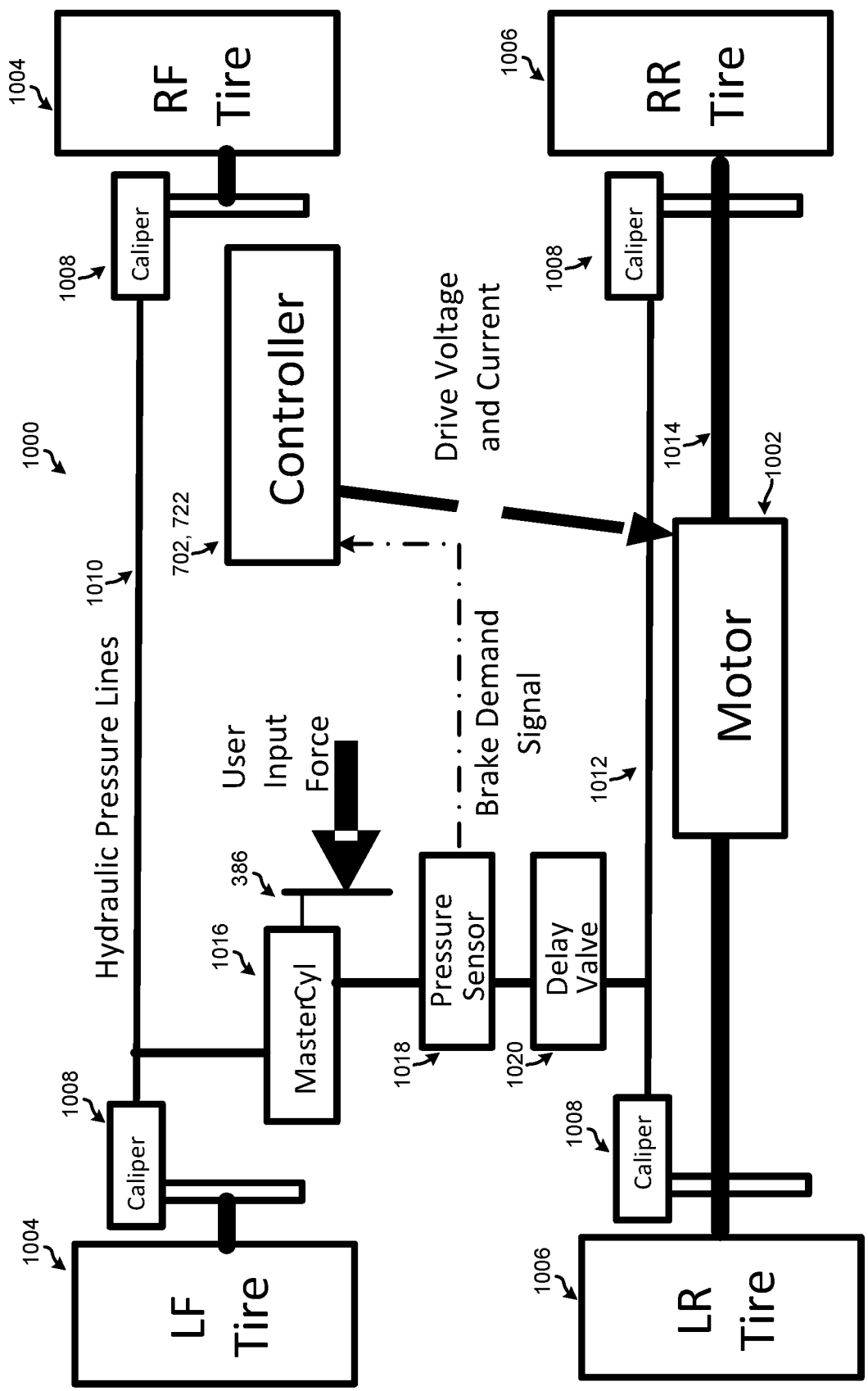
FIG. 69 is a representative view of an exemplary blended braking system of the vehicle of FIG. 1.
Figure 70:
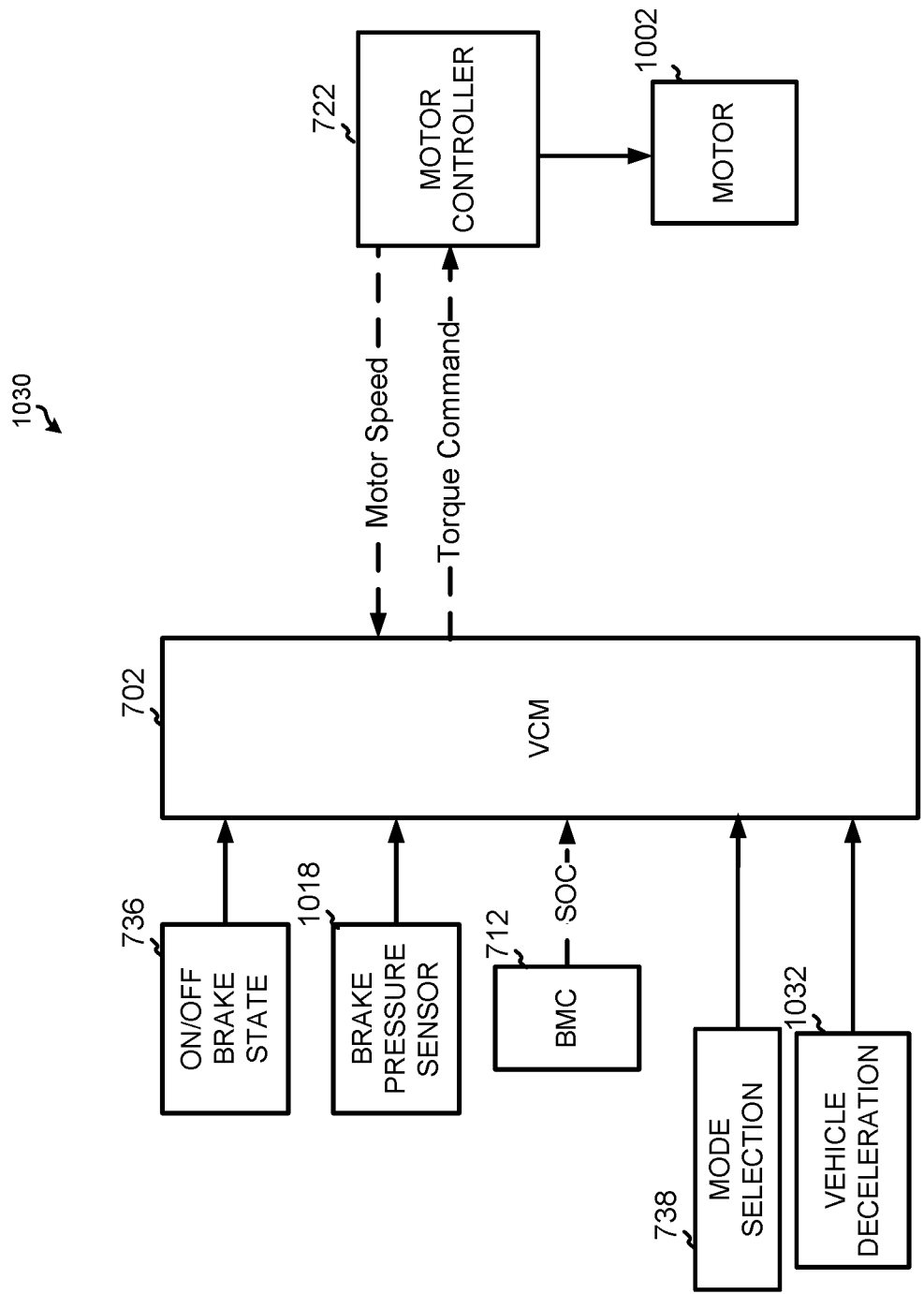
FIG. 70 is a representative view of another exemplary blended braking system of the vehicle of FIG. 1.
Figure 71:
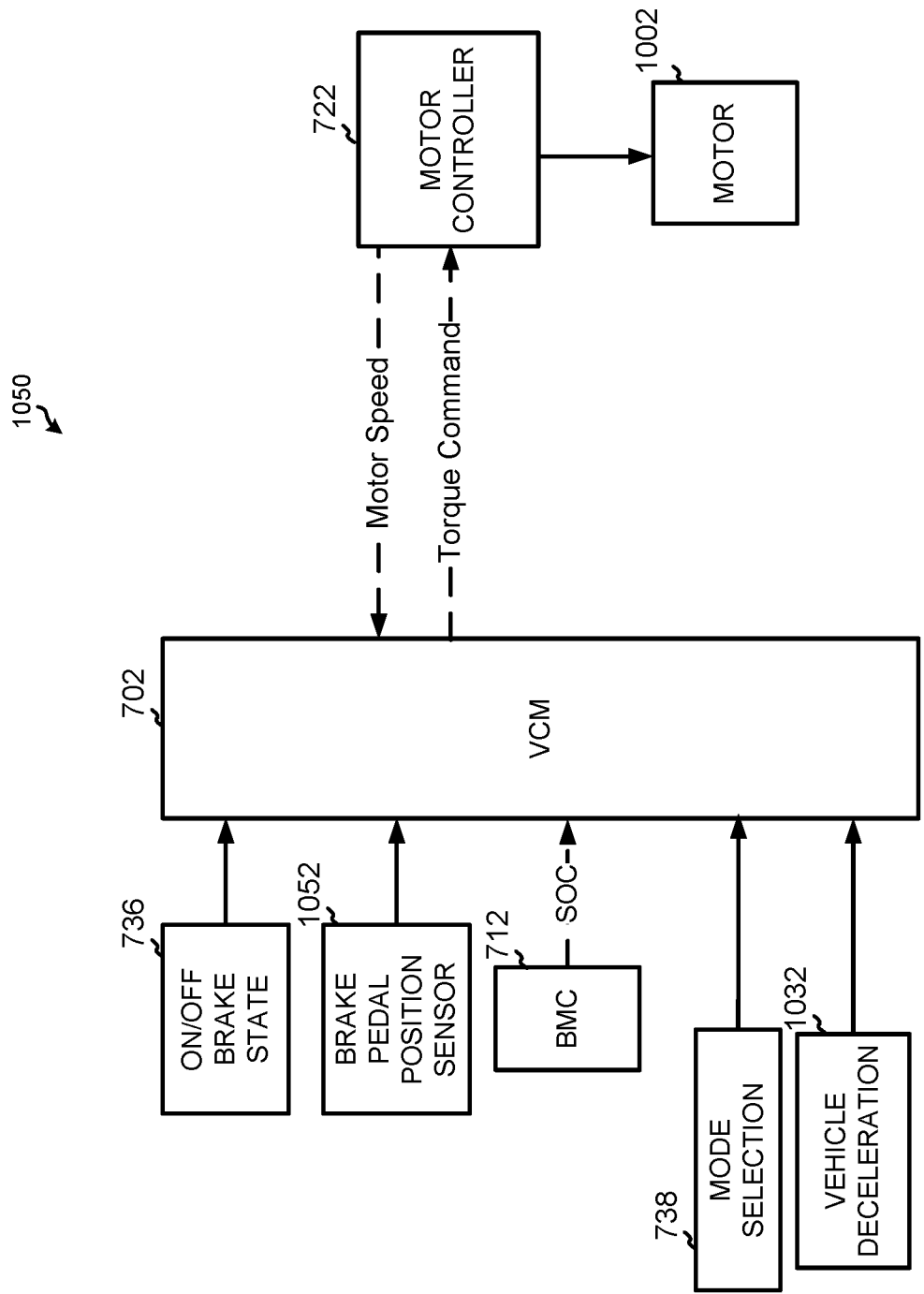
FIG. 71 is a representative view of yet another exemplary blended braking system of the vehicle of FIG. 1.

As illustrated in FIGS. 62-71 and described below, several exemplary braking systems may be implemented in vehicle 10. FIG. 62 illustrates an exemplary fixed regenerative braking system, FIGS. 63-68 illustrate exemplary kinetic energy recovery braking systems, and FIGS. 69-71 illustrate several exemplary blended braking systems that include both hydraulic and electric regenerative braking. A combination of the braking systems described in FIGS. 62-71 may be implemented in vehicle 10.

Referring initially to FIG. 62, a fixed regenerative braking system 780 of vehicle 10 is illustrated using a fixed amount of regenerative braking. Vehicle controller 702 receives as input the ON/OFF state of the vehicle brakes via brake switch 736 described herein. Vehicle controller 702 also receives the current motor speed from motor controller 722. When the brakes are in the ON state, a fixed amount of regenerative braking energy is applied to decelerate vehicle and supply energy to batteries 252 (FIG. 60). When the brakes are in the OFF state, the regenerative braking energy is removed. In one embodiment, vehicle controller 702 further adjusts electric motor braking based on the motor speed. In one embodiment, as the vehicle slows to a zero speed, the braking energy is ramped down to zero, e.g., in proportion to the vehicle or motor speed. In one embodiment, the fixed amount of regenerative braking is varied based on the drive mode selected with mode selection input 738. To control regenerative braking, vehicle controller 702 instructs motor controller 722 over CAN bus with an opposite direction torque command to generate the braking energy.

Figure 63:
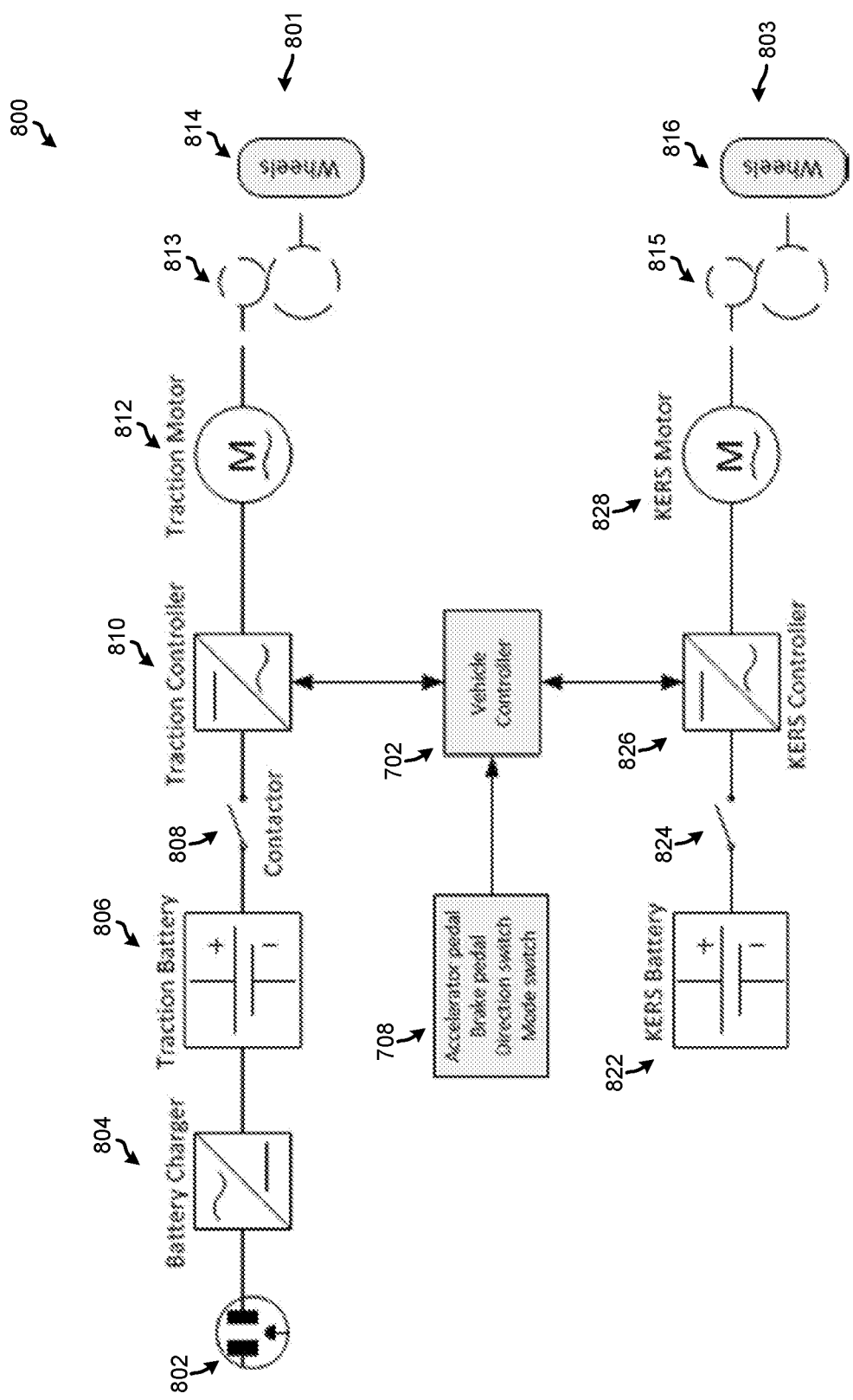
FIG. 63 is a representative view of an exemplary electric powertrain system architecture of the vehicle of FIG. 1 including a kinetic energy recovery braking system.

Referring to FIG. 63, an alternative electric powertrain system architecture 800 for vehicle 10 is illustrated that enables kinetic energy recovery during vehicle braking while reducing the likelihood of overcharging fully charged vehicle batteries 252. In the illustrated embodiment, the recovered energy is stored regardless of the state of charge of vehicle batteries 252. In particular, the recovered energy is selectively routed to a second energy storage component 822, illustratively a battery pack 822, based on current charge levels of batteries 252 and acceleration demands. In the illustrated embodiment, architecture 800 does not include a load dump device, such as a brake resistor, although a load dump device may be included in other embodiments.

In the illustrated embodiment, two separate electric powertrains 801, 803 are controlled by vehicle controller 702 and are provided with separate motors, controllers, and batteries in each powertrain 801, 803. A first electric powertrain 801 includes one or more vehicle batteries 806 (e.g., batteries 252 of FIG. 60) and a plug-in battery charger 804 (e.g., charger 732 of FIG. 60) and is responsible for the average power requirements to propel vehicle 10. In one embodiment, batteries 806 are conventional deep cycle batteries 806. A second electric powertrain 803 uses high power density energy storage via one or more batteries 822 and is responsible for kinetic energy recovery and acceleration. In the illustrative embodiment of FIG. 63, battery pack 822 does not incorporate a plug-in wall charger and is charged via kinetic energy only. First powertrain 801 is also referred to herein as a propulsion or traction powertrain 801. Second powertrain 803 is also referred to herein as a kinetic energy recovery system (KERS) powertrain 803.

First electric powertrain 801 includes at least one traction (propulsion) battery 806, a traction electronic controller 810, and one or more traction motors 812 coupled to at least one wheel 814 of vehicle 10. Battery charger 804, which is illustratively an onboard charger 804, is configured to couple to an electrical outlet 802 to charge traction battery 806. Similarly, second electric powertrain 803 includes at least one energy recovery battery 822, an energy recovery electronic controller 826, and one or more energy recovery motors 828 coupled to at least one wheel 816. Each wheel 814, 816 corresponds to a wheel 14, 16 (FIG. 1) of vehicle 10, for example. Wheels 814, 816 may be different wheels or the same wheels. In the illustrated embodiment of FIG. 63, traction motor 812 is coupled to a front axle of vehicle 10 via a transaxle 813, and energy recovery motor 828 is coupled to a rear axle of vehicle 10 via a transaxle 815, although traction motor 812 and energy recovery motor 828 alternatively may be coupled to the respective rear and front axles or to the same axle. In one embodiment, transaxles 813, 815 include speed reducing transmissions and may further include differential functionality.

In one embodiment, motors 812, 828 of FIG. 63 replace motor 293 of FIG. 60 and motor controllers 810, 826 replace motor controller 722 of FIG. 60. In this embodiment, motors 812, 828 and motor controllers 810, 826 have a combined power rating equal to that of the respective replaced motor 293 and controller 722. In one embodiment, BMC 712 of FIG. 60 is operative to manage the charging of batteries 806 and/or 822 based on controls from vehicle controller 702. In one embodiment, a vehicle with electric powertrain system architecture 800 does not have a mechanical (hydraulic) brake and relies exclusively on the KERS braking system of architecture 800 for normal braking and a conventional parking brake as a parking and emergency brake. Other vehicles further include a mechanical brake.

Vehicle controller 702 selectively closes contactors 808, 824 to power respective motor controllers 810, 826 to thereby enable motors 828. Vehicle controller 702 receives a plurality of inputs 708, including accelerator pedal demand, brake pedal demand, vehicle direction switch, drive mode switch, and other inputs 708 described herein with respect to FIG. 60. Vehicle controller 702 uses the information from inputs 708 to calculate a desired propulsion force (braking force if negative), which controller 702 then proportions to the two powertrains 801, 803 based on predetermined algorithms, as described herein with respect to FIG. 64.

In the illustrated embodiment, only traction battery pack 806 is ever fully charged, and kinetic energy recovery battery 822 is maintained at a partial state of charge so that it may accept braking energy at all times. An exemplary maximum charge limit for battery pack 822 is 70 percent fully charged, and an exemplary minimum charge limit for battery pack 822 is 30 percent, although other suitable charge ranges may be provided. For example, as the charge level of battery pack 822 increases and approaches the maximum charge level limit (e.g., 70 percent fully charged), vehicle controller 702 directs motor 828 to provide more accelerating torque to thereby reduce the state of charge of battery pack 822, and controller 702 may also simultaneously reduce the accelerating torque from traction motor 812. When battery pack 822 is at a lower charge level than desired, such as a charge level approaching the lower level limit (e.g., 30 percent fully charged), vehicle controller 702 commands less or stops accelerating torque from energy recovery motor 828 and commands more accelerating torque from traction motor 812 so that energy recovery motor 828 may provide charging energy for battery pack 822. In one embodiment, energy recovery battery 822 is a battery type that does not need to be fully charged to maintain battery life, such as NiMh, Li-ion, ultra-capacitor, flywheel, or certain lead-acid type batteries, for example.

In some vehicle batteries, power delivery capability diminishes as a battery discharges, and power acceptance is diminished at high state of charge. In one embodiment, because energy recovery battery 822 is separate from traction battery 806, energy recovery battery 822 may be kept in a state of partial charge that increases the likelihood of providing both suitable power delivery capability and suitable power acceptance capability.

Figure 64:
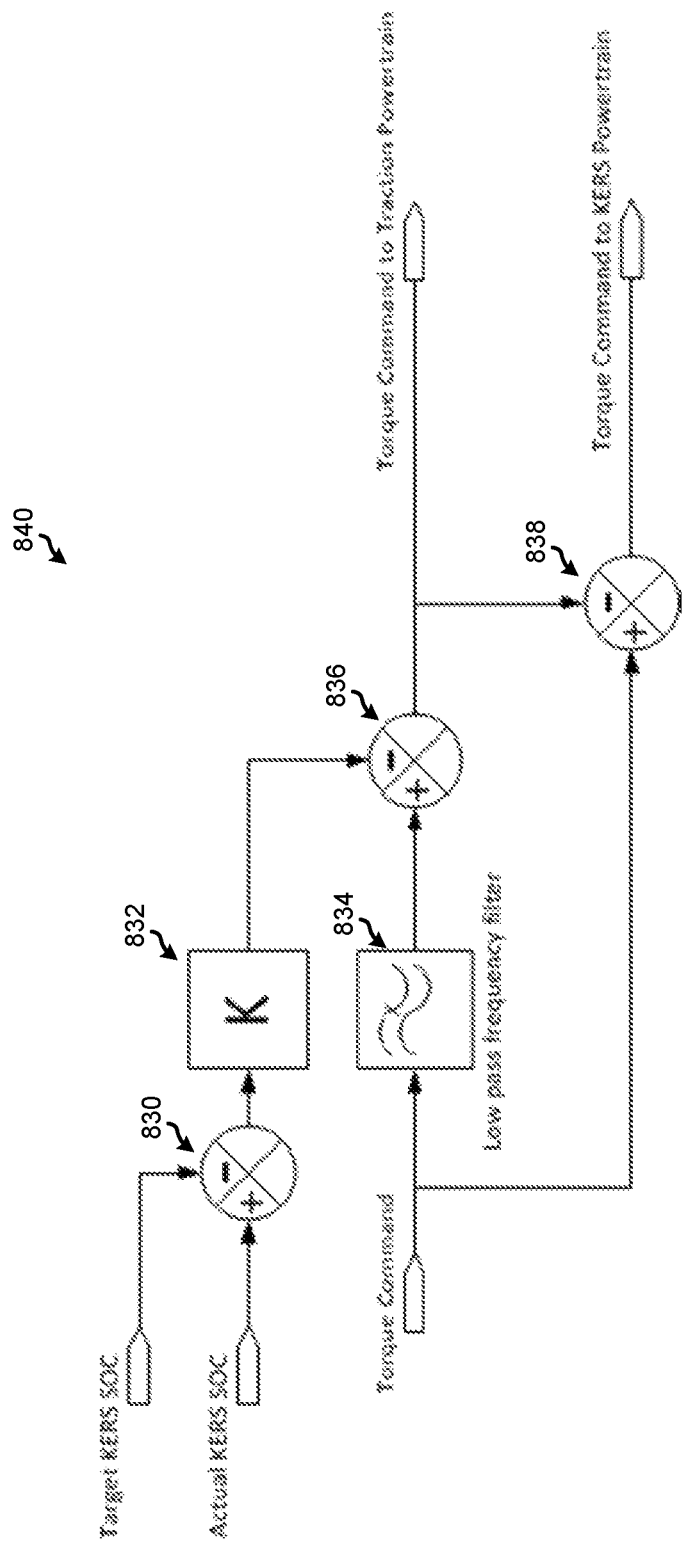
FIG. 64 is a representative view of an exemplary control scheme for the electric powertrain system architecture of FIG. 63.

Referring to FIG. 64, an exemplary control scheme 840 is illustrated for vehicle controller 702 proportioning the braking or propulsion force between powertrains 801, 803 of electric powertrain system architecture 800 of FIG. 63. Vehicle controller 702 calculates a torque command based on inputs 708 as described herein and passes the torque command through a low pass filter 834 that outputs the low frequency components of the torque command. Controller 702 determines at 830 a state of charge (SOC) correction factor or error signal that is the difference between the actual (current) state of charge of energy recovery battery 822 and the target state of charge of energy recovery battery 822. Block 832 scales the SOC error signal determined at 830 with a constant K whose dimensions are torque per unit of state of charge. In order to maintain energy recovery battery pack 822 at the appropriate partial charge level, the scaled SOC error signal is applied to the torque command at 836. In particular, block 836 subtracts the SOC error signal from the low frequency components of the torque command and outputs the traction powertrain torque command. Block 838 subtracts the traction powertrain torque command from the input torque command. The output of block 838 is the torque command sent to the KERS powertrain and contains the high-frequency components of the torque command, with an offset proportional to the SOC error signal.

Accordingly, for negative values of the SOC correction factor (actual charge level is less than target), more accelerating torque is biased towards traction motor 812. For positive values of the correction factor (actual charge level is greater than target), more accelerating torque is biased towards energy recovery motor 828. As such, controller 702 determines at 836, 838 the appropriate apportionment of torque commands to traction motor 812 and to energy recovery motor 828 and delivers the respective torque commands to controllers 810, 826. In one embodiment, BMC 712 of FIG. 60 provides the actual state of charge of battery 822 to vehicle controller 702.

In one embodiment, electric powertrain system architecture 800 of FIG. 63 allows traction battery pack 806 and charger 804 to each have a reduced size and cost for a given range and drive cycle requirement compared to a traction battery pack and charger in a system without energy recovery powertrain 803. In one embodiment, the traction battery pack 806 of electric powertrain system architecture 800 is discharged slowly and gently, thereby increasing the battery life. In one embodiment, electric powertrain system architecture 800 provides a long battery range due to recovered kinetic energy. In one embodiment, electric powertrain system architecture 800 provides improved acceleration due to reduced vehicle weight with a smaller size traction battery pack 806. Further, with energy recovery motor 828 peak torque being sized for the required braking torque, the same torque level is available for acceleration. In some embodiments, electric powertrain system architecture 800 improves performance of range-extended systems (see FIG. 68) as the traction powertrain 801 receives slowly varying torque commands, thereby allowing the output of the range extender to efficiently follow the power demand. In some embodiments, electric powertrain system architecture 800 provides improved vehicle control when implemented in a motor per axle or motor per wheel fashion. For example, when energy recovery motor 828 is coupled to a front axle, braking torque is biased to the front.

Figure 65:
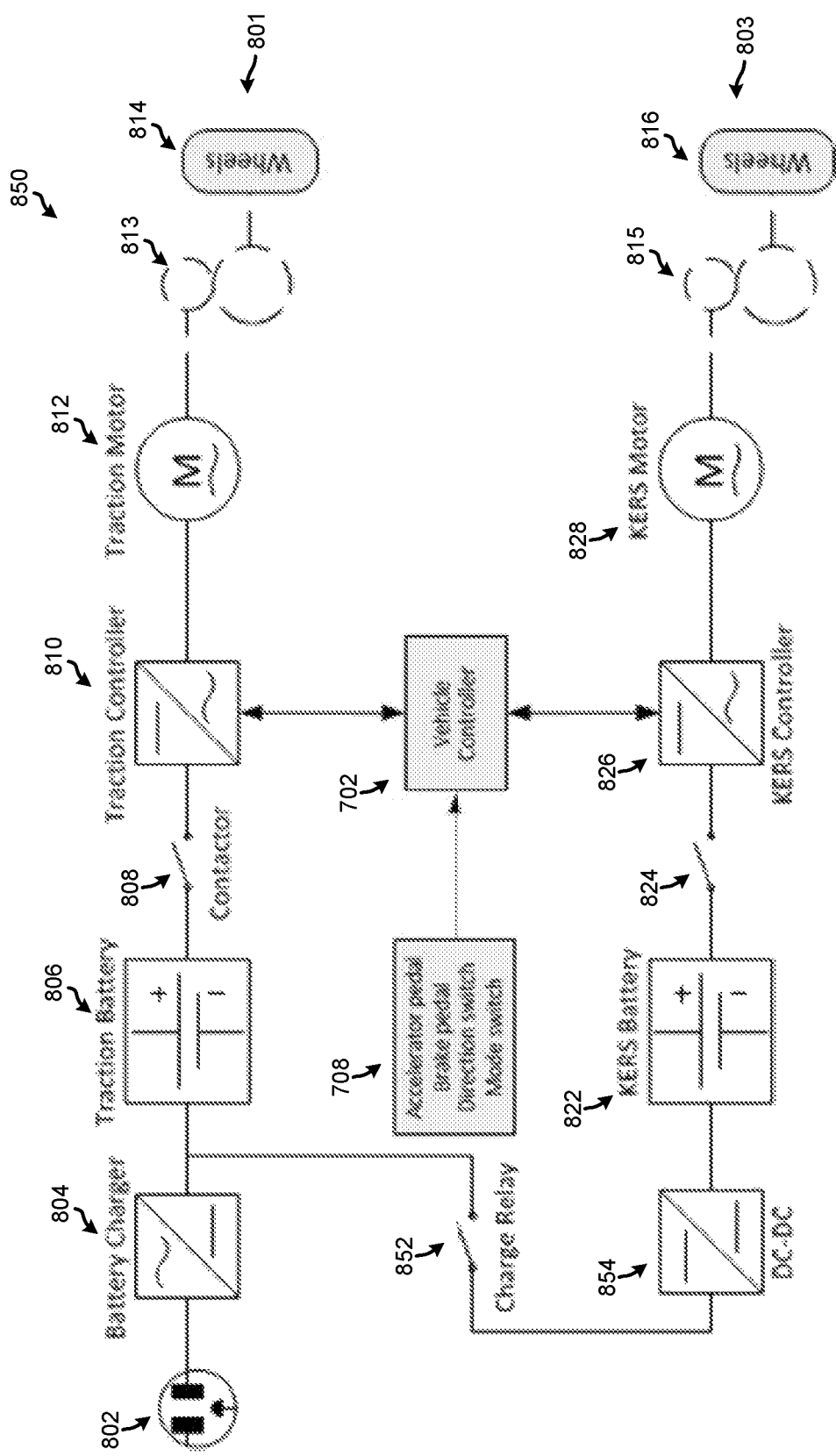
FIG. 65 is a representative view of the electric powertrain system architecture of FIG. 63 further including a DC-DC converter.

Referring to FIG. 65, an alternative electric powertrain system architecture 850 is illustrated including a DC-DC converter 854 coupled to battery charger 804 via a charge relay 852 electrically controlled by vehicle controller 702. Controller 702 closes charge relay 852 during charging of battery 806 to divert at least a portion of the charging power to energy recovery battery pack 822. Charge relay 852 is opened to discontinue charging of battery pack 822 when battery pack 822 reaches the partial charge level threshold.

Figure 66:
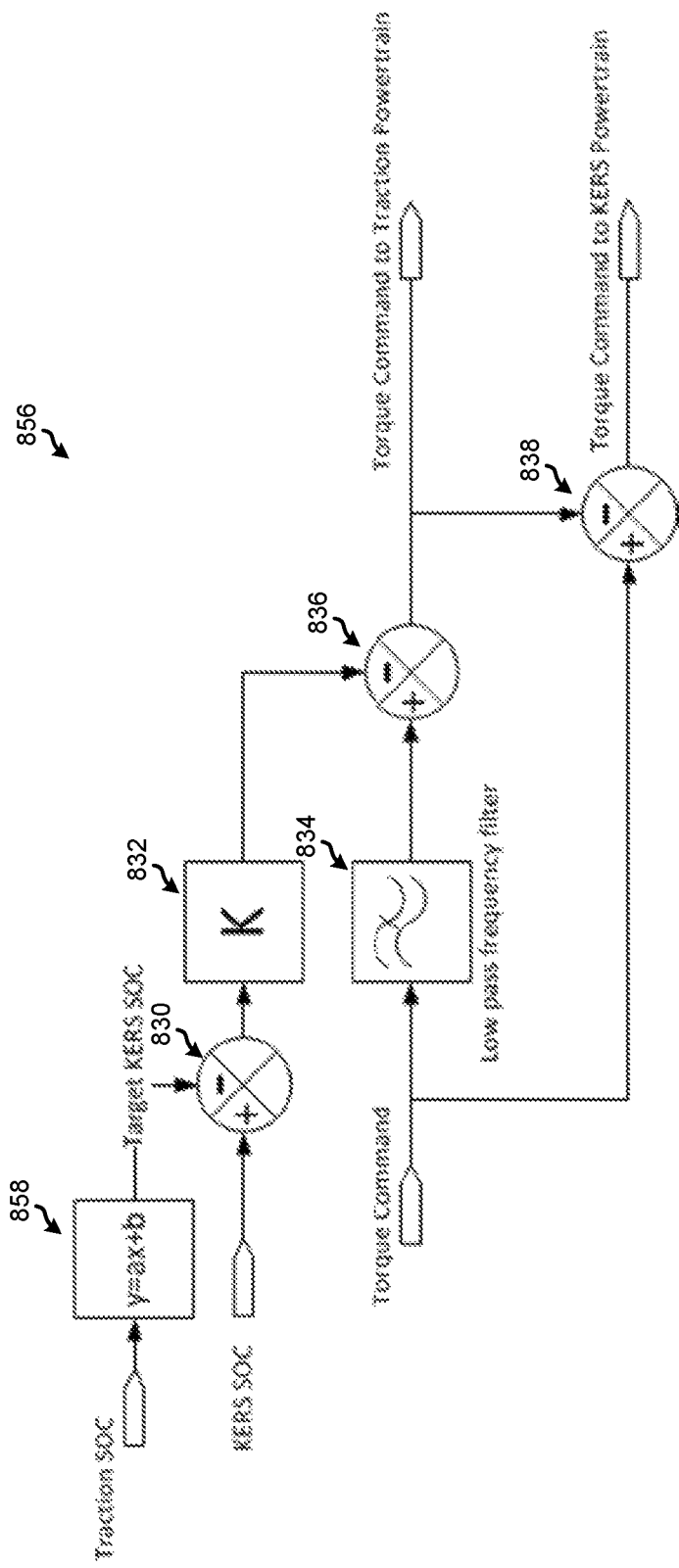
FIG. 66 is a representative view of another exemplary control scheme for the electric powertrain system architecture of FIG. 63.

Referring to FIG. 66, an alternative control scheme 856 is illustrated that calculates the target state of charge of energy recovery battery 822 based on the state of charge of traction battery 806 (FIG. 63). In particular, at block 858 vehicle controller 702 determines the target state of charge of energy recovery battery 822 using the linear equation (1):

$$y = ax + b \tag{1}$$

wherein y is the target state of charge of energy recovery battery 822, x is the current state of charge of traction battery 806, and slope a and intercept b are selected based on the target charge level range of energy recovery battery 822. An exemplary target charge level range of battery 822 is 30 percent to 70 percent fully charged. In this example, a and b are selected such that energy recovery battery 822 is 70 percent fully charged when traction battery 806 is at 100 percent state of charge and energy recovery battery 822 is 30 percent fully charged when traction battery 806 is at zero percent state of charge. As with the control scheme 840 of FIG. 64, controller 702 determines a SOC error signal at block 830, scales the error signal at block 832, and determines the appropriate apportionment of torque commands to traction motor 812 and energy recovery motor 828 at blocks 836, 838. In one embodiment, the torque command to energy recovery motor 828 is a small fraction of the torque command to traction motor 812.

FIG. 67 illustrates an alternative first configuration 860 and an alternative second configuration 862 for incorporating energy recovery motor 828 into the powertrain of vehicle 10. In first configuration 860, traction motor 812 and energy recovery motor 828 are coupled to a common vehicle axle 866 and share a common motor housing 864. In second configuration 862, traction motor 812 is coupled to one end of a transmission input shaft of a transaxle 868 and energy recovery motor 828 is coupled to the other end of the transmission input shaft. In one embodiment, vehicle 10 includes multiple energy recovery motors 828 and corresponding motor controllers 826. For example, one energy recovery motor 828 may be provided for each front wheel or for each rear wheel, and one or more traction motors 812 drive the other of the front and rear wheels. In another embodiment, vehicle 10 includes one energy recovery motor 828 per wheel.

FIG. 68 illustrates another electric powertrain system architecture 870 including an engine generator assembly having a combustion engine 872 driving a generator motor 874. Generator motor 874 produces electrical energy for charging traction battery 806 and/or energy recovery battery 822. Generator motor 874 also illustratively serves as a starter motor for engine 872. A starter/generator electronic controller 876 includes logic for controlling motor 874 and engine 872 and receives start/stop commands from vehicle controller 702 for activating the generator assembly when traction battery 806 and/or energy recovery battery 822 require additional charging energy. Electric powertrain system architecture 870 further illustratively includes optional DC-DC converter 854 coupled to battery charger 804 via charge relay 852 electrically controlled by vehicle controller 702.

In some embodiments, vehicle 10 includes a blended braking system comprising both a hydraulic braking system and an electric regenerative braking system, as described herein with respect to FIGS. 69-71. Referring initially to FIG. 69, a first blended braking system 1000 is illustrated. The hydraulic braking system of blended braking system 1000 is configured to provide low braking power at relatively low brake input pressure or deceleration demand, and the electric regenerative braking is configured to use hydraulic brake pressure as input to produce a brake torque output. At low brake demand, a larger amount of regenerative braking is supplied. As the brake demand increases, the proportion of hydraulic braking is increased and regenerative braking decreased.

For illustrative purposes, controllers 702, 722 are illustrated as single block in FIG. 69. Motor controller 722 provides drive voltage and current to an electric motor 1002 based on torque requests from vehicle controller 702. Motor 1002 may include motor 293 of FIG. 60 or a different motor and is illustratively coupled to rear axle 1014 to drive rear wheels 1006, although motor 1002 may alternatively be coupled to front axles to drive front wheels 1004. The hydraulic braking system illustratively includes disk brakes and calipers 1008 controlled by brake pedal 386 via hydraulic lines 1010, 1012 coupled to a master cylinder 1016. A brake pressure sensor 1018 is coupled to master cylinder 1016 and/or brake pedal 386 to detect the brake input pressure applied by the operator and to provide a brake demand signal representative of the brake input pressure to vehicle controller 702 (or to motor controller 722). Motor controller 722 and/or vehicle controller 702 interprets the brake demand signal and controls the regenerative braking torque provided by motor 1002 based on an brake pedal input/regen output curve stored in memory. The input/output curve may be non-linear or linear.

For example, when brake pedal 386 is depressed by a small amount resulting in small brake demand, the regenerative braking system provides a larger portion of the total blended braking torque compared to when the brake demand is large. As the brake demand increases, the hydraulic braking is proportionally increased while the regenerative braking is decreased. In one embodiment, the hydraulic braking system is not activated to provide braking torque until the brake demand exceeds a threshold demand. In the illustrated embodiment, the brake torque applied by the hydraulic braking system to the axle powered by motor 1002, illustratively rear axle 1014, is reduced at low brake demand using a hydraulic delay valve 1020. In another example, the hydraulic braking system is configured to apply hydraulic braking pressure after the threshold brake demand is reached, i.e., after the pedal 386 moves a threshold distance or the input brake pressure exceeds a pressure threshold. In one embodiment, blended braking system 1000 is tuned to ramp up the hydraulic brake torque at brake demands slightly lower than the input required to pass brake certification and achieve an emergency stop. In some embodiments, blended braking system 1000 allows for large energy recovery during normal braking events, while providing emergency braking capability in the event of an electronic failure.

Figure 72:
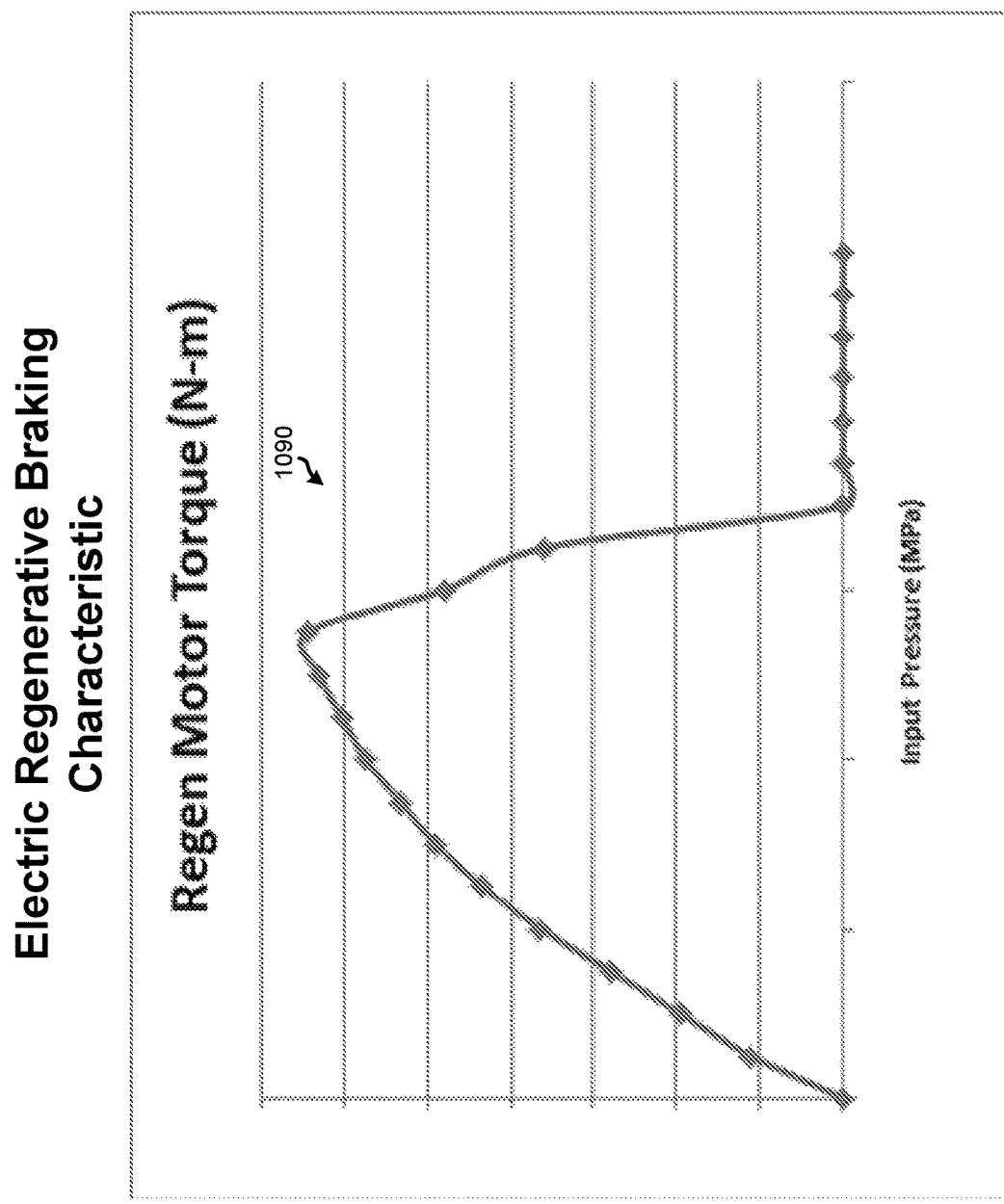
FIG. 72 is a graph illustrating an exemplary regenerative braking motor torque curve over a brake demand range provided by the blended braking system of FIG. 69.

FIG. 72 is a graph illustrating exemplary regenerative braking motor torque 1090 provided by blended braking system 1000 of FIG. 69 (or by systems 1030, 1050 of FIGS. 70 and 71). The brake input pressure applied by the operator on the x-axis, and the regenerative motor torque 1090 is on the y-axis. The regenerative motor torque 1090 increases initially over the low brake demand range before decreasing rapidly at higher brake demand. In the illustrated embodiment, the regenerative motor torque 1090 reaches a maximum level at about 50 percent brake demand and decreases to zero at about 65 to 75 percent brake demand.

Figure 73:
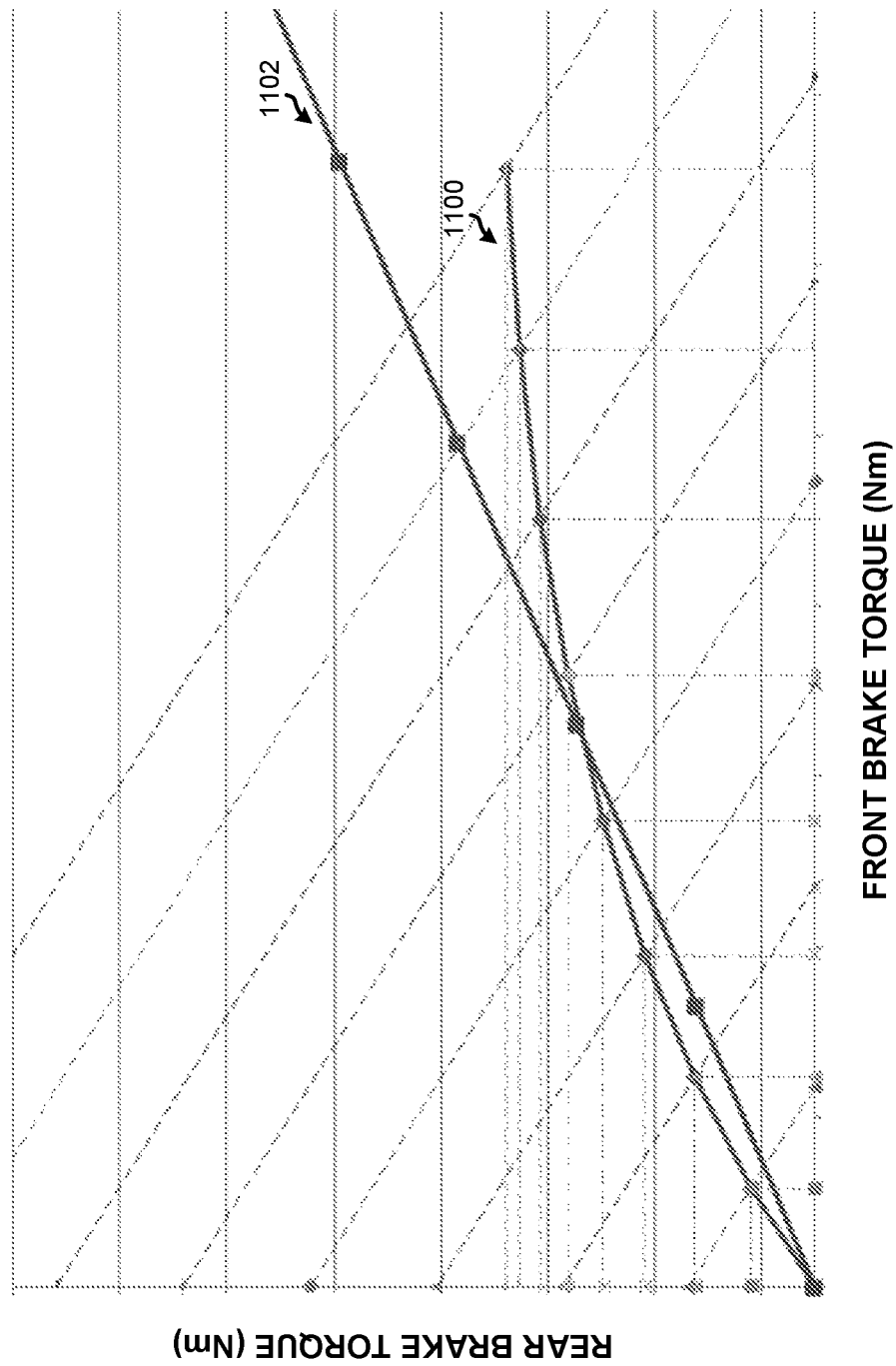
FIG. 73 is a graph illustrating a conventional front and rear braking torque distribution of a vehicle according to an exemplary embodiment.
Figure 74:
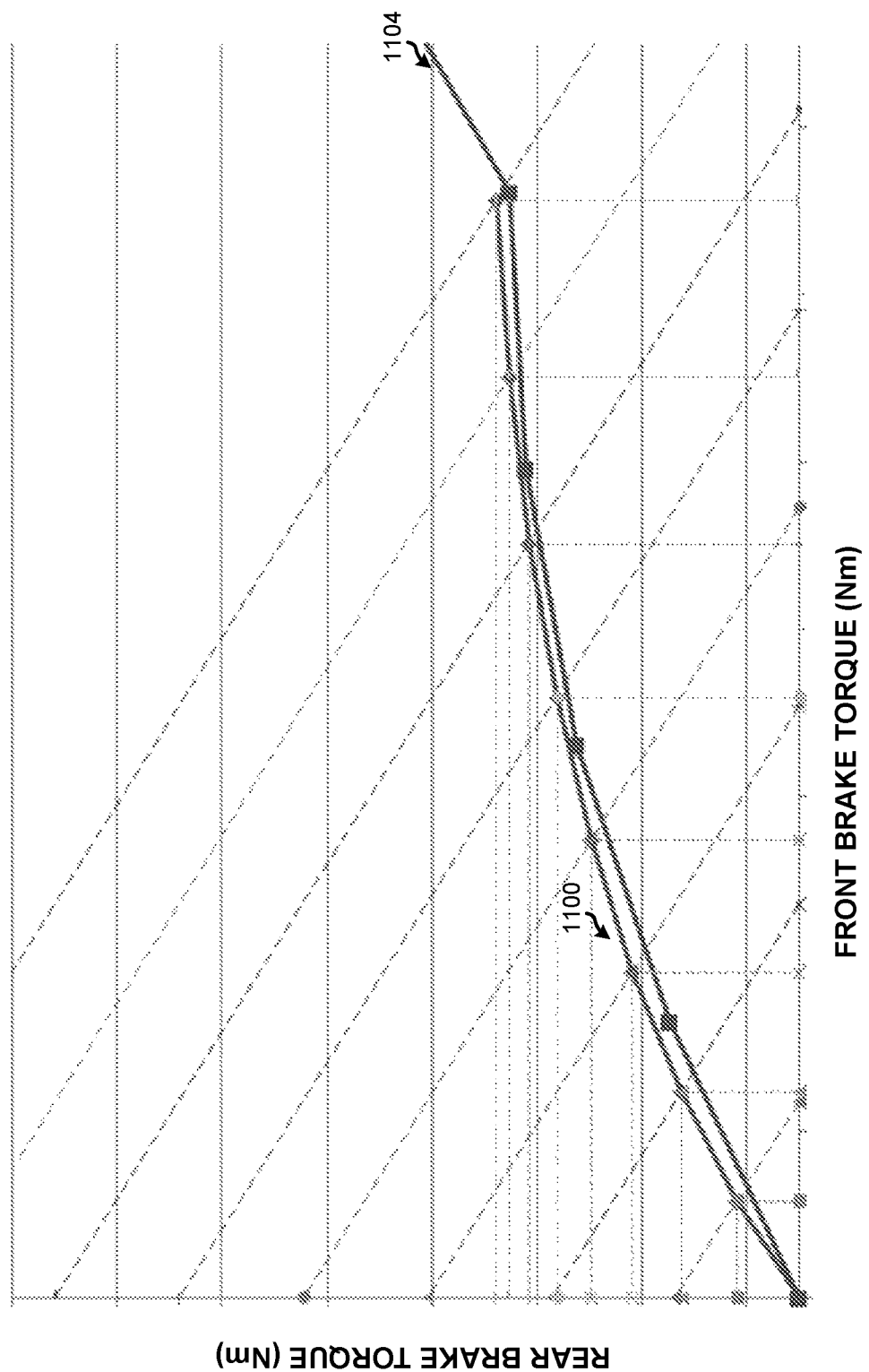
FIG. 74 is a graph illustrating a front and rear braking torque distribution when using a blended braking system according to an exemplary embodiment.

FIG. 73 illustrates an exemplary ideal braking torque curve 1100 showing rear brake torque (y-axis) and front brake torque (x-axis). Other ideal braking torque curves may be provided depending on vehicle configuration. An exemplary braking torque curve 1102 for a conventional mechanical braking system is illustratively linear. FIG. 74 illustrates an exemplary braking torque curve 1104 provided by blended braking system 1000 of FIG. 69. As illustrated, blended braking system 1000 of FIG. 69 provides a front and rear braking torque distribution with curve 1104 that more closely follows ideal braking torque curve 1100 to increase the likelihood of maximum deceleration capability as limited by tire friction.

Figure 75:
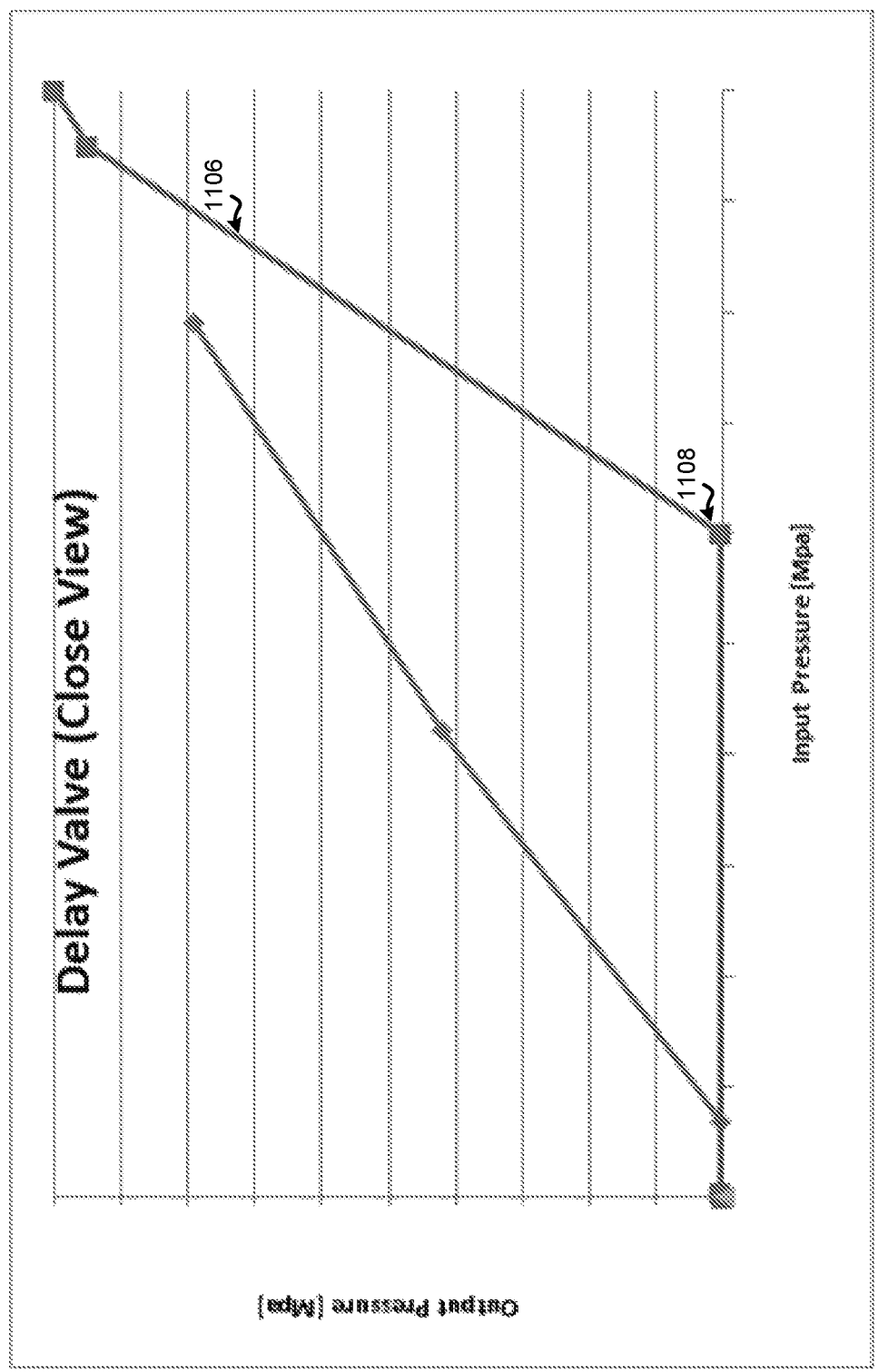
FIG. 75 is a graph illustrating an input/output characteristic of a delay valve of the blended braking system of FIG. 69 according to an exemplary embodiment.
Figure 76:
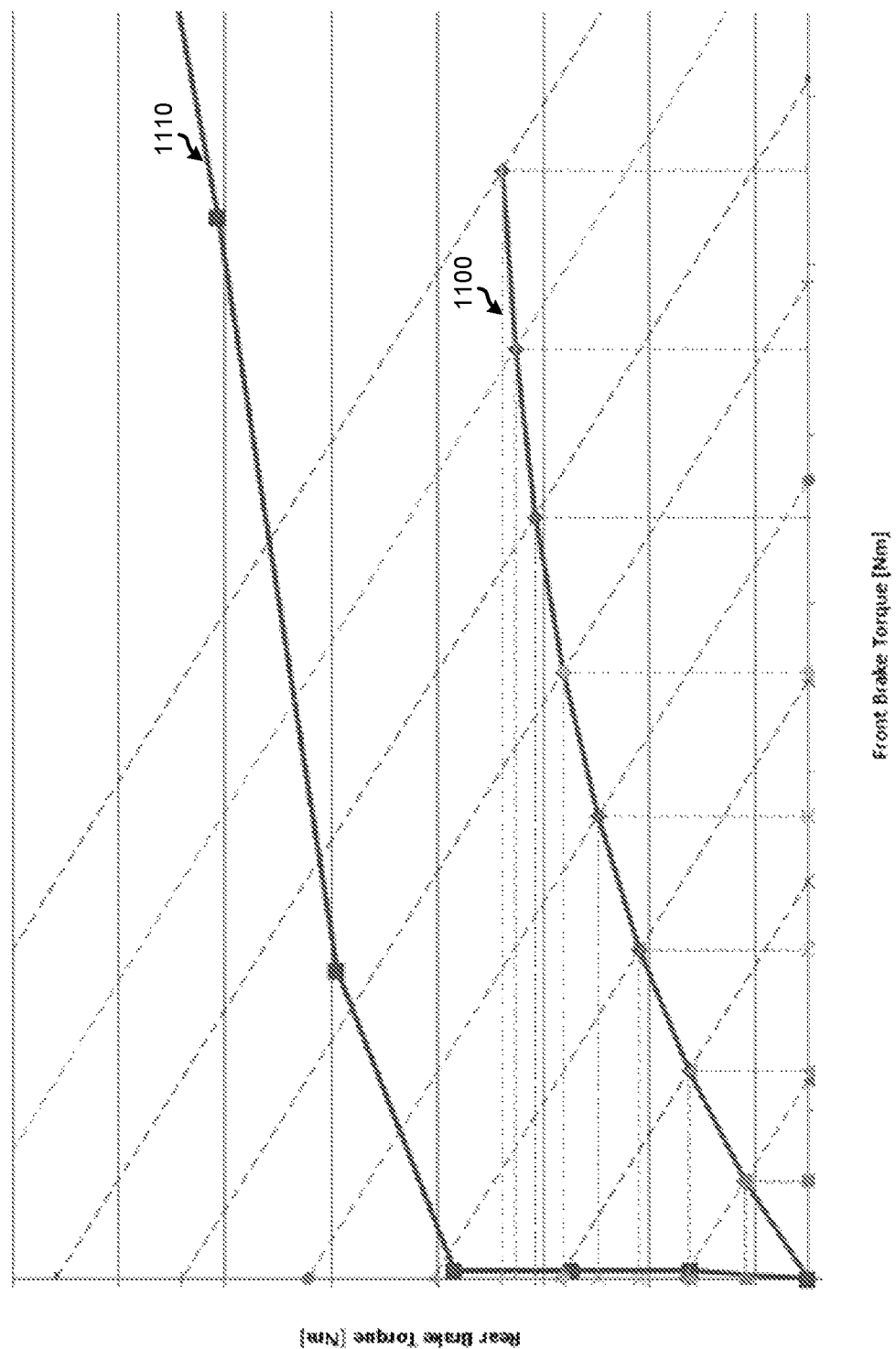
FIG. 76 is a graph illustrating delayed front braking torque when using a blended braking system according to an exemplary embodiment.
Figure 77:
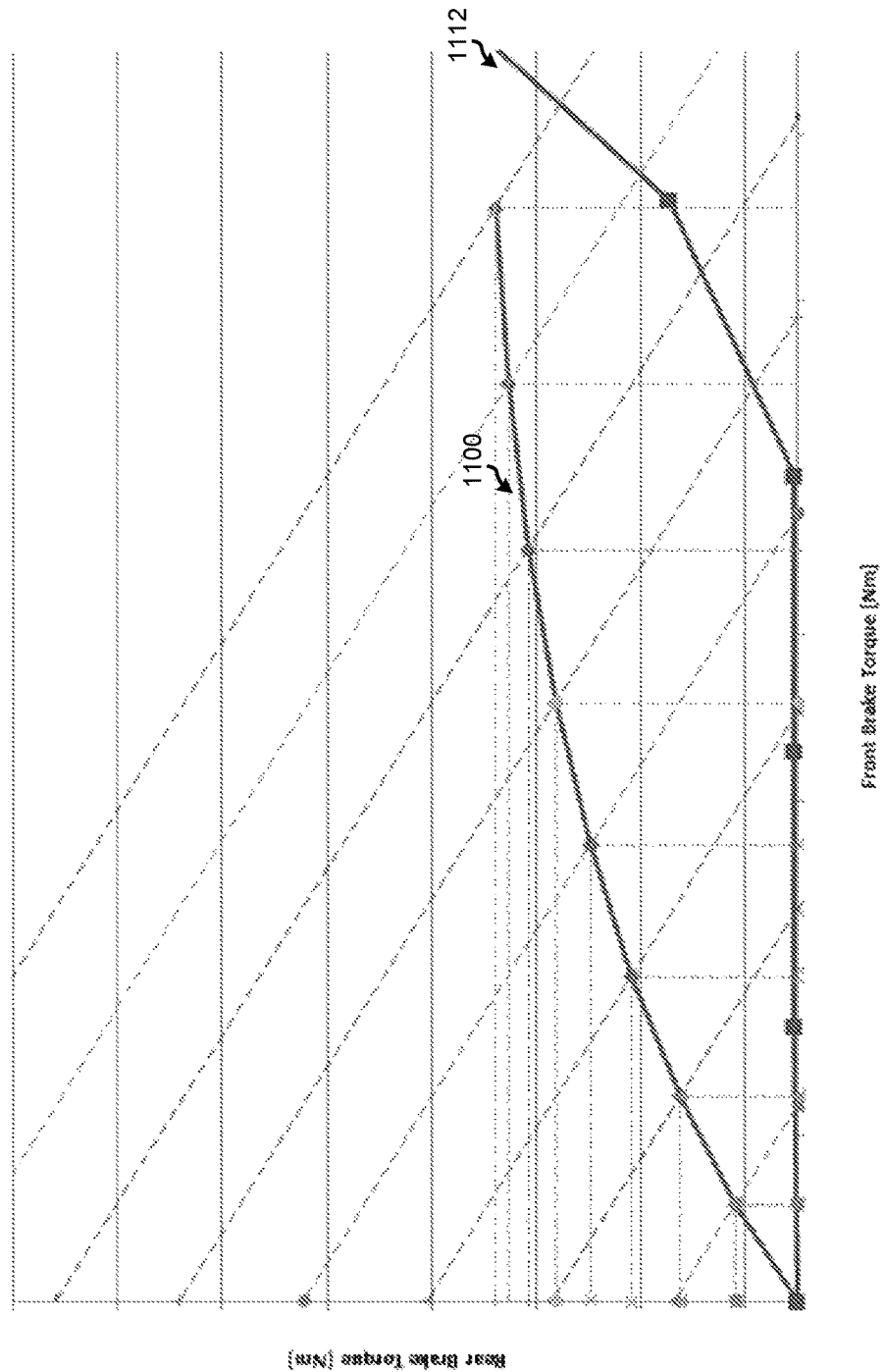
FIG. 77 is a graph illustrating delayed rear braking torque when using a blended braking system according to an exemplary embodiment.

FIG. 75 illustrates an exemplary input/output characteristic 1106 of hydraulic delay valve 1020 of FIG. 69. Delay valve 1020 outputs hydraulic pressure in response to an input pressure threshold 1108 being reached. FIG. 76 illustrates a brake force distribution 1110 of blended braking system 1000 of FIG. 69 with delay valve 1020 (FIG. 69) positioned at the front of the vehicle to delay front hydraulic braking. FIG. 77 illustrates a brake force distribution 1112 of blended braking system 1000 of FIG. 69 with delay valve 1020 (FIG. 69) positioned at the rear of the vehicle to delay rear hydraulic braking.

Referring now to FIG. 70, a second blended braking system 1030 is illustrated that modifies the system 1000 of FIG. 69. In one embodiment, first blended braking system 1000 of FIG. 69 provides regenerative braking during a portion of each braking event and relies on hydraulic brakes at high brake demand, as illustrated in FIG. 72. In one embodiment, when there is adequate battery capacity, second blended braking system 1030 is configured to provide regenerative braking during each entire braking event.

In blended braking system 1030, vehicle controller 702 uses the ON/OFF brake state from brake switch 736 in addition to the brake demand signal from brake pressure sensor 1018 to determine the amount of regenerative braking to apply with motor 1002. The battery charge level from BMC 712 also influences the regenerative braking level. When the vehicle batteries are unable to accept charge, the regenerative braking is disabled. In the illustrated embodiment, each drive mode selected with input 738 has different regenerative braking levels. For example, in golf mode described herein may implement more regenerative braking for smoother braking and reduced damage to the grounds traversed by vehicle 10. As another example, in high mode described herein less regenerative braking may be provided for more aggressive braking.

Regenerative braking may be applied before or during the hydraulic braking. In one embodiment, all or a portion of the regenerated energy is captured prior to the hydraulic brake usage. In another embodiment, at low brake demand, a larger amount of regenerative braking is supplied, and as the brake demand increases the proportion of hydraulic braking is increased and regenerative braking decreased. In one embodiment, as the vehicle speed decreases toward zero during braking, the regenerative braking also decreases towards zero. In one embodiment, controller 702 increases or decreases regenerative braking to maintain a constant vehicle deceleration rate, as detected at block 1032.

Referring to FIG. 71, a third blended braking system 1050 is illustrated that modifies the system 1000 of FIG. 70. Instead of a brake pressure sensor, system 1050 includes a brake pedal position sensor 1052 to detect brake demand. Brake pedal position sensor 1052 provides a signal representative of the degree of offset of brake pedal 386 (FIG. 69). This rotational offset is used by controller 702 to determine an amount of regenerative braking to apply. In one embodiment, an operator is able to control the amount of regenerative braking occurring before hydraulic braking is applied by controlling the position of brake pedal 386. As with the system 1030 of FIG. 70, the drive mode, battery state of charge, ON/OFF brake state 736, and vehicle deceleration 1032 are monitored and used by controller 702 to determine the amount of regenerative braking. In one embodiment, as the vehicle speed decreases toward zero during braking, the regenerative braking also decreases towards zero.

Referring again to FIG. 60, in an illustrative embodiment, one or more auxiliary electrical loads of vehicle 10 are powered directly from at least one of the batteries of battery pack 252, illustratively the lowest potential (bottom) battery, i.e., the battery whose negative terminal is connected directly to ground rather than to the negative terminal of another battery. As referred to herein, the upper or top batteries of battery pack 252 include all batteries other than the bottom battery. Exemplary auxiliary loads include lights, fans, controls (e.g., for power steering, winch, and other switched loads), and other accessories.

Figure 78:
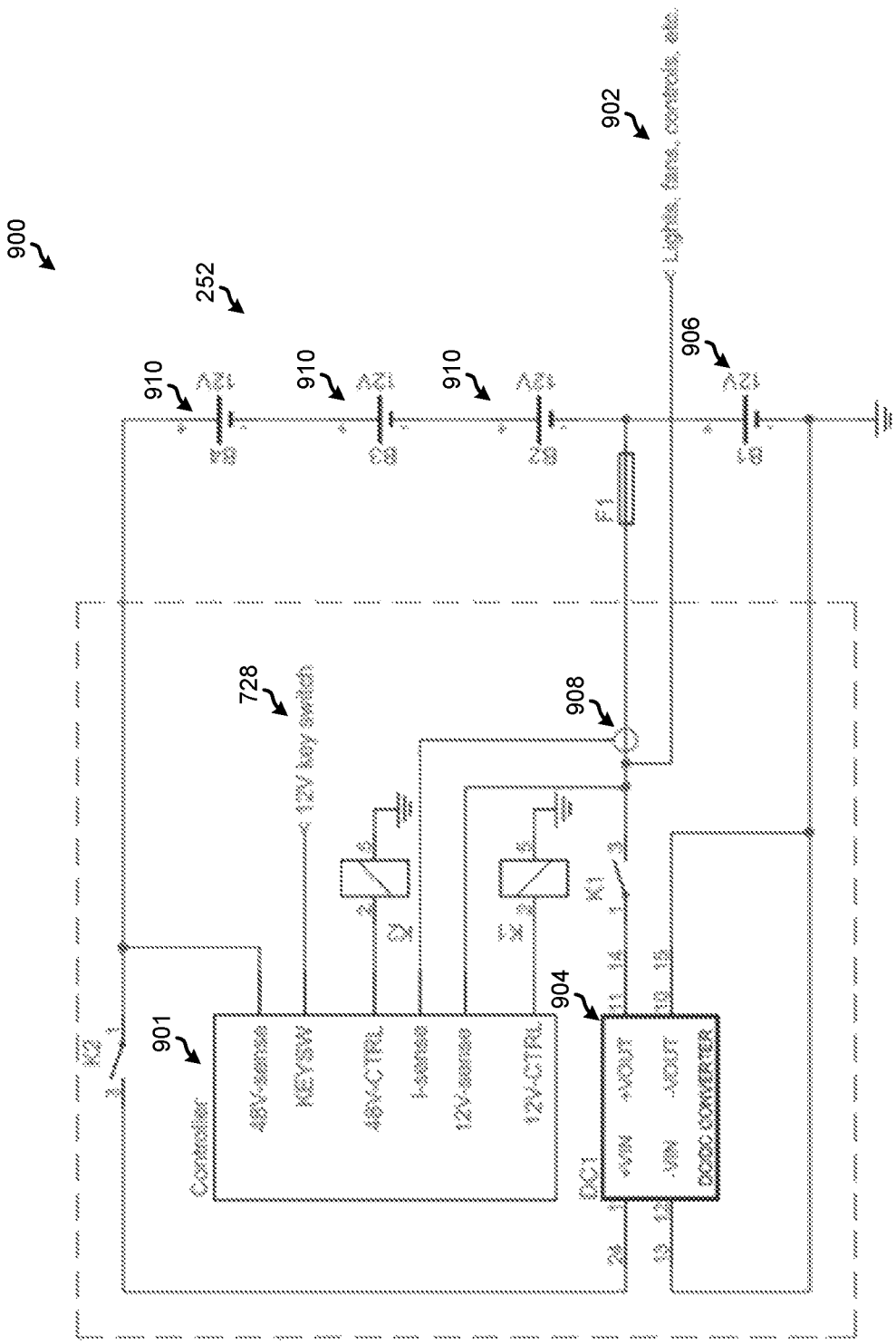
FIG. 78 is a representative view of an exemplary charging system of the vehicle of FIG. 1.

Referring to FIG. 78, an exemplary charging system 900 of vehicle 10 is illustrated for controlling the charge level of the lowest potential battery 906 of batteries 252 that powers one or more auxiliary loads 902. A battery equalization controller 901, such as logic of battery management controller (BMC) 712 (FIG. 60) or a separate control unit, monitors via current sensor 908 the current being delivered to auxiliary loads 902 by lowest potential battery 906. Controller 901 integrates this monitored current over time to track the net charge removed from battery 906 due to auxiliary loads 902. In response to the net charge removed from battery 906 exceeding a threshold amount, controller 901 activates relays K1 and K2 to turn on DC-DC converter 904 and to charge battery 906 with 12 volt current, thereby offsetting the charge removal due to auxiliary loads 902. In the illustrated embodiment, current from DC-DC converter 904 into battery 906 flows through current sensor 908 in the reverse direction as the current flowing to auxiliary loads 902. Controller 901 maintains battery 906 at the same state of charge as the remaining individual batteries 910 by maintaining the net 12 volt current through sensor 908 arbitrarily close to zero.

In one embodiment, controller 901, DC-DC converter 904, relays K1 and K2, and current sensor 908 of FIG. 78 are integrated in a single unit electrically coupled to batteries 252 or are integrated into the battery charger for batteries 252. In one embodiment, controller 901 is operative to increase and decrease the output current from DC-DC converter 904 to zero the average current through sensor 908. In one embodiment, to correct charge imbalance caused by measurement error, such as offset error, controller 901 is operative to sense the total DC bus voltage and the lowest potential battery voltage and adjust operation of DC-DC converter 904 as needed to maintain the proper ratio. In one embodiment, a second DC-DC converter and current sensor are provided to support powering of 24 VDC loads (e.g., hydraulic pumps or other loads) via two lowest potential or bottom batteries of batteries 252.

Figure 79:
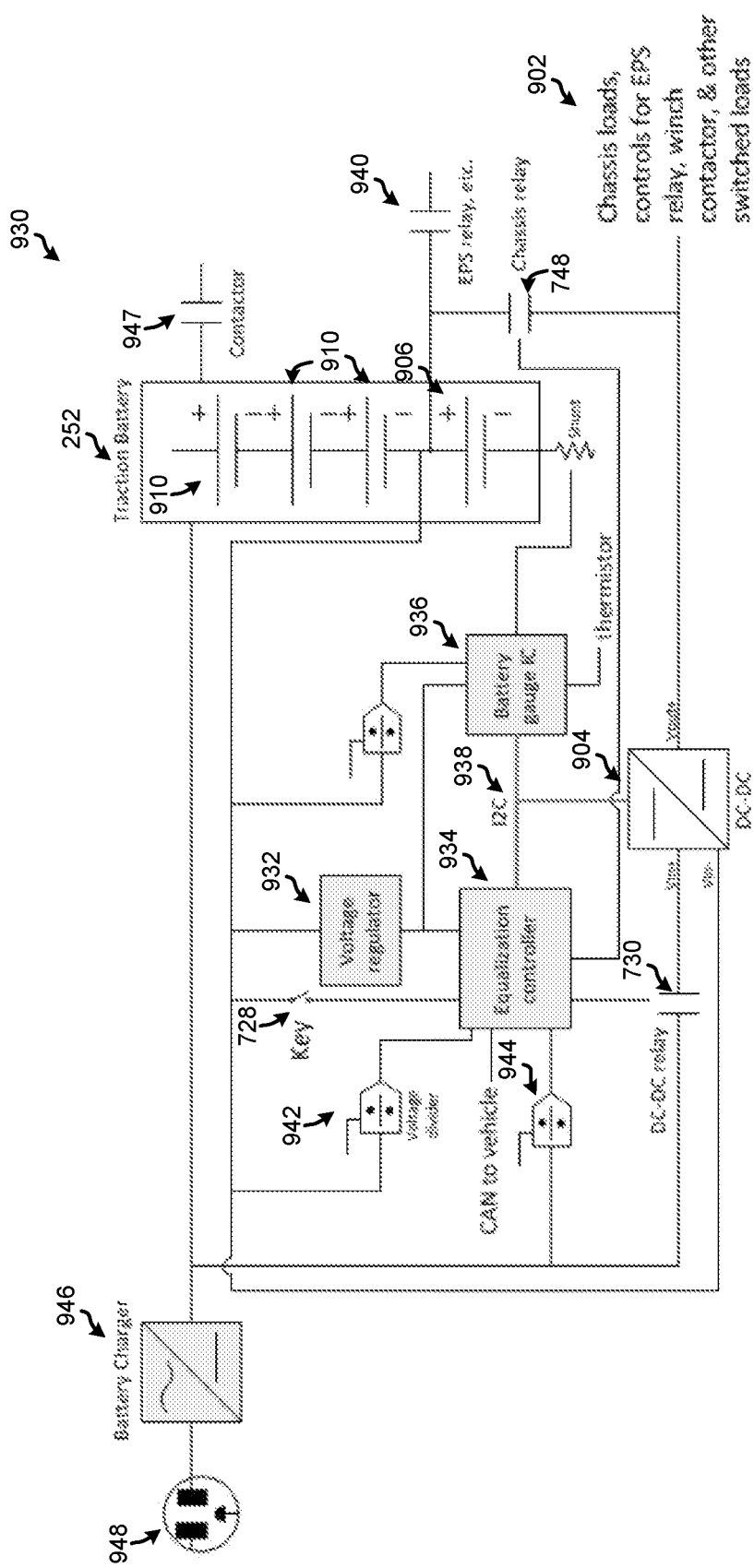
FIG. 79 is a representative view of another exemplary charging system of the vehicle of FIG. 1.

Referring to FIG. 79, another exemplary charging system 930 is illustrated for controlling the charge level of lowest potential battery 906 of batteries 252 that powers one or more auxiliary loads 902. In one embodiment, relays 730, 748 of FIG. 79 correspond to respective relays K2, K1 of FIG. 78. Charging system 930 is operative to supply power to auxiliary loads 902 (e.g., 12 VDC loads) while also providing accurate battery state of charge and power tracking information to an operator. Battery gauge circuitry 936 is operative to measure the state of charge of batteries 252 and report it to a battery equalization controller 934 over communication link 938 (e.g., I2C).

Battery equalization controller 934, such as logic of battery management controller (BMC) 712 or a separate control unit, monitors the average cell voltage (voltage per cell) of both a top battery 910 and bottom (lowest potential) battery 906 of batteries 252 via voltage dividers 942, 944. In the illustrated embodiment, the positive terminal of batteries 910 are coupled to at least one voltage bus which is coupled to traction motor 293 (FIG. 60) via contactor 947 and to the output of battery charger 946 coupled to electrical outlet 948. Controller 934 integrates the difference in the average cell voltages of the top and bottom batteries 910, 906 over time to track the net charge removed from battery 906 due to auxiliary loads 902. Controller 934 activates DC-DC converter 904 via relay contactor 730 and/or adjusts the output of DC-DC converter 904 to battery 906 as needed to charge battery 906 to reduce the difference between the average cell voltages of top and bottom batteries 910, 906 to zero.

Accordingly, controller 934 maintains bottom battery 906 at a same state of charge as the remaining batteries 910 of batteries 252 by selectively activating DC-DC converter 904. As such, the state of charge reported by battery gauge 936 to controller 934 is the state of charge for the entire battery pack 252, thereby increasing the likelihood of providing accurate estimations to an operator of the battery range until empty and the battery power usage. In the illustrated embodiment, DC-DC converter 904 is powered from a portion of batteries 252, illustratively top battery 910, that is not used to generate 12 VDC auxiliary power, which is illustratively generated by bottom battery 906. In one embodiment, controller 934, battery gauge 936, and DC-DC converter 904 all communicate over an inter-integrated circuit (I2C) communication bus 938.

In the illustrated embodiment, battery pack 252 is a 48 volt pack comprised of four 12 volt batteries. In this embodiment, bottom battery 906 supplies 25 percent of the average required auxiliary power for loads 902, and DC-DC converter 904 supplies the remaining 75 percent of the average required auxiliary power. Other suitable battery configurations may be provided.

In one embodiment, controller 934, DC-DC converter 904, relays 730, 748, and other electrical components of FIG. 79 are integrated in a single unit electrically coupled to batteries 252 or are integrated into the battery charger 946 for batteries 252. In one embodiment, a second DC-DC converter and current sensor are provided to support powering of 24 VDC loads (e.g., hydraulic pumps or other loads) via two lowest potential batteries of batteries 252.

In some embodiments, charging systems 900, 930 of FIGS. 78 and 79 allow auxiliary loads such as radios and lights, for example, to be on for extended periods without having to power on DC-DC converter 904 at all times while these accessories are powered on. As such, DC-DC converter 904 may be selectively activated as required by the charge state of lowest potential battery 906. In some embodiments, charging systems 900, 930 of FIGS. 78 and 79 allow high peak load accessories to be added without requiring an additional battery. Exemplary high peak load accessories include implements, such as a winch, or other suitable accessories demanding high peak electrical loads. In one embodiment, charging systems 900, 930 of FIGS. 78 and 79 serve to reduce the likelihood of over-discharge and/or undercharge of the lowest potential battery 906 and overcharge of the remainder of the battery pack 252, thereby increasing the likelihood of improved battery life.

Figure 80:
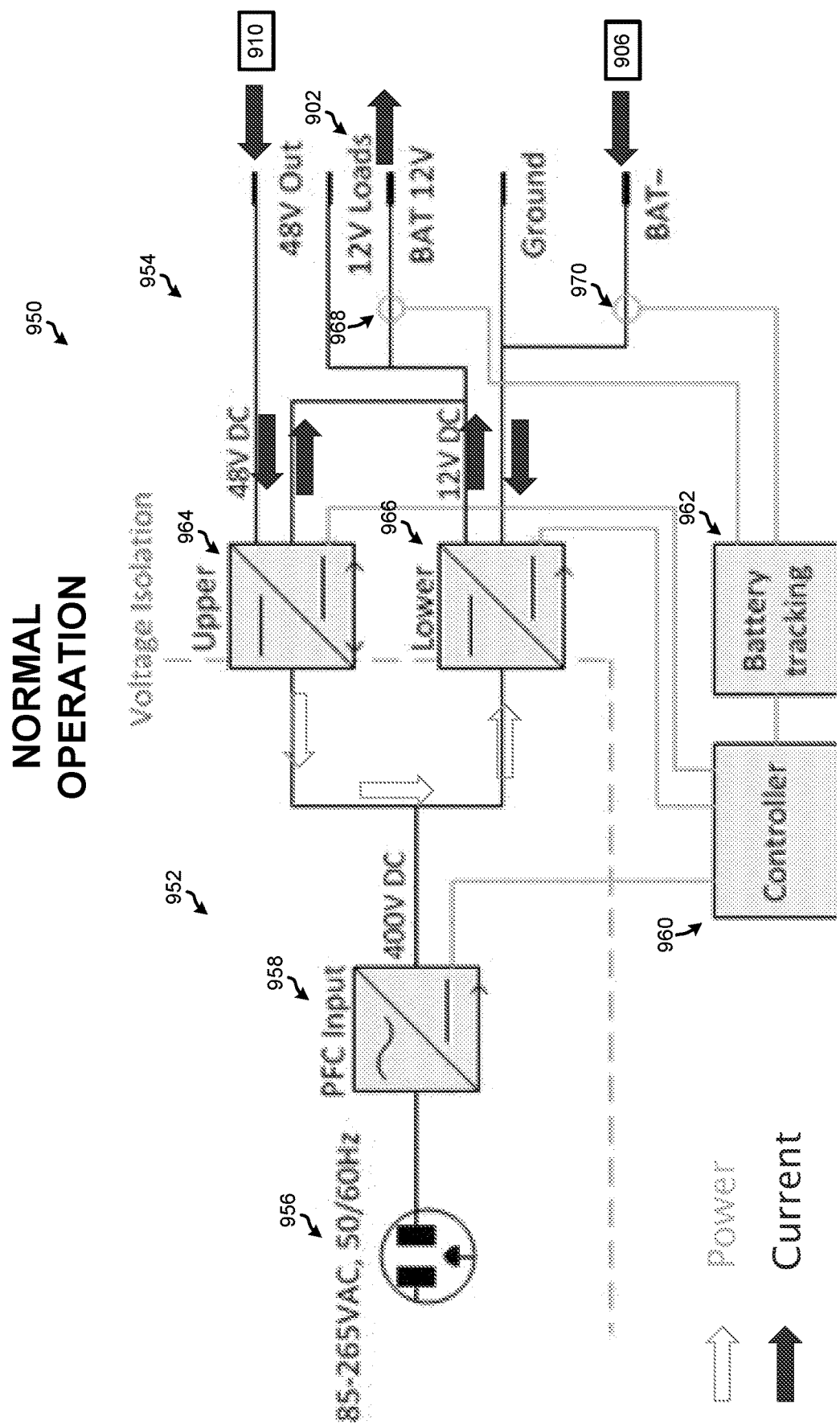
FIG. 80 is a representative view of another exemplary charging system of the vehicle of FIG. 1 during a normal, non-charging operation.

Referring to FIG. 80, another exemplary charging system 950 of vehicle 10 is illustrated that includes battery charging, DC-DC conversion, and battery managing functionality. In the illustrated embodiment, the battery charger, DC-DC converter, and BMC are provided in a common unit or module. Charging system 950 includes an input stage circuitry 952 and an output stage circuitry 954. Input stage circuitry 952 includes an AC to DC power factor correcting (PFC) circuit 958 configured to couple to an AC electrical outlet 956. PFC circuit 958 is operative to convert AC power received from outlet 956 to DC power while performing power factor correction. In the illustrated embodiment, PFC circuit 958 is operative to output 400 VDC to output stage circuitry 954, although other suitable voltage levels may be provided.

Output stage circuitry 954 is operative to provide independent charging to separate portions of vehicle batteries 252 (FIG. 60), illustratively to top batteries 910 portion and bottom battery 906 portion. Output stage circuitry 954 includes a top or upper output circuit 964 and a bottom or lower output circuit 966 each coupled to the DC output of PFC circuit 958. Upper output circuit 964 is bidirectional and is operative to charge top batteries 910 and to pull charge from top batteries 910 for routing to bottom battery 906 via lower output circuit 966. Lower output circuit 966 is operative to charge bottom battery 906. Upper and lower output circuits 964, 966 are illustratively voltage isolated from input stage circuitry 952.

An electronic controller 960, such as logic of battery management controller 712 of FIG. 60, is in communication with PFC input circuit 958, upper and lower output circuits 964, 966, and battery tracking module 962. Battery tracking circuitry 962 is operative to monitor a level of current routed to bottom battery 906 via current sensor 970 and a level of current drawn by auxiliary loads 902 via current sensor 968.

In one embodiment, current sensor 968 also measures the difference between the upper and lower batteries 910, 906. When the current measured through current sensor 968 is zero, the upper and lower pack batteries have the same current through them. System 950 further includes a battery gauge (e.g., gauge 936 of FIG. 79) that tracks the state of charge of battery pack 252 (FIG. 60) and measures power in and out of battery pack 252 for reporting to controller 960.

During a normal, non-charging operation of system 950 illustrated in FIG. 80, input stage 952 is not activated, and upper output circuit 964 draws power from one or more top batteries 910 of battery pack 252 and lower output circuit 966 delivers this power to one or more bottom batteries 906 of battery pack 252. Controller 960 adjusts the amount of power transferred from top batteries 910 to bottom batteries 906 to keep the charge levels of the batteries of battery pack 252 in balance.

Figure 81:
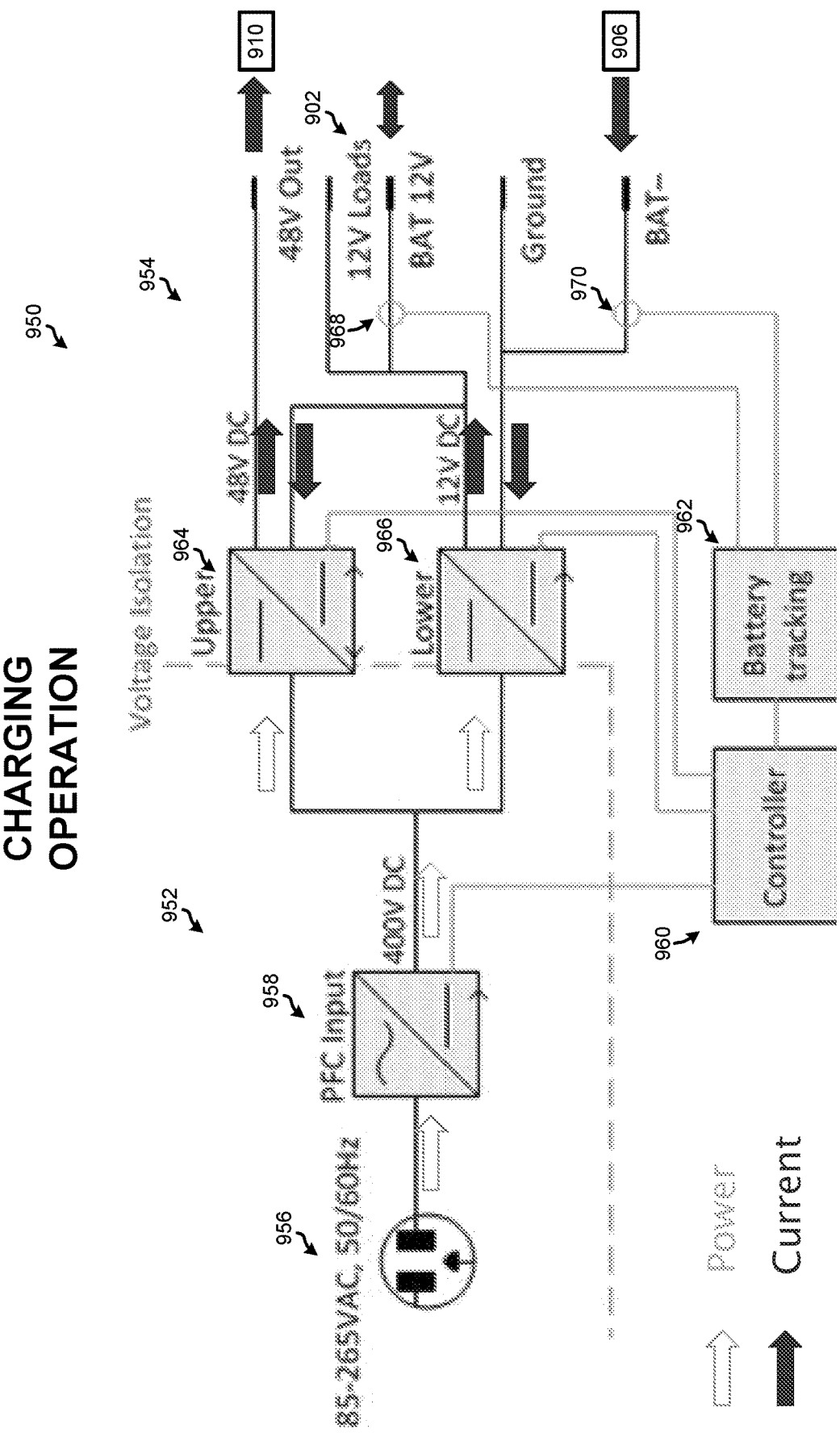
FIG. 81 is a representative view of the charging system of FIG. 80 during a charging operation.

During a charging operation of system 950 illustrated in FIG. 81, input stage 952 is enabled and provides charging power to both upper and lower output circuits 964, 966 of output stage 954. Upper output circuit 964 includes a DC-DC converter to reduce the power to an appropriate level (48 VDC) for charging top batteries 974. Similarly, lower output circuit 966 includes a DC-DC converter for routing 12 VDC power to bottom batteries 906, thereby providing independent charging of top and bottom batteries 910, 906 of battery pack 252. In one embodiment, charging is controlled based on the amount of charge removed during the previous discharge cycle of batteries 252.

In some embodiments, charging system 950 serves to reduce system cost, size, and weight by utilizing portions of the battery charger for DC-DC conversion and tracking functionality. By splitting the battery isolation stage of a battery charger into upper and lower portions, the DC-DC conversion functionality is enabled while sharing and integrating components including sensor and control hardware.

The term "logic" or "control logic" as used herein may include software and/or firmware executing on one or more programmable processors, application-specific integrated circuits (ASICs), field-programmable gate arrays (FPGAs), digital signal processors (DSPs), hardwired logic, or combinations thereof. Therefore, in accordance with the embodiments, various logic may be implemented in any appropriate fashion and would remain in accordance with the embodiments herein disclosed.

Figure 82A:
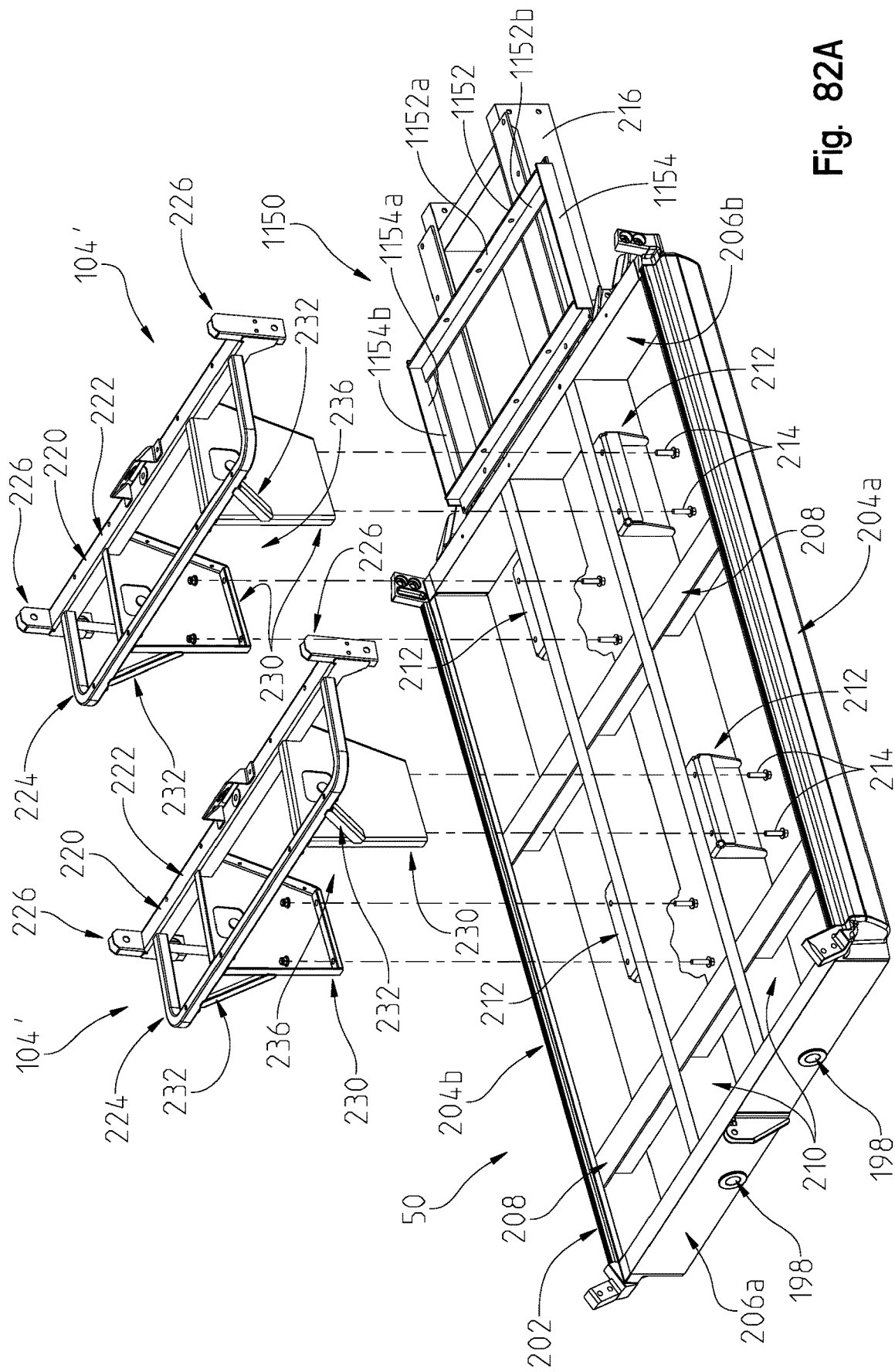
FIG. 82A is a front left perspective view of a floor frame, alternative embodiment seat frames configured to be coupled to the floor frame, and an alternative embodiment battery tray.

Referring to FIG. 82A, in one embodiment, vehicles 10 (FIG. 1), 10A (FIG. 10), 10B (FIG. 11) may include an alternative embodiment of seat frames 104 (FIG. 24) which are shown as seat frames 104'. Seat frames 104' are identical and interchangeable with each other and are configured to support seat bottom 252a-d and seat backs 254a-d (FIG. 34). Each seat frame 104' includes upper frame portion 220, rear frame member 222, front frame member 224, and support walls 230 but does not include front frame member 228 of seat frames 104 (FIG. 24). In this way, cargo area 236 beneath upper frame portion 220 and between support walls 230, which is configured to receive cargo, accessories of vehicles 10, 10A, 10B, or any other item, is accessible by the driver or front passenger from a position forward of seat frame 104' and also is accessible by the rear passengers from a position rearward of seat frame 104'.

Referring still to FIG. 82A, in one embodiment, vehicles 10 (FIG. 1), 10A (FIG. 10), 10B (FIG. 11) may include an alternative embodiment of battery tray 240 (FIG. 24) which is shown as a battery tray 1150. Battery tray 1150 of FIG. 82A is coupled to rear frame members 216 and configured to support at least one battery 252 (FIG. 25). Battery tray 1150 is defined by a plurality of laterally-extending frame members 1152 and a plurality of longitudinally-extending frame members 1154 coupled together in a rectangular shape. In one embodiment, laterally-extending frame members 1152 extend approximately 25-35 inches, for example 30 inches, and longitudinally-extending frame members 1154 extend approximately 10-17 inches, for example 13 inches. Each laterally-extending frame member 1152 includes an upstanding portion 1152a and a horizontal shoulder 1152b and each longitudinally-extending frame member 1154 includes an upstanding portion 1154a and a horizontal shoulder 1154b. Shoulders 1152b, 1154b are coupled together to define a platform or support surface for supporting at least one battery 252. As such, shoulders 1152b, 1154b support the bottom surfaces of batteries 252 and the upper portion of batteries 252 extend upwardly from shoulders 1152b, 1154b.

Figure 82B:
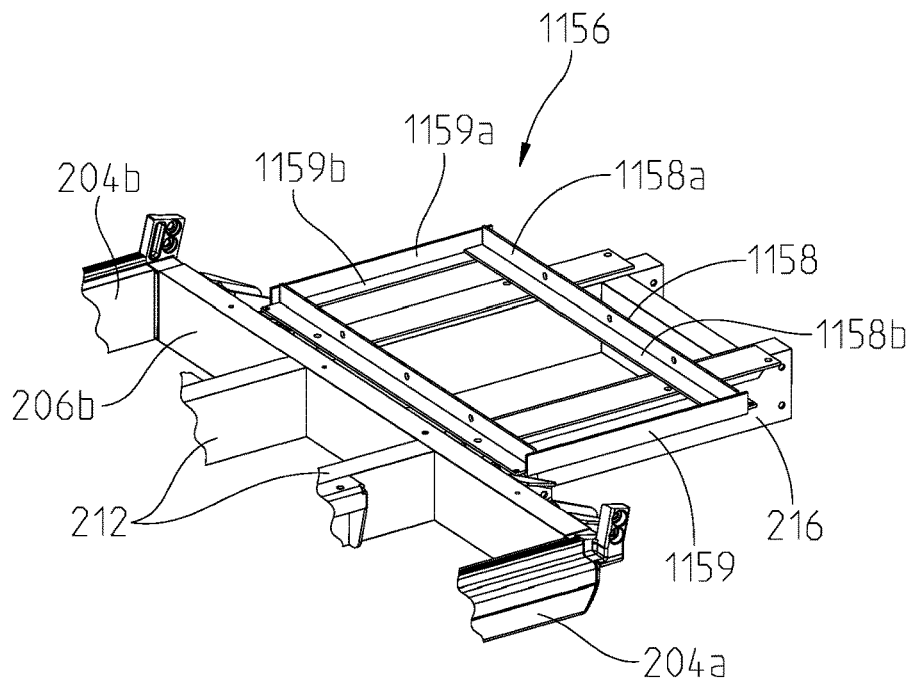
FIG. 82B is a front left perspective view of a rear portion of the floor frame of FIG. 82A and a further alternative embodiment battery tray.

Referring to FIG. 82B, an alternative embodiment of battery tray 1150 is shown as battery tray 1156. Battery tray 1156 also is defined by a plurality of laterally-extending frame members 1158 and a plurality of longitudinally-extending frame members 1159 coupled together in a rectangular shape. In one embodiment, laterally-extending frame members 1158 extend approximately 25-35 inches, for example 30 inches, and longitudinally-extending frame members 1159 extend approximately 12-20 inches, for example 16 inches, such that battery tray 1156 has a larger longitudinal dimension than battery tray 1150 of FIG. 82A. In this way, batteries 252 (FIG. 25) may be oriented differently in battery tray 1156 compared to the orientation of batteries 252 in battery tray 1150. Each laterally-extending frame member 1152 includes an upstanding portion 1158a and a horizontal shoulder 1158b and each longitudinally-extending frame member 1159 includes an upstanding portion 1159a and a horizontal shoulder 1159b. Shoulders 1158b, 1159b are coupled together to define a platform or support surface for supporting at least one battery 252.

Figure 82C:
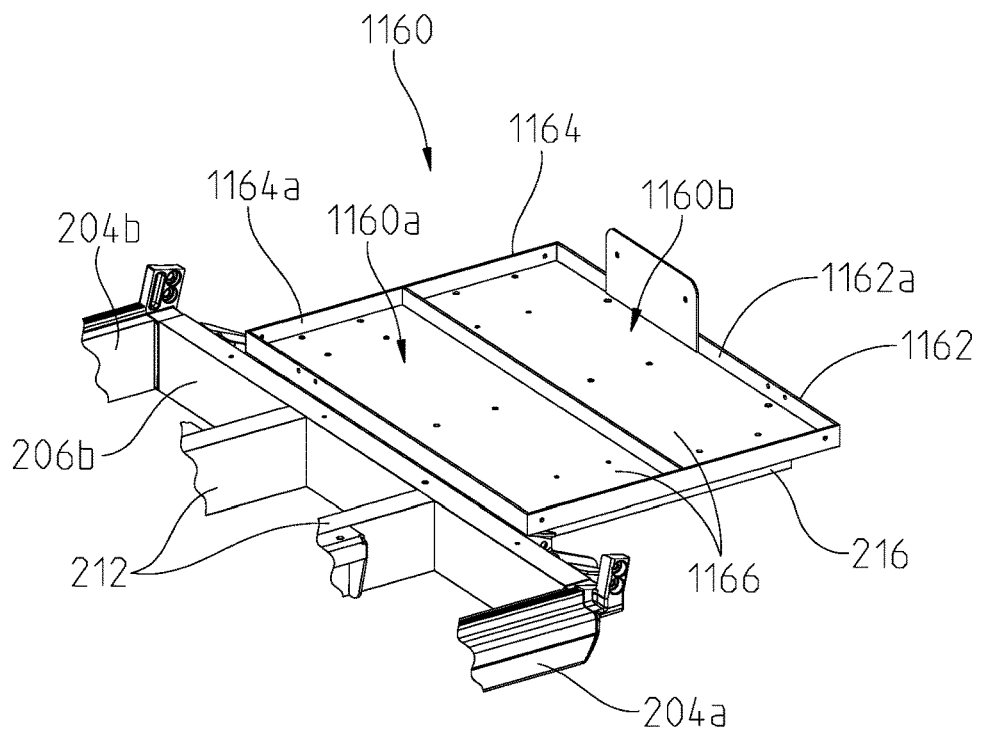
FIG. 82C is a front left perspective view of a rear portion of the floor frame of FIG. 82A and a further alternative embodiment battery tray.

Referring to FIG. 82C, an alternative embodiment of battery tray 1150 (FIG. 82A) is shown as battery tray 1160. Battery tray 1160 of FIG. 82C is coupled to rear frame members 216 and configured to support at least one battery 252 (FIG. 25). Battery tray 1160 is defined by a plurality of laterally-extending frame members 1162 and a plurality of longitudinally-extending frame members 1164 coupled together in a two longitudinally-oriented rectangular platforms 1160a, 1160b. In one embodiment, each rectangular platform 1160a, 1160b may have the same dimensions as battery tray 1150 of FIG. 82A. Each laterally-extending frame member 1162 includes an upstanding portion 1162a and a horizontal shoulder (not shown) and each longitudinally-extending frame member 1164 includes an upstanding portion 1164a and a horizontal shoulder (not shown). The shoulders of frame members 1162, 1164 are coupled to a floor panel 1166 which defines a support surface for supporting at least one battery 252. As such, the bottom surface of batteries 252 are supported by floor panels 1166 and the upper portion of batteries 252 extend upwardly from floor panels 1166.

Figure 82D:
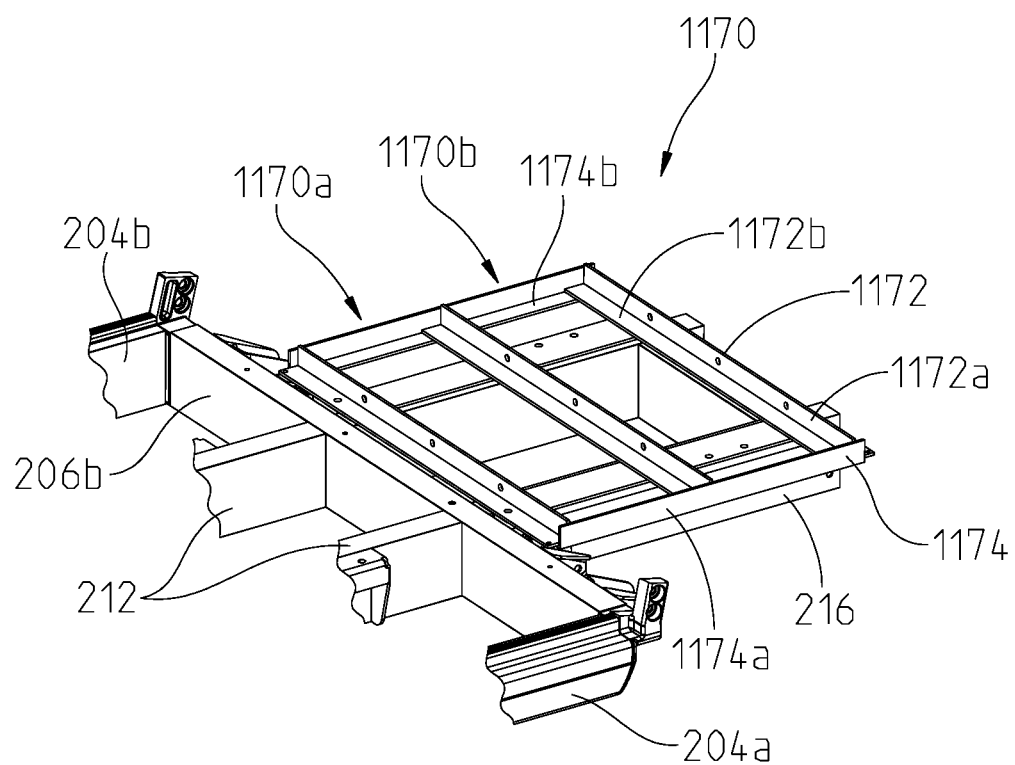
FIG. 82D is a front left perspective view of a rear portion of the floor frame of FIG. 82A and another alternative embodiment battery tray.

Referring now to FIG. 82D, an alternative embodiment of battery tray 1160 (FIG. 82C) is shown as battery tray 1170. Battery tray 1170 of FIG. 82D is coupled to rear frame members 216 and configured to support at least one battery 252 (FIG. 25). Battery tray 1170 is defined by a plurality of laterally-extending frame members 1172 and a plurality of longitudinally-extending frame members 1174 coupled together in a two longitudinally-oriented rectangular platforms 1170a, 1170b. Each laterally-extending frame member 1172 includes an upstanding portion 1172a and a horizontal shoulder 1172b and each longitudinally-extending frame member 1174 includes an upstanding portion 1174a and a horizontal shoulder 1174b. In one embodiment, each rectangular platform 1170a, 1170b may have the same dimensions as platforms 1160a, 1160b of FIG. 82C, however, battery tray 1170 of FIG. 82D does not include floor panels 1166 (FIG. 82C). Instead, shoulders 1172b, 1174b are coupled together to define a platform or support surface for supporting at least one battery 252.

It may be appreciated that battery trays 1150, 1156, 1160, 1170 of FIGS. 82A-82D, respectively, may support at least one battery 252 as discussed herein or may be positioned on top of battery tray 240 (FIG. 24) such that the bottom surface of batteries 252 may be supported by battery tray 240 and the upper portion of batteries 252 may be supported by any of battery trays 1150, 1156, 1160, 1170.

Figure 83:
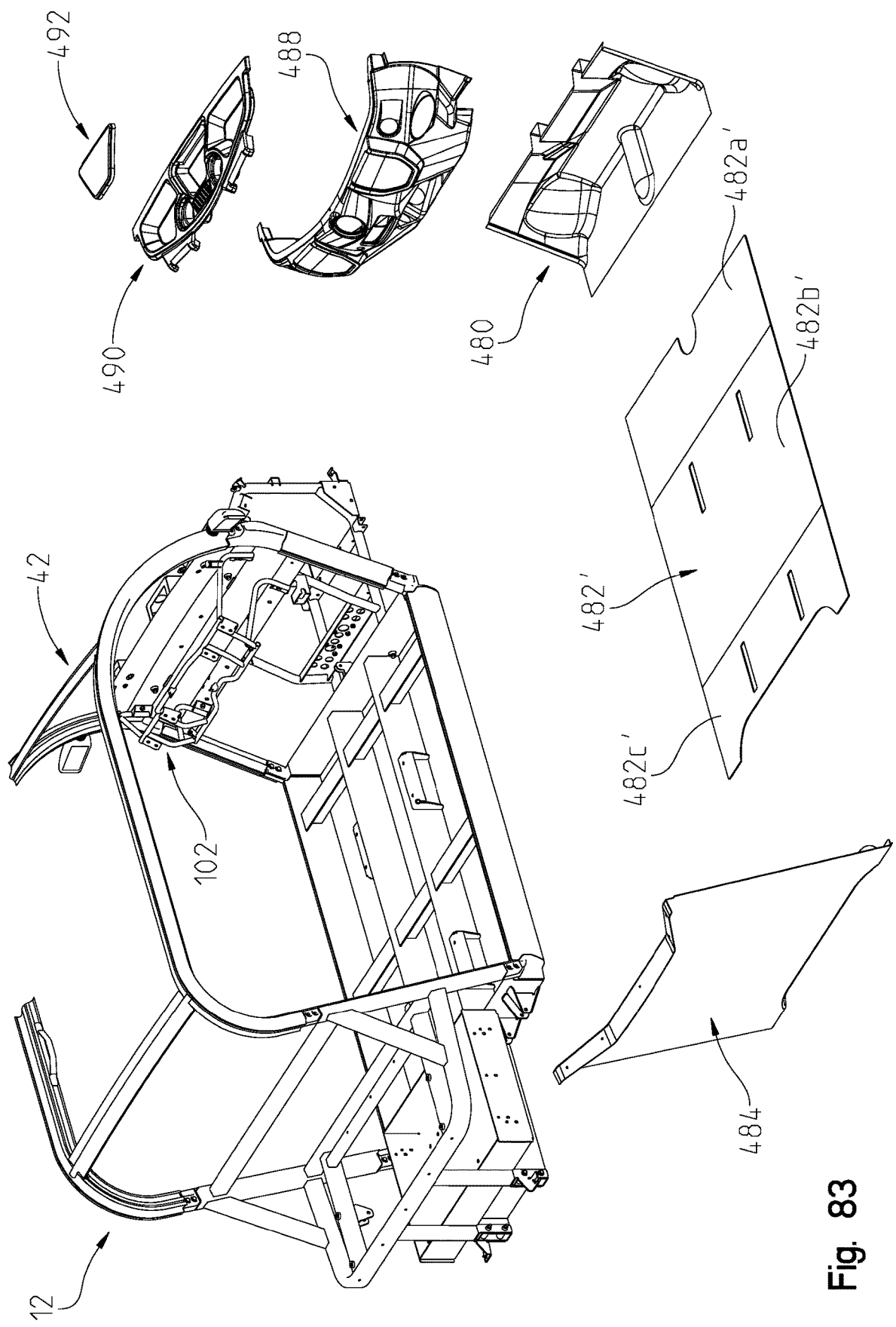
FIG. 83 is a partially exploded rear right perspective view of the vehicle of FIG. 1 including the frame assembly and an alternative embodiment of a plurality of interior panels configured to couple to the frame assembly.

Referring to FIG. 83, in one embodiment, the interior of any of vehicles 10, 10A, 10B includes front lower floor liner panel 480 and rear panel 484 and also includes an alternative embodiment of floor panel 482 (FIG. 47) shown as a floor panel 482'. Panels 480, 482', 484 are coupled to middle frame module 42. For each different length of vehicle 10, 10A, 10B described herein (FIGS. 1-12), lower floor liner panel 480 and rear panel 484 are identical but floor panel 482' varies in length to accommodate the different length of middle frame modules 42. More particularly, floor panel 482' may include a plurality of sections 482a', 482b', 482c' which are coupled together to define floor panel 482'. While exemplary floor panel 482' is disclosed as having three sections 482a', 482b', 482c', floor panel 482' may include any number of sections, such that floor panel 482' may be defined by a single section or by 2 or more sections. In one embodiment, sections 482a', 482b', 482c' are coupled to middle frame module 42 with an adhesive, although other suitable fasteners or couplers may be used. Additionally, sections 482a', 482b', 482c' may be coupled to each other with adhesive, fasteners, or complementary interlocking members (not shown).

In one embodiment, for vehicle 10A (FIG. 10), which includes two seats, floor panel 482' may only include one of sections 482a', 482b', 482c'. For example, the interior of vehicle 10A may include only section 482a' of floor panel 482'. However, in another embodiment, if the size of the vehicle disclosed herein is increased to accommodate four seats, as shown in vehicle 10 (FIG. 1), section 482b' may be coupled to section 482a' to increase the size of floor panel 482' in accordance with the size of vehicle 10A. Similarly, in a further embodiment, if the size of the vehicle is further increased to accommodate six seats, as shown in vehicle 10B (FIG. 11), section 482c' may be coupled to section 482b' to further increase the size of floor panel 482' in accordance with the size of vehicle 10B. In this way, floor panel 482' may have a modular configuration such that additional sections 482b' and 482c' may be added to section 482a' to accommodate he increased length of middle frame module 42.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:
1. An electric vehicle including:
a plurality of ground engaging members;
a chassis supported by the plurality of ground engaging members;
an electric motor supported by the chassis;
a drive train supported by the chassis and operative to provide power from the electric motor to at least one ground engaging member;
a frame assembly supported by the plurality of ground engaging members, the frame assembly including a front frame module supported by a first portion of the plurality of ground engaging members, a middle frame module, and a rear frame module supported by a second portion of the plurality of ground engaging members, the first portion of the plurality of ground engaging members including a first ground engaging member and a second ground engaging member and the second portion of the plurality of ground engaging members including a third ground engaging member in line with the first ground engaging member of the first portion of the plurality of ground engaging members and a fourth ground engaging member in line with the second ground engaging member of the second portion of the plurality of ground engaging members, the middle frame module is positioned between the first portion and the second portion, a first side of the middle frame module is in line with the first ground engaging member of the first portion of the plurality of ground engaging members and the third ground engaging member of the second portion of the plurality of ground engaging members, and a second side of the middle frame module is in line with the second ground engaging member of the first portion of the plurality of ground engaging members and the fourth ground engaging member of the second portion of the plurality of ground engaging members, the middle frame module comprising a floor frame which further includes a pair of rear frame members coupled to and extending longitudinally from a rear beam of the floor frame to a position directly under the rear frame module and rearward of a portion the plurality of ground engaging members positioned rearward of the seating area;
a seating area supported by the middle frame module,
the front frame module being fastened to a front portion of the middle frame module, the rear frame module being fastened to a rear portion of the middle frame module, and the middle frame module being interchangeable with at least one other middle frame module to change a length of the vehicle;
and
a plurality of batteries supported by the rear frame module independent of the middle frame module, the plurality of batteries being operative to provide energy to the electric motor.

2. The electric vehicle of claim 1, wherein the middle frame module includes a cab frame positioned above the floor frame.

3. The electric vehicle of claim 2, wherein the floor frame and cab frame each include a plurality of frame members, frame members of the floor frame each have a height that is greater than a height of frame members of the cab frame, and the frame members of the floor frame are coupled together to form a plurality of storage openings in the floor frame.

4. The electric vehicle of claim 3, further including at least one of a battery and an electronic controller coupled to the floor frame in at least one of the storage openings.

5. The electric vehicle of claim 2, wherein the seating area includes a first seat assembly and a second seat assembly positioned rearward of the first seat assembly, and the first and second seat assemblies are coupled to the floor frame and are interchangeable with each other.

6. The electric vehicle of claim 2, wherein the seating area includes a first seat assembly and a second seat assembly positioned rearward of the first seat assembly, the first and second seat assemblies is coupled to the floor frame, and at least one of the first and second seat assemblies is configured for positioning in a forward orientation and in a reverse orientation when coupled to the floor frame.

7. The electric vehicle of claim 1, further including a battery tray configured to hold the plurality of batteries.

8. The electric vehicle of claim 7, wherein the battery tray extends between a plurality of longitudinally-extending frame members of the rear frame module.

9. The electric vehicle of claim 7, wherein electrical wiring is routed along frame members of the middle frame module from the plurality of batteries to the electric motor.

10. The electric vehicle of claim 1, wherein the middle frame module includes a steering assembly frame including a left steering assembly mount and a right steering assembly mount, and the vehicle further includes a steering assembly coupled to one of the left and right steering assembly mounts.

11. The electric vehicle of claim 1, wherein the seating area includes a seat assembly, the seat assembly includes a seat supported by a seat frame, the seat including a seat bottom and a seat back, and the seat frame includes an upper frame portion supporting the seat and forms a rear opening below the seat extending from the floor panel to the upper frame portion.

12. The electric vehicle of claim 1, wherein the electric motor and the drive train are mounted only to the front frame module.

13. The electric vehicle of claim 1, wherein the ground engaging members include a pair of front wheels coupled to the front frame module and a pair of rear wheels coupled to the rear frame module.

14. An electric vehicle including:
a plurality of ground engaging members including a first portion of the plurality of ground engaging members positioned in a front portion of the vehicle and a second portion of the plurality of ground engaging members positioned in a rear portion of the vehicle;
a chassis supported by the plurality of ground engaging members;
an electric motor supported by the chassis and operative to provide power to at least one ground engaging member;
a plurality of batteries providing electric power to the electric motor;
an operator seating area supported by the chassis and positioned in a middle portion of the vehicle;
an independent front suspension assembly;
an independent rear suspension assembly including a left rear suspension assembly and a right rear suspension assembly, wherein the plurality of batteries are positioned in the rear portion of the vehicle laterally between the second portion of the plurality of ground engaging members, and laterally between the left rear suspension assembly and the right rear suspension assembly; and
a frame assembly including a front frame module, a rear frame module, and a middle frame module coupled to the front and rear frame modules, wherein the middle frame module comprising a floor frame which further includes a pair of rear frame members coupled to and extending longitudinally from a rear beam of the floor frame to a position directly under the rear frame module and rearward of a portion the plurality of ground engaging members positioned rearward of the seating area.

15. The vehicle of claim 14, wherein the electric motor is positioned in the front portion of the vehicle.

16. The vehicle of claim 14, further including a tray holding the plurality of batteries and being positioned between the left and right rear suspension assemblies, wherein the tray is supported by the rear portion of the vehicle.

17. An electric vehicle including:
a plurality of ground engaging members;
a chassis supported by the plurality of ground engaging members;
an electric motor supported by the chassis;
a drive train supported by the chassis and operative to provide power from the electric motor to at least one ground engaging member;
a frame assembly supported by the plurality of ground engaging members, the frame assembly including a front frame module, a middle frame module, and a rear frame module;
a plurality of batteries operative to provide energy to the electric motor;
a battery tray supported by the rear frame module and configured to hold the plurality of batteries; and
a seating area supported by the middle frame module, the front frame module being fastened to a front portion of the middle frame module, the rear frame module being fastened to a rear portion of the middle frame module, a first side of the middle frame module is in line with a first ground engaging member, of the plurality of ground engaging members, and a second side of the middle frame module is in line with a second ground engaging member, of the plurality of ground engaging members, and the middle frame module being interchangeable with at least one other middle frame module to change a length of the vehicle, the middle frame module comprising a floor frame which further includes a pair of rear frame members coupled to and extending longitudinally from a rear beam of the floor frame to a position directly under the rear frame module and rearward of a portion the plurality of ground engaging members positioned rearward of the seating area.

* * * * *